US012317054B2

(12) United States Patent
Palmer et al.

(10) Patent No.: US 12,317,054 B2
(45) Date of Patent: *May 27, 2025

(54) SYSTEMS, METHODS, AND DEVICES RELATING TO AUDIO TRANSDUCERS

(71) Applicant: WING ACOUSTICS LIMITED, Auckland (NZ)

(72) Inventors: David Palmer, Auckland (NZ); Michael Palmer, Auckland (NZ)

(73) Assignee: WING ACOUSTICS LIMITED, Auckland (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 18/174,951

(22) Filed: Feb. 27, 2023

(65) Prior Publication Data

US 2023/0362549 A1 Nov. 9, 2023

Related U.S. Application Data

(63) Continuation of application No. 17/268,227, filed as application No. PCT/IB2019/056916 on Aug. 14, 2019, now Pat. No. 11,627,415.

(30) Foreign Application Priority Data

Aug. 14, 2018 (NZ) ........................................ 745284

(51) Int. Cl.
*H04R 9/06* (2006.01)
*H04R 7/04* (2006.01)
(Continued)

(52) U.S. Cl.
CPC ............... *H04R 9/066* (2013.01); *H04R 7/04* (2013.01); *H04R 7/18* (2013.01); *H04R 9/025* (2013.01); *H04R 31/006* (2013.01)

(58) Field of Classification Search
CPC . H04R 9/066; H04R 7/04; H04R 7/18; H04R 9/025; H04R 31/006
See application file for complete search history.

(56) References Cited

U.S. PATENT DOCUMENTS 5,825,901 A 10/1998 Hisey
6,788,796 B1 9/2004 Miles et al.
(Continued)

FOREIGN PATENT DOCUMENTS

JP S61157000 7/1986
JP S6253099 3/1987
(Continued)

OTHER PUBLICATIONS

International Search Report and Written Opinion for Application No. PCT/IB2019/056916 dated Oct. 24, 2019.
(Continued)

*Primary Examiner* — Sunita Joshi
(74) *Attorney, Agent, or Firm* — ALSTON & BIRD LLP

(57) ABSTRACT

The invention relates to various rotational action audio transducer embodiments having a diaphragm structure including a single or multiple diaphragms. A diaphragm suspension rotatably mounts the diaphragm structure to a base structure. In some embodiments, the diaphragm suspension may be made from soft and/or damped materials. In some embodiments, the location of an axis of rotation of the diaphragm is determined based on a node axis of the diaphragm. A transducing mechanism of the audio transducer cooperates with the moving diaphragm to transduce sound. The mechanism may comprise a moving magnet design in some embodiments, or a moving coil design in others.

46 Claims, 33 Drawing Sheets

(51) Int. Cl.

| | |
|---|---|
| ***H04R 7/18*** | (2006.01) |
| ***H04R 9/02*** | (2006.01) |
| ***H04R 31/00*** | (2006.01) |

(56) References Cited

U.S. PATENT DOCUMENTS

| | | | |
|---|---|---|---|
| 7,088,839 | B2 | 8/2006 | Geschiere et al. |
| 7,860,265 | B2 | 12/2010 | Gaudreault |
| 8,965,024 | B2 | 2/2015 | Graham |
| 2004/0202338 | A1 | 10/2004 | Longbottom et al. |
| 2007/0165886 | A1 | 7/2007 | Topliss et al. |
| 2012/0257778 | A1 | 10/2012 | Hall et al. |
| 2014/0003624 | A1 | 1/2014 | Stroembaeck |
| 2016/0192087 | A1 | 6/2016 | Van Halteren et al. |
| 2017/0078798 | A1 | 3/2017 | Palmer et al. |

FOREIGN PATENT DOCUMENTS

| | | | | |
|---|---|---|---|---|
| JP | 2006013671 A | | 1/2006 | |
| WO | WO-2017046716 A1 | * | 3/2017 | ........... H04R 31/003 |
| WO | WO 2018/066002 | | 4/2018 | |

OTHER PUBLICATIONS

Phoenix Gold Cyclone Subwoofer—product, not patent publication (https://www.diymobileaudio.com/threads/bnib-phoenix-gold-cyclone-from-1996-yes-new-in-box.151765/).

U.S. Appl. No. 17/268,227, filed Mar. 12, 2021, U.S. Pat. No. 11,627,415.

* cited by examiner

SECTION G-G

SECTION C-C

SECTION I-I

SECTION A-A

SECTION B-B

SECTION D-D

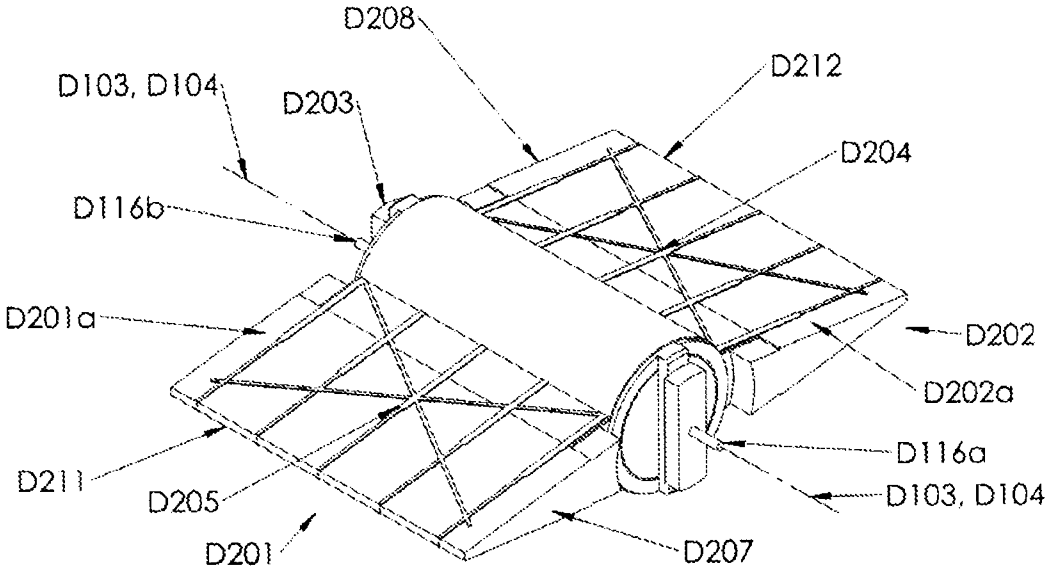
FIG. 12L
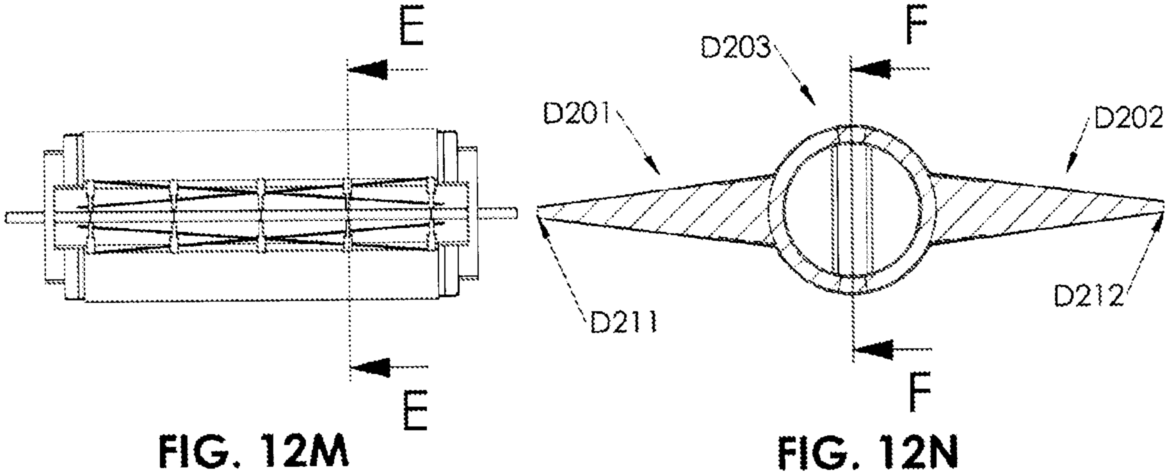
FIG. 12M
FIG. 12N
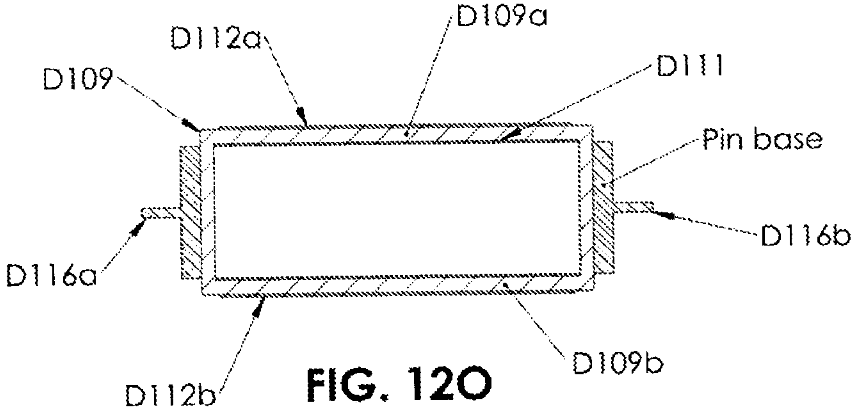
FIG. 12O

SECTION A-A

SECTION B-B

SECTION C-C

SECTION D-D

SECTION E-E

SECTION F-F

SECTION G-G

SECTION H-H

SECTION V-V

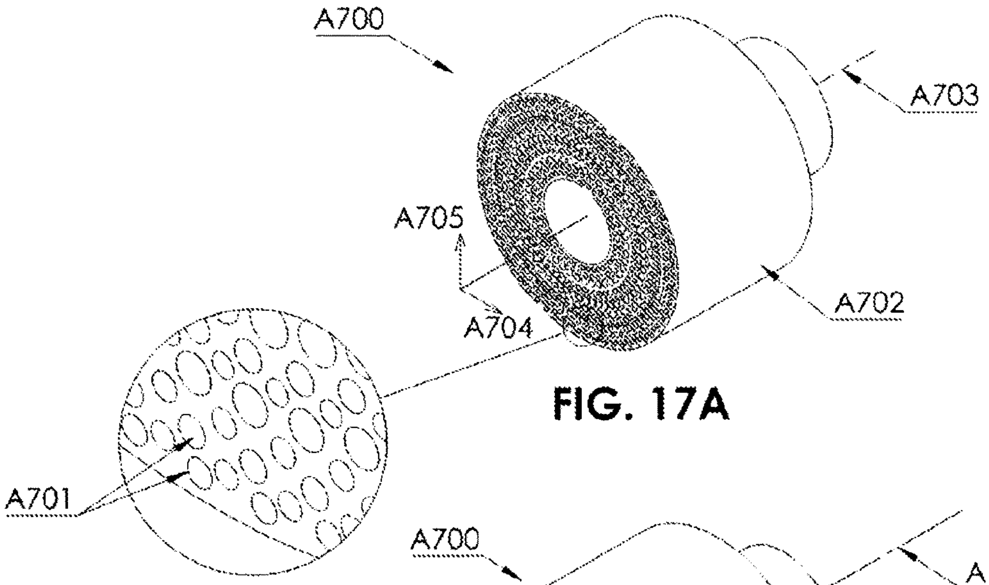
FIG. 17A
FIG. 17B
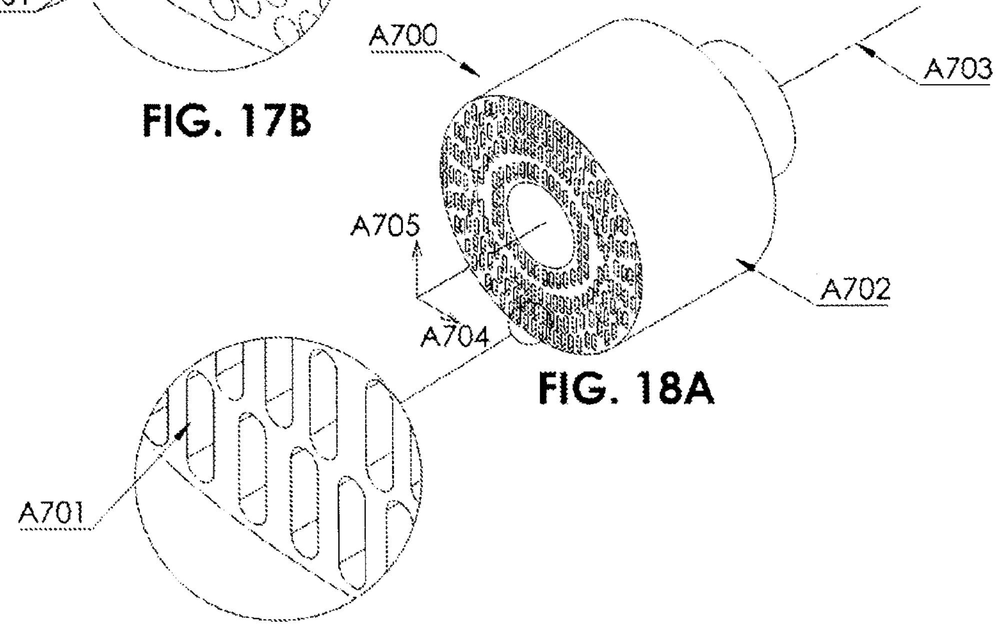
FIG. 18A
FIG. 18B
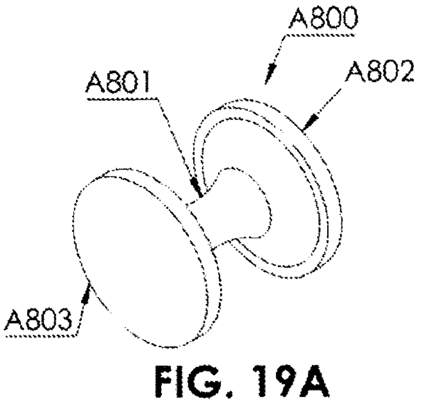
FIG. 19A
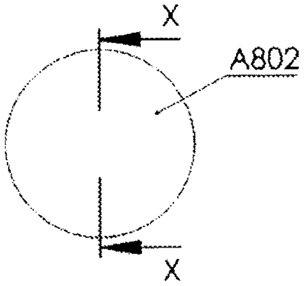
FIG. 19B
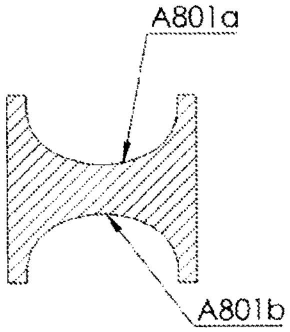
FIG. 19C
SECTION X-X

SYSTEMS, METHODS, AND DEVICES RELATING TO AUDIO TRANSDUCERS

CROSS-REFERENCE TO RELATED APPLICATIONS

This application is a continuation of and claims priority to U.S. patent application Ser. No. 17/268,227, filed on Feb. 12, 2021, which is a National Stage Entry of PCT/IB2019/056916, filed on Aug. 14, 2019, which claims priority to New Zealand Patent Application No. 745284, filed on Aug. 14, 2018, the contents of each of which are herein incorporated by reference in their entirety.

FIELD OF THE INVENTION

The present invention relates to audio transducers, such as those used in loudspeakers, microphones and the like, and associated devices or methods.

BACKGROUND TO THE INVENTION

Loudspeaker drivers are a type of audio transducer that generate sound by oscillating a diaphragm using an actuating mechanism that may be electromagnetic, electrostatic, piezoelectric or any other suitable moveable assembly known in the art. The driver is generally contained within a housing. In conventional drivers, the diaphragm is a flexible membrane component linearly coupled to a rigid housing. Loudspeaker drivers therefore form resonant systems where the diaphragm is susceptible to unwanted mechanical resonance (also known as diaphragm breakup) at certain frequencies during operation. This affects the performance and sound quality of the driver.

Rotational-action loudspeakers operate by rotating a diaphragm to generate sound. Recent developments in loudspeaker technology have benefited from this approach to improve the performance and sound quality relative to the conventional, linear driver technology. Such developments are exemplified in PCT publication WO 2017/046716, for example, where a rigid approach to multiple driver aspects, including the diaphragm and diaphragm suspension for example, is employed to push unwanted resonances to frequencies that are approximately beyond the listeners hearing range, or approximately beyond the driver's intended frequency range of operation.

Given that the design of a loudspeaker is dependent on factors including performance and intended application, there continues to be a need for alternative designs that may be better suited for certain applications.

It is an object of the present invention to provide alternative audio transducer devices or methods of manufacture which work in some towards addressing some of the shortcomings of existing technologies, or to at least provide the public with a useful choice.

SUMMARY OF THE INVENTION

Device Aspects

In some aspects, the invention may broadly be said to consist of an audio transducer comprising:

a diaphragm;

a transducer base structure;

a diaphragm suspension system configured to rotatably mount the diaphragm relative to the transducer base structure, the diaphragm suspension system being located such that a primary axis of rotation of the diaphragm relative to the transducer base structure is located in a plane that is substantially perpendicular to a coronal plane of the diaphragm and that contains a predetermined node axis of the diaphragm; and a transducing mechanism operatively coupled to the diaphragm to transduce between audio signals and sound pressure.

In some aspects the invention may broadly be said to consist of an audio transducer comprising:

a diaphragm;

a transducer base structure;

a diaphragm suspension system configured to rotatably mount the diaphragm relative to the transducer base structure, the diaphragm suspension system being located such that a primary axis of rotation of the diaphragm relative to the transducer base structure and a centre of mass axis of the diaphragm are substantially coaxial; and a transducing mechanism operatively coupled to the diaphragm to transduce between audio signals and sound pressure.

In some aspects, the invention may broadly be said to consist of an audio transducer comprising:

a diaphragm structure comprising a plurality of diaphragms;

a transducer base structure;

a diaphragm suspension configured to rotatably mount the diaphragm structure relative to the transducer base structure to enable the diaphragm structure to rotate relative to the transducer base structure about an axis of rotation; and a transducing mechanism operatively coupled to the diaphragm structure to transduce between audio signals and sound pressure.

In some aspects, the invention may broadly be said to consist of an audio transducer comprising:

a diaphragm;

a transducer base structure;

a diaphragm suspension configured to rotatably mount the diaphragm relative to the transducer base structure to enable the diaphragm structure to rotate relative to the transducer base structure about an axis of rotation, wherein the diaphragm suspension comprises at least one hinge; and a transducing mechanism operatively coupled to the diaphragm structure to transduce between audio signals and sound pressure.

In some aspects, the invention may broadly be said to consist of an audio transducer comprising:

a diaphragm;

a transducer base structure;

a diaphragm suspension configured to mount the diaphragm relative to the transducer base structure to enable the diaphragm to rotate relative to the transducer base structure; and a transducing mechanism to transduce between audio signals and sound pressure and comprising a magnet or magnetic assembly coupled to the diaphragm and moveable with the diaphragm during operation.

Device Embodiments

Unless stated otherwise, the following embodiments may apply to any one or more of the abovementioned aspects and the features of any two or more embodiments may be combined with any aspect.

In some embodiments, the audio transducer may comprise a single diaphragm. In the case of a rotating action transducer, the single diaphragm may extend radially, in a single direction, from the axis of rotation.

In some embodiments, the audio transducer may comprise a diaphragm structure including a plurality of diaphragms.

In some embodiments, the plurality of diaphragms may be extend from a central location at an angle relative to one another. In the case of a rotating action transducer, the plurality of diaphragms may be radially spaced about the axis of rotation, for example. The plurality of diaphragms may be uniformly radially spaced. There may be a pair of diaphragms spaced at 180 degrees apart, for example.

In some embodiments, the plurality of diaphragms are substantially rigidly connected to one-another.

The following embodiments may relate to a single-diaphragm transducer embodiment or to a multiple-diaphragm transducer embodiment.

In some embodiments, each diaphragm remains substantially rigid in-use.

In some embodiments, each diaphragm may comprise a diaphragm body formed from a composite material. The diaphragm body may comprise an interconnected structure that varies in three-dimensions. The diaphragm body may comprise a substantially low density matrix. The diaphragm body may be formed from a low density foam material, such as a polystyrene foam.

In some embodiments, each diaphragm comprises a substantially thick diaphragm body. The diaphragm body may comprise a maximum thickness that is greater than 12% or 15% of a length of the diaphragm body. The diaphragm body may comprise a maximum thickness that is greater than 20% of a length of the diaphragm body. The diaphragm body may comprise a maximum thickness that is greater than 9% or 11% of a greatest dimension, such as a diagonal length, of the diaphragm body. The diaphragm body may comprise a maximum thickness that is greater than 14% of a maximum dimension, such as a diagonal length, of the diaphragm body.

In some embodiments, the diaphragm may comprise a length from an axis of rotation to an opposing terminal end that is less than approximately 6 times greater than a width of the diaphragm or diaphragm structure, or less than 4 times greater than the width, or less than three times greater than the width in the axis direction.

In some embodiments, each diaphragm may comprise a varying mass along a length of the diaphragm. In some embodiment, each diaphragm may comprise a relatively lower mass, per unit area, in regions of the diaphragm that are distal from a centre of mass of the diaphragm relative to regions that are proximal to the centre of mass. In some embodiments, where the diaphragm is configured to rotate relative to the transducer base structure, each diaphragm may comprise a lower mass, per unit area, in regions of the diaphragm that are distal from an axis of rotation of the diaphragm relative to regions that are proximal to the axis of rotation. In some embodiments, each diaphragm may comprise a relatively lower mass, per unit area, in regions proximal one end of the diaphragm relative to regions proximal an opposing end.

In some embodiments a region of relatively lower mass of the diaphragm may comprise a reduced thickness relative to a region of relatively higher mass.

In some embodiments, each diaphragm may be substantially wedge-shaped.

In some embodiments, each diaphragm may comprise a tapering thickness along a length of the diaphragm. Each diaphragm may comprise a substantially smooth, tapering thickness along a length of the diaphragm. The thickness of the diaphragm may reduce towards a terminal end that is distal to the axis of rotation in the case of a rotating diaphragm, or distal to the centre of mass. The diaphragm may taper in thickness from a central region towards the terminal end. The diaphragm may comprise a substantially uniform thickness from a base end, proximal to the axis of rotation in the case of a rotating diaphragm, or proximal to a centre of mass, to the central region. Alternatively, the diaphragm may comprise a tapering thickness from the central region toward the base end. The tapering thickness may reduce from the central region toward the base end. The central region may be located at approximately 15-50% of a longitudinal length between the base end and the terminal end of the diaphragm. The central region may be located at approximately 20% of the longitudinal length between the base end and the terminal end of the diaphragm.

Each taper may be stepped or continuous. Each taper may be linear or curved.

In some embodiments, an absolute value of an angle of a radiating surface of the diaphragm relative to a coronal plane of the diaphragm, between the central region and base end, is less than an absolute value of an angle of the radiating surface between the central region and the terminal end.

In some embodiments, at least one major face of each diaphragm comprises a profile that is substantially convex along a longitudinal length of the diaphragm and/or along a sagittal cross-sectional plane of the diaphragm. In some embodiments, each major face of each diaphragm comprises a profile that is substantially convex along a longitudinal length of the diaphragm along a sagittal cross-sectional plane of the diaphragm.

In some embodiments, each diaphragm may comprise a diaphragm body having one or more major, radiating faces, and normal stress reinforcement coupled to the body, the normal stress reinforcement being coupled adjacent at least one of the major, radiating face for resisting compression-tension stresses experienced at or adjacent the face of the body during operation. There may be two opposing radiating faces.

In some embodiment, the normal stress reinforcement may comprise a relatively lower mass, per unit area, in regions of the diaphragm that are distal from a centre of mass of the diaphragm relative to regions that are proximal to the centre of mass. In some embodiments, where the diaphragm is configured to rotate relative to the transducer base structure, the normal stress reinforcement may comprise a lower mass, per unit area, in regions of the diaphragm that are distal from an axis of rotation of the diaphragm relative to regions that are proximal to the axis of rotation. In some embodiments, the normal stress reinforcement may comprise a relatively lower mass, per unit area, in regions proximal one end of the diaphragm relative to regions proximal an opposing end.

In some embodiments, a region of relatively lower normal stress reinforcement mass may comprise recesses or may be devoid of normal stress reinforcement. In some embodiments, a region of relatively lower normal stress reinforcement mass may comprise normal stress reinforcement of reduced or reducing thickness, or reduced or reducing width, or both.

In some embodiments, a region of relatively higher normal stress reinforcement mass and/or higher diaphragm mass, comprises approximately 30-70% of a surface area of the major face, and a region of relatively lower normal stress reinforcement mass and/or lower diaphragm mass, comprises approximately 30-70% of a surface area of the major face.

In some embodiments, a region of relatively lower normal stress reinforcement mass and/or lower diaphragm mass may be located within approximately 20% of a length of the diaphragm from an end of the diaphragm that is distal to the centre of mass or that is distal to the axis of rotation, in the case of a rotating diaphragm.

In some embodiments, each diaphragm may comprise a diaphragm body having one or more major, radiating faces, and at least one inner reinforcement member embedded within the body and oriented at an angle relative to at least one of said major faces for resisting and/or substantially mitigating shear deformation experienced by the body during operation. There may be a plurality of inner reinforcement members.

In some embodiments, each diaphragm may comprise a length from a centre of mass to a terminal end, or from one end to an opposing end, or from an axis of rotation to an opposing end in the case of a rotating diaphragm that is approximately 20% greater than a width of the diaphragm.

In some embodiments, each diaphragm may comprise a length from an axis of rotation to an opposing terminal end that is less than approximately 6 times greater than a width of the diaphragm assembly, or less than 4 times greater than the width, or less than three times greater than the width in the axis direction.

In some embodiments, each diaphragm may comprise a diaphragm base structure rigidly coupled to the diaphragm body. The diaphragm base structure may be located at or proximal to the axis. The diaphragm base structure may constitute the majority of the mass of the diaphragm assembly. The diaphragm base structure may act, structurally, as a rigid shaft. The diaphragm base structure may comprise or rigidly connect the diaphragm body to a diaphragm suspension. The diaphragm may be immediately, rigidly connected to the diaphragm suspension via the diaphragm base structure. The diaphragm base structure may comprise a transducing mechanism. The diaphragm base structure may rigidly connect the diaphragm body to a transducing mechanism. The diaphragm may be immediately, rigidly connected to the transducing mechanism via the diaphragm base structure.

In some embodiments, the diaphragm base structure may be rigidly connected to the normal stress reinforcement of each diaphragm.

In some embodiments, the diaphragm base structure may consist of a substantially planar part or parts.

In some embodiments, the diaphragm base structure may be rigidly coupled to the diaphragm body via a rigid component or components that is or are sufficiently straight and/or well-supported and/or sufficiently thick that bending deformation of the rigid component or components during operation is substantially negligible.

In some embodiments the diaphragm base structure may be rigidly coupled to the diaphragm body exclusively via components having a relatively high Young's Modulus of preferably more than approximately 0.5 GPa, more preferably more than approximately 2 GPa and most preferably more than approximately 4 GPa.

In some embodiments, each diaphragm body is rigidly coupled to an associated diaphragm base structure.

In some embodiments, the diaphragm base structure is comprises relatively rigid materials having a Young's Modulus of at least approximately 8 GPa, or at least approximately 20 GPa. In some embodiments, each diaphragm is rigidly connected to the diaphragm suspension. In some embodiments, each diaphragm is rigidly connected to the transducing mechanism.

In some embodiments, the audio transducer further comprises a structure immediately surrounding each diaphragm. A single structure, such as a housing may surround all diaphragms and/or the remainder of the transducer, or a separate structure may individually surround each diaphragm.

In some embodiments, each diaphragm comprises an outer periphery that is at least partially free from physical connection with an interior of the immediately surrounding structure associated with the diaphragm.

In some embodiments, the diaphragm may comprise one or more peripheral regions that are free from physical connection with the interior of the surrounding and the outer periphery is significantly free from physical connection such that the one or more peripheral regions constitute at least 20% of a length or perimeter of the periphery. In some embodiments the outer periphery may be substantially free from physical connection such that the one or more peripheral regions may constitute at least 50% of the length or perimeter of the periphery. In some embodiments, the one or more peripheral regions may constitute at least 80% of the length or perimeter of the periphery.

In some embodiments, all regions of the outer periphery of the diaphragm that move a significant distance (relative to other regions) during normal operation may be approximately entirely free from physical connection with the interior of the surrounding structure.

In some embodiments, all regions of the outer periphery of the diaphragm that are distal from a centre of mass location of the diaphragm may be approximately entirely free from physical connection with the interior of the surrounding structure.

In some embodiments, one or more regions of the outer periphery of the diaphragm that are free from physical connection with the interior of the surrounding may be separated from the housing by an air gap. A relatively small air gap may separate the interior of the surrounding structure and the one or more peripheral regions of the diaphragm, such that a width of the air gap defined by the distance between each peripheral region and the surrounding structure may be less than approximately $1/10^{th}$ or less than approximately $1/20^{th}$ or less than approximately $1/40^{th}$ of a length of the diaphragm.

In some embodiments a relatively small air gap may separate the interior of the surrounding structure and the one or more peripheral regions of the diaphragm, such that a width of the air gap defined by the distance between each peripheral region and the surrounding structure is less than approximately 1 mm, or less than approximately 0.8 mm, or less than approximately 0.5 mm.

In some embodiments, the surrounding structure may fit substantially tightly, but physically separated, around the periphery of the diaphragm throughout substantially an entire range of motion of the diaphragm during operation, such that the surrounding structure is effectively sealed.

In some embodiments, the combination of a tightly fitting surround and the use of a housing and/or baffle to surround the transducer effectively separates air adjacent a radiating, major face of the diaphragm producing positive air pressure, given a particular direction of rotation, from air adjacent to an opposing major, radiating face of the diaphragm.

In some embodiments, each surrounding structure may comprise reinforced region(s) opposing a terminal end of the associated diaphragm(s) that is distal to the axis of rotation.

The reinforced region(s) may oppose a terminal end of the diaphragm that is configured to move a greatest distance during operation, and may extend along a full range of motion of the terminal end during operation. The reinforced region(s) may comprise a greater stiffness relative to adjacent region(s) of the surrounding structure. In the case of a rotating diaphragm, the reinforced region(s) may be provided on a curved wall of the surrounding structure, located immediately adjacent the terminal end of the associated diaphragm.

In some embodiments the reinforcing is across the full width of the terminal end, in a direction substantially parallel to the axis.

In some embodiments, the reinforced region(s) may comprise a greater thickness relative to the adjacent region(s) of the surrounding structure.

In some embodiments, the reinforced region(s) may comprise one or more reinforcing ribs.

In some embodiments, the reinforced region(s) may comprise material(s) of relatively greater stiffness than material (s) of the adjacent region(s).

In some embodiments, the surrounding structure may comprise a protective material, such as velvet or silicone, on an inner wall adjacent a periphery of the diaphragm.

In some embodiments, the surrounding structure may comprise an elastomer protective material on an inner wall adjacent a periphery of the diaphragm, such as silicone or rubber, formed into compliant geometry comprising hollows, for example the geometry could be ribs or foam.

In some embodiments, the surrounding structure may comprise one or more stoppers on an inner wall adjacent one or both radiating faces of the associated diaphragm for preventing the radiating face from contacting and impacting against the inner wall in use.

In some embodiments the stoppers may prevent undue diaphragm displacements, relative to a housing beyond a tip edge of a diaphragm, in a direction perpendicular to the axis of rotation and towards the tip of the diaphragm. The maximum displacement may be approximately 0.5 mm, more preferably 0.35 mm, and most preferably 0.2 mm in this direction.

In some embodiments an opening in the surround structure adjacent to a major, radiating face a diaphragm is at the front of an enclosure, facing towards a listener.

In some embodiments a coronal plane of a diaphragm in the surround faces towards a listener when it is at its maximum excursion angle and displaced towards the listener.

In some embodiments, each diaphragm may be substantially symmetrical about a sagittal plane of the diaphragm.

In some embodiments, each diaphragm may be substantially symmetrical about a sagittal plane of the diaphragm that is substantially perpendicular to the axis of rotation.

In some embodiments, the audio transducer may comprise a diaphragm assembly including the diaphragm and a diaphragm-side transducing component of the transducing mechanism, the diaphragm-side transducing component configured to transfer a force to or from the diaphragm during operation, and wherein the diaphragm assembly is substantially symmetrical about the sagittal plane of the diaphragm.

In some embodiments, each diaphragm does not comprise a position sensor therein or thereon.

In some embodiments, the audio transducer may comprise a diaphragm suspension that is configured to rotatably couple the diaphragm, or the diaphragm structure of a multiple-diaphragm construction, to the transducer base structure.

In some embodiments, the diaphragm suspension may enable rotation of the diaphragm about an axis of rotation to enable a range of angular motion of approximately 10 degrees on either side of the axis, or approximately 15 degrees on either side of the axis, or approximately 20 degrees on either side of the axis.

In some embodiments, the diaphragm suspension may comprise at least one hinge mount. Each hinge mount may be coupled to the diaphragm or diaphragm structure and to the transducer base structure.

In some embodiments, the diaphragm suspension may comprise a plurality of hinge mounts.

In some embodiments, the diaphragm suspension may comprise a pair of hinge mounts coupled to the diaphragm or diaphragm structure.

In some embodiments the diaphragm suspension may comprise a pair of hinge mounts coupled on either side of the diaphragm between the diaphragm and the transducer base structure.

In some embodiments, each hinge mount may be substantially coaxial with the node axis and/or the centre of mass axis of the diaphragm.

In some embodiments, the pair of hinge mounts may be coupled at opposing sides of the diaphragm.

In some embodiments, the diaphragm suspension may comprise at least two hinge mounts rotatably coupling the diaphragm to the transducer base structure, and wherein the at least two hinge mounts are located on either side of a central sagittal plane of the diaphragm or a diaphragm of the diaphragm structure that is substantially perpendicular to the axis of rotation, and wherein each hinge mount is located a distance from the central sagittal plane that is at least 0.2 times of a maximum width of the diaphragm.

In some embodiments, the diaphragm suspension may comprise at least two hinge mounts rotatably coupling the diaphragm to the transducer base structure, and wherein the at least two hinge mounts are located on either side of a central sagittal plane of the diaphragm or a diaphragm of the diaphragm structure that is substantially perpendicular to the axis of rotation, and wherein each hinge mount is located a distance from the central sagittal plane that is less than approximately 0.47, 0.45, 0.42 times of a maximum width of the diaphragm.

Each hinge mount may be located on outer sides of the diaphragm-side transducing component of the transducing mechanism.

In some embodiments the diaphragm suspension may be located such that an axis of rotation of the diaphragm or diaphragm structure relative to the transducer base structure is located in a plane that is substantially perpendicular to a coronal plane of the diaphragm or diaphragm structure and that contains a predetermined node axis of the diaphragm or diaphragm structure.

In some embodiments, the node axis may be predetermined.

In some embodiments, the axis of rotation and the node axis are substantially parallel. In some embodiments the axis of rotation and the node axis are substantially coaxial.

In some embodiments, the diaphragm suspension may be located such that an axis of rotation of the diaphragm or diaphragm structure relative to the transducer base structure and a centre of mass axis of the diaphragm or diaphragm structure are substantially parallel.

In some embodiments, the diaphragm suspension may be located such that an axis of rotation of the diaphragm or diaphragm structure relative to the transducer base structure and a centre of mass axis of the diaphragm or diaphragm structure are substantially coaxial.

In some embodiments the node axis may be determined by identifying an axis of rotation of the diaphragm in an effectively substantially unsupported and activated state, whereby the diaphragm is not coupled to the diaphragm suspension system and exhibits movement forces generated by the transducing mechanism.

In some embodiments, the node axis may be predetermined using either one of the following methods:

Running a computer simulation to locate the axis of rotation of a computer model of the audio transducer excluding the diaphragm suspension system, when a transducing mechanism of the model is activated by a simulated audio signal;

Activating a transducing mechanism of a physical model of the audio transducer in which a diaphragm of the physical model is effectively substantially unsupported, and determining an axis of rotation of the diaphragm.

In some embodiments, the step of activating the transducing mechanism, may comprise activating the mechanism to oscillate the diaphragm within the diaphragm's mass controlled region. The step of activating the transducing mechanism may comprise activating the mechanism to oscillate the diaphragm within the diaphragm's mass controlled region in respect to a resonance mode comprising a strong element of diaphragm translation in a direction perpendicular to a coronal plane of the diaphragm.

In some embodiments the predetermined node axis may be determined experimentally, for example by mounting the diaphragm very lightly, for example with heavy part resting on soft foam, so that it is effectively substantially unsupported, applying an excitation force and/or torque in substantially the same direction(s) as would occur in-use, and then measuring the node directly using, for example, an lightweight accelerometer, or via laser Doppler vibrometry, or using a proximity sensor. Alternatively, or in addition, the predetermined node axis may be determined by operating the transducer at a frequency in which it becomes effectively substantially unsupported relative to the transducer base structure.

In some embodiments, the diaphragm suspension may flexibly mount the diaphragm or diaphragm structure relative to the transducer base structure. Each hinge mount may comprise rotational compliance about at least one axis.

In some embodiments the diaphragm suspension may comprise at least one mount formed from an amorphous metal alloy such as Liquidmetal or Vitreloy.

In some embodiments there are a number of resonance modes involving diaphragm movement whereby the diaphragm structure remains substantially rigid, as does the driver base structure, and compliance is primarily in the diaphragm suspension. Preferably, of these modes, that involving diaphragm rotation about a primary axis has the lowest frequency. Preferably the frequency is less than 0.75, or more preferably less than 0.5 of the frequency of the next highest-frequency mode.

In some embodiments the flexible hinge mounts collectively may provide, in-use, a primary resistance to translational displacement of the diaphragm relative to the transducer base structure.

In some embodiments the flexible hinge mounts may collectively provide, in-use, a primary resistance to translational displacement of the diaphragm relative to the transducer base structure along at least two substantially orthogonal axes.

In some embodiments the flexible hinge mounts may collectively provide, in-use, a primary resistance to translational displacement of the diaphragm relative to the transducer base structure along at least three substantially orthogonal axes.

The flexible hinge mounts provide a primary compliance for rotation of the diaphragm relative to the transducer base structure about the axis of rotation.

In some embodiments, the diaphragm suspension may comprise at least one mount formed from a substantially soft material having an average Young's Modulus of less than approximately eight Gigapascals (GPa). The at least one flexible mount may be formed from a substantially soft material having an average Young's Modulus of less than approximately four gigapascals (GPa). The at least one flexible mount may be formed from a substantially soft material having an average Young's Modulus of less than approximately two gigapascals (GPa). The at least one flexible mount may formed from a substantially soft material having an average Young's Modulus of less than approximately one gigapascal (GPa).

In some embodiments, the diaphragm suspension may comprise at least one hinge mount that has sufficiently low Young's Modulus such a fundamental diaphragm resonance frequency is less than approximately 100 Hertz. The fundamental resonance frequency may be less than approximately 70 Hertz. The fundamental resonance frequency may be less than approximately 50 Hertz.

In some embodiments, each substantially soft hinge mount may be substantially compliant in translation such that the hinge mount may deform substantially linearly along at least one axis. Each soft hinge mount may be substantially compliant in translation such that the hinge mount may deform substantially linearly along at least two orthogonal axes. Each substantially soft hinge mount may be substantially compliant in translation such that the hinge mount may deform substantially linearly along three orthogonal axes.

In some embodiments the diaphragm suspension may comprise at least one mount formed from an elastomer or soft plastics material. The soft plastics material may be urethane, such as a thermoset urethane, or a silicone plastics material, or Nitrile rubber (NBR).

In some embodiments, each mount may be formed from moulding, such as injection moulding. In some embodiments each flexible mount is primary hinge support.

In some embodiments, each mount may be formed from a material having Young's modulus, in compression, that is less than 1 GPa, more preferably less than 0.5 GPa, more preferably still is less than 0.1 GPa, and most preferably is less than 0.05 GPa. Preferably the material also has Young's modulus that is greater than 0.003 GPa, more preferably is greater than 0.005 GPa, more preferably still is greater than 0.0065 GPa, and most preferably is greater than 0.008 GPa. In some embodiments, on a Shore A scale the material may have durometer less than 90, more preferably less than 85 and most preferably less than 75. In some embodiments on the Shore A scale the material may have a durometer greater than 30, more preferably greater than 40 and most preferably greater than 55.

In some embodiments each flexible mount may comprise a bush rigidly coupled at one end to the diaphragm and at an opposing end to the transducer base structure. The bush may be substantially hollow. The bush may comprise a plurality of radially spaced longitudinal channels. The bush may comprise a plurality of radially extending and separated inner spokes. Each bush may be rigidly coupled to a respective pin that extends laterally from the diaphragm or transducer base structure along an axis that substantially coaxial with the node axis and/or the centre of mass axis of the diaphragm. Each flexible bush is configured to couple a recess at a corresponding side of the transducer base structure or diaphragm. An inner periphery of each recess may correspond in shape to the outer periphery of the corresponding bush.

In some embodiments, each hinge mount may comprise a pin rigidly connected to either of the diaphragm or the transducer base structure and extending substantially coaxial with the axis of rotation, and wherein a soft, flexible material of the hinge mount is in intimate contact with the pin. The flexible material may connect to a part of the other of the diaphragm or transducer base structure that extends around the pin.

In some embodiments, each hinge mount may comprise an elongated flexible element. One end may connect the diaphragm and another end may connect the transducer base structure. The shortest length through the flexing material from the diaphragm to the transducer base structure may be greater than 1.5, more preferably greater than 2, and most preferably greater than 2.5 times the minimum thickness across the elongated element in a direction perpendicular to the length.

In some embodiments a soft hinge comprises a torsion element located at the axis. The diaphragm assembly may be connected at one end of the element and the driver base at the other. One or both connections may be located substantially at the axis.

In some embodiments each hinge mount may comprise an elongated flexible hinge element. One end may connect to the diaphragm and another end may connect to the transducer base structure. A shortest length through the flexible hinge element from the diaphragm to a transducer base structure may be greater than 1.5, more preferably greater than 2, and most preferably greater than 2.5 times the minimum thickness across the elongated element in a direction perpendicular to the length. Preferably the length through the flexing material is substantially straight. In some embodiments the hinge may comprise another elongated flexible element oriented in a significantly different direction, which may provide increase support against translation since each element may provide reduced compliance in a direction along its length. The connection points with the diaphragm and the transducer base structure may comprise a thicker profile relative to a central section of each flexible hinge element. Each flexible element may be substantially planar and oriented substantially parallel to the axis of rotation.

In some embodiments, each hinge mount may be substantially damped.

In some embodiments, each hinge mount may be formed from a material having a material loss coefficient, at 30 degrees Celsius and 100 Hertz operating frequency, that is greater than 0.005. Each hinge mount may be formed from a material having a material loss coefficient, at 30 degrees Celsius and 100 Hertz operating frequency that is greater than approximately 0.01. Each hinge mount may be formed from a material having a material loss coefficient, at 30 degrees Celsius and 100 Hertz operating frequency that is greater than approximately 0.02. Each hinge mount may be formed from a material having a material loss coefficient, at 30 degrees Celsius and 100 Hertz operating frequency that is greater than approximately 0.05.

In some embodiments, each hinge mount may be supported by a material having a material loss coefficient, at 30 degrees Celsius and 100 Hertz operating frequency, that is greater than 0.005. Each hinge mount may be supported by a material having a material loss coefficient, at 30 degrees Celsius and 100 Hertz operating frequency that is greater than approximately 0.01. Each hinge mount may be supported by a material having a material loss coefficient, at 30 degrees Celsius and 100 Hertz operating frequency that is greater than approximately 0.02. Each hinge mount may be supported by a material having a material loss coefficient, at 30 degrees Celsius and 100 Hertz operating frequency that is greater than approximately 0.05.

Preferably the material is flexible and its deformation facilitates rotation of the diaphragm. Alternatively said material rolls against another component to facilitate diaphragm rotation. In yet another alternative said material is separate to components primarily involved in facilitation of diaphragm rotation.

In some embodiments the material accounts for a significant proportion of translational compliance occurring in the suspension system when the diaphragm is translated in a direction perpendicular to a major face at a frequency of 100 Hz.

In some embodiments, the material may contribute significantly to mechanical damping of one or more resonance modes involving significant translational displacement at the suspension system in a direction perpendicular to a major face of the diaphragm.

In some embodiments, each hinge mount may be damped in terms of translational displacement along at least one axis. Each hinge mount may be damped in terms of translation displacement along at least two orthogonal axes. Each hinge mount may be damped in terms of translation displacement along at least three orthogonal axes.

In some embodiments, each flexible hinge mount may be formed from an anisotropic material. Each flexible hinge mount anisotropy may be such that the mount is resistant to translational deformation in a direction that is substantially perpendicular to a coronal plane of the diaphragm, compared to rotational deformation of the mount.

In some embodiments, each flexible mount may comprise a Young's modulus that is greater in a direction perpendicular to the coronal plane of the diaphragm.

In some embodiments, a flexible hinge mount may be formed from a foamed material.

In some embodiments, each flexible hinge mount may comprise at least one substantially concave outer surface. Each flexible hinge mount may comprise at least one substantially concave outer surface extending along a longitudinal axis of the mount body. Each flexible hinge mount may comprise at least one substantially concave outer surface extending along the mount body in a direction parallel to the axis of rotation. Each flexible hinge mount may comprise at least one substantially concave cross-sectional profile of at least one outer surface, wherein the cross-sectional profile is across a transverse plane of the mount that is substantially orthogonal to the longitudinal axis of the mount or the axis of rotation. One or more concave surface(s) of each flexible hinge mount may face toward the diaphragm.

One or more concave surface(s) of each flexible hinge mount may face the transducer base structure.

In some embodiments, each flexible hinge mount may comprise a central region and at least one external surface that is inwardly angled or curved toward the central region.

In some embodiments, each flexible hinge mount may comprise a central region and at least two external surfaces that are inwardly angled or curved toward the central region so that a central region is relatively thinner than adjacent regions on either side.

In some embodiments, each flexible hinge mount may comprise a central axis and at least one external surface that is inwardly angled or curved toward the central axis.

In some embodiments, each flexible hinge mount may be formed from a structure having varying densities.

In some embodiments, each flexible hinge mount may comprise one or more cavities. Each cavity may be open. Each cavity may be filled with a fluid, such as gas like air. Each cavity may be closed. Each cavity may be filled with a lower density material relative to the remainder of a mount body.

In some embodiments, each flexible hinge mount may comprises a plurality of substantially flexible elements. The elements may be in the form of spokes. The elements may be longitudinal. Each element may be substantially slender. Each element may be substantially short and thick. There may be a plurality of spokes extending between the diaphragm or diaphragm structure and the transducer base structure.

In some embodiments, each hinge mount may comprise a plurality of radially spaced, longitudinal elements extending from a central base. A longitudinal axis of the central base may be substantially coaxial with an axis of rotation of the diaphragm or diaphragm structure. Each hinge element maybe formed from a material or materials having a Young's modulus of less than approximately 8 GPa such that the elements flex or deform during operation. Each hinge element maybe formed from a material or materials having a Young's modulus of less than approximately 2 GPa. Each hinge element maybe formed from a material or materials having a Young's modulus of less than approximately 1 GPa. Each hinge element maybe formed from a material or materials having a Young's modulus of less than approximately 0.5 GPa.

In some embodiments, each hinge mount may comprise air channels between the elements. Each hinge mount may comprise a relatively lower density material between the elements.

In some embodiments, each flexible mount may comprise a cross spring pivot hinge component coupled between the diaphragm and the transducer base structure. Each hinge component may be formed from a flexible and resilient material.

In some embodiments, each flexible mount may comprise two radially spaced spokes. In some embodiments, each flexible mount may comprise a plurality of radially spaced spokes. An inner end of each spoke may be coupled to a central body part of the mount. The opposed outer end of each spoke may comprise a head. Each head or spoke may be configured to couple a corresponding formation on a wall of the transducer base structure, in situ. Each spoke may be held in tension in situ. Two or more spokes extend substantially radially from a primary hinging axis. One spoke may be oriented at an angle greater than 30 degree, more preferably greater than 45 degrees, and most preferably greater than 60 degrees relative to another spoke.

In some embodiments, the diaphragm suspension may comprise one or more hinge joints, each hinge joint having a pair of cooperating contact surfaces configured to move relative to one another to rotate the supported diaphragm or diaphragm structure during operation. One of the contact surfaces may form part of the diaphragm or diaphragm structure and the other contact surface may form part of the transducer base structure.

In some embodiments, each hinge mount may comprise a pair of hinge elements that are angled relative to one another. The pair of hinge elements may be substantially orthogonal relative to one another, rotated about the axis. The pair of hinge elements may comprise flexible elements.

In some embodiments, each flexible mount may comprise a cross spring pivot hinge component.

In some embodiments, the diaphragm suspension may comprise at least one hinge joint, each hinge joint having a pair of cooperating, substantially rigid contact surfaces configured to move relative to one another during operation to rotate the supported diaphragm. The diaphragm suspension may comprise a biasing mechanism configured to compliantly bias the pair of cooperating contact surfaces towards one another to maintain substantially consistent physical contact between the contact surfaces during normal operation. One of the contact surfaces may form part of the diaphragm or diaphragm structure and the other contact surface may form part of the transducer base structure.

In some embodiments, the diaphragm suspension may comprise one or more ball bearing hinges.

In some embodiments, the diaphragm suspension may comprises at least one hinge joint, each hinge joint having a ball bearing, and wherein the ball bearing comprises less than seven balls. Each hinge joint may comprise a ball bearing, and wherein the ball bearing comprises less than six balls. Each hinge joint may comprise a ball bearing, and wherein the ball bearing comprises less than five balls.

In some embodiments, the transducing mechanism may comprise a diaphragm-side transducing component configured to transfer force to or from the diaphragm or diaphragm structure, in use.

In some embodiments, the diaphragm-side transducing component may be directly coupled to the diaphragm or the diaphragm structure.

In some embodiments, the diaphragm-side transducing component may be rigidly coupled to the diaphragm or the diaphragm structure.

In some embodiments, the diaphragm-side transducing component may be rigidly connected to the diaphragm or the diaphragm structure via one or more rigid intermediary components. The one or more rigid intermediary components may comprise a Young's Modulus of at least approximately 8 GPa, or at least approximately 20 GPa.

In some embodiments, the diaphragm-side transducing component may be integrated or integrally formed with the diaphragm or the diaphragm structure.

In some embodiments, the diaphragm side-transducing component may extend along a side of the diaphragm or of a diaphragm of the diaphragm structure.

In some embodiments, the diaphragm side-transducing component may extend along an end of the diaphragm or of a diaphragm of the diaphragm structure.

In some embodiments, in the case of a rotational action transducer, the diaphragm-side transducing component may couple along an axis that is substantially parallel to the axis of rotation.

In some embodiments, the diaphragm-side transducing component may overlap with the diaphragm or the diaphragm structure. In the case of a rotational action transducer, the diaphragm-side transducing component may overlap with the diaphragm or the diaphragm structure along the axis of rotation. The diaphragm-side transducing component may extend substantially parallel to the axis of rotation.

Alternatively or in addition, the diaphragm-side transducing component may overlap with the diaphragm or the diaphragm structure along a centre of mass of the diaphragm or diaphragm structure.

In some embodiments, the diaphragm may overlap with a common base of the diaphragm structure, in the case of a multiple diaphragm structure having a plurality of diaphragms extending from a common base.

In some embodiments, in the case of a rotational action transducer, the diaphragm-side transducing component may be located substantially exclusively proximal to the axis of rotation. The diaphragm-side transducing component may be located at a distance from the axis of rotation that is within 75% of a length of the diaphragm, or of a length of a diaphragm of the diaphragm structure, or of a radius of the diaphragm structure. The diaphragm-side transducing component may be located at a distance from the axis of rotation that is within 50% of a length of the diaphragm, or of a length of a diaphragm of the diaphragm structure, or of a radius of the diaphragm structure. The diaphragm-side transducing component may be located at a distance from the axis of rotation that is within 40% of a length of the diaphragm, or of a length of a diaphragm of the diaphragm structure, or of a radius of the diaphragm structure. The diaphragm-side transducing component may be located at a distance from the axis of rotation that is within 30% of a length of the diaphragm, or of a length of a diaphragm of the diaphragm structure, or of a radius of the diaphragm structure.

In some embodiments, the diaphragm-side transducing component may be located at a distance from the axis of rotation that is within 20% of a maximum length dimension of the diaphragm, or a maximum length of a diaphragm of the diaphragm structure, such as a diagonal length dimension. The diaphragm-side transducing component may be located at a distance from the axis of rotation that is within 15% of a maximum length dimension. The diaphragm-side transducing component may be located at a distance from the axis of rotation that is within 10% of a maximum length dimension.

In some embodiments, in the case of a rotational action transducer, the diaphragm-side transducing component does not extend beyond a maximum width of the diaphragm, or a maximum width of the diaphragm structure, or maximum width of a common base of the diaphragm structure, by more than approximately 20%, or more than approximately 15%, or more than approximately 10% of the width dimension along the axis of rotation. The maximum width dimension may be substantially parallel to the axis of rotation.

In some embodiments, the diaphragm-side transducing component may be substantially symmetrical across at least one axis, or across at least two orthogonal axes, or across three orthogonal axes.

In some embodiments, the diaphragm-side transducing component may exert or transfer a substantially pure torque on or from the diaphragm or the diaphragm structure. The pure torque may comprise a substantially zero net translational force component.

In some embodiments, the diaphragm or diaphragm structure may be rigidly coupled to the transducing mechanism via one or more substantially planar parts or components.

In some embodiments, the diaphragm or diaphragm structure may be rigidly coupled to the transducing mechanism via a rigid component or components that is or are sufficiently straight and/or well-supported and/or sufficiently thick such that bending deformation of the rigid component or components during operation is substantially negligible.

In some embodiments, the transducing mechanism may comprise an electromagnetic transducing mechanism comprising a magnet or magnetic structure operatively coupled to a coil.

In some embodiments, the transducing mechanism may be substantially non-commutated. The magnet and coil may be separated by a fluids gap. The magnet may comprise a substantially curved surface adjacent the fluids gap. The fluids gap may be an air gap. The coil may comprise a substantially curved surface adjacent the fluid gap. The curved surfaces of the coil and magnet may be complementary. The magnet surface may be curved about the axis of rotation, in the case of a rotational action transducer. The coil surface may be curved about the axis of rotation, in the case of a rotational action transducer.

In some embodiments, the audio transducer may comprise ferromagnetic fluids or materials located between the coil and the magnet.

In some embodiments, the electromagnetic transducing mechanism may be substantially symmetrical relative to a sagittal plane of the audio transducer.

In some embodiments, the transducing mechanism may include a magnet. The magnet may comprise a substantially non-alternating magnetic field. The magnet may be a permanent magnet. The magnet may be formed from a neodymium material. Alternatively, the magnet may be an electromagnet. The electromagnet may be a direct current electromagnet. The magnet is preferably not an armature.

In some embodiments, the magnet may be the diaphragm-side transducing component. The magnet may be configured to move with the diaphragm or the diaphragm structure, during operation. The magnet may be configured to rotate with the diaphragm or diaphragm structure about the axis of rotation, during operation, in the case of a rotational action transducer.

In some embodiments, the magnet may comprise one or more pole pieces rigidly coupled thereto. The pole pieces, collectively, may comprise a volume of less than approximately 50% of a total volume of the magnet. The pole pieces, collectively, may comprise a volume of less than approximately 30% of a total volume of the magnet. The pole pieces, collectively, may comprise a volume of less than approximately 5% of a total volume of the magnet.

In some embodiments, the magnet comprises a convex outer surface on the diaphragm-side. The magnet may comprise an opposing convex outer surface.

In some embodiments, the magnet may comprise an external surface configured to couple a corresponding surface of the diaphragm. The external surface and the corresponding surface may be complementary. The external surface may be substantially planar and the corresponding diaphragm surface may be substantially planar.

In some embodiments, the magnet comprises one or more surfaces configured to couple to corresponding surfaces of the diaphragm. The one or more surfaces include a sufficient surface area for achieving a sufficiently rigid connection. The surfaces may be on sides of the magnet that are configured to extend adjacent and/or in a same or similar plane to the major faces of the radiating diaphragm. The surfaces may be directly coupled to normal stress reinforcement of the diaphragm.

The magnet may be coupled to the diaphragm directly at regions of the magnet most-proximal to the diaphragm. Regions most proximal may be closer to the diaphragm than adjacent coils and/or pole pieces of the transducing mechanism.

The magnet may be directly coupled to a surface of the diaphragm body that is configured to exhibit primarily shear deformation forces during operation.

A high temperature adhesive may be used to bond the magnet to the diaphragm. The magnet bonding surface may be nickel plated and treated with an acid, such as nitric acid.

The magnet and diaphragm may be coupled via one or more components configured to extend into corresponding apertures or slots in one or both of the magnet and diaphragm.

In alternative embodiments, the magnet may be a base-structure side transducing component. The magnet may be relatively stationary during operation. The magnet may be rigidly coupled to the transducer base structure.

In some embodiments, the magnet may comprise a pair of opposing magnetic poles extending substantially continuously along the length of the magnet. The magnet may only consist of a single pair of magnetic poles.

In some embodiments, the magnet may overlap with the axis of rotation. The magnet may overlap the diaphragm along the axis of rotation. The magnetic poles may be located either side of the axis of rotation, for a rotational action transducer. The axis of rotation may extend through a main body of the magnet.

In some embodiments, the direction of a primary internal magnetic field between the magnetic poles may be angled relative to the axis of rotation. The direction of the primary magnetic field may be substantially orthogonal to the axis of rotation.

In some embodiments, the direction of the primary internal magnetic field may be substantially angled relative to a coronal plane of the diaphragm, or of a diaphragm of the diaphragm structure. The direction of the primary magnetic field may be substantially orthogonal relative to a coronal plane of the diaphragm, or of a diaphragm of the diaphragm structure.

In some embodiments, the direction of the primary internal magnetic field may be substantially angled relative to a major, radiating surface of the diaphragm, or of a diaphragm of the diaphragm structure. The direction of the primary magnetic field may be substantially orthogonal relative to a radiating surface of the diaphragm, or of a diaphragm of the diaphragm structure.

In some embodiments, the magnetic poles may extend on opposing sides of a coronal plane of the magnet.

In some embodiments, the primary internal magnetic field of the magnet between opposing poles may be substantially parallel to a coronal plane of a diaphragm. The primary internal magnetic field may be substantially angled, such as orthogonally, relative to the axis of rotation of the diaphragm.

In some embodiments, the magnet may be substantially curved about the axis of rotation. An outer surface of the diaphragm may be curved about the axis of rotation.

In some embodiments, the magnet may comprise a curved surface adjacent a corresponding coil of the transducing mechanism.

In some embodiments, a centre of mass of the magnet or magnetic structure may be located at or proximal to the axis of rotation of the diaphragm or diaphragm structure.

In some embodiments, the magnet or magnetic structure may be located at or proximal to either side of the axis of rotation of the diaphragm, with respect to the longitudinal axis of the diaphragm.

In some embodiments, the audio transducer may comprise one or more other strongly ferromagnetic component(s) that are rigidly connected to the magnet(s) and that may carry a significant magnetic flux form a magnet structure or assembly.

In some embodiments, the audio transducer may not comprise other components comprising a strongly ferromagnetic material other than those of the magnet structure or assembly.

A component having a strongly ferromagnetic material may mean a component having a maximum relative magnetic permeability in-situ (with diaphragm-at-rest) of more than approximately 300 $m\mu_r$, or more than approximately 500 $m\mu_r$, or more than approximately 1000 $m\mu_r$.

In some embodiments, the audio transducer may comprise one or more other strongly ferromagnetic component(s), other than components of the magnetic structure or assembly, and the magnetic assembly is substantially distal from the other ferromagnetic component(s).

In some embodiments, the other ferromagnetic component(s) may comprise one or more relatively large or major surface(s) facing towards the magnet or magnetic structure or assembly. The relatively large or major surface(s) of the other ferromagnetic component(s), may be substantially distal from a nearest surface or a relatively large or major surface of the magnet or of the magnetic structure or assembly, to mitigate or significantly minimise a reaction of the other ferromagnetic component(s) with the magnet or magnetic structure or assembly. The nearest or relatively large or major surface(s) of the magnet or magnetic structure or assembly may be separated from the relatively large or major surface(s) of the other ferromagnetic component(s) by a distance of at least approximately 0.4 times a maximum distance between opposing poles of the magnet or magnetic structure or assembly.

The nearest or relatively large or major surface(s) of the magnet or magnetic structure or assembly may be separated from the relatively large or major surface(s) of the other ferromagnetic component(s) by a distance of at least approximately 0.6 times a maximum distance between opposing poles of the magnet or magnetic structure or assembly. The nearest or relatively large or major surface(s) of the magnet or magnetic structure or assembly may be separated from the relatively large or major surface(s) of the other ferromagnetic component(s) by a distance that is approximately the same as a distance between opposing poles of the magnet or magnetic structure or assembly.

The nearest or relatively large or major surface(s) of the magnet or magnetic structure or assembly may be separated from the relatively large or major surface(s) of the other ferromagnetic component(s) by a distance, along an axis substantially perpendicular to the axis of rotation, of at least approximately 0.4 times a maximum distance between opposing poles of the magnet or magnetic structure or assembly. The nearest or relatively large or major surface(s) of the magnet or magnetic structure or assembly may be separated from the relatively large or major surface(s) of the other ferromagnetic component(s) by a distance, along an axis substantially perpendicular to the axis of rotation, of at least approximately 0.6 times a maximum distance between opposing poles of the magnet or magnetic structure or assembly.

The nearest or relatively large or major surface(s) of the magnet or magnetic structure or assembly may be separated from the relatively large or major surface(s) of the other ferromagnetic component(s) by a distance, along an axis substantially perpendicular to the axis of rotation, that is approximately the same as a distance between opposing poles of the magnet or magnetic structure or assembly.

The nearest or relatively large or major surface(s) of the magnet or magnetic structure or assembly may be separated from the relatively large or major surface(s) of the other ferromagnetic component(s) by a distance of at least approximately 0.4 times a maximum dimension of the magnet along an axis that is substantially perpendicular to the axis of rotation.

The nearest or relatively large or major surface(s) of the magnet or magnetic structure or assembly may be separated from the relatively large or major surface(s) of the other ferromagnetic component(s) by a distance of at least approximately 0.6 times a maximum dimension of the magnet along an axis that is substantially perpendicular to the axis of rotation.

The nearest or relatively large or major surface(s) of the magnet or magnetic structure or assembly may be separated from the relatively large or major surface(s) of the other ferromagnetic component(s) by a distance that is approximately the same as a maximum dimension of the magnet along an axis that is substantially perpendicular to the axis of rotation.

The nearest or relatively large or major surface(s) of the magnet or magnetic structure or assembly may be separated from the relatively large or major surface(s) of the other ferromagnetic component(s) by a distance of at least approximately 0.4 times a maximum length of the magnet. The nearest or relatively large or major surface(s) of the magnet or magnetic structure or assembly may be separated from the relatively large or major surface(s) of the other ferromagnetic component(s) by a distance of at least approximately 0.6 times a maximum length of the magnet. The nearest or relatively large or major surface(s) of the magnet or magnetic structure or assembly may be separated from the relatively large or major surface(s) of the other ferromagnetic component(s) by a distance that is approximately the same as a maximum length of the magnet.

The nearest or relatively large or major surface(s) of the magnet or magnetic structure or assembly may be separated from the relatively large or major surface(s) of the other ferromagnetic component(s) by a distance of at least approximately 0.4 times a maximum length of the magnet. The nearest or relatively large or major surface(s) of the magnet or magnetic structure or assembly may be separated from the relatively large or major surface(s) of the other ferromagnetic component(s) by a distance of at least approximately 0.6 times a maximum length of the magnet. The nearest or relatively large or major surface(s) of the magnet or magnetic structure or assembly may be separated from the relatively large or major surface(s) of the other ferromagnetic component(s) by a distance that is approximately the same as a maximum length of the magnet.

The nearest or relatively large surface of the magnet assembly is separated, in some direction perpendicular to the axis, from the relatively large surface of the other ferromagnetic component(s) by a distance of at least approximately 0.4 times a maximum dimension of the magnet in a direction parallel to said surface in locality of said surface. The nearest or relatively large surface of the magnet assembly is separated, in some direction perpendicular to the axis, from the relatively large surface of the other ferromagnetic component(s) by a distance of approximately 0.6 times a maximum dimension of the magnet in a direction parallel to said surface in locality of said surface. The nearest or relatively large surface of the magnet assembly is separated, in some direction perpendicular to the axis, from the relatively large surface of the other ferromagnetic component(s) by a distance substantially similar to a maximum dimension of the magnet in a direction parallel to said surface in locality of said surface.

In some embodiments, the transducer does not comprise other ferromagnetic component(s) exerting a force on the magnet or magnetic structure or assembly that is greater than seventy times, more preferably greater than fifty times and most greater preferably forty times the force due to gravity acting on the magnet assembly.

In some embodiments, the transducer comprises other ferromagnetic component(s) facing towards the magnet or magnetic structure or assembly that attract the magnet or magnetic structure or assembly in opposing directions. In some embodiments, the net force on the magnet or magnetic structure or assembly due to the other ferromagnetic component(s) is negligible or approximately zero.

In some embodiments, the net force exerted on the diaphragm by the other ferromagnetic components is less than 20 times greater, more preferably less than 10 times great, and most preferably less than 5 times greater than the force on the diaphragm due to the effect of gravity.

In some embodiments, the net force exerted on the diaphragm by other ferromagnetic components may approximately cancel the force on the diaphragm due to the effect of gravity, in situ.

In some embodiments, the magnet may be housed in a metal part having a density of less than approximately 2.2 grams per centimetre cubed. In some embodiments, the metal part, in the vicinity of the magnet, may have a solid volume that is lower than a solid volume of the magnet, or a solid volume that is less than approximately 0.8 times the solid volume of the magnet. The metal part may be located at an average radius that is less than the average radius of the magnet.

In some embodiments, the transducing mechanism may include a coil. The coil may comprise one or more coil windings. The coil may be the diaphragm-side transducing component and may be configured to move with the diaphragm or the diaphragm structure, during operation.

In some embodiments, the coil is the base-structure-side transducing component. The coil may comprise a single coil winding extending about a periphery of a corresponding magnet of the transducing mechanism.

In some embodiments, the coil may not be in intimate contact with a ferromagnetic core.

In some embodiments, the audio transducer may further comprise a shield formed from a ferromagnetic material, the shield being configured to substantially mitigate magnetic attraction or repulsion of nearby foreign ferromagnetic material toward or away from the transducing mechanism. The shield may mitigate movement, such as twisting, of the transducing mechanism toward or away from foreign ferromagnetic materials. The shield may extend about the transducing mechanism. The shield may not be in intimate contact with any coil. The shield may be substantially distal to each coil such that there is a gap therebetween. The gap may be at least 1 mm for example. The shield may exert a substantially zero net force on the diaphragm or diaphragm structure.

In some embodiments the ferromagnetic shielding may have perforations or other gaps to facilitate passage of sound waves.

In some embodiments the ferromagnetic shielding may also double as a grille.

In some embodiments, a face or side of the coil on a side distal from a magnet of an electromagnetic mechanism, may not have any strongly ferromagnetic material in intimate contact therewith. In some embodiments, a face or side of the coil on a side distal from a magnet of an electromagnetic mechanism, may not have any strongly ferromagnetic material rigidly connected therewith.

In some embodiments, a face or side of the coil on a side distal from a magnet of an electromagnetic mechanism, may have a gap of at least 1 mm, more preferably at least 2 mm, and most preferably at least 4 mm to any strongly ferromagnetic material beyond.

In some embodiments, the audio transducer may not comprise any pole pieces around the coil. In alternative embodiments, the audio transducer may comprise pole pieces around the coil.

In some embodiments, the coil may couple about a pin of a hinge mount of the diaphragm suspension.

In some embodiments, the coil may divert around an axis pin of a hinge that connects the diaphragm suspension.

In some embodiments, the coil may be located adjacent and wrap around a magnet of the transducing mechanism.

In some embodiments, the coil may be located adjacent a magnet of the transducing mechanism and wrap around a region adjacent a pole of the magnet. The regions may be immediately adjacent the pole.

In some embodiments, a shortest distance between a magnet or magnetic structure and the coil is lower than approximately 1.5 mm, more preferably lower than approximately 1 mm, most preferably lower than approximately 0.5 mm.

In some embodiments, the coil may be symmetric across opposing sides of the magnet or magnetic structure.

In some embodiments the coil extends within a plane that is substantially transverse relative to a longitudinal axis of the diaphragm.

In some embodiments the coil extends substantially parallel to the axis of rotation and along either side of the axis of rotation.

In some embodiments, a plurality of coils may be located adjacent a magnet of the transducing mechanism, each wrapping around a region adjacent one of the poles of the magnet. The regions may be directly adjacent the poles. The plurality of coils may not be electrically and magnetically connected (e.g. via a ferromagnetic core). The coils may be connected. The coils may be connected in series or in parallel. A first coil may be located adjacent a magnet of the transducing mechanism and wrap around a region adjacent a first pole of the magnet, and a second coil may be located adjacent the magnet and wrap around a region adjacent a second pole of the magnet.

In some embodiments, a longitudinal axis of the coil may be substantially perpendicular to the primary magnetic field of a corresponding magnet of the transducing mechanism. The coil axis may intersect at a central region of the magnet. The coil axis may intersect at a central region of a longitudinal axis of the magnet.

In some embodiments, the coil may comprise a resistance of less than approximately 2.5 ohms. The coil may comprise a resistance of less than approximately two ohms. The coil may comprise a resistance of less than approximately one ohm.

In some embodiments, the transducing mechanism may comprise a piezoelectric mechanism. The diaphragm-side transducing component may be a component or part of the piezoelectric mechanism.

In some embodiments, the transducer base structure may comprise a plurality of cooling fins.

In some embodiments, the transducer base structure may be formed from alumina.

In some embodiments, the audio transducer may further comprise a decoupling mounting system flexibly mounting the transducer base structure to an adjacent component of the audio transducer other than the diaphragm or the diaphragm structure.

In some embodiments, the audio transducer may further comprise a housing or baffle configured to surround the audio transducer, and wherein the decoupling mounting flexibly mounts the transducer base structure to the housing or baffle.

In some embodiments, the decoupling mounting system may comprise at least one transducer node axis mount that is configured to locate at or proximal to a predetermined transducer node axis of the audio transducer. The predetermined transducer node axis may be determined by identifying an axis of rotation of the transducer base structure in an effectively substantially unsupported and activated state of the audio transducer, whereby the audio transducer is effectively decoupled from the housing and the transducer base structure exhibits movement reaction forces during rotation of the diaphragm. In some embodiments, the predetermined transducer node axis may be determined using a computer simulation of a model of the audio transducer in the unsupported and activated state.

In some embodiments the decoupling system may comprise at least one distal mount configured to locate distal from the predetermined transducer node axis.

In some embodiments the at least one transducer node axis mount may be relatively less compliant and/or relatively less flexible than the at least one distal mount.

In some embodiments, the decoupling system may comprise a pair of transducer node axis mounts located on either side of the transducer base structure. Preferably each transducer node axis mount comprises a pin rigidly coupled to the transducer base structure and extending laterally from one side thereof along an axis that is substantially aligned with the transducer node axis. Preferably each transducer node axis mount further comprises a bush rigidly coupled about the pin and configured to be located within a corresponding recess of the housing. Preferably the corresponding recess of the housing comprises a slug for rigidly receiving and retaining the bush therein.

In some embodiments each distal mount may comprise a substantially flexible mounting pad. Preferably the decoupling system comprises a pair of mounting pads connected between an outer surface of the transducer base structure and an inner surface of the housing. Preferably the mounting pads are coupled at opposing surfaces of the transducer base structure. Preferably each mounting pad comprises a substantially tapered width along the depth of the pad with an apexed end and a base end. Preferably the base end is rigidly connected to one of the transducer base structure or housing and the apexed end is connected to the other of the transducer base structure or housing.

In some embodiments, the audio transducer may be an electroacoustic transducer/loudspeaker configured to generate sound pressure from input audio signals.

In some embodiments, the audio transducer may be an acoustoelectric transducer/microphone configured to generate audio signals from input sound pressure.

In some embodiments, the audio transducer may comprise a housing for surrounding the diaphragm or diaphragm structure, transducer base structure and transducing mechanism. The housing may be made from plastics material.

In some embodiments, the audio transducer may be a mid-range and treble transducer configured to transduce sound in the frequency band 200 Hz to 20 kHz.

In some embodiments, the audio transducer may be a bass transducer configured to transduce sound in the frequency band of approximately 20 Hz to approximately 200 Hz.

In some embodiments, the audio transducer may be a personal audio transducer configured to transduce sound in the frequency band of approximately 20 Hz to approximately 20 k Hz. In some embodiments, the audio transducer may comprise a fundamental resonance frequency of less than 100 Hz, or less than approximately 70 Hz, or most preferably less than 50 Hz.

In some embodiments each hinge mount of the diaphragm suspension has sufficiently low Young's modulus such that fundamental diaphragm resonance frequency occurs at frequency less than approximately 100 Hz. In some embodiments each hinge mount of the diaphragm suspension has sufficiently low Young's modulus such that a fundamental diaphragm resonance frequency occurs at frequency less than approximately 70 Hz. In some embodiments each hinge mount of the diaphragm suspension has a sufficiently low Young's modulus such that a fundamental diaphragm resonance frequency occurs at frequency of less than approximately 50 Hz.

In some embodiments, the audio transducer may comprises a translational resonance frequency of more than approximately 200 Hz, or more than approximately 300 Hz, or more than approximately 400 Hz.

In some embodiments one or more diaphragm suspension components are sufficiently rigid in order that a diaphragm resonance frequency associated with translational compliance occurs at frequency greater than approximately 200 Hz, more preferably greater than approximately 300 Hz, and most preferably greater than approximately 400 Hz. The diaphragm assembly resonance frequency associated with translational compliance may involve significant displacement of the diaphragm in a direction perpendicular to a coronal plane.

In some embodiments each hinge mount of the diaphragm suspension is sufficiently rigid in order that a diaphragm resonance frequency associated with translational compliance occurs at frequency greater than approximately 200 Hz, more preferably greater than approximately 300 Hz, and most preferably greater than approximately 400 Hz. The diaphragm assembly resonance frequency associated with translational compliance may involve significant displacement of the diaphragm in a direction perpendicular to a coronal plane.

In some aspects the invention may broadly consist of audio device configured for use within approximately 10 cm of a user's ear and comprising: a housing; and an audio transducer as per any one of the previous aspects located within the housing.

In some embodiments, the audio device may comprise at least one interface device sized and configured to be located against a user's ear in use, the interface device comprising the housing and the audio transducer.

Each interface device may be configured to mount the user's head in use, at or adjacent an ear of the user.

Each audio device may comprise a pair of interface devices for both ears of the user. The pair of interface devices may be configured to reproduce at least two independent audio signals via the associated audio transducer.

In some embodiments, each interface device is a headphone cup configured to be worn at or about a user's ear in use.

In some embodiments, each interface device is an interface plug configured to locate at, adjacent or within the user's ear canal in use. Each earphone interface may be non-sealing about the associated ear canal when worn. Each interface device may comprise an air channel extending from an ear canal opening to a vent in the device.

In some embodiments, the interface device is a mobile phone sound interface.

In some embodiments, the device is a hearing aid interface.

In some aspects the invention may broadly consist of a mobile phone device comprising: a housing; and an audio transducer as per any one of the previous aspects located within the housing.

In some aspects the invention may broadly consist of a hearing aid comprising: a housing; and an audio transducer as per any one of the previous aspects located within the housing.

In some aspects the invention may broadly be said to consist of an electronic device comprising:

a housing having cavity for an audio transducer, the cavity having a substantially shallow depth dimension; and an audio transducer as per any one of the previous aspects:

wherein the audio transducer is located within the cavity and the diaphragm is configured to rotatably oscillate about the primary axis of rotation between a first terminal position and second terminal position during operation; the audio transducer is oriented within the cavity such that the primary axis of rotation is substantially parallel to the depth dimension of the cavity, and wherein a total linear displacement of a terminal end of the diaphragm most distal from the primary axis of rotation along a plane that is substantially orthogonal to the depth dimension is substantially the same or greater than the depth dimension of the cavity.

In some aspects the invention may broadly be said to consist of an electronic device comprising:

a housing having cavity for an electroacoustic transducer, the cavity having a depth dimension that is smaller than a substantially orthogonal length dimension and/or smaller than a substantially orthogonal width dimension of the cavity; and an audio transducer as per any one of the previous aspects located within the cavity and having a diaphragm that is configured to rotate about an axis of rotation during operation;

wherein the electroacoustic transducer is oriented within the cavity such that the diaphragm axis of rotation is substantially parallel to the depth dimension of the cavity; and wherein the housing has a depth dimension that is substantially smaller than a width dimension and a length dimension of the housing.

In some embodiments, the housing depth dimension may be significantly smaller than the housing width and the length dimensions. For example the housing depth dimension may be less than approximately 0.2 times the width and/or length dimensions of the housing, or less than approximately 0.15 times the width and/or length dimensions of the housing, or less than approximately 0.1 times the width and/or length dimensions of the housing.

In another aspect the invention may broadly be said to consist of an electronic device comprising:

a housing having:

- a pair of opposing major faces that are connected by one or more side faces, the major faces having a relatively larger surface area than each of the side faces; and
- a cavity for an electroacoustic transducer, the cavity having a shallow depth dimension that is substantially orthogonal to the major faces; and an electroacoustic transducer as per any one of the previous aspects located within the cavity and having a diaphragm that is configured to rotatably oscillate about an axis of rotation between a first terminal position and second terminal position during operation;

wherein the electroacoustic transducer is oriented within the cavity such that the diaphragm axis of rotation is substantially parallel to the depth dimension of the cavity.

In some aspects the present invention broadly consists of an electronic device comprising:

a housing having cavity for an electroacoustic transducer, the cavity having a depth dimension that is smaller than a substantially orthogonal length dimension and/or smaller than a substantially orthogonal width dimension of the cavity; and an audio transducer located within the cavity and having a diaphragm that is configured to rotate about an axis of rotation during operation; wherein the electroacoustic transducer is oriented within the cavity such that the diaphragm axis of rotation is substantially parallel to the depth dimension of the cavity; and wherein the housing has a depth dimension that is substantially smaller than a width dimension and a length dimension of the housing.

In some aspect the invention may broadly be said to consist of an electronic device comprising:

a housing having:

a pair of opposing major faces that are connected by one or more side faces, the major faces having a relatively larger surface area than each of the side faces; and a cavity for an electroacoustic transducer, the cavity having a shallow depth dimension that is substantially orthogonal to the major faces; and an audio transducer as per any one of the previous aspects located within the cavity and having a diaphragm that is configured to rotatably oscillate about an axis of rotation between a first terminal position and second terminal position during operation; wherein the electroacoustic transducer is oriented within the cavity such that the diaphragm axis of rotation is substantially parallel to the depth dimension of the cavity.

In some aspects the invention may broadly be said to consist of an electronic device comprising:

a housing having cavity for an audio transducer, the cavity having a smaller depth dimension relative to a substantially orthogonal length dimension and a substantially orthogonal width dimension of the cavity; and an audio transducer as per any one of the previous aspects located within the cavity and having a diaphragm that is configured to rotate about an axis of rotation during operation; wherein the audio transducer is oriented within the cavity such that the diaphragm axis of rotation is substantially parallel to the depth dimension of the cavity.

In some aspects the invention may broadly be said to consist of an electronic device comprising:

a housing having cavity for an electroacoustic transducer, the cavity having a substantially shallow depth dimension; and an audio transducer as per any one of the previous aspects located within the cavity and having a diaphragm that is configured to rotatably oscillate about an axis of rotation between a first terminal position and second terminal position during operation; wherein the electroacoustic transducer is oriented within the cavity such that the diaphragm axis of rotation is substantially parallel to the depth dimension of the cavity, and wherein at least a component of a total linear displacement of a terminal end of the diaphragm along a plane that is substantially orthogonal to the depth dimension is substantially the same or greater than the depth dimension of the cavity, the component of the total linear displacement being substantially orthogonal to the depth dimension and the terminal end of the diaphragm being at an end of the diaphragm most distal from the axis of rotation.

In some aspects the invention may broadly be said to consist of an electronic device comprising:

a housing having cavity for an electroacoustic transducer, the cavity having a substantially shallow depth dimension; and an audio transducer as per any one of the previous aspects located within the cavity and having a diaphragm that is configured to rotatably oscillate about an axis of rotation between a first terminal position and second terminal position during operation; wherein the electroacoustic transducer is oriented within the cavity such that the diaphragm axis of rotation is substantially parallel to the depth dimension of the cavity, and wherein at least a component of a total linear displacement of a terminal end of the diaphragm along a plane that is substantially orthogonal to the depth dimension is substantially the same or greater than the depth dimension of the cavity, the component of the total linear displacement being substantially orthogonal to the depth dimension and the terminal end of the diaphragm being at an end of the diaphragm most distal from the axis of rotation.

In some aspects the invention may be said to consist of an audio system comprising:

an audio device having an audio transducer as per any one of the above aspects; and an audio tuning system operatively coupled to the audio device for optimising an audio signal at an input of the transducer.

The audio tuning system may be implemented in the audio device of the audio system or in an external or remote device.

In another aspect the invention may be said to consist of an audio device comprising:

an audio transducer as per any one of the above aspects; and an audio tuning system operatively coupled to the audio transducer for optimising an input audio signal to the transducer.

The audio tuning system may be implemented in analogue and/or digital circuitry.

In some embodiments the audio tuning system of the invention includes an equaliser configured to equalise received audio signals for each output channel of the associated audio device. The equaliser is configured to compensate for characteristics of the related audio transducer(s). Such characteristics may include any combination of one or more of: a frequency response of the audio transducer; the phase response of the audio transducer; the impulse response of the audio transducer; and/or the mass-spring-damper lumped parameter characteristics, where the fundamental mode is modelled, and optionally also one or more translational modes.

In some embodiments, the equaliser may be configured to remove steps in a frequency response of an audio signal, and deliver an equalised audio signal to the transducing mechanism of an audio transducer.

In some embodiments, the equaliser may be configured to remove spikes or blips in a frequency response of an audio signal, and deliver an equalised audio signal to the transducing mechanism of a related audio transducer. The spike or blip may cause an at least 1 dB spike in the frequency response, for example.

The equaliser may be configured to remove phase spikes or blips or steps in a phase response of an audio signal.

In some embodiments, the audio tuning system may be configured to equalise a frequency and/or a phase response and/or a transient response of an input signal to the transducing mechanism based on the fundamental diaphragm resonance frequency.

In some embodiments, the audio tuning system may be configured to equalise a frequency response and/or a phase response and/or a transient response of an input signal to the transducing mechanism to compensate for amplitude and/or phase and/or transient characteristics associated with lumped parameter, e.g. mass-spring-damper, characteristics of the diaphragm. The lumped parameter characteristics may include both the fundamental diaphragm resonance mode and also one or more resonance modes involving a significant component of diaphragm assembly translation associated with translational hinge compliance.

In some embodiments, the audio tuning system may be configured to increase a frequency response of an audio signal with increasing frequency at an input of the transducing mechanism, to compensate for high-frequency roll-off. The high-frequency roll-off may be related to coil inductance.

In some embodiments, the audio tuning system may be configured to impose a frequency response curve comprising a step change in loudness occurring at or near a frequency corresponding to compensation for effect of a resonance mode having motion comprising translation of the diaphragm structure via translational compliance of the diaphragm suspension. The imposed frequency response curve may also comprise a correction for a response peak and/or trough associated with a resonance mode having motion comprising translation of the diaphragm structure via translational compliance of the diaphragm suspension.

In some embodiments, the audio tuning system may comprise a high pass filter having an input configured to operatively couple an audio source and an output configured to operatively couple the transducing mechanism to attenuate audio signals from the audio source at frequencies below one or more predetermined cut-off frequencies. In embodiments where the diaphragm suspension system is also sufficiently flexible, a resonance frequency associated with a resonance mode that in turn is associated with diaphragm suspension system compliance may be lower than one or more of the predetermined cut-off frequencies.

In some embodiments, the audio tuning system comprises a high-pass filter for filtering relatively low frequency components of an input audio signal. The filter is also configured to provide a filtered audio signal to the transducing mechanism of an associated transducer during operation.

The filter may be configured to filter frequency components of an associated audio transducer based on the lower roll-off frequency of the transducer's frequency response.

In some embodiments, the diaphragm suspension of the audio transducer may be sufficiently compliant such that a resonance frequency of the diaphragm associated with translational compliance is below the cut-off frequency of the filter. The cut-off frequency may be the −3 DB frequency of the filter for example. Preferably the resonance mode is not the primary diaphragm resonance mode. Preferably at the frequency of the resonance mode the diaphragm remains substantially rigid. Preferably the resonance mode involves translational compliance/movement of the diaphragm in the region of the primary axis. Preferably the resonance mode involves compliance/movement of the suspension system that facilitates rotation of the diaphragm about an axis other than the primary axis. Preferably the axis is located parallel to the primary axis. Preferably the translation has a significant component in a direction perpendicular to a major face of a diaphragm. Preferably the resonance mode is one which results in a resonance peak greater than 1 dB, more preferably greater than 2 dB, and most preferably greater than 3 dB, in a frequency response measurement. Preferably the resonance mode is one which is associated with in a step in level, in a frequency response plot, greater than 0.5 dB, more preferably greater than 1 dB, and most preferably greater than 1.5 dB.

The diaphragm resonance frequency associated with translational hinge compliance may involve significant displacement of the diaphragm in a direction perpendicular to a coronal plane. The diaphragm resonance frequency associated with translational hinge compliance may cause an associated frequency response deviation of 1 dB or more when measured 1 m away on-axis. The diaphragm assembly resonance frequency associated with translational hinge compliance may cause an associated frequency response step of 0.5 dB or more when measured 1 m away on-axis.

In some embodiments, the audio device may further comprise an amplifier for amplifying an input audio signal and outputting an amplified signal to the transducing mechanism, during operation. The amplifier may be configured to receive output current as feedback at an input of the amplifier. The amplifier may be digital and/or analogue.

In some aspects, the invention may broadly be said to consist of a method of manufacturing an audio transducer having a diaphragm, a transducer base structure and a transducing mechanism, the method comprising the steps of:

a) Determining a node axis of the diaphragm;
b) Coupling the transducing mechanism to the diaphragm and to the transducer base structure; and
c) rotatably mounting the diaphragm to the transducer base structure via a diaphragm suspension system such that an axis of rotation of the diaphragm relative to the transducer base structure is located in a plane that is: substantially perpendicular to a coronal plane of the diaphragm and that contains the node axis of the diaphragm.

In some embodiments, the order of steps a) to c) may be altered provided step c) is performed after step a).

In some embodiments the axis of rotation may be substantially coaxial with the node axis.

In some embodiments, the step of determining the node axis of the diaphragm may comprise operating the diaphragm in an effectively substantially unsupported state and observing an axis of rotation indicative of the node axis.

In some embodiments, the step of determining the node axis of the diaphragm may comprise the steps of:

- generating a computer model of the audio transducer;
- simulating an operative state in which a transducing mechanism of the model rotates a diaphragm of the model in an effectively substantially unsupported state relative to a transducer base structure of the model; and determining from the simulation an axis of rotation of the model diaphragm; and determining the node axis of the audio transducer from the axis of rotation of the model diaphragm.

In some embodiments, the effect of the diaphragm suspension on the node axis location during the operative state is negligible. A time period of the operative state may be sufficiently short and/or the frequency of operation in this state is sufficiently high that the effect of the diaphragm suspension on the node axis location is negligible. The effect of the diaphragm flexing (as opposed to diaphragm suspension flexing/diaphragm displacement) on the node axis location during the operative state may be negligible. The operative state may be sufficiently long and/or the frequency of operation in this state may be sufficiently low that the diaphragm remains substantially rigid, or at least that any deformation of the diaphragm has negligible effect on the determined node axis location.

In some embodiments equivalent computer modelling techniques may be used to design the diaphragm's mass distribution and/or the transducer's mass distribution and/or the location and direction of excitation of the diaphragm in a way that that a node axis occurs at a target location.

In some embodiments the step of determining the node axis of the diaphragm comprises use of the laws of kinematics and/or the application of Newton's second law.

In some embodiments an assumption may be made that the diaphragm is a substantially rigid body. An assumption may be made that the transducer base structure is a substantially rigid body. An assumption may be made that the diaphragm suspension has a substantially negligible effect on motion. A calculation may be made of the location of the axis of rotation of the diaphragm. An initial condition may be zero relative movement between the diaphragm and transducer base structure. A force may be applied in the same direction(s) and location(s) as are applied in the actual driver. The force may be applied for a sufficiently short period of time such that resulting displacement is small or negligible. A location of the diaphragm may be determined which has undergone substantially zero translation following application of the force.

In some embodiments equivalent techniques, based on the laws of kinematics, may be used to design the diaphragm's mass distribution and/or the transducer's mass distribution and/or the location and direction of excitation of the diaphragm in a way that that a node axis occurs at some target location.

In some embodiments, the step of determining the node axis of the diaphragm may comprise the steps of:

generating a physical model of the audio transducer;

operating a transducing mechanism of the model to rotate the model diaphragm in an effectively substantially unsupported state relative to a transducer base structure of the model;

determining an axis of rotation of the model diaphragm relative to the transducer base structure; and determining the node axis of the audio transducer from the axis of rotation of the model diaphragm.

In some embodiments, the effect of the diaphragm suspension on the node axis location during the operative state is negligible. A time period of the operative state may be sufficiently short and/or the frequency of operation in this state is sufficiently high that the effect of the diaphragm suspension on the node axis location is negligible. The effect of the diaphragm flexing (as opposed to diaphragm suspension flexing/diaphragm displacement) on the node axis location during the operative state may be negligible. The operative state may be sufficiently long and/or the frequency of operation in this state may be sufficiently low that the diaphragm remains substantially rigid, or at least that any deformation of the diaphragm has negligible effect on the determined node axis location.

In some embodiments the step of determining the axis of rotation of the model may comprise measuring the axis using one or more sensors or measuring devices such as accelerometers, Laser Doppler Vibrometer (LDV), proximity sensors or the like.

In some aspects, the invention may broadly be said to consist of a method of manufacturing an audio transducer having a diaphragm, a transducer base structure and a transducing mechanism, the method comprising the steps of:

a) assembling the audio transducer by:
   i. Coupling the transducing mechanism to the diaphragm and to the transducer base structure; and
   ii. rotatably mounting the diaphragm to the transducer base structure via a diaphragm suspension system;
b) operating the transducing mechanism to rotate the diaphragm of the partly assembled audio transducer;
c) analysing one or more operating characteristics of the partly assembled audio transducer;
d) adjusting one or more physical characteristics of the partly assembled audio transducer to optimise the one or more operating characteristics;
e) and repeating steps b)-d) if necessary until one or more desired criteria of the one or more operating characteristics is/are achieved.

In some embodiments, the desired criteria may be predetermined.

In some embodiments, in addition, or instead, step b) may comprise operating the driver in a manner such that the effect of the diaphragm suspension on the node location is non-negligible.

In some embodiments, the one or more operating characteristics may comprise any one or more of: a frequency response of the transducer within at least an intended frequency range of operation.

In some embodiments, step c) may comprise analysing a frequency response of the transducer to determine if a value of a parameter indicative of one or more stepped changes in the frequency response is greater than a predetermined threshold value.

In some embodiments, step c) may comprise analysing a frequency response of the transducer to determine if a peak value of the frequency response is greater than a predetermined threshold value.

In some embodiments, the one or more physical characteristics may comprise any combination of one or more of: a location of the diaphragm suspension system relative to the diaphragm; a location of an axis of rotation of the diaphragm relative to the transducer base structure; a mass profile of the transducer base structure; a mass profile of the diaphragm; one or more dimensions of the diaphragm; a shape profile of the diaphragm; a shape profile of the diaphragm suspension system; a stiffness profile of the diaphragm suspension system; a force generation profile of the transducing mechanism.

In some aspects, the invention may broadly be said to consist of a method of manufacturing an audio transducer having a diaphragm, a transducer base structure and a transducing mechanism, the method comprising the steps of:

a) Determining a centre of mass axis of the diaphragm;
b) Coupling the transducing mechanism to the diaphragm and to the transducer base structure; and c) rotatably mounting the diaphragm to the transducer base structure via a diaphragm suspension system such that an axis of rotation of the diaphragm relative to the transducer base structure is located in a plane that is: substantially perpendicular to a coronal plane of the diaphragm and that contains the centre of mass axis of the diaphragm.

In some embodiments, the axis of rotation may be substantially coaxial with the centre of mass axis.

In some aspects the invention may broadly be said to consist of an audio transducer comprising:

a diaphragm;

a transducer base structure;

a diaphragm suspension system configured to flexibly and rotatably mount the diaphragm relative to the transducer base structure to enable the diaphragm to rotatably oscillate relative to the transducer base structure about an axis of rotation during operation and comprising at least one flexible mount coupled between an outer side of the diaphragm and an adjacent side of the transducer base structure; and an electromagnetic transducing mechanism operatively coupled to the diaphragm to transduce between audio signals and sound pressure and comprising a magnet or magnetic structure and an associated conductive coil located within a magnetic field of the magnet or magnetic structure in situ.

In some aspects the invention may broadly be said to consist of an audio transducer comprising:

a diaphragm;

a transducer base structure;

a diaphragm suspension system configured to flexibly and rotatably mount the diaphragm relative to the transducer base structure to enable the diaphragm to rotatably oscillate relative to the transducer base structure about an axis of rotation during operation; and an electromagnetic transducing mechanism operatively coupled to the diaphragm to transduce between audio signals and sound pressure and comprising a magnetic structure and an associated conductive coil located within a magnetic field of the magnetic structure in situ; wherein the electromagnetic transducing mechanism is located at or proximal the axis of rotation to thereby exert a torque on the diaphragm during operation with substantially zero net translational force component.

In some aspects the invention may broadly be said to consist of an audio transducer comprising:

a diaphragm;

a transducer base structure;

a diaphragm suspension system configured to rotatably mount the diaphragm relative to the transducer base structure to enable the diaphragm to rotatably oscillate relative to the transducer base structure about an axis of rotation during operation, the diaphragm suspension system being located such that the axis of rotation of the diaphragm is substantially coaxial with a predetermined node axis of the diaphragm; and an electromagnetic transducing mechanism operatively coupled to the diaphragm to transduce between audio signals and sound pressure and comprising a magnetic structure and an associated conductive coil structure located within a magnetic field of the magnetic structure in situ; wherein the magnetic structure is configured to move during operation.

In some aspects the invention may broadly be said to consist of an audio transducer comprising:

a diaphragm;

a transducer base structure;

a diaphragm suspension system configured to rotatably mount the diaphragm relative to the transducer base structure to enable the diaphragm to rotatably oscillate relative to the transducer base structure about an axis of rotation during operation, the diaphragm suspension system being located such that the axis of rotation of the diaphragm is substantially coaxial with a centre of mass axis of the diaphragm; and an electromagnetic transducing mechanism operatively coupled to the diaphragm to transduce between audio signals and sound pressure and comprising a magnetic structure and an associated conductive coil structure located within a magnetic field of the magnetic structure in situ; wherein the magnetic structure is configured to move during operation.

In some aspects the invention may broadly be said to consist of an audio transducer comprising:

a diaphragm;

a transducer base structure;

a diaphragm suspension system configured to rotatably mount the diaphragm relative to the transducer base structure to enable the diaphragm to rotatably oscillate relative to the transducer base structure about an axis of rotation during operation, the diaphragm suspension system being located such that the axis of rotation of the diaphragm is substantially coaxial with a predetermined node axis of the diaphragm; and an electromagnetic transducing mechanism operatively coupled to the diaphragm to transduce between audio signals and sound pressure and comprising a magnetic structure and an associated conductive coil structure located within a magnetic field of the magnetic structure in situ; wherein the magnetic structure is configured to move during operation.

In some aspects the invention may broadly be said to consist of an audio transducer comprising:

a diaphragm;

a transducer base structure;

a diaphragm suspension system configured to rotatably mount the diaphragm relative to the transducer base structure to enable the diaphragm to rotatably oscillate relative to the transducer base structure about an axis of rotation during operation; and an electromagnetic transducing mechanism operatively coupled to the diaphragm to transduce between audio signals and sound pressure and comprising a magnetic structure and an associated conductive coil structure located within a magnetic field of the magnetic structure in situ; wherein the magnetic structure is configured to move during operation and a shortest distance between the magnetic structure and the conductive coil structure is lower than approximately 1.5 mm.

In some aspects the invention may broadly be said to consist of an audio transducer comprising:

a diaphragm;

a transducer base structure;

a diaphragm suspension system configured to rotatably mount the diaphragm relative to the transducer base structure to enable the diaphragm to rotatably oscillate relative to the transducer base structure about an axis of rotation during operation;

an electromagnetic transducing mechanism operatively coupled to the diaphragm to transduce between audio signals and sound pressure and comprising a magnetic structure and an associated conductive coil structure located within a magnetic field of the magnetic structure in situ, the magnetic structure being configured to move during operation; and a ferromagnetic shield extending about the transducing mechanism to substantially mitigate magnetic attraction or repulsion forces acting on nearby foreign ferromagnetic materials. In some embodiments the invention comprises ferromagnetic shielding which does not significantly improve the efficiency of the driver [is not part of the motor].

In some aspects the invention may broadly be said to consist of an audio transducer comprising:

a diaphragm;

a transducer base structure;

a diaphragm suspension system configured to rotatably mount the diaphragm relative to the transducer base structure to enable the diaphragm to rotatably oscillate relative to the transducer base structure about an axis of rotation during operation;

an electromagnetic transducing mechanism operatively coupled to the diaphragm to transduce between audio signals and sound pressure and comprising a magnetic structure and an associated conductive coil structure located within a magnetic field of the magnetic structure in situ, the magnetic structure being configured to move during operation; and wherein a resistance of the conductive coil structure is less than approximately 2.5 ohms.

In some aspects the invention may broadly be said to consist of an audio device comprising:

An audio transducer having:

a diaphragm;

a transducer base structure;

a diaphragm suspension system configured to rotatably mount the diaphragm relative to the transducer base structure to enable the diaphragm to rotatably oscillate relative to the transducer base structure about an axis of rotation during operation;

an electromagnetic transducing mechanism operatively coupled to the diaphragm to transduce between audio signals and sound pressure and comprising a magnetic structure and an associated conductive coil structure located within a magnetic field of the magnetic structure in situ, the magnetic structure being configured to move during operation;

a housing including an enclosure or baffle for accommodating the audio transducer therein; and a decoupling mounting system flexibly mounting the transducer base structure to the housing for at least partially alleviating mechanical transmission of vibration between the transducer base structure and the housing.

In some aspects the invention may broadly be said to consist of an audio transducer comprising:

a diaphragm;

a transducer base structure;

a diaphragm suspension system configured to flexibly and rotatably mount the diaphragm relative to the transducer base structure, the diaphragm suspension system having a pair of flexible mounts coupling between the diaphragm and the transducer base structure, wherein each flexible mount is formed from a material or materials having a Young's modulus of less than approximately 8 GPa; and a transducing mechanism operatively coupled to the diaphragm to transduce between audio signals and sound pressure.

In some aspects the invention may broadly be said to consist of an audio transducer comprising:

a diaphragm;

a transducer base structure;

a diaphragm suspension system configured to flexibly and rotatably mount the diaphragm relative to the transducer base structure, the diaphragm suspension system having a pair of flexible elements coupling between the diaphragm and the transducer base structure, wherein each flexible element is formed from a material or materials having a Young's modulus of less than approximately 8 GPa, and wherein the flexible elements are angled relative to one another; and a transducing mechanism operatively coupled to the diaphragm to transduce between audio signals and sound pressure.

In some embodiments, each flexible element may be configured to undergo significant bending deformation to facilitate fundamental-mode diaphragm rotation.

In some embodiments, the flexible elements are angled at least 40 degrees, more preferably at least 50 degrees, and most preferably at least 60 degrees relative to one-another.

In some embodiments each flexible element may resist diaphragm translation along an axis that is substantially perpendicular to a primary axis of rotation of the diaphragm suspension system, via primarily tension/compression loading. Preferably some direction of diaphragm translation exists that is perpendicular to the primary axis of rotation and where one of the flexible elements undergoes only minimal tension/compression loading, and where the other flexible element does resist translation via tension/compression loading.

In some embodiments the flexible elements may be located in close proximity. The pair of flexible elements may be formed as part of a single flexible mount component.

In some aspects the invention may broadly be said to consist of an audio transducer comprising:

a diaphragm;

a transducer base structure;

a diaphragm suspension system configured to flexibly and rotatably mount the diaphragm relative to the transducer base structure, the diaphragm suspension system having one or more flexible mounts, each flexible mount consisting of a substantially longitudinal body with an outer wall and a plurality of inner spokes extending radially toward the outer wall about a longitudinal axis of the body, and wherein the inner spokes of each mount are formed from a material or materials having a Young's modulus of less than approximately 8 GPa such that the spokes flex or deform during operation; and a transducing mechanism operatively coupled to the diaphragm to transduce between audio signals and sound pressure.

In some aspects the invention may broadly be said to consist of an audio device comprising:

an audio transducer having:

a diaphragm;

a transducer base structure;

a diaphragm suspension system configured to flexibly and rotatably mount the diaphragm relative to the transducer base structure to enable the diaphragm to rotatably oscillate relative to the transducer base structure about an axis of rotation during operation, the diaphragm suspension system having one or more flexible mounts, each flexible mount formed primarily of a material or materials having a Young's modulus of less than approximately 8 GPa;
a transducing mechanism operatively coupled to the diaphragm to transduce between audio signals and sound pressure;
a housing including an enclosure or baffle for accommodating the audio transducer therein; and
a decoupling mounting system flexibly mounting the transducer base structure to the housing for at least partially alleviating mechanical transmission of vibration between the transducer base structure and the housing.

In some aspects the invention may broadly be said to consist of an audio device comprising:
an audio transducer having:
a diaphragm;
a transducer base structure;
a diaphragm suspension system configured to rotatably mount the diaphragm relative to the transducer base structure to enable the diaphragm to rotatably oscillate relative to the transducer base structure about an axis of rotation during operation, the diaphragm suspension system having one or more vibration damping components coupled between the diaphragm and transducer base structure;
a transducing mechanism operatively coupled to the diaphragm to transduce between audio signals and sound pressure;
a housing including an enclosure or baffle for accommodating the audio transducer therein; and
a decoupling mounting system flexibly mounting the transducer base structure to the housing for at least partially alleviating mechanical transmission of vibration between the transducer base structure and the housing.

In some aspects the invention may broadly be said to consist of an audio device comprising:
an audio transducer having:
a diaphragm;
a transducer base structure;
a diaphragm suspension system configured to flexibly and rotatably mount the diaphragm relative to the transducer base structure to enable the diaphragm to rotatably oscillate relative to the transducer base structure about an axis of rotation during operation, the diaphragm suspension system having one or more flexible mounts, each flexible mount formed primarily of a material or materials having a Young's modulus of less than approximately 8 GPa;
a transducing mechanism operatively coupled to the diaphragm to transduce between audio signals and sound pressure;
a housing including an enclosure or baffle for accommodating the audio transducer therein; and
one or more diaphragm stoppers preventing undue displacement of the diaphragm beyond a predetermined maximum displacement for protecting the diaphragm from damage in the event of unwanted movement.

In some aspects the invention may broadly be said to consist of an audio transducer comprising:
a diaphragm;
a transducer base structure;
a diaphragm suspension system configured to flexibly and rotatably mount the diaphragm relative to the transducer base structure to enable the diaphragm to rotatably oscillate relative to the transducer base structure about an axis of rotation during operation, the diaphragm suspension system having one or more flexible mounts, each flexible mount formed primarily of a material or materials having a Young's modulus of less than approximately 8 GPa; and
a transducing mechanism operatively coupled to the diaphragm to transduce between audio signals and sound pressure;
wherein the flexible mounts provide the primary resistance to translational displacement of the diaphragm relative to the transducer base structure in a direction perpendicular to a major face of a diaphragm body of the diaphragm.

In some aspects the invention may broadly be said to consist of an audio transducer comprising:
a diaphragm;
a transducer base structure;
a diaphragm suspension system comprising at least one hinge joint to rotatably mount the diaphragm relative to the transducer base structure to enable the diaphragm to rotatably oscillate relative to the transducer base structure about an axis of rotation during operation, the hinge joint comprising a material having a material loss coefficient (tan delta property) at 30 degrees Celsius and 100 Hz that is greater than 0.005; and
a transducing mechanism operatively coupled to the diaphragm to transduce between audio signals and sound pressure;
wherein the hinge joint(s) collectively provide the primary resistance to translational displacement of the diaphragm relative to the transducer base structure along an axis substantially perpendicular to a major face of a diaphragm body of the diaphragm.

In some aspects the invention may broadly be said to consist of an audio transducer diaphragm comprising:
a substantially rigid diaphragm body having a first region and a second region, the first region being of relatively greater thickness than the second region and wherein the second region has a tapering thickness reducing in a direction away from the first region; and
normal stress reinforcement coupled to the diaphragm body at or adjacent at least one major face of the diaphragm body for resisting compression-tension stresses experienced by the body during operation; and
wherein the first region of the diaphragm body has:
a substantially constant thickness; or
a tapering thickness reducing toward the second region of substantially lower gradient than the tapering thickness of the second region; or
a tapering thickness increasing toward the second region.

In some aspects the invention may broadly be said to consist of an audio transducer comprising:
a transducer base structure;
a diaphragm moveably coupled to the transducer base structure and having:
a substantially rigid diaphragm body having a first region and a second region, the first region being of relatively greater thickness than the second region and wherein the second region has a tapering thickness reducing in a direction away from the first region; and
normal stress reinforcement coupled to the diaphragm body at or adjacent at least one major face of the diaphragm body for resisting compression-tension stresses experienced by the body during operation; and wherein the first region of the diaphragm body has:

a substantially constant thickness; or a tapering thickness reducing toward the second region of substantially lower gradient than the tapering thickness of the second region; or a tapering thickness increasing toward the second region;

an electromagnetic transducing mechanism operatively coupled to the diaphragm and having a magnet or conductive coil rigidly coupled to the first region of the diaphragm body.

In some aspects the invention may broadly be said to consist of an audio transducer comprising:

a transducer base structure;

a diaphragm moveably coupled to the transducer base structure and having:

a substantially rigid diaphragm body having a first region and a second region, the first region being of relatively greater thickness than the second region and wherein the second region has a tapering thickness reducing in a direction away from the first region, wherein the first region of the diaphragm body has:

a substantially constant thickness; or a tapering thickness reducing toward the second region of substantially lower gradient than the tapering thickness of the second region; or a tapering thickness increasing toward the second region;

a diaphragm suspension system configured to rotatably mount the diaphragm relative to the transducer base structure, the diaphragm suspension system being located such that a primary axis of rotation of the diaphragm relative to the transducer base structure and a centre of mass axis of the diaphragm are substantially coaxial; and an electromagnetic transducing mechanism operatively coupled to the diaphragm and having a magnet or conductive coil rigidly coupled to the first region of the diaphragm body.

Any one or more of the above embodiments or preferred features can be combined with any one or more of the above aspects.

Other aspects, embodiments, features and advantages of this invention will become apparent from the detailed description and from the accompanying drawings, which illustrate by way of example, principles of this invention.

Definitions

The phrase "audio transducer" as used in this specification is intended to encompass an electroacoustic transducer, such as a loudspeaker, or an acoustoelectric transducer such as a microphone. Although a passive radiator is not technically a transducer, for the purposes of this specification the term "audio transducer" is also intended to include within its definition passive radiators.

The phrase "personal audio" as used in this specification and claims in relation to a transducer or a device means a loudspeaker transducer or device operable for audio reproduction and sized, intended and/or dedicated for utilisation within close proximity to a user's ear or head during audio reproduction, such as within approximately 10 cm of the user's ear or head. A personal audio device typically comprises a sound interface that is sized and configured to be located against a user's ear in use. The interface may be mountable, such as in the case of an earphone, headphone or hearing aid, or it may be sized to press against the user's ear such as the case of a mobile phone. The sound interface is preferably smaller than or sized approximately similar to a user's ear. Examples of personal audio transducers or devices include headphones, earphones, hearing aids, mobile phones and the like.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

Number Ranges

It is intended that reference to a range of numbers disclosed herein (for example, 1 to 10) also incorporates reference to all rational or irrational numbers within that range (for example, 1, 1.1, 2, 3, 3.9, 4, 5, 6, 6.5, 7, 8, 9 and 10) and also any range of rational or irrational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

The invention consists in the foregoing and also envisages constructions of which the following gives examples only. Further aspects and advantages of the present invention will become apparent from the ensuing description.

BRIEF DESCRIPTION OF THE DRAWINGS

Preferred embodiments of the invention will be described by way of example only and with reference to the drawings, in which:

FIGS. 1A-1F show various views of a first embodiment audio transducer of the invention, in which:

FIG. 1A is a perspective view of the transducer;

FIG. 1B is a plan view of the transducer;

FIG. 1C is a cross-sectional side view (section G-G) of the transducer;

FIG. 1D is a front end view of the transducer;

FIG. 1E is a close-up view of a hinge region of the transducer;

FIG. 1F is an exploded perspective view of the transducer;

FIGS. 1G-1I show finite element analysis results of a simulation on a model audio transducer similar to the transducer of FIGS. 1A-1F;

FIGS. 2A-2F show various views of the diaphragm structure of the audio transducer of FIGS. 1A-1F, in which:

FIG. 2A is a perspective view of the diaphragm;

FIG. 2B is a plan view of the diaphragm;

FIG. 2C is a side view of the diaphragm;

FIG. 2D is a close-up view of the hinge region of the diaphragm;

FIG. 2E is a front view of the diaphragm;

FIG. 2F is an exploded perspective view of the diaphragm;

FIGS. 3A-3H show various views of a loudspeaker embodiment of the invention comprising the audio transducer of FIGS. 1A-1F, in which:

FIG. 3A is a perspective view of the loudspeaker;

FIG. 3B is a close-up view of a region of a protective surround adjacent a front end of the diaphragm;

FIG. 3C is a cross-sectional side view (section C-C) of the loudspeaker;

FIG. 3D is a top view of the loudspeaker;

FIG. 3E is a cross-sectional top view (section I-I) of the loudspeaker;

FIG. 3F is a close-up view of the protective surround adjacent a side of the diaphragm;

FIG. 3G is an exploded perspective view of the loudspeaker;

FIG. 3H is a close up perspective view of an inner wall of the protective surround of the loudspeaker;

FIGS. 4A-4C show a first embodiment of a flexible mount to be used as a hinge element of a hinge mechanism of an audio transducer of the invention, in which:

FIG. 4A is an end view of the flexible mount;

FIG. 4B is a side view of the flexible mount;

FIG. 4C is a perspective view of the flexible mount;

FIGS. 5A-5C show a second embodiment of a flexible mount to be used as a hinge element of a hinge mechanism of an audio transducer of the invention, in which:

FIG. 5A is an end view of the flexible mount;

FIG. 5B is a side view of the flexible mount;

FIG. 5C is a perspective view of the flexible mount;

FIGS. 6A-6D show a third embodiment of a flexible mount to be used as a hinge element of a hinge mechanism of an audio transducer of the invention, in which:

FIG. 6A is an end view of the flexible mount;

FIG. 6B is a side view of the flexible mount;

FIG. 6C is a perspective view of the flexible mount;

FIG. 6D is an exploded perspective view of the flexible mount;

FIGS. 7A-7J show various views of a second embodiment audio transducer of the invention, in which:

FIG. 7A is a perspective view of the audio transducer;

FIG. 7B is a cross-sectional side view (section A-A) of the audio transducer;

FIG. 7C is a front end view of the audio transducer;

FIG. 7D is a plan view of the audio transducer;

FIG. 7E is a close-up cross-sectional view of a transducing mechanism of the audio transducer;

FIG. 7F is a cross-sectional side view (section B-B) of the audio transducer;

FIG. 7G is a close-up cross-sectional view of a hinge region of the audio transducer;

FIG. 7H is an cross-sectional view (section D-D) along the hinge of the transducer;

FIG. 7I is a close up view of one side of the hinge;

FIG. 7J is an exploded perspective view of the audio transducer;

FIGS. 8A-8C show a fourth embodiment of a flexible mount to be used as a hinge element of a hinge mechanism of the audio transducer of FIGS. 7A-7J, in which:

FIG. 8A is an end view of the flexible mount;

FIG. 8B is a side view of the flexible mount;

FIG. 8C is a perspective view of the flexible mount;

FIGS. 9A-9D show various views of the diaphragm structure of the audio transducer of FIGS. 7A-7J, in which:

FIG. 9A is a perspective view of the diaphragm;

FIG. 9B is a plan view of the diaphragm;

FIG. 9C is a side view of the diaphragm;

FIG. 9D is an exploded perspective view of the diaphragm;

FIGS. 12A-12P show a third audio transducer embodiment of the invention, in which:

FIG. 12A is a perspective view of the audio transducer;

FIG. 12B is a side view of the audio transducer;

FIG. 12C is a side view (section A-A) of the audio transducer;

FIG. 12D is a close-up cross-section view of an edge of a diaphragm of the audio transducer;

FIG. 12E is a close-up cross-section of a transducing mechanism of the audio transducer;

FIG. 12L is a perspective view of a diaphragm structure of the audio transducer;

FIG. 12M is a front view of the diaphragm structure;

FIG. 12N is a cross-sectional view (section E-E) across the diaphragm structure;

FIG. 12O is a cross-sectional view (section F-F) across the centre of the diaphragm structure;

FIG. 12P is an exploded perspective view of the diaphragm structure;

FIGS. 13A-13P show a fourth audio transducer embodiment of the invention, in which:

FIG. 13A is a perspective view of the audio transducer;

FIG. 13P is an exploded perspective view of the diaphragm structure;

FIGS. 14A-14D show an audio device incorporating the fourth audio transducer embodiment of the invention, in which:

FIG. 14A is a perspective view of the device;

FIG. 14B is a cross-sectional view (section H-H) of the device;

FIG. 14C is a front view of the device;

FIG. 14D is a cross-sectional view (section G-G) of the device;

FIGS. 15A-15C show a slim electronic device incorporating the fourth audio transducer embodiment of the invention, in which:

FIG. 15A is a perspective view of the device;

FIG. 15B is an exploded perspective view of the device;

FIG. 15C is a close-up exploded view of the transducer and transducer cavity in the device;

FIGS. 16A-16C show a fifth audio transducer embodiment of the invention, in which:

FIG. 16A is a perspective view of diaphragm structure of the transducer;

FIG. 16B is a side cross-sectional view of the transducer; and

FIG. 16C is a close-up cross-sectional view of a hinge of the transducer;

FIGS. 17A and 17B show a further hinge mount embodiment of the invention in which:

FIG. 17A is a perspective view of the hinge mount; and

FIG. 17B is a close-up view of an end of the hinge mount;

FIGS. 18A and 18B show a further hinge mount embodiment of the invention in which:

FIG. 18A is a perspective view of the hinge mount; and

FIG. 18B is a close-up view of an end of the hinge mount;

FIGS. 19A-19C show a further hinge mount embodiment of the invention in which:

FIG. 19A is a perspective view of the hinge mount; and

FIG. 19B is an end view of the hinge mount; and

FIG. 19C is a cross-sectional view (section X-X) of the hinge mount;

FIGS. 20A and 20B show a headphone apparatus incorporate an audio transducer embodiment of the invention, in which:

FIG. 20A is a perspective view of the headphone; and

FIG. 20B is an exploded perspective view of one of the headphone interfaces;

FIG. 21A is a block diagram showing an audio system embodiment of the invention incorporating an audio tuning system and any one or more of the audio transducer embodiments of the invention;

FIG. 21B is a block diagram showing an audio system embodiment of the invention incorporating an audio tuning system in an audio source device;

FIG. 22A is a flow chart of a first method for assembling or manufacturing any of the audio transducer embodiments of the invention;

FIG. 22B is a flow chart of a second method for assembling or manufacturing any of the audio transducer embodiments of the invention; and FIG. 22C is a flow chart of a third method for assembling or manufacturing any of the audio transducer embodiments of the invention.

DETAILED DESCRIPTION OF EMBODIMENTS

Figure 1A:
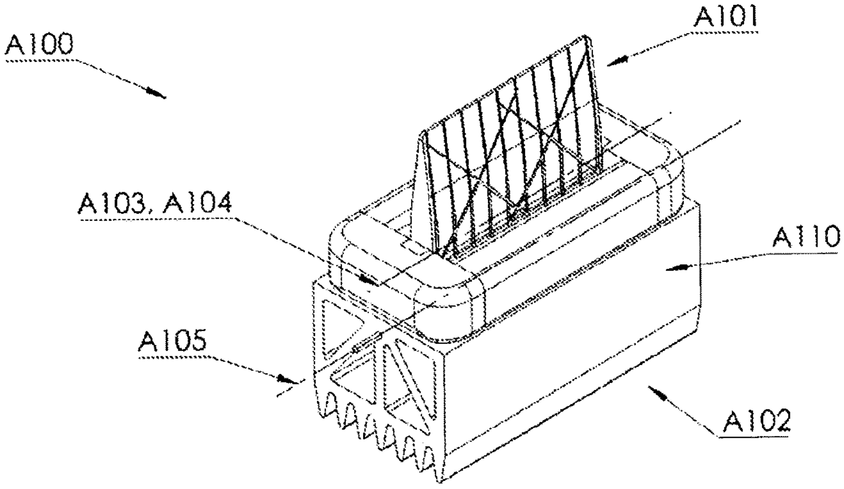
Figure 1B:
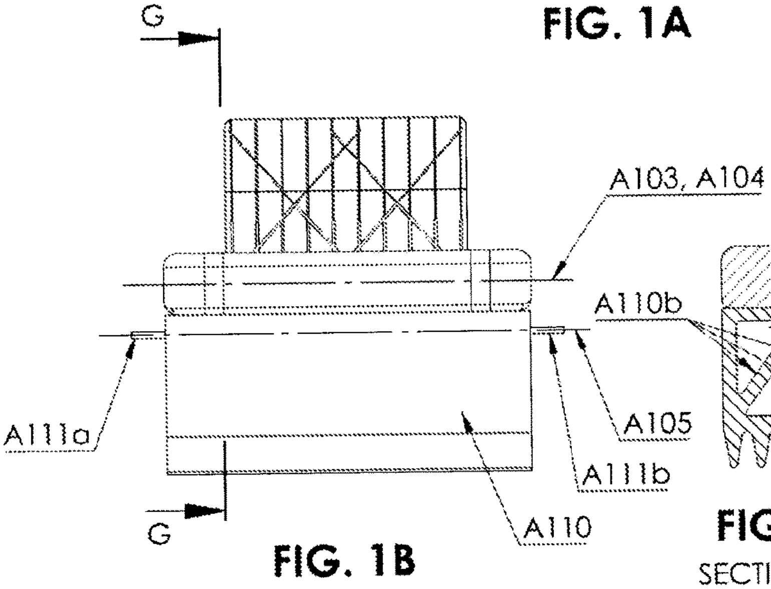
Figure 1C:
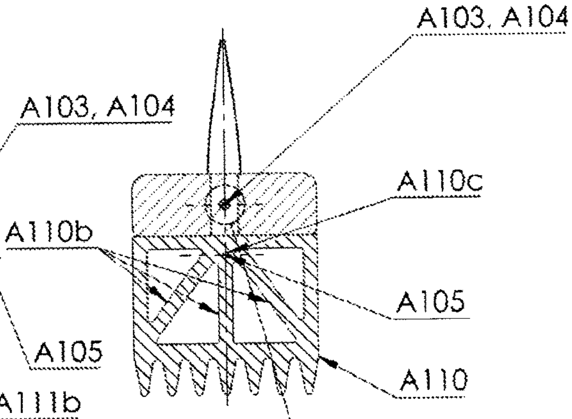

Various audio transducer embodiments of the invention will now be described with reference to the figures. In each of the audio transducer embodiments herein described the audio transducer comprises a diaphragm structure that is movably coupled relative to a base, such as a transducer base structure and/or part of a housing, support or baffle. The base has a relatively higher mass than the diaphragm structure. A transducing mechanism associated with the diaphragm structure moves the diaphragm structure in response to electrical energy, in the case of an electroacoustic transducer, or transduce movement of the diaphragm structure into electrical energy in the case of an acoustoelectric transducer. In this specification, a transducing mechanism may also be referred to as an excitation mechanism. One part or side of the transducing mechanism may be coupled to the base ("base-side transducing component" or "transducer-base-structure-side transducing component") and another side or part of the transducing mechanism may be coupled to the diaphragm structure ("diaphragm-side transducing component").

In some embodiments, the transducer may comprise an electromagnetic transducing mechanism. An electromagnetic transducing mechanism typically comprises a magnet or magnetic structure configured to generate a magnetic field, and at least one conductive coil (herein referred to as "coil") configured to locate within the magnetic field and move in response to received electrical signals (in the case of an electroacoustic transducer), or generate electrical signals in response to movement (in the case of an acoustoelectric transducer). As the electromagnetic transducing mechanism does not require physical coupling between the magnet and the coil, generally one part of the mechanism will be coupled to the base, and the other part of the mechanism will be coupled to the diaphragm structure. In some embodiments, the magnet is coupled to or forms part of the transducer base structure and the coil is coupled to or forms part of the diaphragm structure. In other embodiments, the magnet is coupled to or forms part of the diaphragm structure and the coil is coupled to or forms part of the transducer base structure. In alternative embodiments, other transducing mechanisms such as piezoelectric, electrostatic or other suitable mechanisms known in the art, may be incorporated in the audio transducer embodiments described herein.

In some embodiments, the diaphragm structure may comprise a single diaphragm. In some embodiments, the diaphragm structure may comprise multiple diaphragms including multiple diaphragm bodies extending from a central base region. The multiple diaphragms may be coupled and concurrently moveable during operation.

The diaphragm structure is moveably coupled relative to the base via a diaphragm suspension. In the rotational action audio transducer embodiments, the diaphragm rotatably oscillates relative to the base. In rotational action audio transducers, the diaphragm suspension comprises a hinge configured to rotatably couple the diaphragm structure to the base. In some embodiments, the diaphragm suspension may enable linear movement of the diaphragm structure relative to the base.

The audio transducer may be accommodated with a housing or surround to form an audio transducer assembly, which may also form an audio device or part of an audio device, such as part of an earphone or headphone device which may comprise multiple audio transducer assemblies for example. In some embodiments, the transducer base structure may form part of the housing or surround of an audio transducer assembly. The audio transducer, or at least the diaphragm structure, is mounted to the housing or surround via a decoupling mounting system. A type of mounting system that is configured to decouple the audio transducer from the housing or surround to at least mitigate transmission of mechanical vibrations from the audio transducer to the housing (and vice versa) due to unwanted resonances during operation, as described in PCT/IB2016/055472, may be utilised in any one of the embodiments of this invention.

Although various structures, assemblies, mechanisms, devices or systems described under these sections are described in association with some of the audio transducer embodiments of this invention, it will be appreciated that these structures, assemblies, mechanisms, devices or systems may alternatively be incorporated in any other suitable audio transducer assemblies without departing from the scope of the invention. Furthermore, the audio transducer embodiments of the invention incorporate certain combinations of one or more of various features, structures, assemblies, mechanisms, devices or systems which may be incorporated in other combinations for alternative embodiments Methods of construction of audio transducers, audio devices or any of the various structures, assemblies, mechanisms, devices or systems are described herein for some but not all embodiments for the sake of conciseness. The application of such methods to other embodiments are not intended to be excluded from the scope of this invention. The invention is also intended to cover methods of transducing audio signals using the principles of operation and/or audio transducer features described herein.

Embodiments or configurations of audio transducers or related structures, mechanisms, devices, assemblies or systems of the invention are described in this specification with reference to electroacoustic transducers, such as loudspeaker drivers. Unless otherwise stated, the audio transducers or related structures, mechanisms, devices, assemblies or systems herein described may otherwise be implemented as or in an acoustoelectric transducer, such as a microphone. As such, the term audio transducer as used in this specification, and unless otherwise stated, is intended to include both electroacoustic (e.g. loudspeaker) and acoustoelectric (e.g. microphone) implementations.

1. First Audio Transducer Embodiment

Referring to FIGS. 1A-1F, a first embodiment of a rotational action audio transducer 100 of the invention is shown comprising a diaphragm A101 that is rotatably coupled to a transducer base structure A102 via a substantially flexible diaphragm suspension. The diaphragm A101 is a single body structure but may alternatively comprise a multiple diaphragm body structure in some embodiments. The diaphragm A101 is operatively coupled to a transducing mechanism configured to transduce electrical audio signals into rotational motion of the diaphragm A101. In this embodiment, the transducing mechanism is an electromagnetic mechanism comprising conductive coil A106 and a magnet A205. Unless specified, the term magnet may mean one or more permanent magnets or one or more direct current electromagnets, or any combination thereof. In this embodiment, the magnet is a permanent magnet A205. Unless specified, the term "conductive coil" or "coil" as used herein may comprise to a single or multiple coil windings. In this embodiment, the conductive coil A106 is coupled to base structure A102 and the magnet A205 is coupled to the diaphragm A101. In alternative configurations this may be the other way around.

The diaphragm suspension flexibly and rotatably mounts the diaphragm A101 relative to the transducer base structure A102. The diaphragm suspension comprises one or more flexible hinge mount(s) A107*a,b* that are configured to enable rotation of the diaphragm A101, via flexure of the mount, relative to the transducer base structure A102 about a primary axis of rotation A103. The flexible mount(s) A107*a,b* are flexible in terms of rotational motion about one or more orthogonal axes and/or in terms of translational motion along one or more orthogonal axes. This results in a compliant diaphragm suspension that enables movement of the diaphragm relative to the transducer base structure in directions other than the primary axis of rotation A103. The degree of compliance may differ depending on the direction of forces applied. It is preferred that the diaphragm suspension is compliant in translation as well as rotation. It is preferred the diaphragm suspension system is substantially compliant in terms of translations along one or more axes that are:

- substantially perpendicular to a major, radiating face A212*a*/A212*b* and/or coronal plane A211 of the diaphragm A101;
- substantially parallel to a major face(s) A212*a*/A212*b* and/or coronal plane A211 of the diaphragm A101 and substantially perpendicular to the primary axis of rotation A103; and/or
- substantially parallel to the primary axis of rotation A103.

The diaphragm suspension may be compliant along any combination of one or more of the above-mentioned axes, more preferably any combination of two or more and most preferably all three. The diaphragm suspension is preferably compliant in terms of rotation about the primary axis of rotation A103, and one orthogonal axis, and more preferably two other orthogonal axes. The diaphragm suspension may also comprise stoppers or other limiters for limiting displacement of the diaphragm relative to the transducer base structure in one or more directions. It is preferred that the flexible hinge mount(s) provide primary compliance for rotation of the diaphragm during operation. The diaphragm suspension also provides the primary resistances to motion/displacement of the diaphragm relative to the transducer base structure in the abovementioned directions in normal use (besides the abovementioned stoppers or limiters which inhibit, rather than resist further movement).

In some cases, if there are resonance modes of the diaphragm associated with translational compliance at the hinge, it is the compliance of the diaphragm suspension that primarily affects the frequency of such modes, whereas other elements such as stoppers, torsion bars and the like may not significantly affect such frequencies. In this application hinge translational compliance in directions perpendicular to a coronal plane of the diaphragm is of interest in some instances, since such resonances may generate a significant amount of sound due to the fact that a large diaphragm area may move in a direction that couples air.

In this embodiment, the suspension system comprises a pair of substantially flexible mounts A107*a* and A107*b* on either side of the diaphragm A101. The flexible mounts are preferably coupled to opposing outer sides of the diaphragm A101 along the primary axis A103 and on either side of the diaphragm's sagittal plane A201. The flexible mounts A107*a* and A107*b* are preferably formed from a substantially flexible and resilient material.

Each mount A107*a*, A107*b* is preferably formed from a substantially soft material. Each substantially soft hinge mount A107*a*, A107*b* is preferably substantially compliant in translation such that the hinge mount may deform substantially linearly along at least one axis, preferably along at least two orthogonal axes and most preferably along three orthogonal axes. In this embodiment an elastomer or a soft plastics material may be used for example.

Each hinge mount A107*a*, A107*b* is preferably formed from a material that provides damping (herein referred to as "damped material" or "damped hinge mount") in terms of translational displacement along at least one axis, more preferably along at least two orthogonal axes and most preferably along at least three orthogonal axes. In this embodiment an elastomer or a soft plastics material may be used for example.

In this specification, in the context of a hinge or hinge mount for an audio transducer diaphragm or diaphragm structure, the terms "soft" and "flexible" in terms of the material used is intended to mean a material or materials having an overall Young's Modulus of lower than approximately 8 Gigapascals (GPa), or less than approximately 4 GPa, or less than approximately 2 GPa, or less than 1.5 GPa, or less than 1 GPa, or less than 0.1 GPa.

In general such Young's modulus values are sufficiently low that an approach of pushing resonance modes associated with hinge compliance up in frequency to outside of the operating bandwidth may not be possible, and the design approach becomes one of either managing such resonances within the operating bandwidth or else taking the opposite approach of shifting them down in frequency to below the operating bandwidth.

These values are also sufficiently low that the material may be well-damped, which may also be advantageous for managing resonances associated with hinge compliance. Each hinge mount A107*a*, A107*b* is preferably formed from a material that is sufficiently damped such that it has a material loss coefficient, at 30 degrees Celsius and 100 Hertz operating frequency that is greater than 0.005, or greater than approximately 0.01 or greater than approximately 0.02 or greater than approximately 0.05.

In this embodiment each mount A107*a*, A107*b* may comprise a main body or bodies formed from a thermoset urethane elastomer, such as one having Shore A hardness of between 50 and 70. Such material may comprise a Young's modulus of between approximately 6 MPa and approximately 100 MPa, for example. In some embodiments, each mount may be formed from a Silicone rubber or a Nitrile rubber. Preferably each mount is primarily formed from a material having a combination of one or more of the following properties: an ability to be attached to supports such as via adhesive or over-moulding, resistance to long-term creep under loads such as gravity and/or magnetic attraction, ability to withstand sufficient deformation over sufficient cycles and temperature range in-use, and sufficient resistance to change in properties such as stiffness and damping over time or with variation in temperature. Each mount A107*a*, A107*b* preferably exhibits all abovementioned properties. Each mount A107*a*, A107*b* may be formed from a moulding process, such as injection moulding.

In some embodiments, each hinge mount A107*a*, A107*b* has a sufficiently low Young's Modulus such that a fundamental diaphragm resonance frequency is less than approximately Hertz, or less than approximately 70 Hertz, or less than approximately 50 Hertz.

The diaphragm A101 consists of a substantially rigid construction, as described in WO 2017/046716, for example. Similarly, the transducer base structure is substantially rigid and comprises a relatively squat geometry, as described in WO 2017/046716 for example.

The diaphragm suspension comprising flexible hinge mounts A107*a* and A107*b* forms a hinge, enabling the diaphragm A101 to rotatably oscillate relative to the transducer base structure A102 about an axis of rotation A103. The location of the mounts A107*a* and A107*b* is chosen, such that the axis of rotation A103 coincides with a node axis A104 of the diaphragm A101. The node axis A104 may be predetermined or may be determined during manufacture/installation of the device. The diaphragm node axis A104 is primarily dependent on the mass distribution of the diaphragm A101 and the force vector(s) experienced by the diaphragm from the transducing mechanism during operation. As will be described in further detail below, the diaphragm node axis A104 is the primary axis about which the diaphragm A101 would rotate if it was effectively substantially unsupported and subject to the same forces as applied by the transducing mechanism A106/A205.

In this embodiment, the transducing mechanism is designed such that the node axis A104 of the diaphragm A101 is substantially coaxial with a centre of mass axis (also A104 in this embodiment) of the diaphragm A101. In particular, in this embodiment the transducing mechanism is configured to apply a substantially pure torque with approximately zero translational force vector(s) applied to the diaphragm A101, during operation. In this manner, and as will be described in further detail below, this locates the diaphragm's node axis A104 at or substantially proximal to the centre of mass axis A104 of the diaphragm A101. Furthermore, in this embodiment the diaphragm A101 is designed such that the centre of mass axis A104 is located proximal to one end of the diaphragm A101.

Each hinge mount A107*a*, A107*b* of the diaphragm suspension provides a primary hinge support to the diaphragm for rotatably coupling the diaphragm to the transducer base structure. A primary hinge support may mean a hinge that contributes significantly to rigidity of support in a direction perpendicular to the axis of rotation and perpendicular to a coronal plane of a diaphragm, such that if translational compliance of the diaphragm suspension is altered in this direction there is a corresponding and significant change in frequency of one or more key resonance modes involving translation of the diaphragm proximal to said hinge support.

Referring to FIGS. 3A-3H, in some configurations the audio transducer A100 may be accommodated within a speaker enclosure A301/A302, and is preferably decoupled from the speaker enclosure A301/A302 via a decoupling mounting system as described in Section 4 of PCT publication WO 2017/046716, for example. The enclosure A301/A302 preferably comprises a ferromagnetic mesh shielding A308 for substantially inhibiting magnetic interaction between the audio transducer A100 and other foreign bodies external to the speaker.

Various preferred and alternative features of the audio transducer A100 and related speaker system will now be described in further detail.

Transducer Base Structure

Referring back to FIGS. 1A-1F, the transducer base structure A102 comprises a main body A110 and the conductive coil A106 of the transducing mechanism. The conductive coil A106 is rigidly coupled to the main body A110, preferably at one end of the body. The transducer base structure A102 further comprises a pair of decoupling pins A111*a*, A111*b* of the decoupling mounting system, and a pair of diaphragm suspension blocks A109*a*, A109*b* configured to cooperate with the flexible mounts A107*a*, A107*b* and pins A108*a*, A108*b* of the diaphragm suspension system, respectively. The main body A110 is has cooling fins A110*a* to help cool the conductive coil A106 and increase power handling. The main body A110 also has internal ribs A110*b* that provide rigidity.

The base structure A102 is relatively squat, is formed from relatively high specific modulus materials (more than approximately 30 GPa, for example), and so has internal resonance modes that are high in frequency, preferably outside listener's hearing range and/or the transducer's intended frequency range of operation.

The main body A110 has an aperture A110*c* at each side for receiving and fixedly accommodating driver decoupling pins A111 of the decoupling mounting system. The decoupling pins A111 may be fixed to the main body via adhesive or other suitable mechanism. The apertures A110*c* on either side of the main body A110 are preferably substantially coaxial with a node axis of the transducer A105 (hereinafter referred to as: transducer node axis A105). This helps provide an effective decoupling of the audio transducer A100 relative to the housing A301/A302, as described in WO 2017/046716 with respect to embodiment A, for example.

Figure 1D:
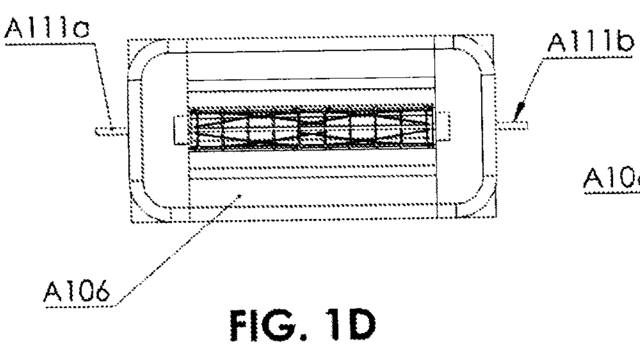
Figure 1E:
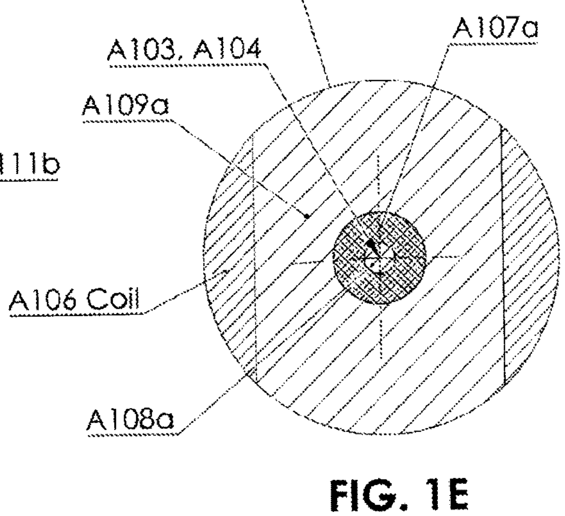
Figure 1F:
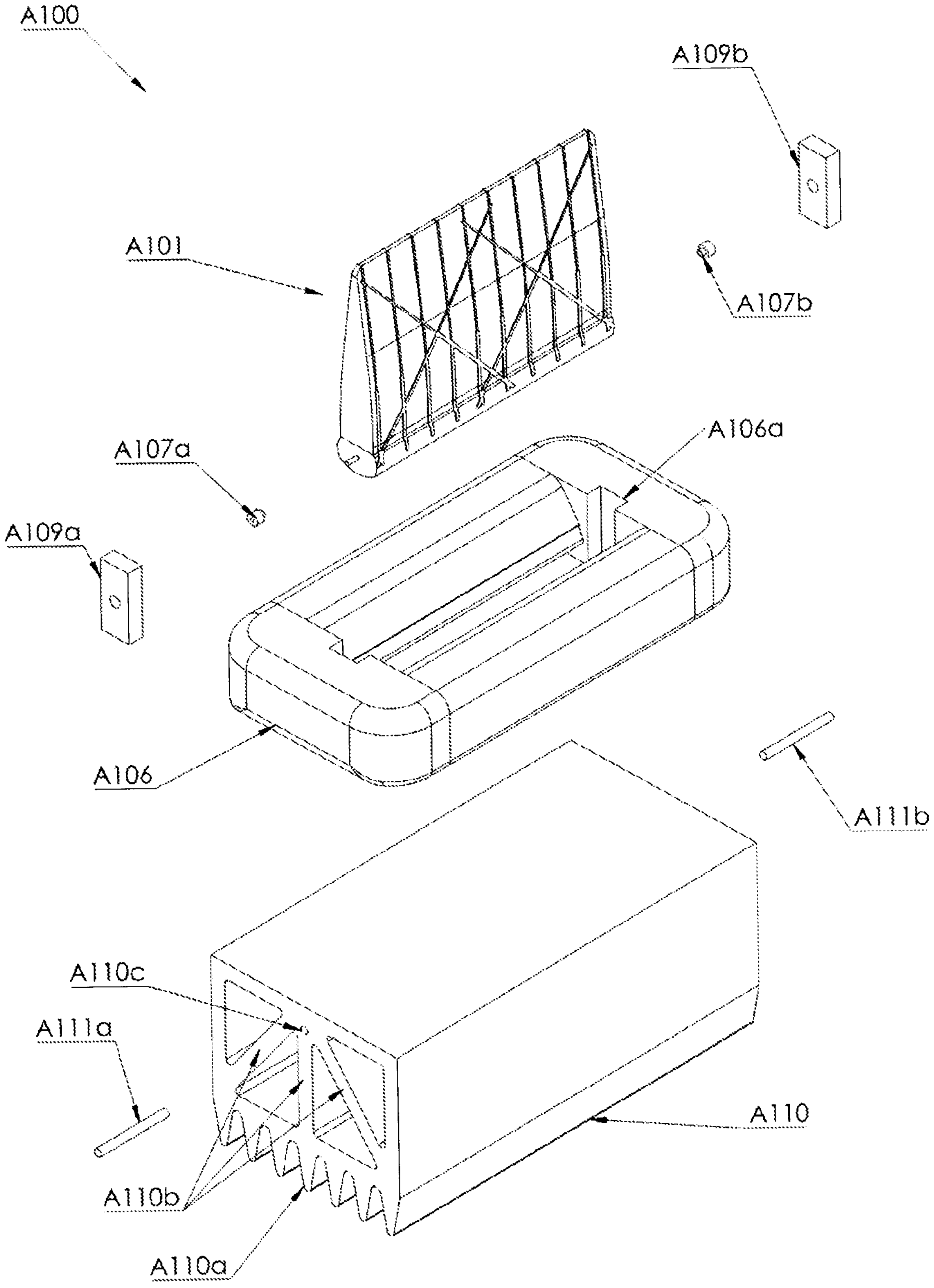

The conductive coil A106 is rigidly coupled to the transducer base structure body and may be wound using enamel coated copper wire, in an approximate rectangular shape (for example in a clockwise direction, looking at FIG. 1D).

The coil A106 comprises recesses A106*a*, A106*b* on the inner periphery of the opposing short sides for fixedly accommodating mounting blocks A109*a*, A109*b* of the diaphragm suspension system respectively.

The transducer base structure of this embodiment, may alternatively be replaced by the transducer base structure of any one of the other embodiments herein described.

Diaphragm Structure

Referring to FIGS. 2A-2F, in this embodiment the diaphragm A101 comprises a structure including a main diaphragm body A207 and a magnet A205 of the transducing mechanism connected to one end of the body A207, at a base region A101*a* of the diaphragm A101. A pair of diaphragm mounting pins A108*a* and A108*b* of the diaphragm suspension extend laterally from either side the magnet A205. The diaphragm A101 is a rigid diaphragm construction and consists of magnet A205, pins A108, a plurality of body parts A208*a*-A208*k*, inner reinforcement members A209*a*-A209*j* between each adjacent pair of body parts A208*a*-A208*k*, and outer reinforcement A206*a*, A206*b* extending on or adjacent each major face A212*a*, A212*b* of the diaphragm body A207. The diaphragm body parts A208*a-k*, inner reinforcement members A209*a*-209*j* and outer reinforcement members A206*a*, A206*b* are substantially rigid and formed in accordance with the rigid diaphragm construction principles described in WO 2017/046716, for example.

The diaphragm body A207 may comprise an interconnected structure that varies in three-dimensions. The body A207 may comprise a substantially low density matrix, and may be formed from expanded polystyrene foam body parts A208*a*-A208*k*, for example.

The inner reinforcement members A209*a*-A209*j* may be substantially thin, formed from aluminium foil and laminated between the body parts A208*a*-A208*k*. The outer reinforcement members A206*a*, A206*b* may comprise a plurality of struts made from carbon fibre or other suitably rigid material, most preferably of a Young's modulus of greater than approximately GPa. The outer reinforcements may be sandwiched onto the two outside major, radiating faces A212*a*, A212*b* of the diaphragm body A207.

The diaphragm body A207 comprise a maximum thickness that is greater than 12%, or more preferably greater than 15% of a length of the diaphragm body A207. The diaphragm body A207 may comprise a maximum thickness that is greater than 20% of a length of the diaphragm body in some embodiments. The diaphragm body A207 may alternatively or additional comprise a maximum thickness that is greater than 9% or greater than 11% of a greatest dimension, such as a diagonal length, of the diaphragm body A207. The diaphragm body may comprise a maximum thickness that is greater than 14% of a maximum dimension, such as a diagonal length, of the diaphragm body A207 in some embodiments.

The diaphragm A101 may comprise a length from an axis of rotation to an opposing terminal end that is less than approximately 6 times greater than a width of the diaphragm or diaphragm structure, or less than 4 times greater than the width, or less than three times greater than the width in the axis direction.

The diaphragm A101 comprises a varying mass along a length of the diaphragm A101. The diaphragm A101 comprises a relatively lower mass, per unit area, in regions of the diaphragm that are distal from a centre of mass A104 of the diaphragm A101 relative to regions that are proximal to the centre of mass A104. In this embodiment, the diaphragm A101 also comprises a lower mass, per unit area, in regions of the diaphragm that are distal from an axis of rotation A103 of the diaphragm relative to regions that are proximal to the axis of rotation A103. The diaphragm also comprises a relatively lower mass, per unit area, in regions proximal one end of the diaphragm relative to regions proximal an opposing end.

In this embodiment, the diaphragm body A207 consists of a profile of varying thickness along the length of the diaphragm. As shown in FIG. 2C, the diaphragm body A207 consists of a relatively greater thickness in a first region A114*a*, at or near the base region, relative to a thickness at a second region A114*b* that is distal from the base region. The thickness at the second region is preferably substantially tapered such that it reduces away from the base region. The thickness at the first region A114*a* is substantially constant or tapers with a substantially lower gradient(s) than the gradient(s) or taper of the second region A114*b*. The overall major face profiles may be linear and/or substantially curved. In this embodiment the profiles are substantially curved. The major face profile is generally convex, along the length of the face. In other words, the major face profile is generally convex along a sagittal cross-section of the diaphragm body A207.

In this embodiment, the normal stress reinforcement A206*a*, A206*b* comprises a relatively lower mass, per unit area, in regions of the diaphragm that are distal from a centre of mass A104 of the diaphragm A101 relative to regions that are proximal to the centre of mass A104. In some embodiments, a region of relatively lower normal stress reinforcement mass may comprise recesses or may be devoid of normal stress reinforcement. In this embodiments, regions of relatively lower normal stress reinforcement mass comprise normal stress reinforcement of reduced or reducing thickness, or reduced or reducing width, or both.

The region of relatively higher normal stress reinforcement mass and/or higher diaphragm mass, comprises approximately 30-70% of a surface area of the major face, and the region of relatively lower normal stress reinforcement mass and/or lower diaphragm mass, comprises approximately 70-30% of a surface area of the major face.

In some embodiments, a region of relatively lower normal stress reinforcement mass and/or lower diaphragm mass may be located within approximately 20% of a length of the diaphragm from an end of the diaphragm that is distal to the centre of mass or that is distal to the axis of rotation, in the case of a rotating diaphragm.

In this embodiment, the diaphragm A101 is substantially symmetrical about a sagittal plane of the diaphragm. The diaphragm structure including the diaphragm body A207 and the magnet A205 of the transducing mechanism, is substantially symmetrical about the sagittal plane of the diaphragm A101.

In some embodiments it is preferred that the diaphragm A101 does not comprise a position sensor or other unnecessary weighted elements that may exacerbate resonance issues or otherwise adversely affect operation.

The diaphragm A101 of this transducer embodiment, may alternatively be replaced by a diaphragm of any one of the other embodiments herein described. Similarly, the diaphragm A101 may be used in any one of the audio transducer embodiments herein described.

Transducing Mechanism

The transducing mechanism in this embodiment comprises an electromagnetic mechanism including a coil that is operatively coupled to a magnet. It is preferred that the transducing mechanism is substantially non-commutated.

In each one of the embodiments herein described, the transducing mechanism generally comprises a diaphragm-side transducing component. In this case it is magnet A205. In this specification, the phrase "diaphragm-side transducing component" is intended to mean a part of the transducing mechanism that is coupled to a diaphragm or diaphragm structure that is responsible for converting between electrical and mechanical energy, or vice versa. For example, this may be the coil or the magnet of an electromagnetic mechanism, or it may be a part, section or component of a piezoelectric mechanism.

The transducing mechanism generally also comprises a base-structure-side transducing component. In this case it is coil A106. In this specification, the phrase "base=structure-side transducing component" is intended to mean a part of the transducing mechanism that is coupled to a transducer base structure that is configured to remain substantially stationary relative to the diaphragm during operation. For example, this may be a stationary coil or magnet of an electromagnetic mechanism, or it may be a stationary part, section or component of a piezoelectric mechanism.

In this embodiment, the diaphragm-side transducing component A205 is directly coupled to the diaphragm A101, and is preferably rigidly coupled to the diaphragm A101. The magnet A205 is integrated into the diaphragm A101 such that it is one structure. The magnet A205 comprises an external surface configured to couple a corresponding surface of the diaphragm body A207. The external surface and the corresponding surface are complementary. The external surface is substantially planar and the corresponding diaphragm surface is substantially planar in this embodiment. However, other profiles are possible.

In some embodiments, the diaphragm-side transducing component may be indirectly coupled to the diaphragm or diaphragm structure via one or more intermediary components. The one or more intermediary components are preferably substantially rigid, and may comprise a Young's Modulus of at least approximately 8 GPa, or at least approximately 20 GPa, for example. In some embodiments, the diaphragm or diaphragm structure may be rigidly coupled to the transducing mechanism via one or more substantially planar parts or components. In the case where the diaphragm is coupled to the diaphragm-side transducing component via one or more intermediary components, in some embodiments the components may be sufficiently straight and/or well-supported and/or sufficiently thick such that bending deformation of the rigid component or components is minimal.

Figure 2A:
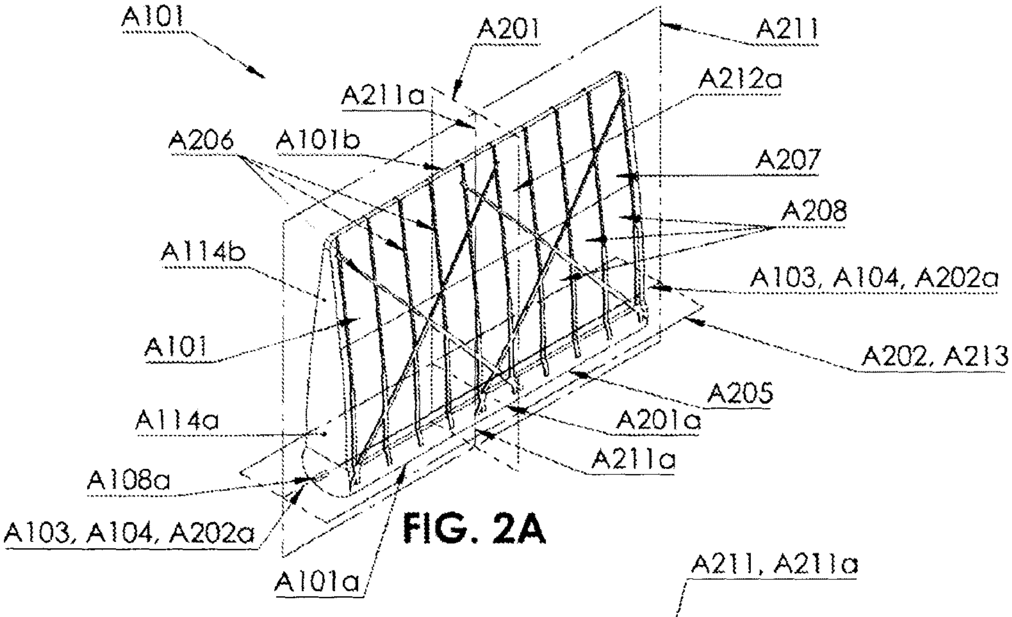
Figure 2B:
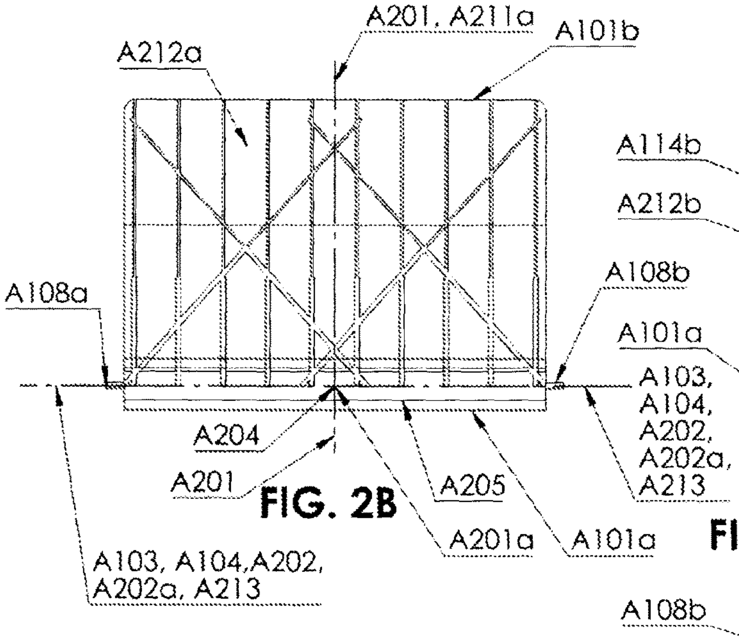
Figure 2C:
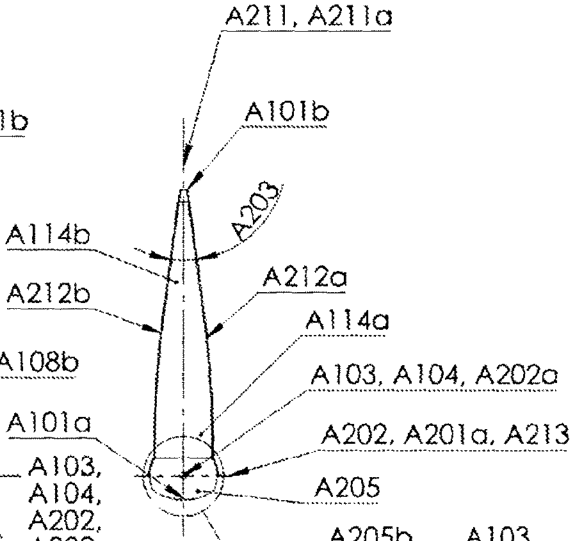
Figure 2D:
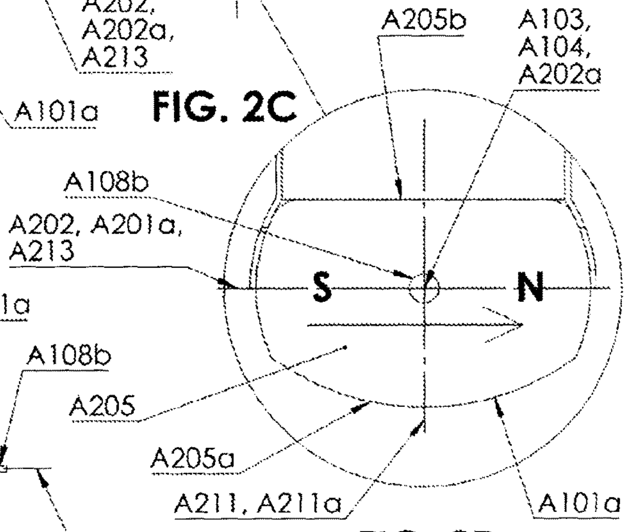
Figure 2E:
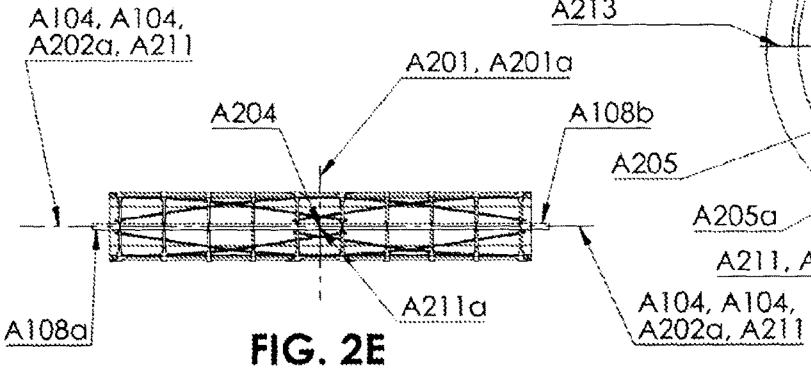

Referring to FIGS. 2A, 2C and 2D, the magnet A205 is magnetised in a direction perpendicular to the coronal plane A211 of the diaphragm A101. The magnetic poles of the magnet are located on opposing sides of the axis of rotation A103 to achieve this. In some embodiments, the magnet poles may be arranged such that the primary internal magnetic field is angled relative to the axis of rotation A103 and/or angled relative to the coronal plane A211. The magnet comprises a substantially non-alternating magnetic field. The magnet is preferably a permanent magnet, such as a N52 grade Neodymium (NdFeB) magnet, or another strong permanent magnet type. Alternatively, the magnet may be an electromagnet. The electromagnet is preferably be a direct current electromagnet. It is preferred that the magnet is not an armature. The magnet A205 may exhibit high magnetic strength, sufficient physical strength and toughness in order to survive impact scenarios as may occur over the life of the transducer and/or comparatively low density for a magnet. Other grades of magnet that provide improved resistance to elevated temperature may be used also, depending on the power handling and other operating requirements.

The magnet A205 is located at or proximal to the axis of rotation A103 of the diaphragm A101. The magnet A205 is located at or proximal to either side of the axis of rotation A103 of the diaphragm, with respect to a sagittal plane A201 of the diaphragm A101. The magnet A205 couples along an axis that is substantially parallel to the axis of rotation A103 or the centre of mass axis A104. The magnet A205 extends along the axis of rotation A103 and in this embodiment, the axis of rotation A103 extends through the magnet A205. In some variations, the magnet A205 may be located proximal to the axis of rotation but is substantially exclusively proximal to the axis of rotation A103 such that no other part or component of the diaphragm-side transducing mechanism is non-proximal to the axis. For example, the magnet A205 may be located at a distance from the axis of rotation A103 that is within 50% of a length of the diaphragm A101, or the magnet A205 may be located at a distance from the axis of rotation that is within 40% of a length of the diaphragm, or most preferably the magnet A205 may be located at a distance from the axis of rotation that is within 30% of a length of the diaphragm. In some embodiments, the magnet A205 may be located at a distance from the axis of rotation that is within 20% of a maximum length dimension of the diaphragm, such as a diagonal length dimension, or the magnet A205 may be located at a distance from the axis of rotation that is within 15% of a maximum length dimension or most preferably the magnet A205 may be located at a distance from the axis of rotation that is within 10% of a maximum length dimension.

The magnet A205 does not extend beyond a maximum width of the diaphragm A101 or diaphragm body A207. In some embodiments, the magnet A205 may extend beyond the width but preferably by more than approximately 20%, or more than approximately 15%, or most preferably more than approximately 10% of the width dimension along the axis of rotation A103. The maximum width dimension in this case may be substantially parallel to the axis of rotation A103.

In this embodiment, the magnet A205 is coupled to an end of the diaphragm A101 and extends longitudinally along the end between opposing sides of the diaphragm. As the magnet A205 has high specific modulus and a reasonably rigid geometry, it provides a suitably low-resonance foundation upon which the relatively lightweight diaphragm body A207 is supported resulting in a comparatively large diaphragm A101 having breakup modes occurring at relatively high frequencies. Rotational inertia is manageable due to the fact that the magnet's mass is concentrated close to the axis of rotation A103. The magnet A205 is shaped to have a slightly higher mass on the side A205*a* distal from the diaphragm body A207 relative to a mass on the side A205*b* directly adjacent the diaphragm body A207. This is achieved via convex shaping of the outer periphery of the magnet A205 on the distal side. This mass profile of the magnet A205 is predetermined to locate the centre of mass axis A104 in a desired location, preferably closer to the terminal end A101*a* of the diaphragm. The magnet is symmetrical across a plane that is substantially perpendicular to the axis of rotation or substantially perpendicular to a longitudinal axis of the diaphragm.

The magnet A205 is configured to cooperate with the coil A106 rigidly coupled to the transducer base structure A102 to exert or transfer a substantially pure mechanical torque on or from the diaphragm A101. The coil A106 may comprise a single winding that extends about the periphery of the magnet A205. In this embodiment, the coil A106 is not in intimate contact with any ferromagnetic core or other ferromagnetic component.

In use, an audio signal (from an amplifier) may be applied to the conductive coil, which consequently applies a positive and negative torque on the magnet, rotating the diaphragm about an axis of rotation A103. Preferably the conductive coil A106 extends substantially parallel to the axis of rotation A103 and along either side of the axis of rotation A103. Preferably the conductive coil A106 extends within a plane that is substantially transverse relative to a longitudinal axis A211*a* of the diaphragm A101.

Separating the coil A106 from the diaphragm A101 in this embodiment means the mass of the coil A106 may be increased without negatively affecting efficiency. An increase in mass often improves power handling of the device and may improve efficiency by facilitating increased wire turns for a given Direct Current (DC) coil resistance. However, increased turns may create a different efficiency limitation associated with coil inductance which may block current at high frequencies. To minimise this effect, the wire used in the conductive coil A106 preferably has a substantially large diameter for a given volume, to reduce the number of turns in the coil A106 and thereby reduce coil inductance resulting in a sound pressure response of the transducer A100 that has comparatively less drop off with increasing frequency. In this manner the DC resistance of the coil A106 may be reduced below the standard, approximately 3-7 Ohms range. The DC resistance of the coil A106 may be less than approximately 2.5 Ohms, or less than approximately 2 Ohms, or less than approximately 1.5 Ohm, or less than approximately 1 Ohm. In this embodiment the DC resistance of coil A106 may be approximately 0.6 Ohms, for example.

The magnet A205 and coil A106 are separated by an air fluids gap. The fluids gap is an air gap in this embodiment. Alternatively, ferromagnetic fluids or materials may be located between the coil and the magnet. The magnet may comprise a substantially curved surface adjacent the fluids gap. The coil A106 may also comprise a complementary curved surface adjacent the air fluid gap and magnet A205. The curved surfaces of the coil and magnet may be complementary. The magnet surface may be curved about the axis of rotation. The coil surface may also be curved about the axis of rotation.

The conductive coil A106 extends about the magnet A205, in situ. Preferably, a shortest distance between the magnet A205 and the conductive coil A106 is lower than approximately 1.5 mm, or lower than approximately 1 mm, or lower than approximately 0.5 mm. Preferably the conductive coil A106 is symmetric across opposing sides of the magnet A205.

The transducing mechanism of this embodiment may alternatively be replaced with the transducing mechanism of any one of the other embodiments or variations herein described.

Magnet is Sufficiently Distant from Other Ferromagnetic Components

In embodiments of this invention, the audio transducer may comprise ferromagnetic component(s) other than those of the transducing mechanism, or other than those which may be rigidly coupled to the magnet as part of a magnetic assembly (i.e. magnet poles) or that may be rigidly coupled to magnet or magnetic assembly to couple the magnetic assembly to the diaphragm or transducer base structure. Such other ferromagnetic component(s) may have a substantially strong ferromagnetic property. A substantially strong ferromagnetic property in this context may mean having a maximum relative magnetic permeability in-situ (with diaphragm-at-rest) of more than approximately 300 $m\mu_r$, or more than approximately 500 $m\mu_r$, or more than approximately 1000 $m\mu_r$.

The inclusion of such components in an audio transducer means there is an attraction force on the magnet exerted by such component(s), if they are not located substantially distal from the magnet or magnet assembly. In the case of this embodiment, where the magnet is coupled to the substantially compliant diaphragm suspension, this could cause the suspension to lose its integrity over time. In other embodiments plastic housings and mounts may also be susceptible to creep deformation when subjected to long-term loads due to magnetic attraction forces.

For this reason, this embodiment and other embodiments of the invention are preferably configured such that such other ferromagnetic component(s) are located substantially distal from the magnet or magnetic structure so that there is only a relatively small pull force on the magnet, or in the case where multiple component(s) act on the magnet in multiple directions, there is a net force on the magnet that is negligible or close to zero.

For example, in some embodiments, the other ferromagnetic component(s) may comprise one or more relatively large or major surface(s) facing towards the magnet or magnetic structure or assembly. Such surface(s) will typically exert a significant force on the magnet if they are located proximal to the magnet. It is preferred that such faces are substantially distal from a nearest or relatively large or major surface of the magnet, to mitigate or significantly minimise or mitigate a pull force from the other ferromagnetic component(s) on the magnet or magnetic structure or assembly.

The following are examples of "substantially distal" in this context.

The nearest or relatively large or major surface(s) of the magnet or magnetic structure or assembly is may be separated from the relatively large or major surface(s) of the other ferromagnetic component(s) by a minimum or average distance of at least approximately 0.4 times a maximum distance between opposing poles of the magnet assembly or magnetic structure or assembly. The nearest or relatively large or major surface(s) of the magnet or magnetic structure or assembly may be separated from the relatively large or major surface(s) of the other ferromagnetic component(s) by a distance of at least approximately 0.6 times a maximum distance between opposing poles of the magnet or magnetic structure or assembly. The nearest or relatively large or major surface(s) of the magnet or magnetic structure or assembly may be separated from the relatively large or major surface(s) of the other ferromagnetic component(s) by a distance that is approximately the same as a distance between opposing poles of the magnet or magnetic structure or assembly.

The nearest or relatively large or major surface(s) of the magnet or magnetic structure or assembly may be separated from the relatively large or major surface(s) of the other ferromagnetic component(s) by a distance, along an axis substantially perpendicular to the axis of rotation, of at least approximately 0.4 times a maximum distance between opposing poles of the magnet or magnetic structure or assembly. The nearest or relatively large or major surface(s) of the magnet or magnetic structure or assembly may be separated from the relatively large or major surface(s) of the other ferromagnetic component(s) by a distance, along an axis substantially perpendicular to the axis of rotation, of at least approximately 0.6 times a maximum distance between opposing poles of the magnet or magnetic structure or assembly. The nearest or relatively large or major surface(s) of the magnet or magnetic structure or assembly may be separated from the relatively large or major surface(s) of the other ferromagnetic component(s) by a distance, along an axis substantially perpendicular to the axis of rotation, that is approximately the same as a distance between opposing poles of the magnet or magnetic structure or assembly.

The nearest or relatively large or major surface(s) of the magnet or magnetic structure or assembly may be separated from the relatively large or major surface(s) of the other ferromagnetic component(s) by a distance of at least approximately 0.4 times a maximum dimension of the magnet along an axis that is substantially perpendicular to the axis of rotation. The nearest or relatively large or major surface(s) of the magnet or magnetic structure or assembly may be separated from the relatively large or major surface(s) of the other ferromagnetic component(s) by a distance of at least approximately 0.6 times a maximum dimension of the magnet along an axis that is substantially perpendicular to the axis of rotation. The nearest or relatively large or major surface(s) of the magnet or magnetic structure or assembly may be separated from the relatively large or major surface(s) of the other ferromagnetic component(s) by a distance that is approximately the same as a maximum dimension of the magnet along an axis that is substantially perpendicular to the axis of rotation.

The nearest or relatively large or major surface(s) of the magnet or magnetic structure or assembly may be separated from the relatively large or major surface(s) of the other ferromagnetic component(s) by a distance of at least approximately 0.4 times a maximum length of the magnet. The nearest or relatively large or major surface(s) of the magnet or magnetic structure or assembly may be separated from the relatively large or major surface(s) of the other ferromagnetic component(s) by a distance of at least approximately 0.6 times a maximum length of the magnet. The nearest or relatively large or major surface(s) of the magnet or magnetic structure or assembly may be separated from the relatively large or major surface(s) of the other ferromagnetic component(s) by a distance that is approximately the same as a maximum length of the magnet.

The nearest or relatively large or major surface(s) of the magnet or magnetic structure or assembly may be separated from the relatively large or major surface(s) of the other ferromagnetic component(s) by a distance of at least approximately 0.4 times a maximum length of the magnet. The nearest or relatively large or major surface(s) of the magnet or magnetic structure or assembly may be separated from the relatively large or major surface(s) of the other ferromagnetic component(s) by a distance of at least approximately 0.6 times a maximum length of the magnet. The nearest or relatively large or major surface(s) of the magnet or magnetic structure or assembly may be separated from the relatively large or major surface(s) of the other ferromagnetic component(s) by a distance that is approximately the same as a maximum length of the magnet.

The nearest or relatively large surface of the magnet assembly is separated, in some direction perpendicular to the axis, from the relatively large surface of the other ferromagnetic component(s) by a distance of at least approximately 0.4 times a maximum dimension of the magnet in a direction parallel to said surface in locality of said surface. The nearest or relatively large surface of the magnet assembly is separated, in some direction perpendicular to the axis, from the relatively large surface of the other ferromagnetic component(s) by a distance of approximately 0.6 times a maximum dimension of the magnet in a direction parallel to said surface in locality of said surface. The nearest or relatively large surface of the magnet assembly is separated, in some direction perpendicular to the axis, from the relatively large surface of the other ferromagnetic component(s) by a distance substantially similar to a maximum dimension of the magnet in a direction parallel to said surface in locality of said surface.

In some embodiments, the transducer does not comprise other ferromagnetic component(s) exerting a force on the magnet or magnetic structure or assembly that is greater than seventy times, more preferably greater than fifty times and most greater preferably forty times the force due to gravity acting on the magnet assembly.

In some embodiments, the transducer comprises other ferromagnetic component(s), facing towards the magnet or magnetic structure or assembly that attract the magnet or magnetic structure or assembly in different or opposing directions. In such embodiments, the net force on the magnet or magnetic structure or assembly due to the other ferromagnetic component(s) is negligible or approximately zero.

Diaphragm Suspension System

The diaphragm suspension enables rotation of the diaphragm about an axis of rotation to enable a range of angular motion of approximately 10 degrees on either side of the axis, or approximately 15 degrees on either side of the axis, or approximately 20 degrees on either side of the axis. In this embodiment, the diaphragm suspension comprises a plurality of hinge mounts A107*a*, A107*b*. In some embodiments, a single hinge mount may be used.

The hinge mounts A107*a*, A107*b* are located on outer sides of the diaphragm-side transducing component. In some embodiments, a pair of hinge mounts may be located on either side of a central sagittal plane of the diaphragm A101 that is substantially perpendicular to the axis of rotation A103 and wherein each hinge mount A107*a*, A107*b* is located a distance from the central sagittal plane that is at least 0.2 times of a maximum width of the diaphragm A101. Each hinge mount may be located a distance from the central sagittal plane that is less than approximately at least 0.47, 0.45, 0.42 times of a maximum width of the diaphragm A101, which may be particularly important in embodiments employing a rigid hinge design approach, since such positioning may locate hinges close to node locations for diaphragm base bending modes, resulting in improvement in corresponding resonance frequencies.

As both the diaphragm A101 and base structure A102 are comparatively rigid and connected to each other via a comparatively compliant diaphragm suspension system comprising the two diaphragm suspension bushes A107*a*, A107*b*, there may be six basic relatively low-frequency modes of vibration of the transducer resulting primarily from compliance of the diaphragm suspension system. These may include: three modes having a significant translational component, possibly along three substantially orthogonal axes, and three modes having a significant rotational component, possibly about three substantially orthogonal axes. The frequency of the rotational mode about a transverse axis A202*a*/A103 that is substantially orthogonal to the sagittal plane A201 of the diaphragm A101 is the primary excited mode of the transducer A100 (hereinafter referred to as: Primary Mode). The motion of the diaphragm in the Primary Mode can be thought of as being equivalent to the piston mode of a conventional linear cone driver. As the direction of primary flux of the magnet A205 is substantially perpendicular to the direction of the flux generated by the coil A106, the main torque generated on the magnet A205 is in the same direction as the Primary Mode. It is preferred that the audio transducer 100 operates substantially in a single-degree-of-freedom manner, whereby the Primary Mode is substantially the only source of audible sound (in an electro-acoustic configuration).

The other five modes may also be excited during operation. However, the design of transducer A100 is such that most of these modes do not result in a significant net movement of air cause substantially insignificant audible degradation to the quality of reproduced audio. For example, in this embodiment, two approximately translational modes involving the diaphragm A101 translating along a longitudinal axis A211*a* or the transverse axis A202*a*, and the approximately rotational mode about a sagittal axis A201*a* that is substantially orthogonal to a coronal plane A211 of the diaphragm A101, do not push enough air to cause a significant change to sound pressure, if they are excited. Furthermore in the case of this embodiment, by symmetry, these modes may not be strongly excited. An approximately rotational mode about the longitudinal axis A211*a* (orthogonal to a transverse plane A211 of the diaphragm A101) could create air displacement, however this is substantially mitigated by cancellation between positive and negative air pressure generated at the sides of the diaphragm on either side of the sagittal plane A201. In this embodiment, by symmetry, this mode may not be strongly excited. In some embodiments, excitation of a mode having a significant translational component, at least at parts of the diaphragm, in a direction substantially parallel to the sagittal axis of the diaphragm A101 (hereinafter referred to as: Mode A), may be minimised or substantially mitigated by location of diaphragm suspension mounts A017*a*, A107*b* at or near the diaphragm node axis A104. In some embodiments, Excitation of Mode A may be minimised by locating the primary axis of rotation A103 of the diaphragm in a plane A213 that is substantially perpendicular to a coronal plane A211 of the diaphragm A101 and that contains/intersects with the node axis A104 of the diaphragm A101. In some embodiments, the primary axis of rotation A103 and the diaphragm node axis A104 may substantially coaxial.

During operation, in a first operational mode where the transducer is operating at frequencies significantly below the resonance frequencies of the Primary Mode and the other five modes, the location of the axis of rotation A103 of the diaphragm A101 relative to the base structure A102 may be significantly influenced by the diaphragm suspension, as well as by the forces applied to the diaphragm A101 by the transducing mechanism. The first mode of operation is akin to the stiffness-controlled region of the transducer, with respect to all six diaphragm resonance modes facilitated primarily by diaphragm suspension compliance. In a second operational mode, where the transducer is operating at frequencies significantly above the resonance frequencies of the Primary Mode and the other five suspension compliance modes, the location of the axis of rotation of the diaphragm A101 relative to the transducer base structure A102 may be primarily defined by the location of the diaphragm node axis A104 and less significantly by the diaphragm suspension. The diaphragm node axis A104 is primarily defined by the forces applied to the diaphragm A101 by the transducing mechanism and by the mass distribution/profile of the diaphragm A101 (including magnet A205). In the second operation mode, the diaphragm node axis A104 may be relatively unaffected by the diaphragm suspension. The second operational mode is akin to the mass-controlled region of operation of the transducer, with respect to all six diaphragm resonance modes facilitated primarily by diaphragm suspension compliance.

The transducing mechanism may be configured such that the force applied to the diaphragm A101 during operation is a substantially pure torque. This causes the diaphragm node axis A104 to be substantially coaxial with the centre of mass A204. In this embodiment, the flexible mounts A107*a*, A107*b* of the diaphragm suspension are substantially coaxial with the diaphragm's centre of mass A204. In some embodiments, the overall effect of the diaphragm suspension on the diaphragm A101 is such that the axis of rotation A103 of the diaphragm A101 relative to the transducer base structure A102 is substantially coaxial with, or at least be located proximal to, the diaphragm's centre of mass A204, in the first operational mode.

In some configurations, the force applied by the transducing mechanism to diaphragm A101 during operation may not be a substantially pure torque. In such configurations, the diaphragm node axis A104 may not coincide with the diaphragm centre of mass A204 and the flexible mounts A107*a*, A107*b* of the diaphragm suspension system may be located substantially coaxially with the diaphragm node axis A104. In some embodiments, the overall effect of the diaphragm suspension on the diaphragm A101 is such that the axis of rotation A103 of the diaphragm A101 relative to the transducer base structure A102 is substantially coaxial with, or at least is located proximal to, the diaphragm node axis A104, in the first operational mode.

If the diaphragm node axis A104 is not located coaxial or close to the axis of rotation A103 in the first operational mode then the sound pressure frequency response of the transducer A100 may have a step at or around the frequency of the Mode A, as the axis of rotation translates from the first location A103 (defined by the diaphragm suspension system) to the second location (defined by the diaphragm node axis A104). There may also be an associated resonance peak and/or a dip. A performance advantage may be achieved by configuring the diaphragm A101 and transducing mechanism to have the diaphragm node axis A104 located to be substantially coaxial with the axis of rotation A103 of the first operational mode. This results in a flatter frequency response and improved sound quality at and around the frequency of resonance of Mode A. Configuring the transducing mechanism to provide substantially pure rotational torque on the diaphragm A101 will shift the node axis A104 to the location of the diaphragm centre of mass A204. The diaphragm A101 may then be formed such that the diaphragm centre of mass A204 is in the desired position for coupling the diaphragm suspension mounts A107*a*, A107*b*. In some embodiments the diaphragm suspension mounts are coupled close to one end A101*a* of a diaphragm body A207 to enhance performance of the transducer. As the majority of mass of the diaphragm A101 is in the magnet A205, a method for achieving a centre of mass near the end A101*a* is by shaping the magnet so that the side closest to the distal tip A101*b* of the diaphragm is cut away relative to the side that is at terminal end A101*a*. The surfaces of the magnet where the North and South poles are preferably convexly curved concentrically about the axis of rotation A103 (of at least the first operational mode) as this minimises the required air clearance to the coil.

Another performance advantage of locating the centre of mass of the diaphragm A204 such that it is substantially coaxial with the axis of rotation A103 of the first operational mode, is a minimisation of other adverse modes of vibration associated with diaphragm suspension compliance, resulting in a flatter frequency response and improved sound quality.

Figures 4A, 4B, 4C, 5A, 5B, 5C, 6A, 6B, 6C, 6D:
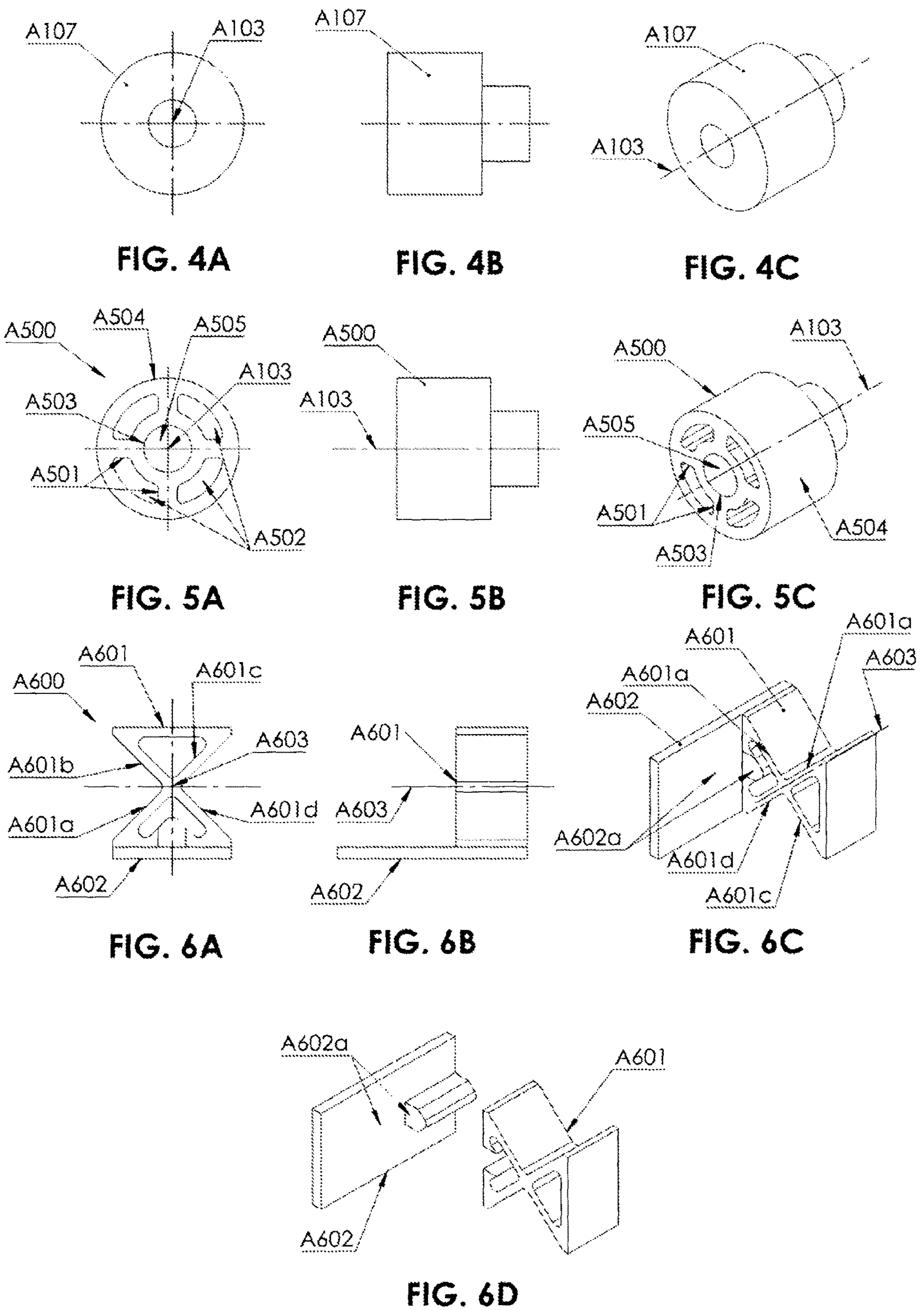

The pair of diaphragm suspension mounts A107*a*, A107*b*, shown in FIGS. 4A-C, may each comprise a substantially solid body with a central aperture for fixedly accommodating corresponding pin A108*a*, A108 therein. In some embodiments, each mount A107*a*, A107*b* may comprise one or more cavities containing a fluid, such as air, or containing a relatively lower density or relatively less-rigid material located therein. The material may be a foam comprising a plurality of air pockets, for example. In some embodiments, each mount A107*a*, A107*b* ma be formed from a urethane foam. In such configurations, a maximum excursion may be increased and/or a fundamental diaphragm resonance frequency may be reduced, without undue reduction in translational rigidity. A geometry of each hinge mount A107*a*, A107*b* may be able to be made relatively thicker and/or shorter. This may be utilised in very small, delicate speaker drivers, for example, where the hinge component is very small, and/or less delicate hinge features may be less-prone to internal resonance modes.

Referring to FIGS. 17A and 17B, in some embodiments, each hinge mount A107*a*, A107*b* may be replaced with hinge mount A700. Hinge mount A700 is formed from anisotropic material, such as an anisotropic foam. The flexible hinge mount anisotropy may be such that the mount comprises relatively greater resistance to translational deformation relative to resistance to rotational deformation. In other words, the flexible hinge mount A700 comprises a greater rotational compliance, particularly about the longitudinal axis A703 of the mount or the axis of rotation A103 of the diaphragm, relative to translational compliance. This may allow for a relatively low fundamental resonance frequency and translational rigidity to help alleviate or mitigate creep of material over time.

In some embodiments, a flexible hinge mount may be formed from a foamed material. The foam may comprise a plurality of cavities A701 extending longitudinally through the mount body A702. In some embodiments, the anisotropic material of mount A701 may have a relatively higher Young's modulus in a direction perpendicular to the coronal plane of the diaphragm A101 and/or in a direction that is substantially perpendicular to the longitudinal axis A703 of the mount A700, which may provide higher resistance against translational displacement relative to rotational compliance about the longitudinal axis A703. Inaccurate manufacturing, such as incorrect diaphragm mass, may be more likely to result in translation in a direction perpendicular to the coronal plane of the diaphragm, compared to other non-primary diaphragm resonance modes. Better restraint of the diaphragm in this direction may also permit smaller gaps between the magnet and coil windings, for improved efficiency.

The cavities A701 are substantially annular in this embodiment, such that compliance of the mount in terms of translation in along a first axis A704 that is substantially perpendicular to the longitudinal axis A703 of the mount, is substantially similar to the compliance of the mount in terms of translation along a second axis A705 that is substantially perpendicular to the longitudinal axis A703. Referring to FIGS. 18A and 18B, in some embodiments the cavities A701 may alternatively be substantially elliptical in cross-section such that compliance along the first axis A704 is different to compliance along the second axis A704. In this case, compliance along axis A704 is higher than along axis A705. The orientation and shape of the cavities may be altered to achieve a certain compliance profile along each axis A704, A705. The cavities A701 may extend along a substantial portion or entire length of the body A702.

In yet another example, the mounts A107*a* and A107*b* may be replaced by the mounts A800 of FIGS. 19A-19C. As shown, the mount comprises a single longitudinal body A801 extending between opposing annular, connection heads A802, A803. The longitudinal body A801 may comprise one or more exterior concave surfaces along A801*a*, A801*b* extending along the length of the body A801. The surfaces may be concave at in a transverse cross-section of the body A801. The surfaces A801*a* and A801*b* may be oriented at approximately 180 degrees relative to one another in this example. Other orientations are envisaged and there may be any number of one or more concave surfaces in some embodiments. The concave surfaces inwardly angled or curved toward a central region or axis of the mount, so that a central region may be relatively thinner than adjacent regions on either side. The heads A802 and A803 may be configured to rigidly couple the transducer base structure A102 and the diaphragm A101 respectively. In some embodiments one such mount may be attached at each end of a diaphragm base structure with the axis of each being substantially coaxial with the axis so that deformation is primarily via torsion in-use. A number of other orientations are also possible.

In yet another example, the mounts A107*a* and A107*b* may be replaced by the mounts A800 of FIGS. 19A-19C. As shown, the mount comprises a single longitudinal body A801 extending between opposing annular, connection heads A802, A803. The longitudinal body A801 may comprise one or more exterior concave surfaces along A801*a*, A801*b* extending along the length of the body A801. The surfaces may be concave at in a transverse cross-section of the body A801. The surfaces A801*a* and A801*b* may be oriented at approximately 180 degrees relative to one another in this example. Other orientations are envisage and there may be any number of one or more concave surfaces in some embodiments.

The mounts A107*a*, A107*b* may be replaced with alternative mounts as shown in FIGS. 5A-5C and 6A-6D, for example. FIGS. 5A-5C show a spoke mount A500 alternative, having a plurality of inner spokes A501 extending radially between an inner wall A503 and an outer wall A504 for providing additional compliance in the direction of rotation about the pin aperture A505, relative to the translational compliance along all three orthogonal axes. Two such suspension mounts may be located distal relative to one another along the primary axis of rotation so that, in conjunction with one-another, they furthermore provide higher compliance in the direction of rotation about the pin aperture A505, relative to rotational compliance about the other two orthogonal rotational axes. For example, the mounts A107*a*, A107*b* may be located at or close to opposing sides of the diaphragm A101. All else being equal, it may be possible to use a stiffer grade material in this example relative to the mounts A107*a*, A107*b*. For example, an elastomer having Shore A hardness of approximately 60 may be utilised. Longitudinal cavities A502 formed between the radial spokes A501 and inner and outer walls A503, A504 may contain air or alternatively a relatively lower density or relatively less rigid material to the spokes A502 and walls A403, A504.

In some embodiments, the audio transducer A100 may comprise diaphragm suspension mounts as shown in FIGS. 6A-6D. Each mount may be a cross-flexure hinge mount A600 having four spokes or flexures A601*a-d* that radiate from a central axis A603, and that provide added compliance about the central axis, relative to the translational compliance along three orthogonal axes. Preferably the pair of mounts are located substantially distal to one another along the primary axis of rotation A103, such that added rotational compliance about an axes that are substantially orthogonal to the central axis may also be achieved. This may also permit a relatively stiffer grade of material to be used relative to the mounts A107*a*, A107*b*. For example, a urethane elastomer having Shore A hardness of 60 may be utilised. The cross-flexure body A601 is coupled on one side to a mounting pad A602 via a connector A602*a* extending from the pad A602.

The hinge mounts A500 and A600 both comprise at least one concave surface that promotes flexing of the hinge at or about these surfaces. In a foam type material, the plurality of internal cavities also comprise concave surfaces promoting this flexible behaviour. It is preferably that at least one surface is concave about an axis that is substantially parallel to an axis of rotation of the diaphragm A101 to promote flexing about the axis of rotation. In some embodiments, there may be a relatively higher number of surfaces that are concave about the axis of rotation, relative to other orthogonal axes, to promote a higher rotational compliance about the axis of rotation, and a relatively lower compliance in translation along and/or rotation about the other orthogonal axes.

In some embodiments, the hinge mounts A107*a* and A107*b* may be replaced by any other diaphragm suspension herein described in relation to other embodiments. Furthermore, any of the hinge mounts described in relation to the transducer A100 may be used in relation to any other audio transducer embodiment herein described.

The compliance of the diaphragm suspension system may be customised to the requirements of a particular driver application. For example a treble driver in a two way home audio speaker may not require a low Primary Mode frequency, and so a relatively less compliant diaphragm suspension system may be used, which might provide an advantage, for example, that the diaphragm structure would be more rigid against displacements of the diaphragm relative to the base due to creep of diaphragm suspension system materials, thereby improving transducer robustness in such an application.

In some embodiments each hinge mount of the diaphragm suspension has sufficiently low Young's modulus such that fundamental diaphragm resonance frequency occurs at frequency less than approximately 100 Hz. In some embodiments each hinge mount of the diaphragm suspension has sufficiently low Young's modulus such that a fundamental diaphragm resonance frequency occurs at frequency less than approximately 70 Hz. In some embodiments each hinge mount of the diaphragm suspension has a sufficiently low Young's modulus such that a fundamental diaphragm resonance frequency occurs at frequency of less than approximately 50 Hz. Such a device may be useful as a bass driver or in personal audio applications as described in further detail below.

In some embodiments, the audio transducer may comprises a translational resonance frequency of more than approximately 200 Hz, or more than approximately 300 Hz, or more than approximately 400 Hz. This may make the device suitable as a mid-range/high frequency driver or also as a personal audio device.

In some embodiments one or more diaphragm suspension components, such as each hinge mount, is sufficiently rigid in order that a diaphragm resonance frequency associated with translational compliance occurs at a frequency greater than approximately 200 Hz, more preferably greater than approximately 300 Hz, and most preferably greater than approximately 400 Hz. The diaphragm resonance frequency associated with translational compliance may involve significant displacement of the diaphragm in a direction perpendicular to a coronal plane.

The materials and/or construction of the diaphragm suspension may provide substantially high damping, particularly in tension/compression, in order to help manage translational and other unwanted resonance modes.

In some embodiments, the diaphragm suspension may consist of a substantially rigid hinge construction, for example as described in section 3.2 of WO 2017/046716, but with the axis of rotation of the hinge being located in a plane that is substantially perpendicular to a coronal plane of the diaphragm and that contains the node axis A104 of the diaphragm. More preferably the axis of rotation is substantially coaxial with the node axis A104, and most preferably the axis of rotation is substantially coaxial with the centre of mass. Such a suspension may comprise at least one hinge mount, having a pair of substantially rigid and opposing contact surfaces that are configured to move relative to one another during operation. One contact surface may be rigidly coupled to or form part of the diaphragm A101, while the other may be rigidly coupled to or form part of the transducer base structure. A biasing mechanism may bias the contact surfaces toward one another.

Method for Identifying Node Axis and Assembling Transducer

Figure 22A:
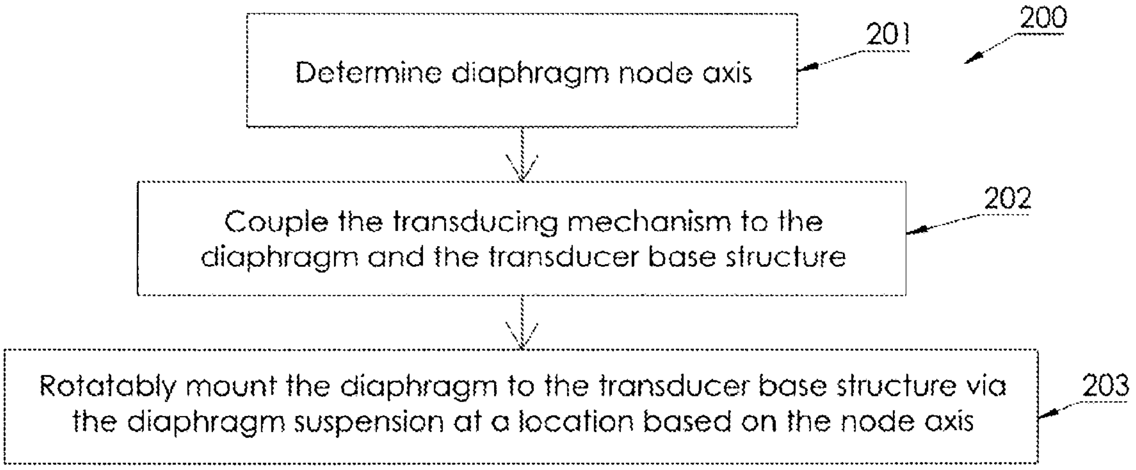

The diaphragm node axis A104 is preferably predetermined and the diaphragm suspension system mounted to the diaphragm A101 accordingly. Referring to FIG. 22A, a method 200 for constructing the audio transducer A100 may consist of:

a) Determining a node axis of the diaphragm—step 201;
b) Coupling the transducing mechanism to the diaphragm and to the transducer base structure—step 202; and
c) rotatably mounting the diaphragm to the transducer base structure via a diaphragm suspension such that an axis of rotation of the diaphragm relative to the transducer base structure is located in a plane that is: substantially perpendicular to the coronal plane A211 of the diaphragm A101 and that contains the node axis A104 of the diaphragm A101—step 203.

Steps a) and b) may be interchangeable in order.

Alternatively, the diaphragm suspension and/or diaphragm A101 are adjusted until the desired operation/characteristics of the transducer is achieved.

In this embodiment, the diaphragm node axis A104 is predetermined via computer modelling and simulation. For example, determining the node axis A104 may consist in the steps of:

generating a computer model of the audio transducer;

simulating an operative state in which a transducing mechanism of the model rotates a diaphragm of the model in an effectively substantially unsupported state; and determining from the simulation an axis of rotation of the model diaphragm; and determining the node axis of the audio transducer from the axis of rotation of the model diaphragm.

Alternatively, the method of predetermining the node axis A104 may comprise determining the axis using a physical model that is similar or equivalent to the audio transducer A100. The stages of such a method may consist of:

generating a physical model of the audio transducer;

operating a transducing mechanism of the model to rotate the model diaphragm in an effectively substantially unsupported state;

determining an axis of rotation of the model diaphragm relative to the transducer base structure; and determining the node axis of the audio transducer from the axis of rotation of the model diaphragm.

In this specification, reference to an "effectively substantially unsupported" diaphragm is intended to mean a diaphragm that is significantly unsupported relative to the level of support provided by the associated diaphragm suspension system. This may be a level of support that is relatively higher in compliance, and/or it may be a result of operating the transducer such that the diaphragm is in the mass-controlled region, with respect to the to the six diaphragm resonance modes facilitated primarily by diaphragm suspension compliance, where it becomes effectively substantially unsupported relative to the transducer base structure. In the case where an effectively substantially unsupported diaphragm state is actualised through operation, the operation time period of excitation is preferably sufficiently short and/or the frequency is sufficiently high that the effect of the diaphragm suspension on the node axis location is substantially negligible. In this way the diaphragm is effectively, for the purposes of determining the diaphragm node axis location, unsupported. In addition, or alternatively, a relatively high compliance diaphragm suspension may be incorporated to reduce the degree of diaphragm support and achieve an effectively substantially unsupported state of the diaphragm.

The operation time period of the test excitation, in which the diaphragm is effectively substantially unsupported, is preferably sufficiently long and/or the frequency of operation is sufficiently low that both the diaphragm and transducer base structure remain substantially rigid, or at least that any deformation of either has substantially negligible effect on the determined node axis location.

Preferably the step of determining the axis of rotation of the model comprises measuring the axis using one or more sensors or measuring devices such as accelerometers, Laser Doppler Vibrometer (LDV), proximity sensors or the like.

Figure 22B:
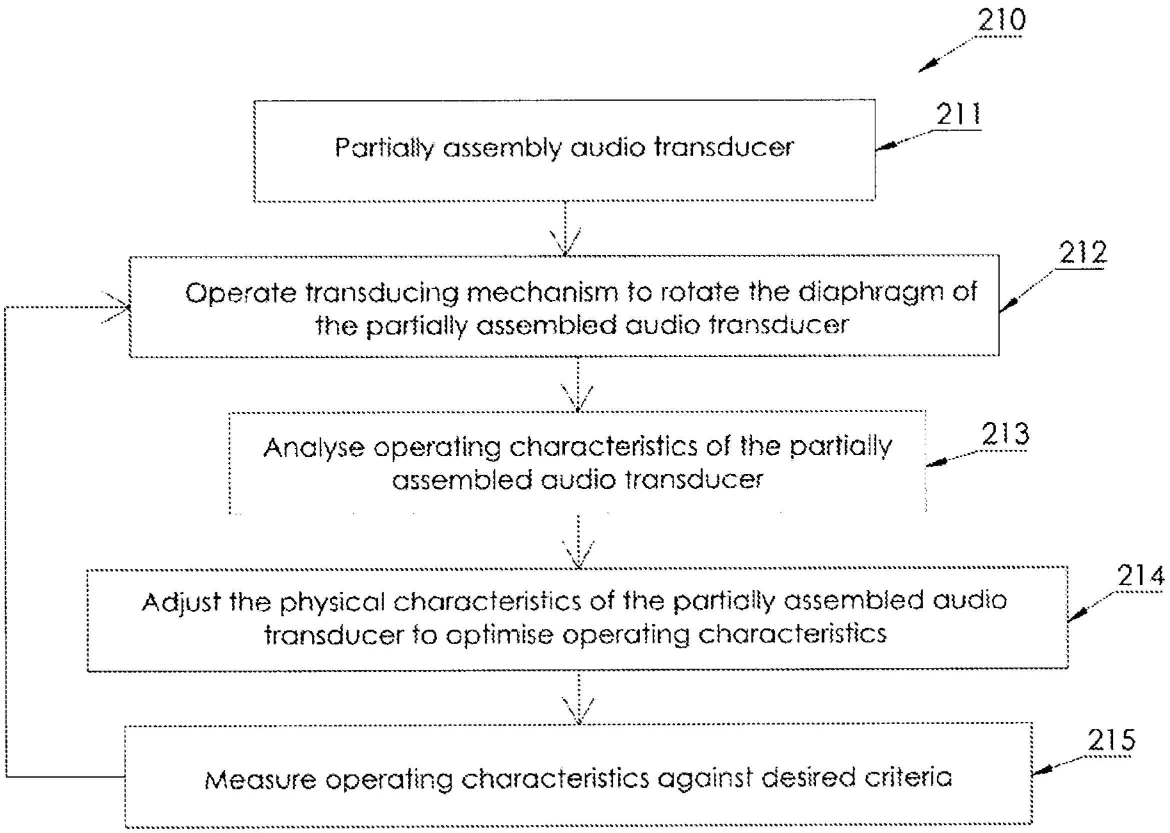
Figure 22C:
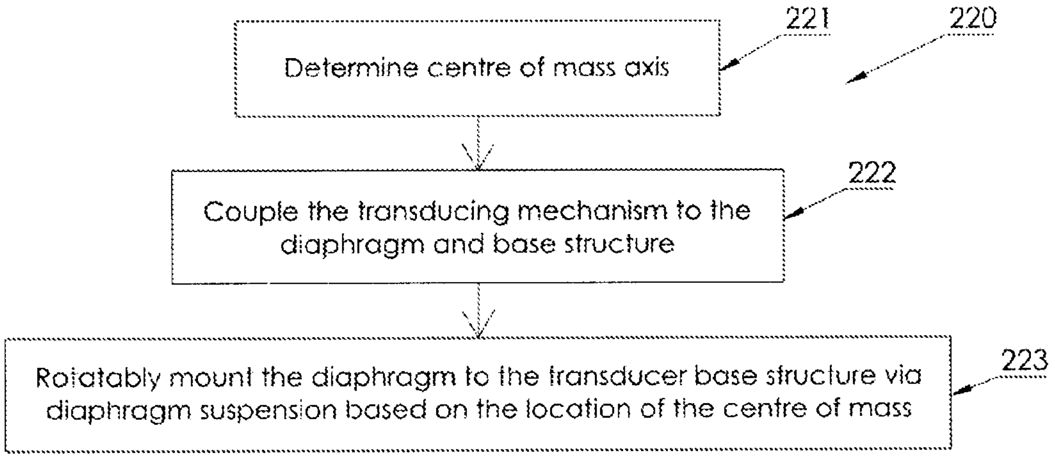

As mentioned, in alternative embodiments the audio transducer A100 is assembled using a technique that adjusts properties of the transducer to achieve desired operating characteristics. Referring to FIG. 22B a method 210 may comprise the steps of:

a) partly assembling the audio transducer (step 211) by:
   i. Coupling the transducing mechanism to the diaphragm A101 and to the transducer base structure A102; and
   ii. rotatably mounting the diaphragm A101 to the transducer base structure A102 via the diaphragm suspension system;

b) operating the transducing mechanism to rotate the diaphragm A101 of the partly assembled audio transducer—step 212;

c) analysing one or more operating characteristics of the partly assembled audio transduce—step 213*r;* d) adjusting one or more physical characteristics of the partly assembled audio transducer to optimise the one or more operating characteristics—step 214;

e) and repeating steps b)-d) if necessary until one or more desired criteria of the one or more operating characteristics is/are achieved—step 215.

The desired criteria are preferably predetermined. Step b) may comprise operating the transducing mechanism to rotate the diaphragm in a mass-controlled, with respect to the six diaphragm resonance modes facilitated primarily by diaphragm suspension compliance, region of the transducer.

Preferably the one or more operating characteristics comprises any one or more of: a frequency response of the transducer within at least an intended frequency range of operation. Preferably the criteria includes a zero-resonance frequency response.

In some embodiments step c) comprises analysing a frequency response of the transducer to determine if a value of a parameter indicative of one or more stepped changes in the frequency response is greater than a predetermined threshold value. Preferably the criteria of step e) comprises one or more desired values of the parameter. For example, the parameter may be the height and/or gradient of the step and the criteria may comprise a desired maximum height and/or gradient value.

In some embodiments step c) comprises analysing a frequency response of the transducer to determine if a peak value of the frequency response is greater than a predetermined threshold value. Preferably the criteria of step e) comprises a desired maximum value of the peak of the frequency response.

The abovementioned parameter values relating to the frequency response may be measured or estimated.

Preferably the one or more physical characteristics comprises any combination of one or more of: a location of the diaphragm suspension system relative to the diaphragm; a location of an axis of rotation of the diaphragm relative to the transducer base structure; a mass profile of the transducer base structure; a mass profile of the diaphragm; one or more dimensions of the diaphragm; a shape profile of the diaphragm; a shape profile of the base structure; a shape profile of the diaphragm suspension system; a stiffness profile of the diaphragm suspension system; a force generation profile of the transducing mechanism.

Referring to step 22C, in yet another method, the audio transducer A100 may be constructed based on the diaphragm's centre of mass axis A204. For example, a method 220 may comprise the steps of:

a) Determining a centre of mass axis A204 of the diaphragm A101—step 221;

b) Coupling the transducing mechanism to the diaphragm A101 and to the transducer base structure A102—step 222; and c) rotatably mounting the diaphragm A01 to the transducer base structure A102 via a diaphragm suspension system such that the axis of rotation A103 of the diaphragm A101 relative to the transducer base structure A102 is located in a plane that is: substantially perpendicular to a coronal plane A211 of the diaphragm A101 and that contains the centre of mass axis A204 of the diaphragm A101—step 223.

The axis of rotation A103 is preferably substantially coaxial with the centre of mass axis A204.

Decoupling Mounting System

Referring to FIGS. 1F-1I and 3G, in some configurations the audio transducer A100 may be housed within a speaker enclosure or housing A301. To minimise the transmission of unwanted vibration between the speaker housing A301/A301 and the transducer A100, the transducer A100 is preferably coupled to the housing via a flexible, decoupling mounting system. In some embodiments this system may be similar to the decoupling mounting systems described in section 4 of WO 2017/046716 in relation to embodiment A, for example. The decoupling mounting system of this embodiment comprises a pair of flexible transducer node axis mounts A305*a*, A305*b* extending laterally from opposing sides of the transducer base structure A102, substantially coaxially with a transducer node axis A105. The transducer node axis A105, which is distinct from the node axis A104 of the diaphragm described above, is the location about which the transducer base structure rotates in an effectively substantially unsupported state during operation (herein referred to as unsupported and active state), as described in section 4.2.1 of the detailed description of WO 2017/046716, for example, which is hereby incorporated by reference. By way of summary, a transducer node axis A105 is the axis about which the transducer base structure rotates due to reaction and/or resonance forces exhibited during diaphragm oscillation. The location is determined when the transducer assembly is operated in a hypothetical unsupported state, and operated at frequencies substantially lower than those at which unwanted diaphragm (flexing type) and transducer base structure (flexing type) resonances occur. Methods of identifying this location are described in WO 2017/046716, which are hereby incorporated by reference.

In some embodiments the transducer node axis A105 may be determined when the transducer assembly is operated in a hypothetical unsupported state, and operated at frequencies substantially lower than those at which unwanted diaphragm (flexing type) and transducer base structure (flexing type) resonances occur, and operated at frequencies substantially higher than frequencies of resonance modes associated at diaphragm suspension compliance (being the six modes described above).

In some embodiments, the transducer node axis A105 may be determined when the transducer assembly is operated in a hypothetical unsupported state, and operated at frequencies substantially lower than those at which unwanted diaphragm (flexing type) and transducer base structure (flexing type) resonances occur, and operated at frequencies higher than the frequency of the primary diaphragm resonance mode.

The decoupling mounting system comprises node axis mounts A305*a*, A305*b* extending laterally from opposing sides of the transducer base structure A102, substantially coaxially with the transducer node axis A105. The node axis mounts are coupled about node axis pins A111*a*, A111*b*, also extending laterally from opposing sides of the transducer base structure A102, substantially coaxially with the node axis A105. The mounts A305*a*, A305*b* are fixedly accommodated within corresponding recesses or cavities internally of the enclosure part A301. The mounts may have a profile similar to that of diaphragm mounts A107*a*, A107*b*, or the diaphragm mounts shown in FIGS. 5A-5C and 6A-6D, for example.

Figure 3A:
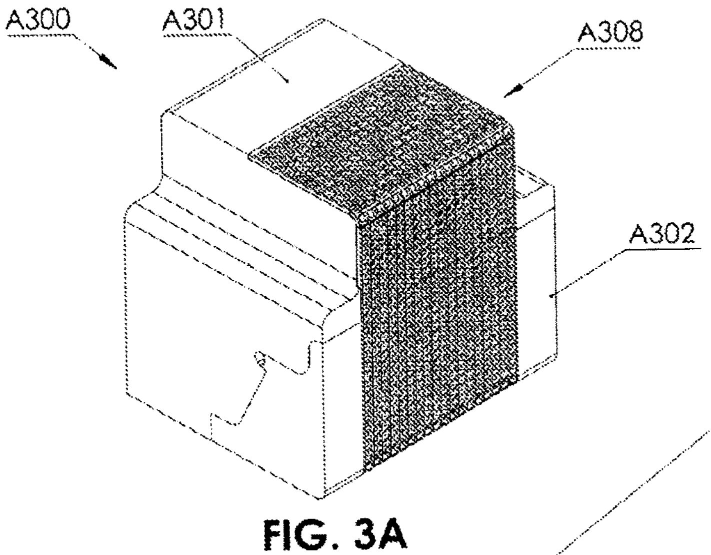
Figure 3B:
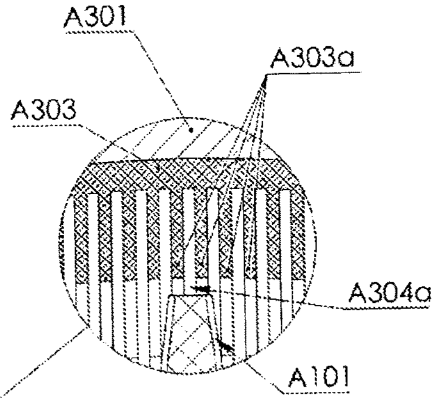
Figure 3C:
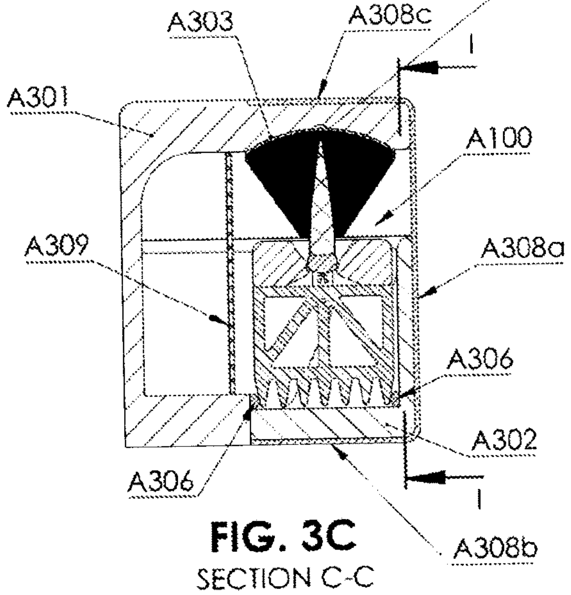
Figure 3D:
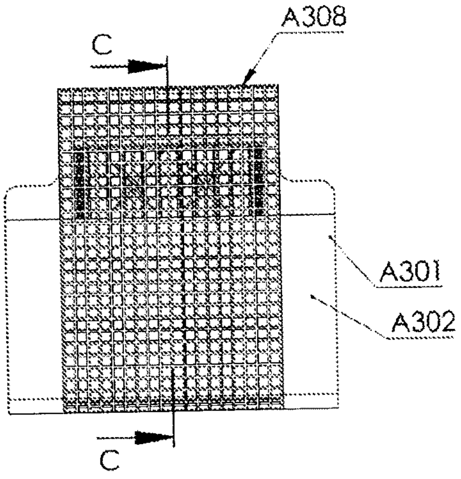
Figure 3E:
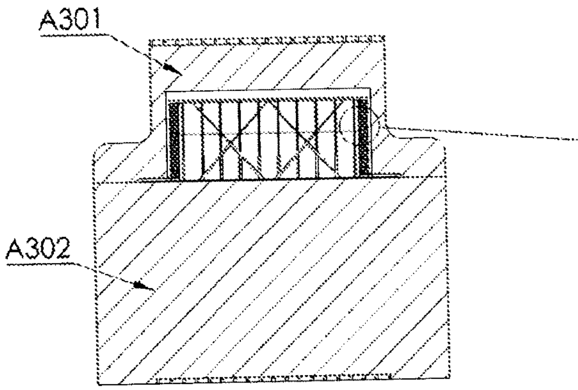
Figure 3F:
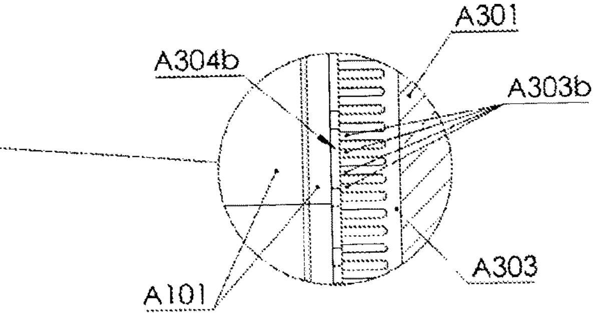
Figure 3H:
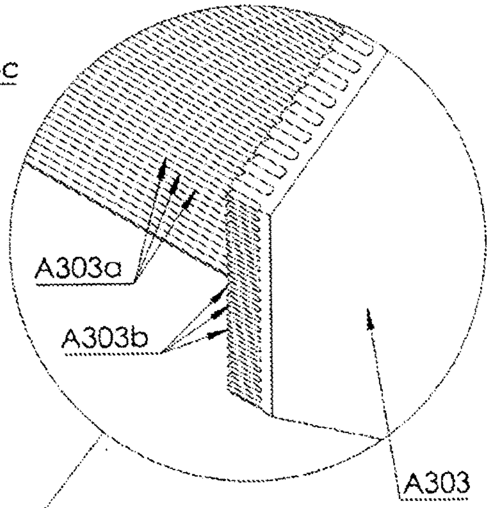
Figure 3G:
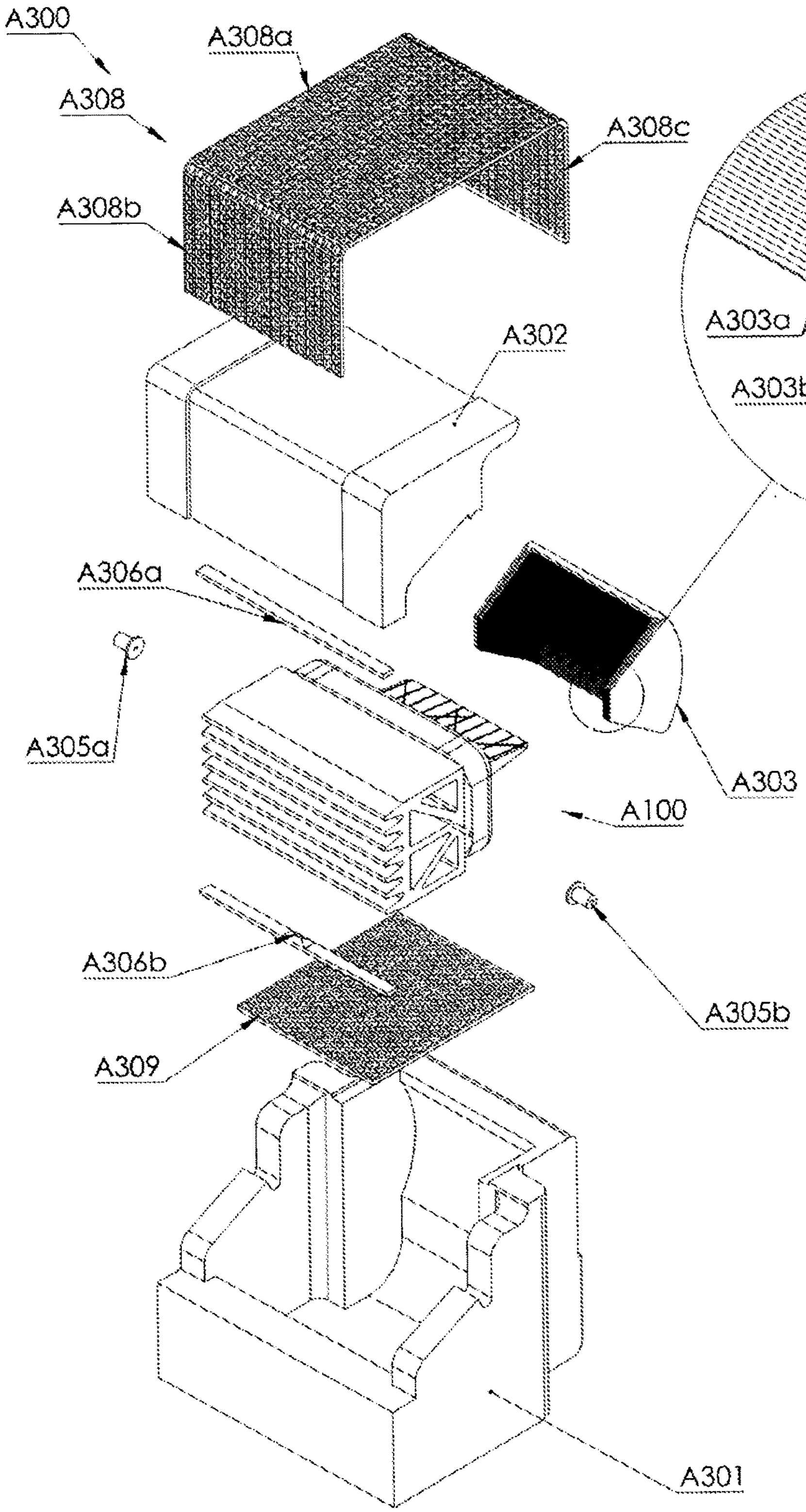

The decoupling mounting system further comprises one or more decoupling pads A306*a*, A306*b* located on one or preferably both major faces of the transducer base structure A102. The pads A306*a*, A306*b* provide an interface between the associated base structure face and a corresponding internal wall/face of the enclosure, to help decouple the components. In this example, one pad A306*a* is located on each major face (upper and lower faces) of the base structure. The decoupling pads are preferably located at a region of the transducer base structure that is distal from the transducer node axis A105. For example, they are located at or adjacent an edge of the base structure adjacent the diaphragm A101. Each pad A306*a*, A306*b* is preferably longitudinal in shape and extends longitudinally along a transverse edge of the base structure A102. As shown in FIG. 3G, each pad A306*a*, A306*b* comprises a pyramid shaped body having a tapering width along the depth of the body. Preferably the apex of the pyramid is coupled to the housing but this orientation may be reversed in alternative embodiments. It will be appreciated that in alternative embodiments the decoupling mounting system may comprise multiple pads distributed about one or more of the major faces of the transducer base structure A102 and/or on the side faces of the base structure where the decoupling pins extend from and the invention is not intended to be limited to the configuration of this example as will be apparent to those skilled in the art. Such mounts are herein referred to as "distal mounts".

The node axis mounts A305*a*, A305*b* and the distal mounts A306*a*, A306*b* are sufficiently compliant in terms of relative movement between the two components to which they are each attached. For instance, the node axis mounts and the distal mounts may be sufficiently flexible to allow relative movement between the two components they are attached to. They may comprise flexible or resilient members or materials for achieving compliance. The mounts preferably comprise a low Young's modulus relative to at least one but preferably both components they are attached to (for example relative to the transducer base structure and housing of the audio device). The mounts are preferably also sufficiently damped. For instance, the node axis mounts A305*a*, A305*b* may be made from a elastomer or a soft plastics material, such as a Silicone rubber, and the pads A306*a*, A306*b* may also be made from a substantially flexible material such as Silicone rubber.

The node axis and distal mounts may be made from a material having a Young's Modulus value of approximately 0.2 MPa-20 MPa, and preferably less than 1 GPa, for example. These values are just exemplary and not intended to be limiting. Material having other Young's Modulus values may also be used as it will be appreciated that compliance is also dependent on the geometry of the material, the frequency range of operation of the driver and the mass of the diaphragm structure, for example.

The decoupling system at the node axis mounts A305*a*, A305*b* has a lower compliance (i.e. is stiffer or forms a stiffer connection between associated parts) relative to the decoupling system at the distal mounts A306*a*, A306*b*. This may be achieved through the use of different materials, and/or in the case of this embodiment, this is achieved by altering the geometries (such as the shape, form and/or profile) of the node axis mounts A305*a*, A305*b* relative to the distal mounts A306*a*, A306*b*. This difference in geometry means that the node axis mounts A305*a*, A305*b* comprise a larger contact surface area with the base structure and housing relative to the distal mounts A306*a*, A306*b*, thereby reducing the compliance of the connection between these parts.

In practice, a transducer mounted in a high quality decoupling mounting system may have a transducer node axis location that moves during operation. At a relatively low frequency range (with respect to the FRO) the movement of the transducer base structure, and a node axis location if one exists, is primarily defined by the mechanical constraints of the transducer decoupling mounting system, the location and direction of forces exerted on the transducer base structure by the diaphragm, and by the transducer base structure assembly's mass distribution—herein referred to as the "first operative state." In general, the movement of the transducer base structure will be different, and if there is a node axis then it will be shifted and may shift with frequency, compared to movement in the hypothetical unsupported and active state of the transducer. At frequencies above this lower range, the movement of the transducer base structure, and the node axis location if one exists, becomes primarily defined by the location and direction of the forces applied to the transducer base structure (such as the reaction forces from diaphragm oscillation, resonance forces and forces applied the transducing mechanism) and by the base structure assembly's mass distribution—herein referred to as the "second operative state" (which is typically the same as the node axis location in the hypothetical unsupported and active state, at a particular frequency of operation). As described above, some embodiments of the present invention comprise compliant hinge systems which permit the effective diaphragm hinging axis to shift over the operating bandwidth, hence the direction of the forces applied to the transducer base structure, and implicitly also the transducer node axis, may shift with (steady state) frequency over the operating bandwidth. Preferably the transducer node axis is determined when the transducer assembly is operated in a hypothetical unsupported state (with respect to a housing, enclosure or other support), and operated at frequencies substantially lower than those at which unwanted diaphragm flexing type and transducer base structure flexing type resonances occur, and operated at frequencies substantially higher than frequencies of resonance modes associated at diaphragm suspension compliance (being the six modes described above.) The decoupling mounting system herein described resists or at least significantly reduces such change in movement, including the aspect of the shift in the transducer node axis location. The decoupling mounting system is designed such that there is very minimal or no movement of the transducer node axis caused by said decoupling mounting system within the frequency range of operation to minimise or prevent translational movement at the less compliant decoupling locations.

Figure 1G:
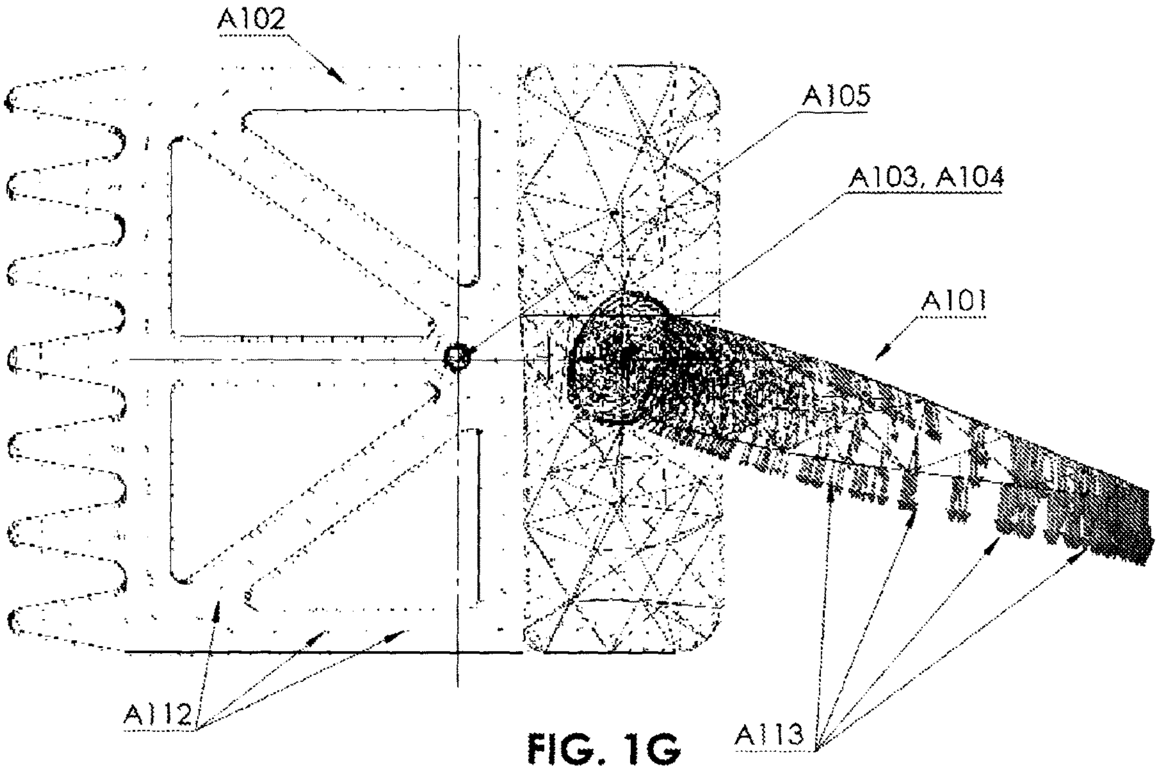
Figure 1H:
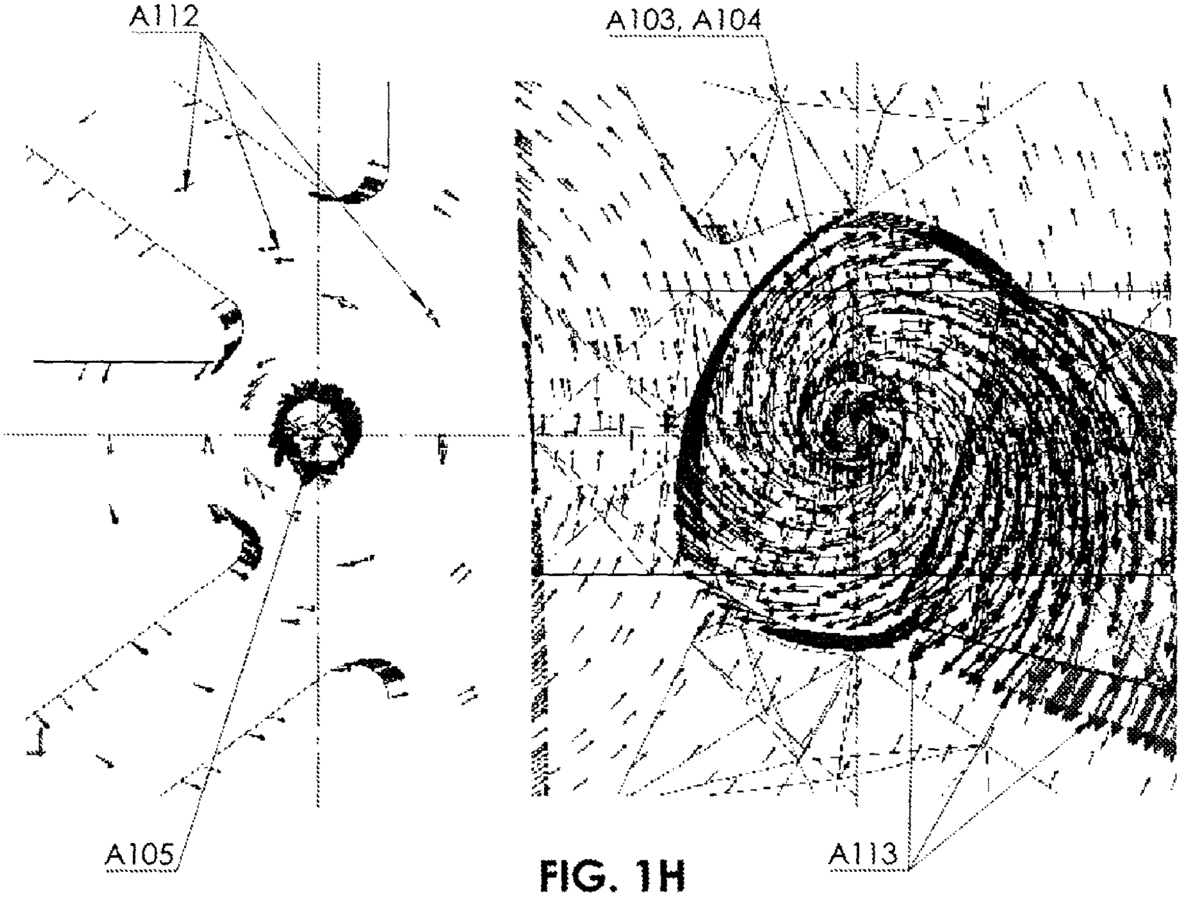
Figure 11:
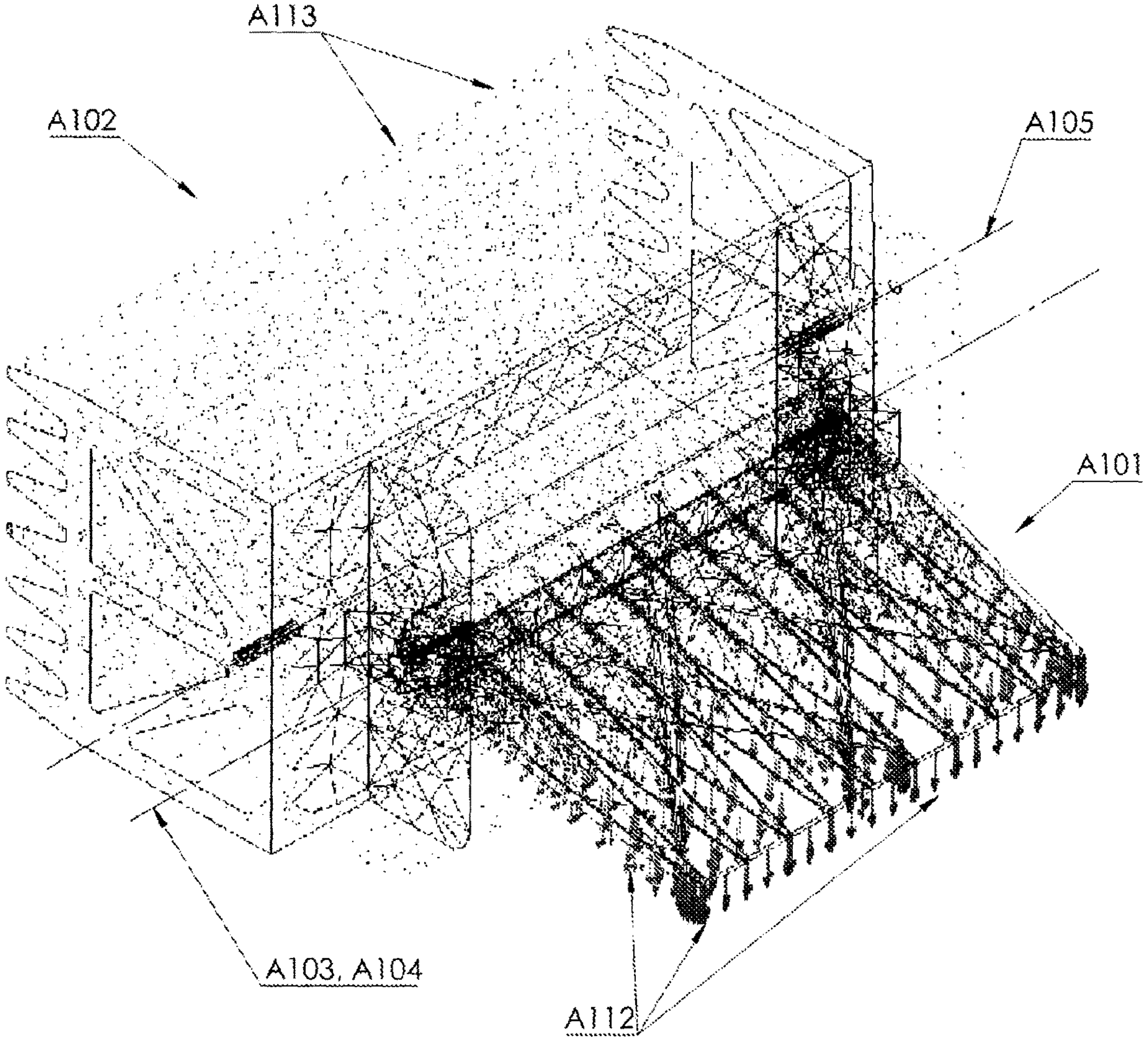
FIG. 11 is a vector diaphragm showing a distance between a resultant force vector of FIG. 10 and the diaphragm's axis of rotation.

FIGS. 1G-1I show a finite element analysis result of a simulated model of audio transducer A100, in an effectively substantially unsupported (with respect to a housing, enclosure or other support onto which the transducer may be coupled in situ) and active state to facilitate location and predetermination of the transducer node axis A105, for locating the node axis mounts A305*a*, A305*b* accordingly. The Primary Mode rotation about an axis substantially parallel to the transducer's transverse axis A202*a* is shown in these figures. Note that in this case the diaphragm suspension has been designed to avoid a shift in the diaphragm's axis of rotation compared to the predetermined (diaphragm) node axis A104 of the diaphragm A101, therefore this is a special case where the diaphragm's primary resonance mode has the same diaphragm axis location as the predetermined (diaphragm) node axis A104 of the diaphragm rotation. Therefore in this analysis the location of the transducer node axis is the same as when the transducer assembly is operated in a hypothetical unsupported state (with respect to a housing, enclosure or other support onto which the transducer may be coupled in situ), and operated at frequencies substantially lower than those at which unwanted diaphragm flexing type and transducer base structure flexing type resonances occur, and operated at frequencies substantially higher than frequencies of resonance modes associated at diaphragm suspension compliance (being the six modes described above.)

Two node axes are apparent: the diaphragm node axis A104 and the transducer node axis A105. The size and direction of each arrow in the finite element analysis plot indicates the relative magnitude and direction of displacement of the respective region on the transducer. The diaphragm A101 in FIG. 1F can be seen to be rotating about the diaphragm node axis A104 in an opposite (clockwise) direction relative to the base assembly (which is rotating about the transducer node axis A105 in an anticlockwise direction).

The distance between the transducer node axis A105 and the diaphragm node axis A104 is preferably relatively small. This is advantageous as it means that the more rigid node axis mounts A305*a*, A305*b* are relatively close to the diaphragm and to the diaphragm's axis of rotation A103, relative to the base structure A102, hence displacement of the transducer base structure A102 relative to the housing, especially rotational displacement, that may occur in an impact scenario results in a smaller displacement of the diaphragm relative to the housing. This, in turn, results in reduced chance of damage to the diaphragm, all else being equal.

Loudspeaker Embodiment

FIGS. 3A-3H show the transducer A100 mounted in a speaker device A300 that could be used for a home audio application, such as a mid-range/treble speaker, for example. The speaker A300 comprises an enclosure A301, an enclosure lid A302, the transducer A100, a protective surround A303 at the outer perimeter of the diaphragm A101, outer shielding mesh A308, inner shielding mesh A309, and a driver decoupling system consisting of two decoupling bushes A305*a*, A305*b* and two decoupling pyramids A306*a*, A306*b*.

The transducer A100 could be configured for many different applications, for example as a full range headphone driver in alternative embodiments. It could be made larger for use as a mid-range driver, a bass-mid driver, a full-range driver or a subwoofer, or smaller for use in personal audio applications such as headphones, mobile phones, bud earphones or hearing aids. It could also be used as a mechanical vibration transducer, or have a dual purpose as both a sound transducer and a mechanical vibration transducer. It also could be used as a microphone.

Protective Surround

In this embodiment, the speaker A300 further comprises a protective surround A303 configured to provide impact protection for the transducer A100 while helping to prevent air from moving past the diaphragm periphery. It may be in-moulded to the enclosure A301/A302 out of a compliant material, for example from an elastomer or plastics material such as Silicone rubber or Sorbothane™, or coupled as a separate component. The parts of the protective surround A303 that may contact the more fragile areas of the diaphragm A101 preferably have small thin flaps A303*a* and A303*b* moulded into it. In a potential use situation where the speaker A300 is dropped, for example, the surround A303 is configured to provide protection via the thin flaps A303 bending and sliding past the diaphragm A101. To additionally help prevent diaphragm damage, a low-friction coating (for example PTFE or Teflon) is preferably applied, inmoulded or otherwise attached to the areas of the protective surround A303 that may contact the diaphragm A101 in a drop. The protective surround A303 may have other flexible geometries moulded, cut or fabricated into it, for example, rather that the layers of flaps A303 that extend around all three sides of the diaphragm as shown in FIG. 3H. There may be a plurality of small flaps or small hairs. The feature of having many small flaps oriented in the plane of the diaphragm A101 helps to restrict the flow or air from an area of positive sound pressure that is generated at one side of the diaphragm A101 during operation, to an area of negative sound pressure that is generated on the other. The protective surround A303 may alternatively be made from a compliant fabric or material, such as Velvet or velour or a Silicone. The protective surround A303 may also have anti-static protection, for example by using an anti-static spray, to help prevent dust being attracted into the airgaps A304.

Magnetic Shielding

In this embodiment, the speaker A300 further comprises magnetic shielding parts A308, A309 made from ferromagnetic materials, such as a steel mesh. The magnetic shielding parts A308, A309 are used to help prevent the electromagnetic mechanism's flux field from extending beyond the external surfaces of the speaker A300 and to reduce magnetic interaction with foreign bodies external to the speaker A300. Without shielding, the diaphragm A101 may displace due to magnetic interaction with foreign bodies, such as other magnets or ferromagnetic materials, potentially leading to damage. In this manner, the speaker A300 comprises an outer shield mesh A308 comprising a panel A308*a* that is approximately equal distance to the magnet A205 as an inner shield mesh A309. The thickness and density of each shield A308, A309 is similar to the other, to maintain an equal and opposite magnetic attraction force on either side of the diaphragm A101. In some embodiments the thickness of different parts of the shielding may vary and distance from the transducer may also vary but the overall effect is that the net force on the diaphragm, and preferably also the transducer as a whole, is zero or at least close to zero. In some embodiments additional shielding and/or permanent magnets and/or other devices may be incorporated to play a part in balancing the force on the diaphragm. As these forces on the magnet are approximately equal and opposite, the net force on the magnet may be approximately zero. Likewise, the magnetic shielding panel A308*b* and A308*c* also attract the magnet from approximately opposite directions, and so provide an approximately zero net force on the magnet A205 and diaphragm A101 in the associated direction. With approximately zero net forces on the magnet A205, the force transmitted through the diaphragm suspension mounts A107*a*, A107*b* may be minimal which may reduce the tendency for the soft mounts A107*a*, A107*b* to creep in displacement over time under too much stress. In this embodiment, there is no shielding on the sides of the enclosure, however this may not be necessary due to the large distance between the magnet A205 and these outside surfaces of the speaker A300.

In the scenario where a magnetic foreign body touches the outside surface of the speaker A300, preferably the shielding A308/A309 is sufficient such that magnetic flux from the magnet A205 is contained within the speaker A300, and the force of attraction from the foreign body to the magnet A205 is negligible or at least significantly reduced.

Additionally or alternatively, magnetic shielding can be rigidly attached to the base structure assembly A102. In some embodiments it is preferable that ferromagnetic materials are not located too close to the diaphragm magnet or coil and/or are not too large and/or are located such that they do not carry too much magnetic flux, otherwise the diaphragm may exist in a state of unstable equilibrium which might be upset if diaphragm suspension materials were to distort due to creep and/or elevated temperatures and/or if manufacturing tolerances are insufficient.

In some embodiments, such as in the case of a tweeter, the magnetic shielding may provide a secondary benefit as a pole piece, aiding in directing either the magnetic flux of the magnet A205 or the magnetic flux induced by the conductive coil A106, in directions that improve the overall efficiency of the transducer A100.

It is preferred that the shielding is not in intimate contact or rigidly connected to the coil. It is also preferred that a face or side of the coil A106 on a side distal from the magnet A205, may not have any strongly ferromagnetic component(s) in intimate contact or rigidly connected therewith. There is preferably a gap of at least 1 mm between the coil and the strongly ferromagnetic component(s), more preferably at least 2 mm and most preferably at least 4 mm.

It is preferable that the net force of attraction of all magnetic shielding A308/A309 on the device, and including the net attraction or repulsion of any other magnets (for example within other transducers A100) acting on the magnet A205 is approximately zero, so as not to overly stress the diaphragm suspension system, which may displace the diaphragm A101 and restrict the transducer performance. The net force on the entire transducer in non-operational state may be approximately zero or alternatively is comparable to or less than the force of gravity, in order to avoid long term loading of the driver suspension and possible creep of compliant components, such as mounts A107*a*, A107*b*.

Perforated mesh has been used as magnetic shielding for the device A300. This is because air from the front face of the diaphragm must pass through parts of the shielding panel A308*a* and also through parts of inner shielding panel A309. Alternatively, portions of the shielding that do not require air to pass through them (e.g. portions that are not adjacent regions of sound pressure generated by the diaphragm during operation) may be made solid, and they would then provide more effective shielding of magnetic flux.

Free-Periphery

The diaphragm A101 comprises an outer periphery that is free from physical connection with a surrounding structure such as the protective surround A303. The phrase "free from physical connection" as used in this context is intended to mean there is no direct or indirect physical connection between the associated free region of the diaphragm periphery and the surrounding structure. For example, the free or unconnected regions are preferably not connected to the surrounding structure either directly or via an intermediate solid component, such as a solid surround, a solid suspension or a solid sealing element, and are separated from the structure to which they are suspended or normally to be suspended by a gap. The gap is preferably a fluid gap, such as a gases or liquid gap.

Furthermore, the term surrounding structure in this context is also intended to cover any surrounding structure that accommodates at least a substantial portion of the diaphragm structure therebetween or therewithin. For instance a baffle that may surround a portion of or an entire diaphragm structure, or even a wall extending from another part of the electroacoustic transducer and surrounding at least a portion of the diaphragm may constitute a surrounding structure in this context. The phrase free from physical connection can therefore be interpreted as free from physical association with another surrounding solid part in some cases. The transducer base structure may be considered as such a solid surrounding part. In the rotational action embodiments of the invention for example, parts of the base region of the diaphragm structure may be considered to be physically connected and suspended relative to the transducer base structure by the associated hinge assembly. The remainder of the diaphragm periphery, however, may be free from connection and therefore the diaphragm comprises at least a partially free periphery.

The phrase "at least partially free from physical connection" (or other similar phrases such as "at least partially free periphery" or sometimes abbreviated as "free periphery") used in relation to the outer periphery in this specification is intended to mean an outer periphery where either:

- approximately the entire periphery is free from physical connection, or
- otherwise in the case where the periphery is physically connected to a surrounding structure/housing, at least one or more peripheral regions are free from physical connection such that these regions constitute a discontinuity in the connection about the perimeter between the periphery and the surrounding structure.

For any electroacoustic transducer embodiment herein described the diaphragm periphery may be at least partially and significantly free from physical connection. For example a significantly free periphery may comprise one or more free peripheral regions that constitute approximately at least 20 percent of a length or two dimensional perimeter of the outer periphery, or more preferably approximately at least 30 percent of the length or two dimensional perimeter of the outer periphery. The diaphragm is more preferably substantially free from physical connection, for example, with at least 50 percent of the length or two-dimensional perimeter of the outer periphery free from physical connection, or more preferably at least 80 percent of the length or two-dimensional perimeter of the outer periphery. Most preferably the diaphragm is approximately entirely free from physical connection.

Preferably the width of the air gaps defined by the distance between the outer periphery of the diaphragm body of each transducer and the housing/surrounding structure is less than 1/10$^{th}$, more preferably less than 1/20$^{th}$, and more preferably less than 1/40$^{th}$ of a diaphragm body length. For example, a width of each air gap defined by the distance between the outer periphery of the diaphragm body and the surround is less than 1 mm, or more preferably is less than 0.8 mm, or even more preferably is less than 0.5 mm. These values are exemplary and other values outside this range may also be suitable. The surrounding structure fits substantially tightly (but remains physically separated) around the periphery of the diaphragm throughout substantially an entire range of motion of the diaphragm during operation, such that the surrounding structure is effectively sealed. The combination of a tightly fitting surround and the use of a housing and/or baffle to surround the transducer effectively separates air adjacent a radiating, major face of the diaphragm producing positive air pressure, given a particular direction of rotation, from air adjacent to an opposing major, radiating face of the diaphragm.

A transducer having a substantially free periphery means the diaphragm may take up nearly the entire thickness of the device which increases the surface area of the major faces and optimises performance. In a rotational action transducer, a substantially free diaphragm periphery design as described above also allows for an increase in diaphragm excursion while reducing fundamental diaphragm resonance and mitigating unwanted diaphragm break up resonances at treble frequencies, further improving the performance of the device.

2. Second Audio Transducer Embodiment

Referring to FIGS. 7A-7I, a second preferred audio transducer embodiment B100 is shown comprising of a rigid diaphragm B101 mounted to a rigid base structure assembly B102 via a compliant diaphragm suspension consisting of two diaphragm suspension flexure mounts B107*a*, B107*b* made from a flexible and preferably resilient material. The mounts are also made from a substantially soft material, such as a flexible urethane elastomer.

The audio transducer B100 is similar to the transducer A100. Like or similar features and components will not be described in detail for the sake of conciseness. In particular, diaphragm B101 is similar to diaphragm A101 in that it consists of a substantially rigid body B207 that is reinforced by inner and outer reinforcements B209*a-g* and B206 respectively. The form of the outer reinforcement B206 in this embodiment is different to that of diaphragm A101, however, the purpose and function is similar. Similarly, the transducer base structure B102 consists of a squat and rigid geometry as per base structure A102.

The diaphragm suspension flexibly and rotatably couples the diaphragm B101 to the transducer base structure B102 such that the diaphragm is capable of rotatably oscillating about an axis of rotation B103. The diaphragm suspension system is configured so that the axis of rotation B103 is substantially coaxial with a diaphragm node axis B104, and most preferably to the diaphragm centre of mass axis B204 as described in relation to audio transducer A100. The transducing mechanism is an electromagnetic mechanism and comprises a conductive coil B106 and an associated magnet. In this embodiment, the conductive coil B106 is rigidly coupled to the diaphragm A101 and the magnet forms part of the transducer base structure B102. This has an advantage in that, as the diaphragm is non-magnetic, it is not attracted to foreign ferromagnetic bodies, alleviating the need for magnetic shielding and minimising the risk of damage to the diaphragm B101.

Figure 7A:
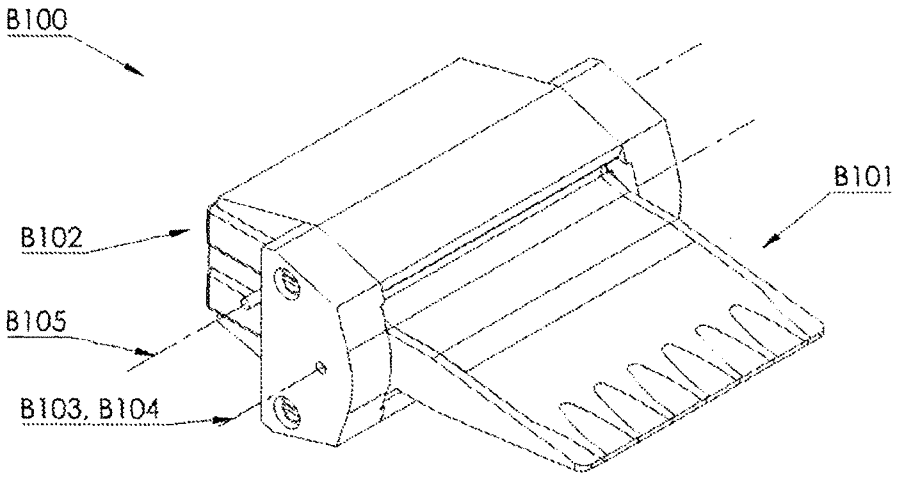
Figure 7B:
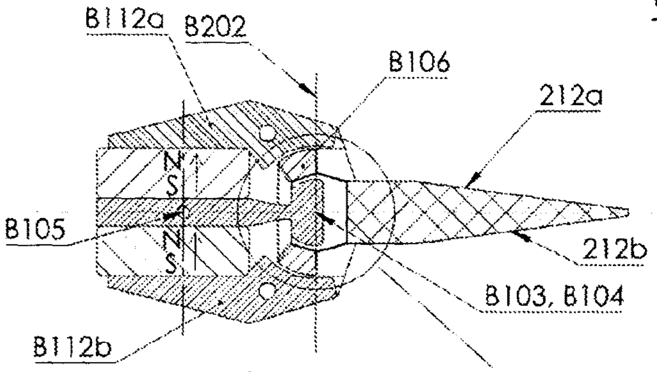
Figure 7C:
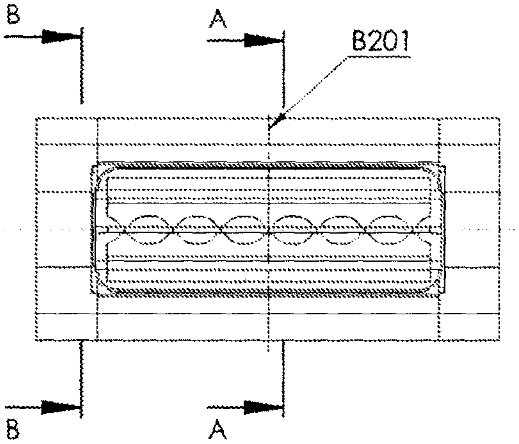
Figure 7D:
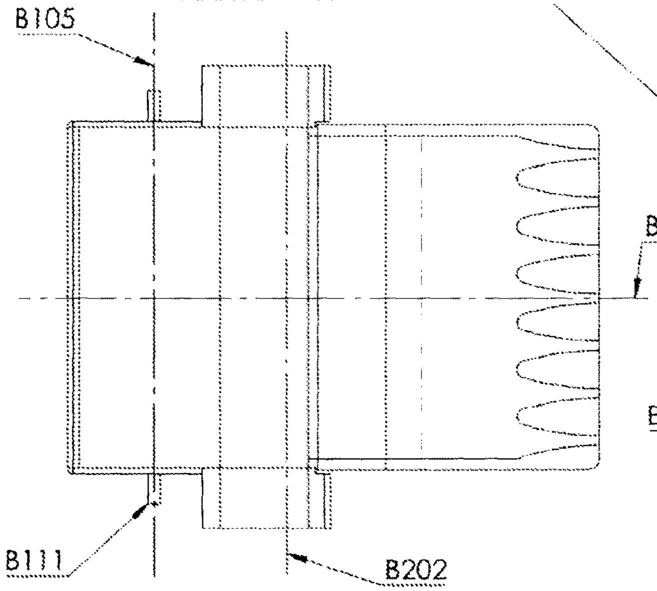
Figure 7E:
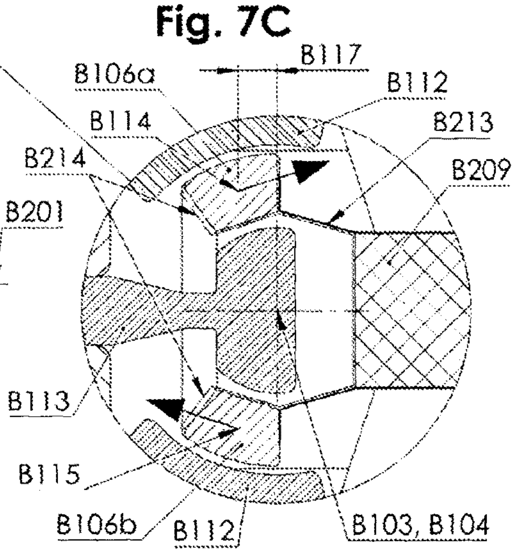
Figure 10:
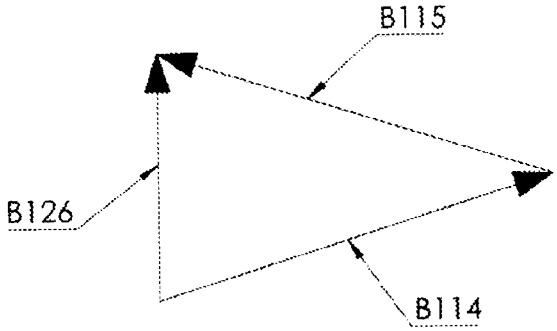
FIG. 10 is a vector diagram of potential vector forces experienced by the diaphragm of the audio transducer of FIGS. 7A-7J during operation.
Figure 11:
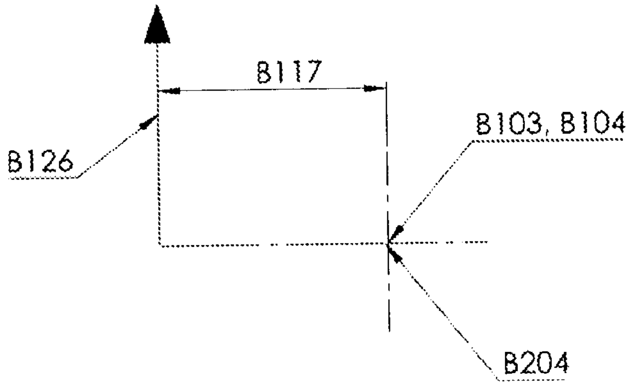

During operation, the transducing mechanism exerts a force on the diaphragm A101. Examples of such force vectors B114 and B115 are shown in FIG. 7E, wherein vector B114 is applied by the coil long side B106*a* and vector B115 is applied by the coil long side B106*b*. A vector force diagram for this scenario is shown in FIG. 10, showing resultant vector B126, being a sum of vectors B114 and B115. The resultant vector B126 is substantially vertical in relation to the diaphragm node axis B104 location with a distance B127 separating the two. This vector may contribute to exciting undesirable modes of vibration, such as a translational mode perpendicular to the coronal plane of the diaphragm B211. It is preferable to configure mass and geometry of the components within the diaphragm structure such that force vectors of each coil long side B106*a* and B106*b* act in significantly opposite directions, such that the resultant vector is minimised.

Diaphragm Suspension

The diaphragm suspension comprises a pair of diaphragm suspension flexure mounts B107*a*, B107*b* extending laterally from opposing sides of the diaphragm B101. A central aperture B220*a*, B220*b* of each mount B107*a*, B107*b* is configured to fixedly couple about a respective suspension pin B108*a*, B108*b* also extending laterally from the associated side of the diaphragm. The suspension pins B108*a*, B108*b* extend substantially coaxially to the diaphragm node axis B104 and to the diaphragm centre of mass axis B204. Each mount B107*a*, B107*b* may be connected to the respective pin via any suitable mechanism such as via an adhesive, such as epoxy resin, or via interference fit. Each diaphragm suspension flexure mount B107*a*, B107*b* consists of multiple substantially thing and planar elements or "spokes" B215*a-d*, B217*a-d*, radially spaced and extending from the central pin aperture B220*a*, B220*b*. The spokes B215*a-d*, B217*a-d* may be substantially uniformly spaced about the central aperture/axis. In some embodiments each mount may comprise a single spoke. At an end of each spokes B215*a-d*, B217*a-d*, distal from the central pin aperture B220*a*, B220*b*, is a flexure head B216*a-d*, B218*a-d*. Each flexure head B216*a-d*, B218*a-d* is configured to couple over corresponding formations B224*a-d* in an inner recess of a corresponding mounting block B109*a*, B109*b* of the base structure B102. During assembly, the spokes of each mount may be pre-stretched to enable the respective flexure heads B216*a-d*, B218*a-d* to couple over the formations for fixedly retaining the flexure mounts B107*a*, B107*b* within the respective mounting blocks B109*a*, B109*b*. During operation, the four spokes B115*a-d*, B117*a-d* flex in tension and in bending to allow a sufficiently low frequency of the fundamental rotational mode of operation.

The diaphragm suspension of this embodiment may be replaced with any other diaphragm suspension herein described or modified as per any other diaphragm suspension modification or variation herein described.

Stoppers

Figure 7G:
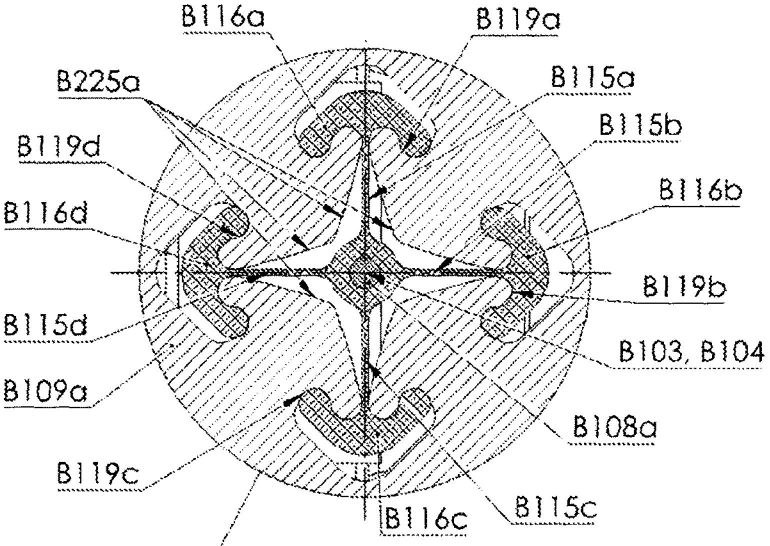
Figure 7F:
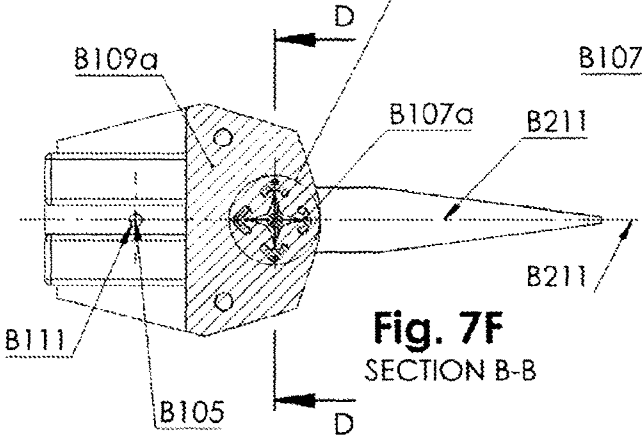
Figure 7H:
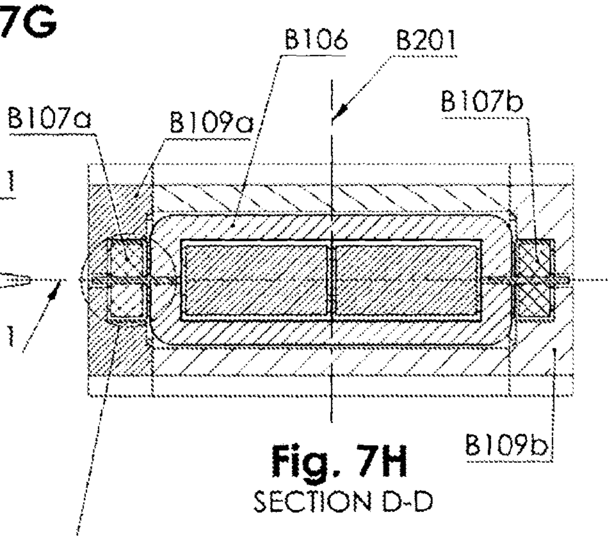
Figure 7I:
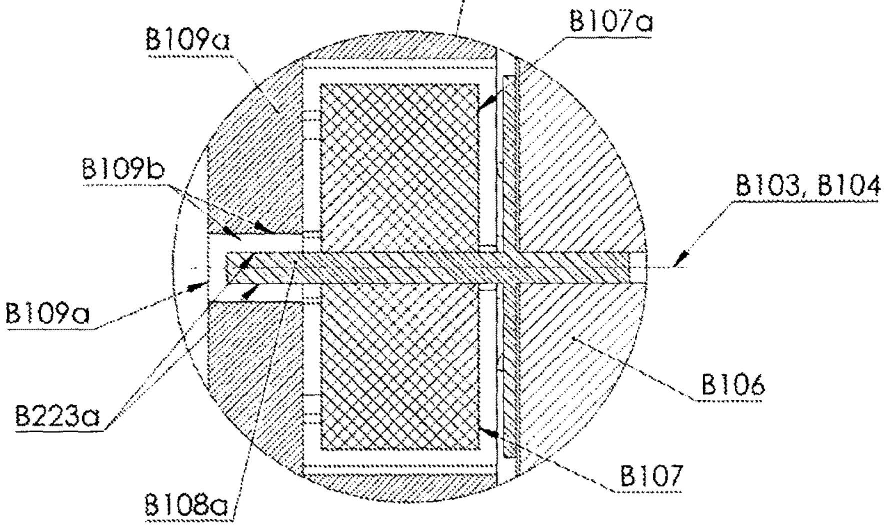

Referring to FIGS. 7G and 7I, the audio transducer B100 further comprises stoppers B223*a*, B223*b* to help prevent excessive movement of the diaphragm B101 with respect to the base structure B102. Each diaphragm suspension mounting block B109*a*, B109*b* has an inner periphery that is configured to limit the translational and rotational motion of the respective mounts B107*a*, B107*b*. As shown in FIG. 7I, the outermost aperture of each mounting block B109*a*, B109*b* comprises of an inner periphery that forms an abutment surface for the respective pin B108*a*, B108*b* to abut against should the diaphragm B101 translate or otherwise displace significantly relative to the transducer base structure. In addition, as shown in FIG. 7G, the inner periphery of each mounting block B109*a*, B109*b* comprises stopper surfaces B225*a*, B225*b* for limiting displacement of the flexure plates accordingly. This may help to prevent damage occurring to the relatively fragile diaphragm, for example, in the case of a drop. Stopper surfaces B225*a*, B225*b* may have a profile that causes the faces of respective flexure mounts B115*a-d*, B117*a-d* to contact progressively, thereby avoiding or at least minimising generation of unwanted noise that might otherwise occur.

Diaphragm

Figure 9A:
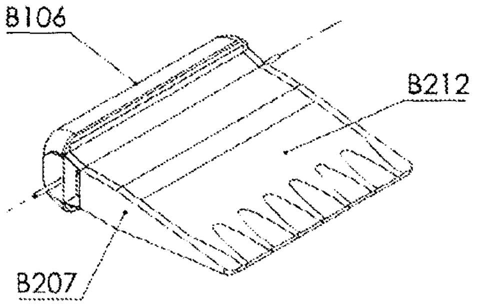
Figure 9B:
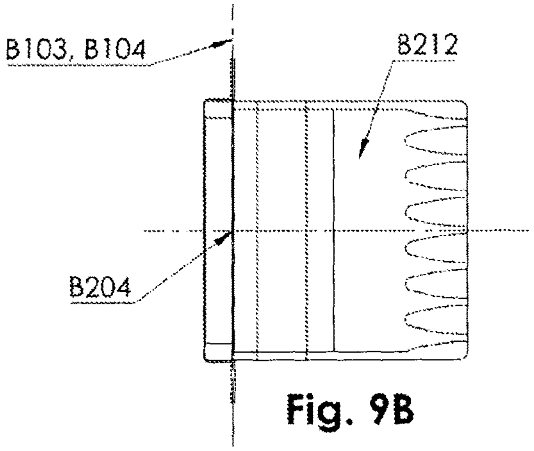
Figure 9C:
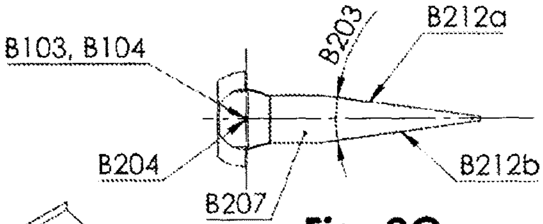
Figure 9D:
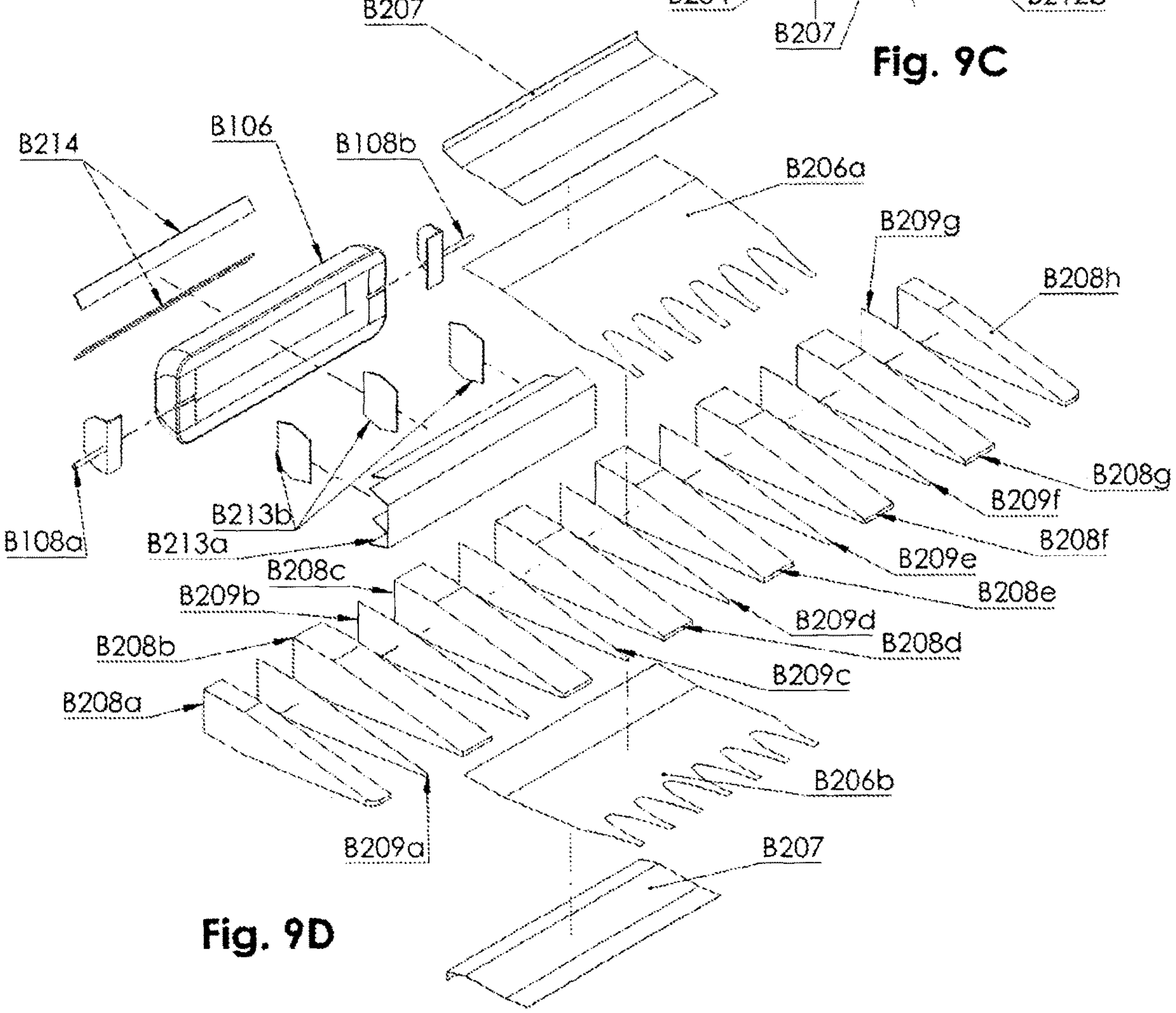

Referring to FIG. 9C, the diaphragm body B207 is shaped to have a varying thickness along the length of the body. Similar to diaphragm A101, the diaphragm B101 also has a first region of relatively greater thickness at one end of the diaphragm (near the base B210) and a second region of relatively lower thickness at the other end of the diaphragm (distal from the base B210). At the second region the diaphragm body B207 tapers at an angle B203 at the tip of the diaphragm, which may be approximately 15 degrees, between the major faces B212 of the diaphragm, such that the thickness tapers along the length in this region. At the intersection between the first and second regions, approximately midway between the diaphragm tip and the base region B210 of the diaphragm, this angle changes, and the major faces become substantially parallel such that the thickness remains substantially constant. In the first region, the angle may be tapered such that the diaphragm reduces in thickness towards the base end. The taper angle of the first region may be lower than that of the second region.

The central region where the first and second regions intersect may be located at approximately 15-50% of a longitudinal length between the base end and the terminal end of the diaphragm. The central region may be located at approximately 20% of the longitudinal length between the base end and the terminal end of the diaphragm.

In this embodiments, an absolute value of an angle of a radiating surface of the diaphragm relative to a coronal plane of the diaphragm, between the central region and base end, is less than an absolute value of an angle of the radiating surface between the central region and the terminal end.

Similar to the first embodiment, the profile of each major face of the diaphragm in this embodiment is substantially convex along the length of the diaphragm, and/or along a sagittal cross-section of the diaphragm.

The diaphragm B101 comprises a diaphragm base structure B213*a*, B213*b* that is rigidly coupled to the diaphragm body B207. The base structure B213*a*, B213*b* may comprise a consist of a pair of substantially planar plates B213*a* and B213*b* that are rigidly coupled to the normal stress reinforcement on the major faces B212*a*, B212*b* of the diaphragm B101. Each plate is sufficiently straight and/or well-supported and/or thick that bending deformation is minimal. Each plate B213*a*, B213*b* is formed from a rigid material having a Young's Modulus of at least approximately 8 GPa, or at least approximately 20 GPa. The diaphragm base structure may act, structurally, as a rigid shaft.

In some embodiments the diaphragm base structure may be rigidly coupled to the diaphragm body B207 exclusively via components having at least reasonably high Young's Modulus, preferably more than approximately 8 GPa, and most preferably more than approximately GPa. Adhesive may be used to couple the components together.

The diaphragm base structure may be located at or proximal to the axis of rotation B103. The diaphragm base structure B213*a*, B213*b* may constitute the majority of the mass of the diaphragm B101. In this embodiment, the diaphragm base structure B213*a*, B213*b* may comprise or rigidly connect the diaphragm body B207 to the diaphragm suspension. The diaphragm B101 is immediately, rigidly connected to the diaphragm suspension via the diaphragm base structure B213*a*, B213*b*.

The diaphragm base structure comprises a diaphragm-side transducing component B106 of the transducing mechanism. In this embodiment, the diaphragm base structure B213*a*, B213*b* rigidly connects the diaphragm body B207 to the diaphragm-side transducing component B106 of the transducing mechanism.

The diaphragm of this embodiment may be replaced with any other diaphragm herein described or modified as per any other diaphragm modification or variation herein described.

Transducing Mechanism

Figure 7J:
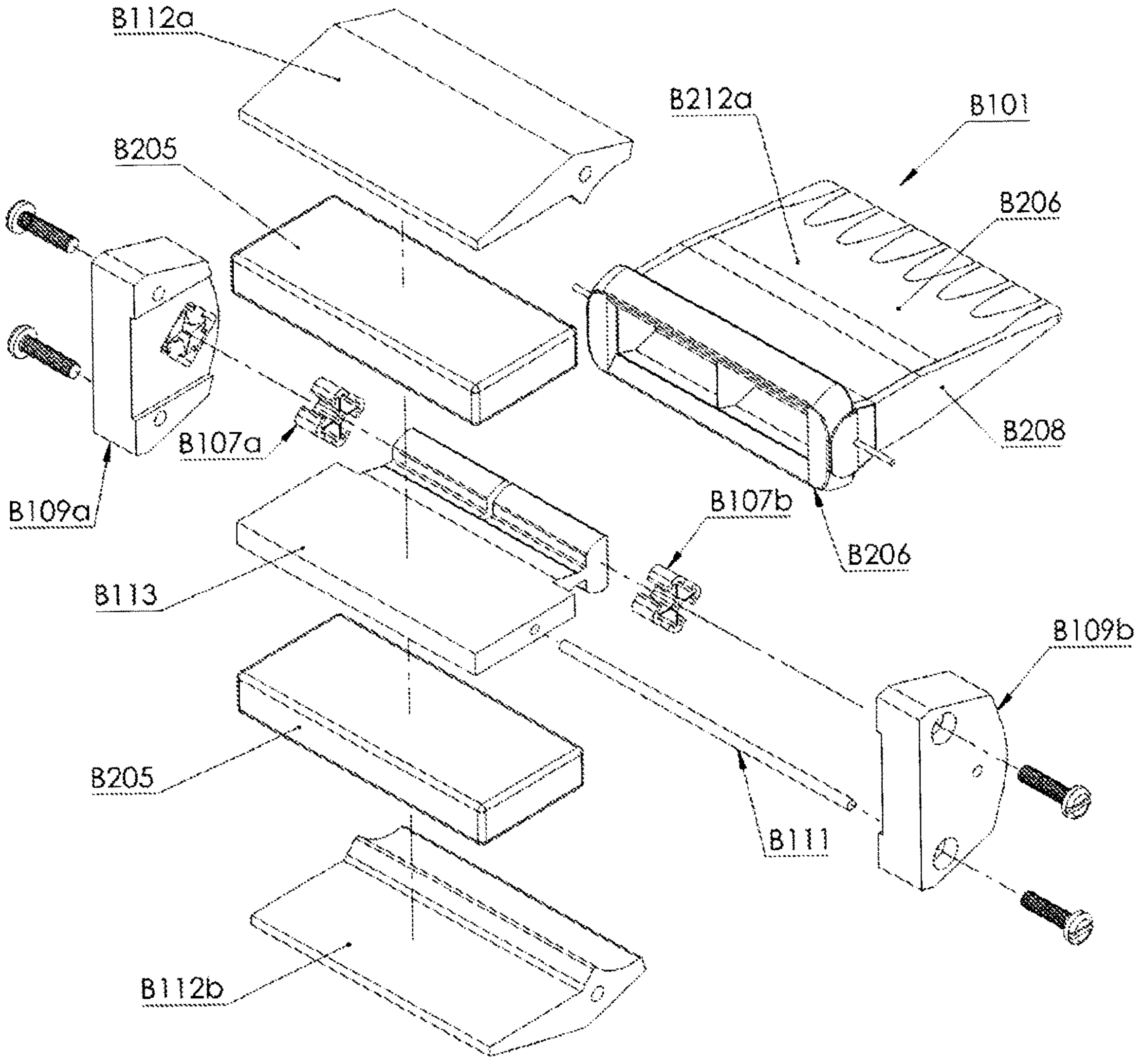
Figure 8A:
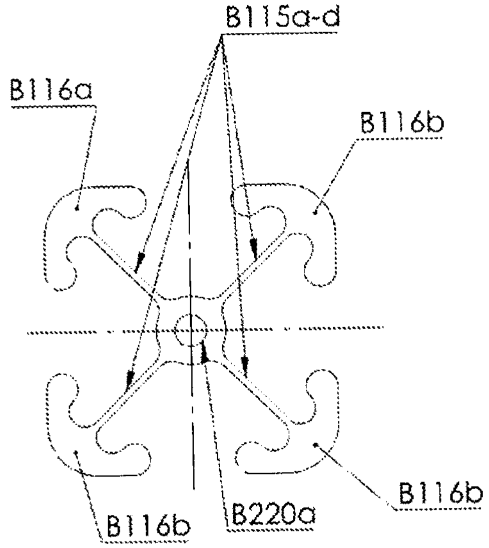
Figure 8B:
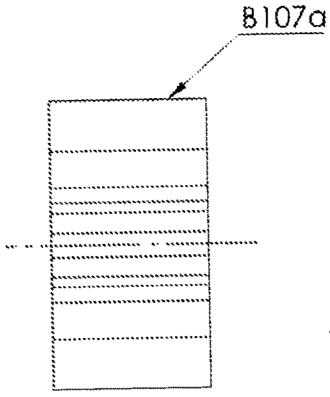
Figure 8C:
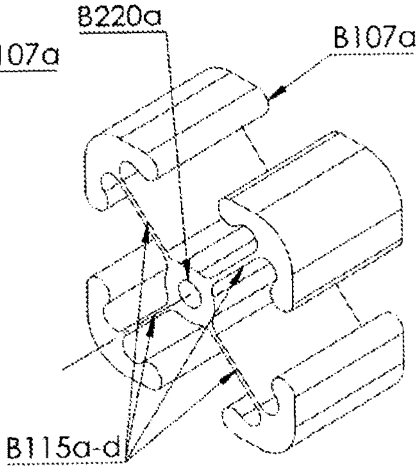

In this embodiment, the electromagnetic mechanism comprises a magnet structure that is part of the transducer base structure B102 and a conductive coil B106 that is rigidly coupled about a diaphragm base structure B213*a*, B213*b*. The magnet structure is rigidly coupled to the transducer base structure. As shown in FIG. 7J the magnet structure comprises permanent magnets B20, an inner pole piece B113 and outer pole pieces B112*a*, B112*b*. The inner pole piece B113 is coupled between the permanent magnets B205, and outer pole pieces B112*a*, B112*b* are coupled at outer sides of the permanent magnets B205. In this manner, at least one pair of opposing magnetic poles extending substantially continuously along the length of the magnet. There are two pairs of opposing magnetic poles one each side of the permanent magnet in this embodiment. In some embodiments, the magnet may only consist of a single pair of magnetic poles. The magnetic poles are located on either side of the axis of rotation B103. A magnetic flux is generated between the inner pole piece B113 and each outer pole piece B112*a*, B112*b*. The conductive coil B106 locates against the edge of the diaphragm body B207 and is configured to have a first long side B106*a* that locates within the magnetic flux between the inner pole piece B113 and the first outer pole piece B112*a*, and a second long side B106*b* that locates within the magnetic flux of the inner pole piece B113 and the second outer pole piece B112*b*, in situ. Coil stiffeners B214 may also be provided. The suspensions pins B108*a,b* extend laterally from either short side of the conductive coil B106.

In this embodiment, the coil B106 is the diaphragm-side transducing component and similar to the first embodiment, this component preferably extends along or substantially proximal to the axis of rotation B103. For example, the coil B106 may overlap with the diaphragm along the axis of rotation. The coil B106 also extend substantially parallel to the axis of rotation B103. The coil also overlaps with the diaphragm along the centre of mass B104 of the diaphragm structure (including the coil B106 and diaphragm B101).

The audio transducer B100 may be housed within a speaker enclosure, similar to that of speaker A300 via a decoupling mounting system similar to that described for the first embodiment. Furthermore, the diaphragm suspension system of transducer B100 may be utilised in transducer A100 and vice versa.

The transducing mechanism of this embodiment may be replaced with any other transducing mechanism herein described or modified as per any other transducing mechanism modification or variation herein described.

3. Third Audio Transducer Embodiment

Figures 12A, 12B, 12C, 12D, 12E:
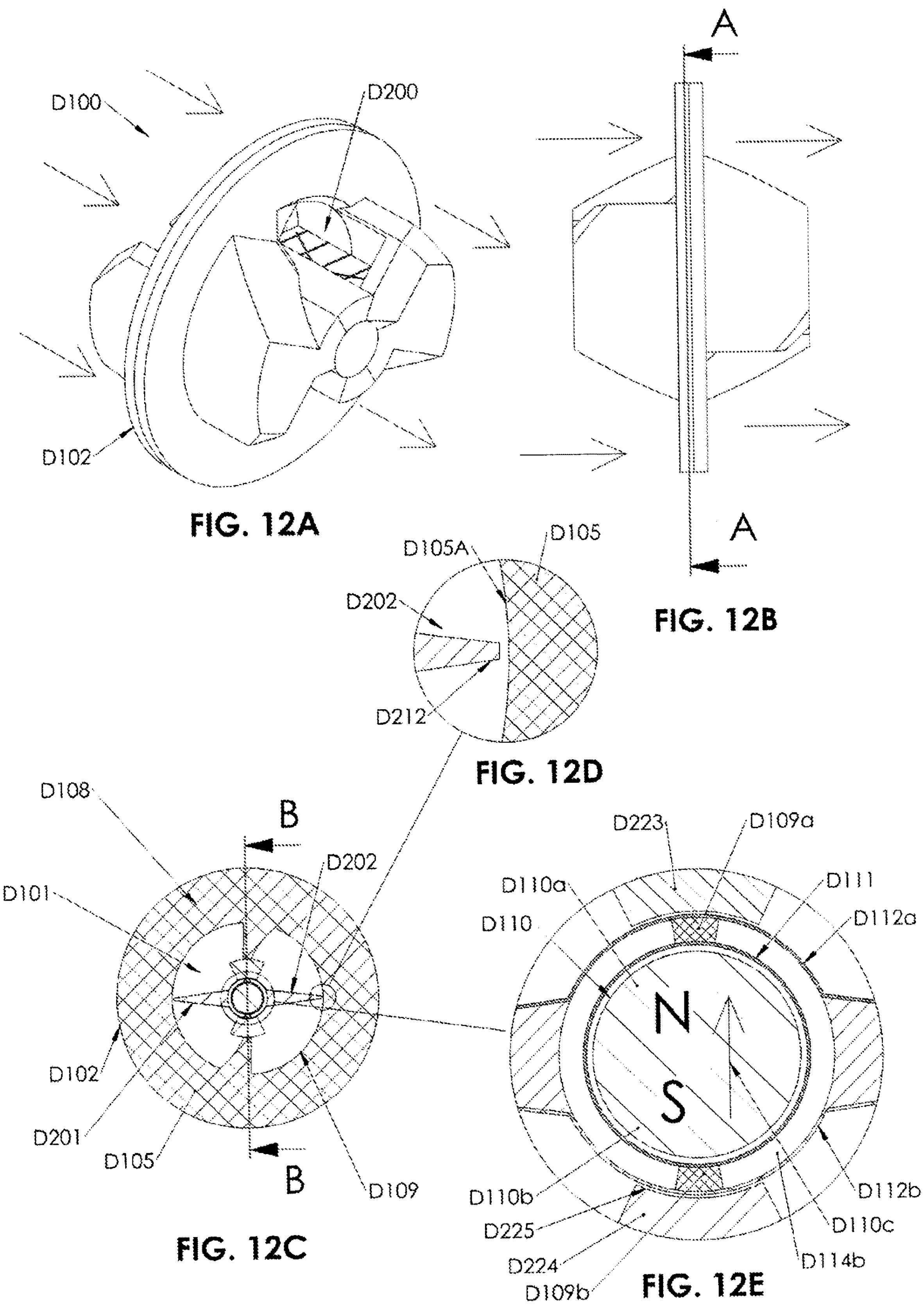
Figure 12F:
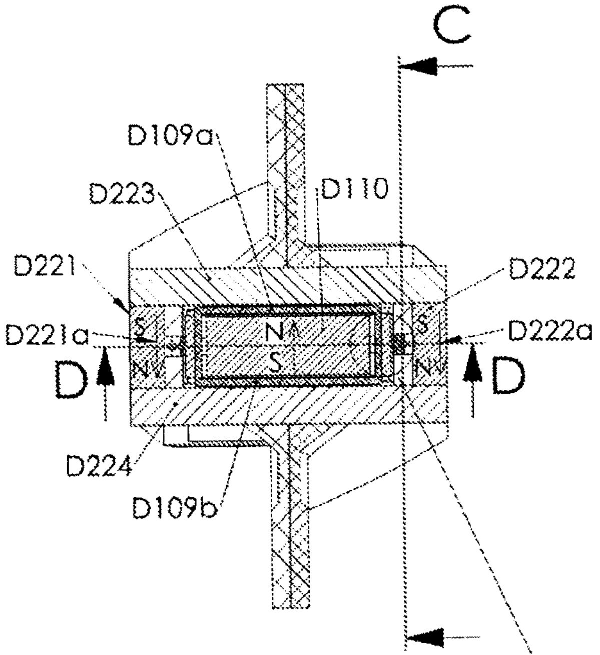
FIG. 12F is a cross-sectional side view (section B-B) of the audio transducer.
Figure 12H:
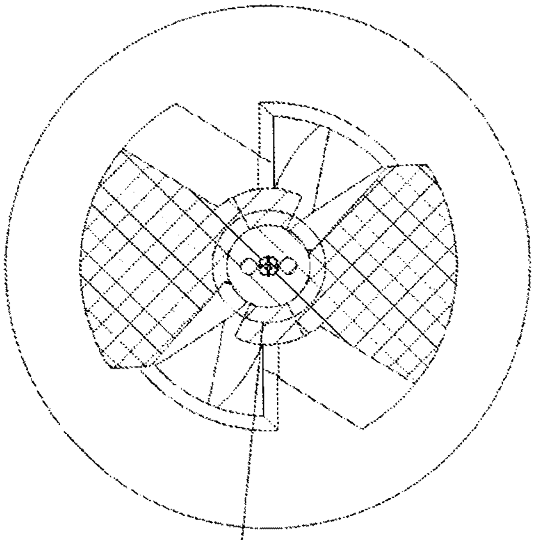
FIG. 12H is a cross-sectional view (section C-C) along the hinge of the transducer.
Figure 12G:
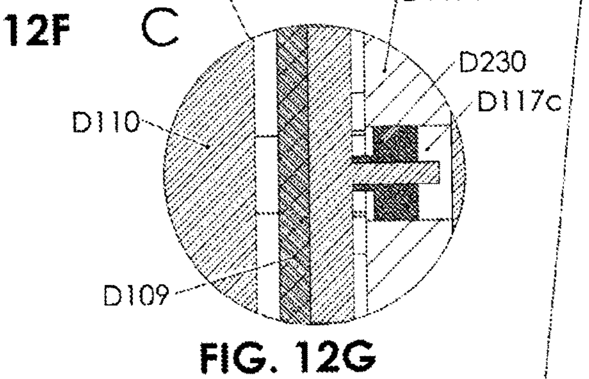
FIG. 12G is a close-up cross-sectional view of a hinge region of the audio transducer.
Figure 12I:
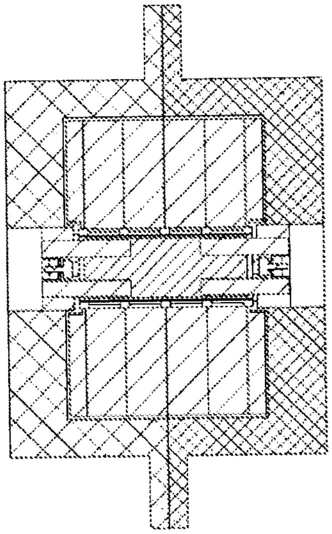
FIG. 12I is a cross-section view (section D-D) across the centre of the audio transducer.
Figure 12J:
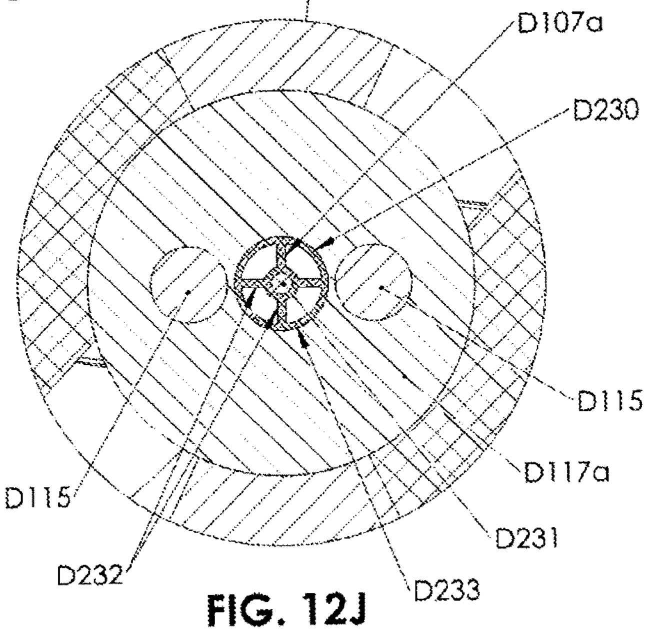
FIG. 12J is a close up view of one side of the hinge.
Figure 12K:
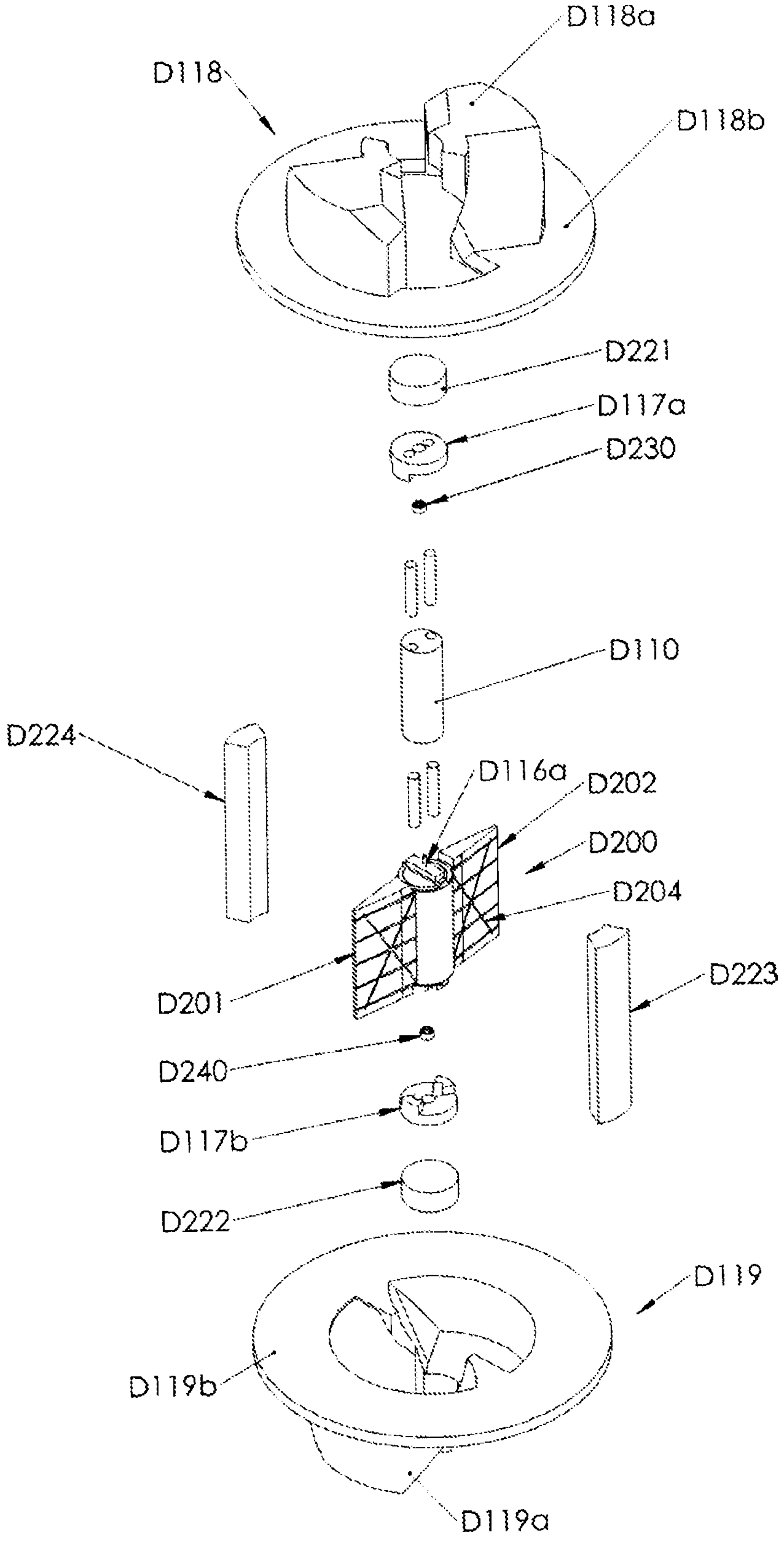
FIG. 12K is an exploded perspective view of the audio transducer.
Figure 12P:
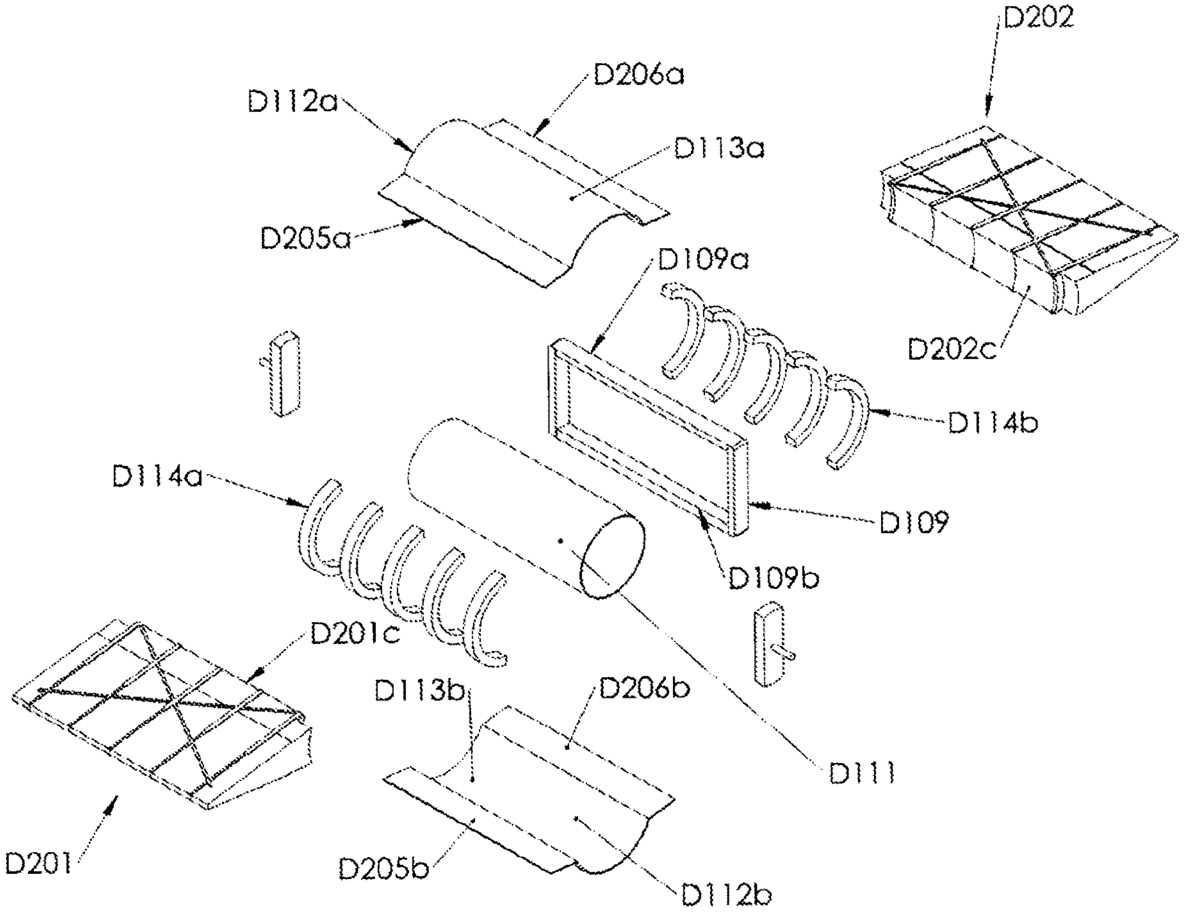

Referring to FIGS. 12A-12P, a third audio transducer embodiment D100 is shown comprising of a substantially rigid diaphragm structure D200 mounted to a substantially rigid base structure D102 via a compliant diaphragm suspension. The diaphragm suspension rotatably mounts the diaphragm structure D200 relative to the base structure D102, such that the diaphragm structure D200 is configured to rotatably oscillate about an axis of rotation D103, during operation.

In this embodiment, the diaphragm suspension is configured such that the axis of rotation D103 is substantially coaxial with the node axis D104 of the diaphragm structure D200. The node axis may be predetermined, or may be determined during assembly of the transducer D100 as per the methods described in relation to the first embodiment, for example. In this example, the node axis and axis of rotation D103 are substantially coaxial with a centre of mass axis of the diaphragm structure D200. In some embodiments, the diaphragm suspension may be configured such that the axis of rotation D103 may be in a plane that is: substantially orthogonal to the coronal plane of at least one diaphragm of the structure D200 and that contains the node axis of the diaphragm structure D200 as described in relation to the first embodiment, for example. In this embodiment, the transducer D100 comprises an electromagnetic transducing mechanism comprising a coil assembly comprising a coil D109 supported by inner and outer formers D111, D112*a* and D112*b*, and a magnet assembly including an inner magnet D110 and outer magnets and pole pieces D221-D224. The coil assembly is rigidly coupled to and forms a part of the diaphragm structure D200 and the magnet assembly is coupled to and forms part of the transducer base structure D102. In some embodiments, the magnet assembly may be coupled to and forms part of the diaphragm structure D200 and the coil assembly may be coupled to and forms part of the transducer base structure D102. In some embodiments, the transducing mechanism may comprise a piezoelectric, electrostatic or other suitable mechanism known in the art.

Diaphragm Structure

Referring to FIGS. 12L-12P, the audio transducer D100 of this embodiment comprises a multiple diaphragm construction. The diaphragm structure D200 comprises a first diaphragm D201 and a second diaphragm D202 extending from a common diaphragm base structure D203. The first and second diaphragms D201 and D202 extend radially about the common axis of rotation D103, and are angled relative to one another. In this embodiment, the first and second diaphragms D201 and D202 extend in opposing directions such that they are approximately 180 degrees apart. The diaphragms D201 and D202 are uniformly spaced about the axis of rotation D103. In some embodiments, the diaphragm structure D200 may comprise a single diaphragm, or two or more diaphragms extending radially at varying angles that may or may not be uniformly spaced about the axis of rotation D103.

Each diaphragm may comprise a construction as per any of the diaphragm embodiments or variations described herein in relation to the first or second embodiment, for example. In the illustrated example, each diaphragm D201, D202 comprises a substantially rigid construction having a diaphragm body D207, D208 formed from a substantially rigid material, such as a Polystyrene foam material. The diaphragm body D207, D208 is substantially thick as previously described in relation to the first embodiment, for example, and comprises a varying thickness. In this example, each body D207, D208 comprises a tapered thickness that reduces from a base end adjacent the diaphragm base structure D203 toward a terminal end D211, D212 distal from the diaphragm base D203. The taper angle is substantially uniform along the length of each diaphragm body D207, D208. In some embodiments the thickness profile may be substantially uniform along the length for the diaphragm D201, D202 or alternatively, each diaphragm D201, D202 may comprise a varying thickness profile similar to any of those described in relation to the first or second embodiments, for example.

Each diaphragm D201, D202 further comprises normal stress reinforcement D204, D205 coupled on each major, radiating face D201*a/b*, D202*a/b* of the diaphragm D201, D202 for resisting tension-compression forces experienced by the diaphragm body D207, D208 during operation. The normal stress reinforcement D204, D205 for each diaphragm D201, D202 may be formed from substantially rigid materials and comprise a varying mass profile similar to those described in relation to the first and second embodiments. In this example, each normal stress reinforcement D204, D205 comprise a plurality of struts. The struts reduce in mass in regions distal from the diaphragm base D203 and proximal to the terminal end D211, D212. For example, a thickness and/or width of each strut may reduce in thickness in regions distal from the diaphragm base D203. Additional reinforcement plates D205, D206 may be provided over the major, radiating faces D201*a/b*, D202*a/b* of each diaphragm D201, D202 at the base end D203.

In some embodiments, the diaphragm structure D200 may further comprise inner stress reinforcement embedded within each diaphragm body D207, D208. The inner stress reinforcement may be similar to that described in relation to the first embodiment, for example. The diaphragm structure D200 comprises a diaphragm base structure D203 located between the diaphragms D201 and D202 and extending about and along the axis of rotation D103. A diaphragm-side transducing component D109 is rigidly coupled the diaphragm base structure D203. In this embodiment, the diaphragm-side transducing component is the coil D109. In some embodiments, it may be the magnet D110 or magnet assembly. The coil D109 is rigidly coupled to and extends about an inner coil former D111. The inner coil former D111 is substantially hollow for accommodating an inner magnet D110 of the transducing mechanism therein, as shown in FIG. 12E. The former D111 may be formed from aluminium or other suitable material with weak ferromagnetism. The coil D109 and former D111 locate about the axis of rotation D103 of the diaphragm structure D200 to provide or transfer a substantially pure torque from or to the transducing mechanism during operation.

In this embodiment, the diaphragm base structure D203 further comprises a first outer former component D112*a* coupled to the first and second diaphragms D201 and D202 and a second former component D112*b* coupled to the first and second diaphragms D201 and D202. The first outer former component D112*a* comprise a central arcuate plate D113*a* and a pair of substantially planar plates D205*a* and D206*a* extending from either side of the arcuate plate D113*a*. The arcuate plate D113*a* rigidly couples over one long side D109*a* of the coil D109. The planar plates D205*a* and D206*a* rigidly couple first major faces D201*a*, D202*a* of the first and second diaphragms D201 and D202 via the respective outer reinforcements D203 and D204. In this manner, the plates D205*a* and D206*a* form part of the outer normal stress reinforcement and may extend partially along the respective first major faces from the base end D203 to strengthen the base of each diaphragm D201, D202. The second outer former component D112*b* comprise a central arcuate plate D113*b* and a pair of substantially planar plates D205*b* and D206*b* extending from either side of the arcuate plate D113*b*. The arcuate plate D113*b* rigidly couples over one long side D109*b* of the coil D109, opposing side D109*a*.

The planar plates D205*b* and D206*b* rigidly couple second major faces D201*b*, D202*b*, of the first and second diaphragms D201 and D202 via the respective outer reinforcements D203 and D204. In this manner, the plates D205*b* and D206*b* form part of the outer normal stress reinforcement and may extend partially along the respective second major faces D201*b*, D202*b* from the base end to strengthen the base of each diaphragm D201, D202. The outer formers D112*a* and D112*b* are formed from a substantially rigid material, such as aluminium or other metal material, to reinforce and rigidly connect the diaphragms D201 and D202.

In this embodiment, a first plurality of arcuate stiffeners D114*a* are distributed along a length of the coil D109 on one side of the coil D109, and a second plurality of arcuate stiffeners D114*b* are distributed along a length of the coil D109 on an opposing side of the coil D109. The stiffeners are rigidly coupled about the inner former D111 along the length of the former D110. The first plurality of stiffeners D114*a* rigidly couple between a first long side D109*a* of coil D109 and a second long side D109*b* of coil D109. The second plurality of stiffeners D114*b* rigidly couple between the first long side D109*a* of coil D109 and the second long side D109*b* of coil D109. Diaphragm 201 rigidly couples to an outer side of stiffeners D114*a* via corresponding concave surface D201*c* at the base end D203, and diaphragm D202 rigidly couples to an outer side of stiffeners D114*b* via corresponding concave surface D202*c* at base end D203. The stiffeners D114*a* and D114*b* are configured to rigidize the connection between the diaphragms D201, d202 and the coil D109 and are preferably formed from a substantially rigid material, such as carbon fibre.

As described in relation to the first embodiment, and as shown in FIG. 12D, a terminal end D211, D212 of each diaphragm D201, D202 may be partially or entirely free from physical connection with an interior D105*a* of a surrounding structure D105 directly adjacent the end D211, D212 of the diaphragm D201, D202. A fluid gap, such as an air gap, may separate the terminal end D211, D212 of each diaphragm D201, D202 with the interior of the surrounding structure D105.

The diaphragm structure of this embodiment may be replaced with any other diaphragm structure herein described or modified as per any other diaphragm structure modification or variation herein described.

Transducer Base Structure

Referring to FIGS. 12A-12E and 12K, in this embodiment the transducer base structure D102 is configured to remain relatively stationary during operation and forms a surrounding structure D105 for accommodating the diaphragm structure D200 therein. The transducer base structure D102 comprises a plurality of inner cavities D108 and D109 that are shaped to accommodate the diaphragms D201 and D202, and enable rotational movement of the diaphragms D201 and D202 within the surround D105 during operation. Each cavity D108, D109 is shaped and sized to complement the envelope of the diaphragm periphery during operation and therefore comprises a substantially arcuate profile along a section opposing the terminal end 211, 212 of the respective diaphragm D201, D202. As shown in FIG. 12I, each cavity D108, D109 may be sized to maintain a close, but physically separated fit with the peripheral edges (including terminal ends 211, 212) of each diaphragm D201, D202 extending between the major faces D201*a/b*, D202*a/b*.

The transducer base structure D102 comprises a pair of surround parts D118 and D119 which may be rigidly coupled together to assemble the transducer. In combination, the parts D118 and D119 form the pair of cavities D108 and D109 or accommodating the diaphragms D201 and D202. Each part D118, D119 comprises a main body D118*a*, D119*a* and an annular flange D118*b*, D119*b* extending about the main body D118*a*, D119*a*. The parts D118, D119 may be coupled at the annular flanges D118 and D119*b*. As shown in FIG. 12A, each main body D118*a*, D119*a* comprises a pair of openings or sound ports D118*c/d*, D119*c/d* on opposite sides of axis of rotation D103 for enabling the propagation of sound pressure to or from the radiating, major faces D201*a/b*, D202*a/b* of the respective diaphragm D201, D202 during operation.

The transducer base structure D102 may be coupled to a housing or a baffle via the flanges D118*b*, D119*b*. The base structure D102 may be rigidly coupled to the baffle or housing or may be coupled via a suspension system, such as a decoupling mounting system as described in relation to the first embodiment and its potential variations.

The components of the magnet assembly including inner magnet D110 and outer pole pieces D221-D224 are rigidly coupled to an interior of transducer base structure parts D118, D119 as will be described in further detail below.

The transducer base structure of this embodiment may be replaced with any other diaphragm suspension herein described or modified as per any other transducer base structure modification or variation herein described.

Diaphragm Suspension

Referring to FIGS. 12F-J and 12P, the diaphragm structure D200 is coupled to the transducer base structure D102 via a diaphragm suspension. The diaphragm suspension comprises a pair of flexible mounts D230 and D240, formed from a substantially soft material, such as a polyurethane elastomer. In some embodiments, the suspension may comprise a single or more than three flexible mounts. Each flexible mounts D230 and D240 may take on the form of any one of the mounts herein described. In this example, each mount D230, D240 comprises a body having a central base part D231, D241 and plurality of spaced spokes D232, D242 extending radially from the central base part D231, D241 as shown in FIG. 12J. An annular, terminal wall D233, D243 may extend about the central base and connect terminal ends of the spokes 232, 242. One or more cavities 234, 244 extend between the spokes 232, 242. The cavities may be filled with a fluid, such as air, or they may comprise a substantially lower density material relative to the main body of the mount.

The central base part D231, D241 of each mount D230, D240 is configured to rigidly couple the diaphragm structure D200 via corresponding pins D116*a* and D116*b* extending laterally from the diaphragm base structure D203. The pins D116*a* and D116*b* extend from either side of the diaphragm structure D200 and are substantially coaxial with the axis of rotation D103. Each pin D116*a* and D116 may be coupled to a respective short side of coil D109 and extends laterally therefrom. The outer, annular wall D233, D234 of each mount D230, D240 is rigidly coupled to an internal side of the transducer base structure D102 via mounting blocks D117*a*, D117*b*. Each mount D230, D240 may couple a respective part D118, D119 of the transducer base structure D102 via mounting blocks D117*a*, D117*b*. Each mounting block D117*a*, D117*b* comprises a recess or aperture D117*c* for tightly accommodating the corresponding hinge mount D230, D240 as shown in FIG. 12G.

The diaphragm suspension of this embodiment may be replaced with any other diaphragm suspension herein described or modified as per any other diaphragm suspension modification or variation herein described.

Transducing Mechanism

Referring to FIGS. 12E and 12F, the transducing mechanism is an electromagnetic mechanism comprising a magnet assembly including an inner magnet D110, and a pair of outer magnets D221 and D222 coupled via pole pieces D223 and D224. The inner and outer magnets D110, D221 and D222 may be permanent or direct current electromagnets. In this example, permanent magnets are utilised. The inner permanent magnet D110 is located within the hollow interior of the inner former D111 and overlaps with diaphragm structure D200 in the direction of the axis of rotation D103. In this embodiment, the inner magnet D110 comprises a convex outer surface on the diaphragm-side. The magnet D110 also comprises an opposing convex outer surface.

The inner magnet D110 comprises opposing poles D110*a* and D110*b* that extend along the length of the magnet D110. The poles D110*a* and D110*a* are oriented such that a direction D110*c* of primary magnetic field through the magnet D110 is along an axis that is substantially orthogonal to the axis of rotation D103. The direction of primary internal magnetic field D110*c* of the magnet D110 may also be substantially orthogonal to: a coronal plane of at least one or each diaphragm D201, D202 or a coronal plane of the diaphragm structure D200. Alternatively, or in addition the direction D110*c* may be substantially parallel to a sagittal of at least one or each diaphragm D201, D202 or diaphragm structure D200. The inner magnet D110 rigidly couples the interior of the transducer base structure. In this example, opposing ends of the magnet 110 couple the interior of the transducer base structure D102 via the mounting blocks D117*a* and D117*b*. For example, support rods or pins D115 may extend longitudinally from either end of the magnet and rigidly couple corresponding apertures of a corresponding mounting block D117*a*, D117*b*.

The outer magnets D221 and D222 are located on an outer side of the coil D109 at either end of the inner magnet D110. The magnets locate adjacent short ends of the coil D109, between the long ends D109*a* and D109*b*. The outer magnets D221 and D222 have poles oriented such that the direction D221*a*, D222*a* of primary magnetic field in each magnet opposes that of the inner magnet D110. The outer magnets D221 and D222 may be rigidly coupled to one another via opposing pole pieces D223 and D224. Pole pieces D223 and D224 are formed from ferromagnetic material and extend in a direction that is substantially parallel to the inner magnet D110 and to the axis of rotation D103. The outer magnets D221 and D222 and the pole pieces D223 and D224 rigidly couple the interior of the transducer base structure D102 via internal surfaces/formations of surround parts D118 and D119

As shown in FIG. 12E, a fluid gap, such as an air gap D225, exists between each outer pole pieces D223, D224 and the corresponding outer former D112*a*, D112*b* of the coil assembly. Similarly, a fluid gap, such as an air gap exists between the inner magnet D110 and the inner former D111. In this manner, the coil D109 is permitted to rotate relative to the magnet D110 and pole pieces D223, D224 during operation. As shown in FIGS. 12E and 12F, the inner magnet D110 is magnetised in the direction of the arrow "S" to "N" and magnetic flux travels in this direction through the coil long side D109*a* and into the first pole piece D223. The pole piece D223 directs the flux in both lateral directions towards each of the two outer magnets D221*a* and D222*a*. Each outer magnet is magnetised in the opposite direction to the inner magnet D110, and so flux travels from the pole piece D223, through the side magnets in the direction of the arrow "S" to "N" in FIG. 12 F, and into the second pole piece D224. This pole piece directs the flux inwards in both directions, away from both outer magnets D221*a* and D222*a* towards its centre. The magnetic flux circuit is completed when flux passes from the second pole piece D224, through coil long side D109*b* and into the inner magnet D110. The audio signal is directed through the coil as alternating current. As the two long sides of the coil D109*a* and D109*b*, pass through the magnetic flux, a corresponding torque is created which rotates the diaphragm back and forth about its axis of rotation D103.

4. Fourth Embodiment Transducer

Figure 13A:
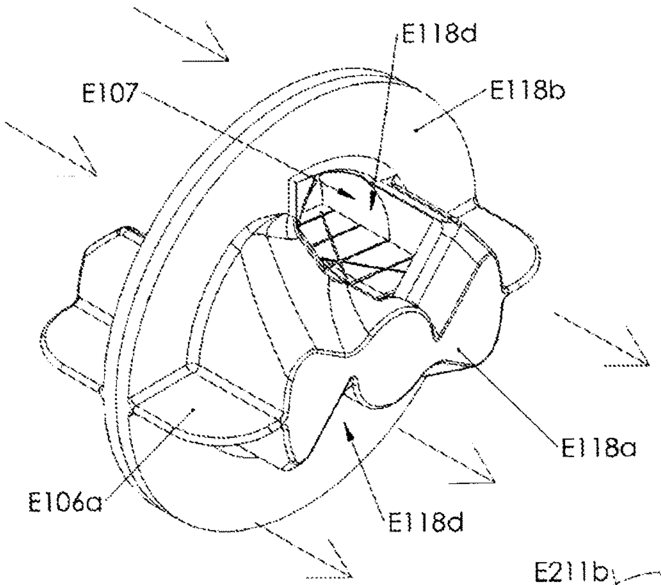
Figure 13B:
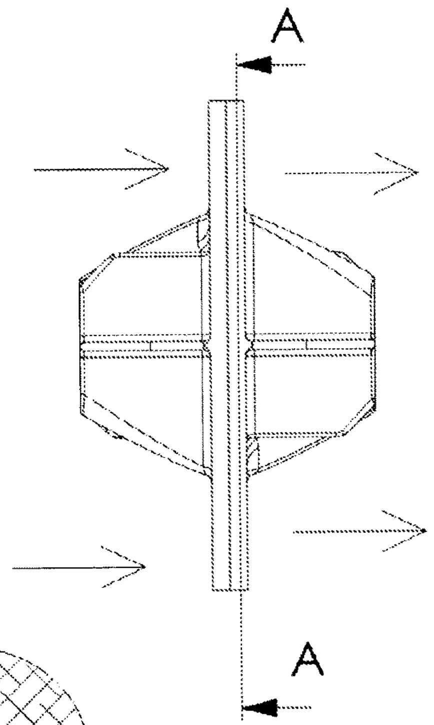
FIG. 13B is a side view of the audio transducer.
Figure 13D:
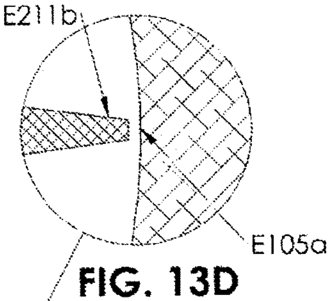
FIG. 13D is a close-up cross-section view of an edge of a diaphragm of the audio transducer.
Figure 13C:
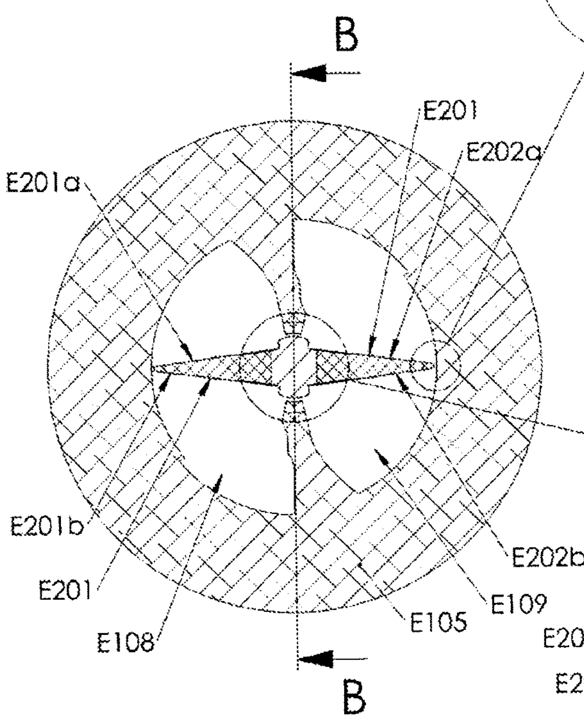
FIG. 13C is a side view (section A-A) of the audio transducer.
Figure 13E:
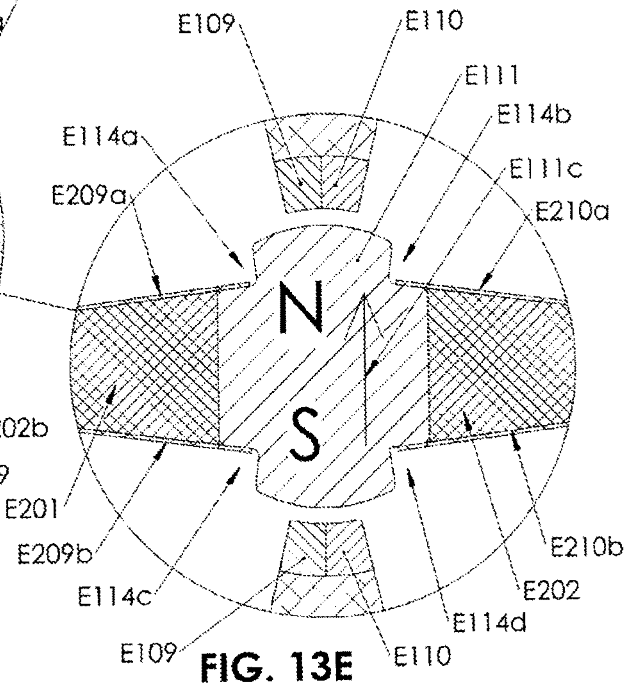
FIG. 13E is a close-up cross-section of a transducing mechanism of the audio transducer.
Figure 13F:
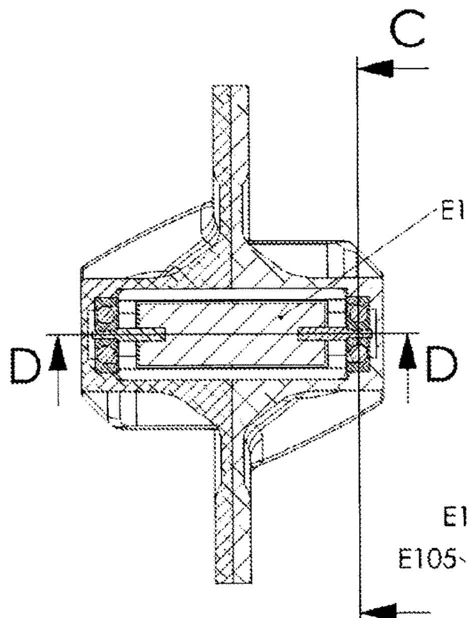
FIG. 13F is a cross-sectional side view (section B-B) of the audio transducer.
Figure 13H:
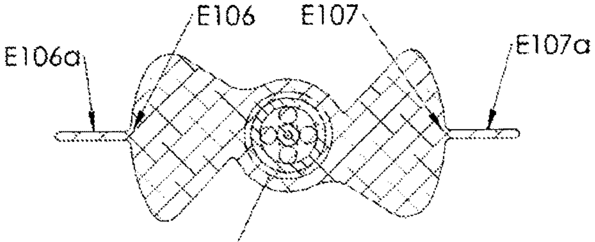
FIG. 13H is a cross-sectional view (section C-C) along the hinge of the transducer.
Figure 13G:
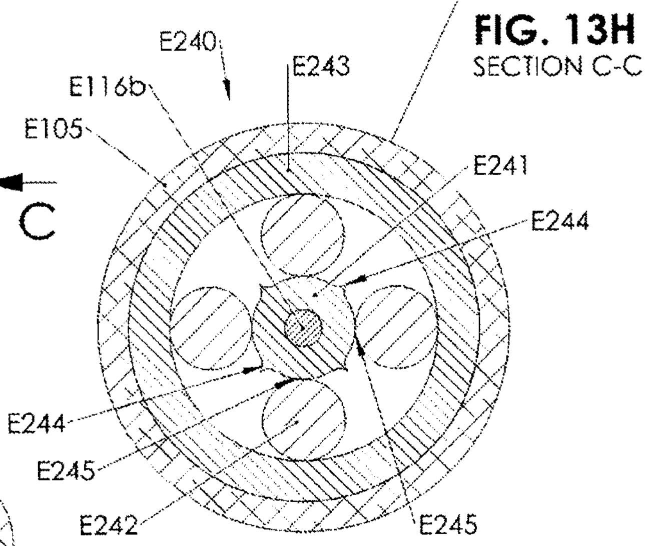
FIG. 13G is a close-up cross-sectional view of a hinge region of the audio transducer.
Figure 13I:
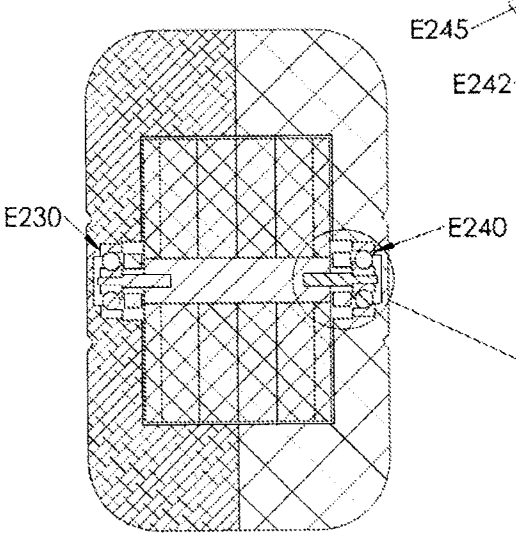
FIG. 13I is a cross-section view (section D-D) across the centre of the audio transducer.
Figure 13J:
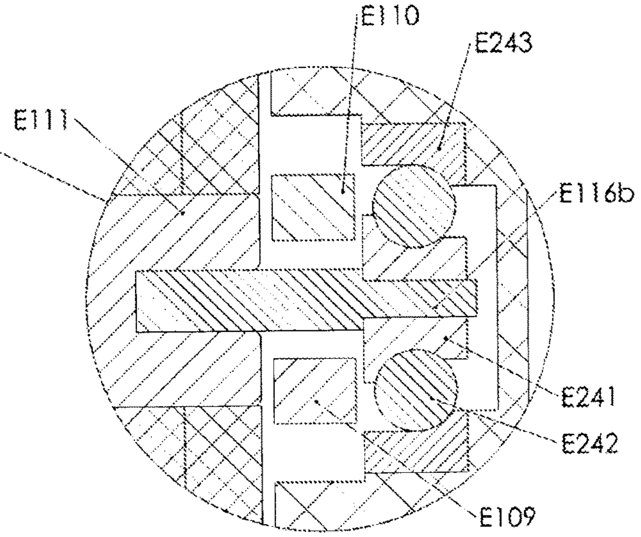
FIG. 13J is a close up view of one side of the hinge.
Figure 13K:
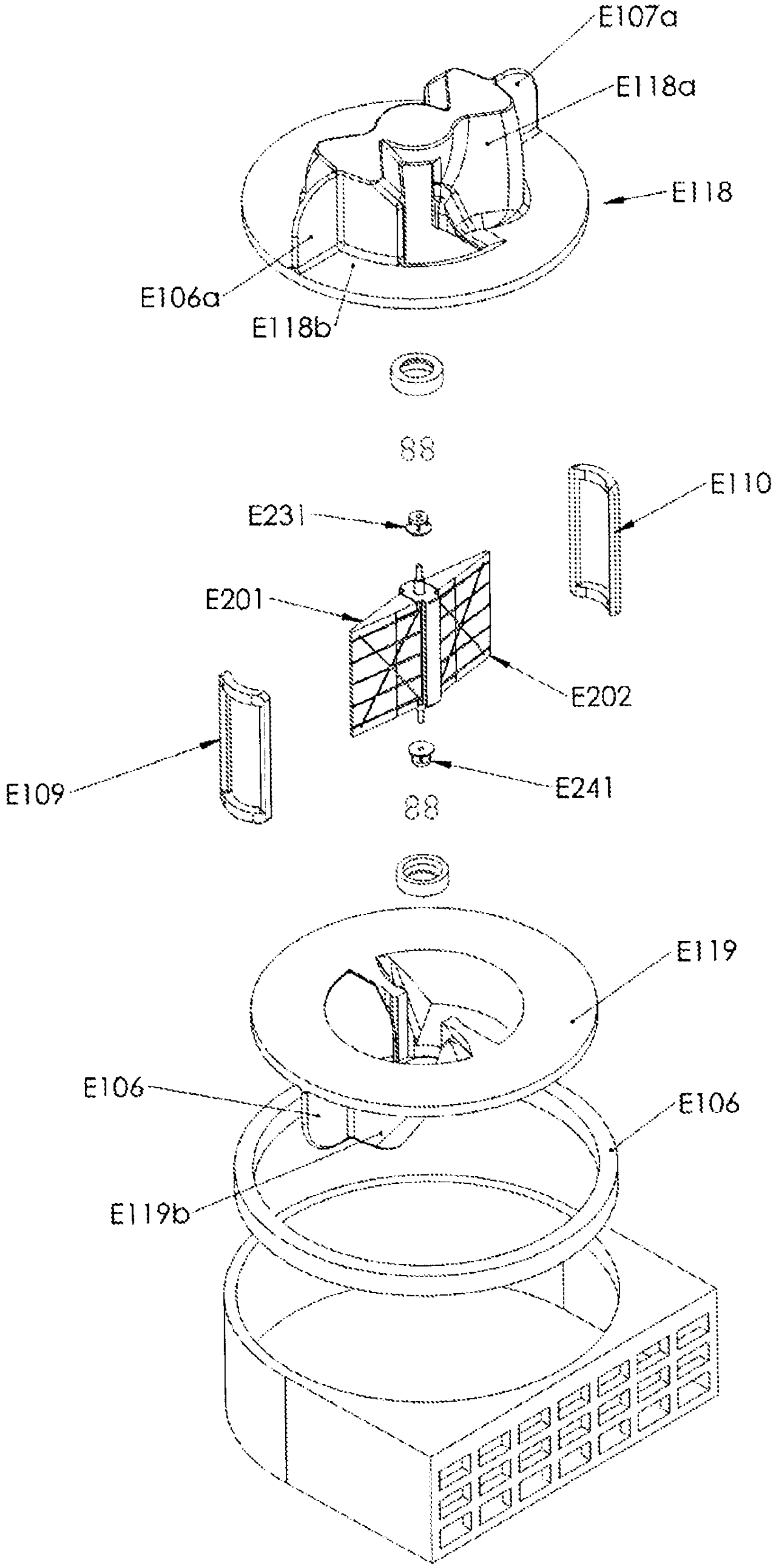
FIG. 13K is an exploded perspective view of the audio transducer.
Figure 13L:
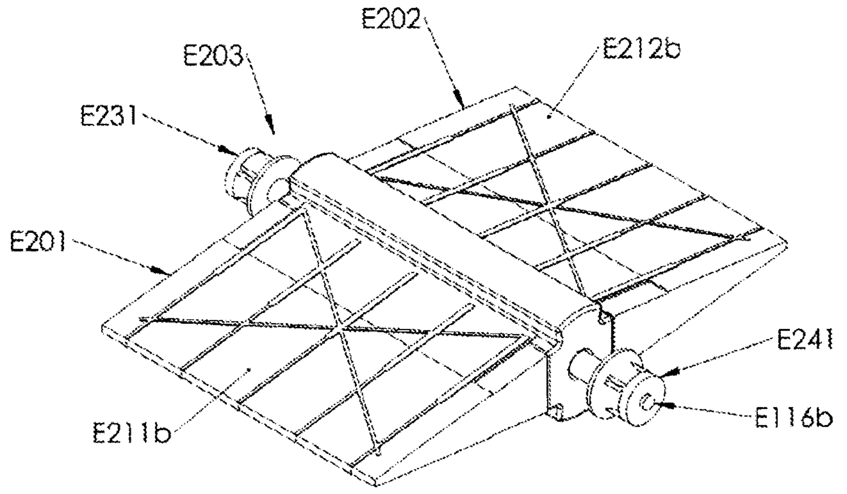
FIG. 13L is a perspective view of a diaphragm structure of the audio transducer.
Figure 13M:
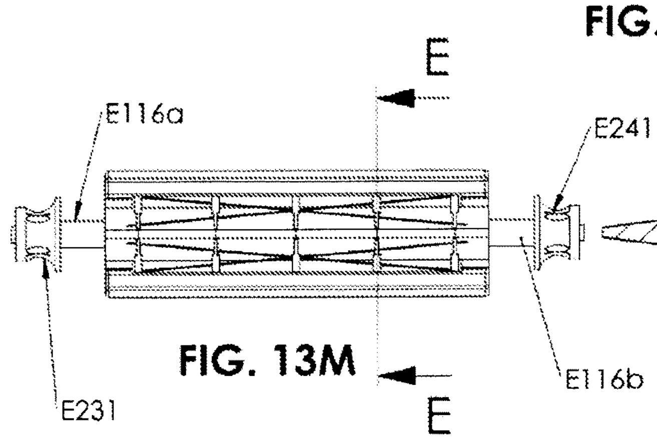
FIG. 13M is a front view of the diaphragm structure.
Figure 13N:
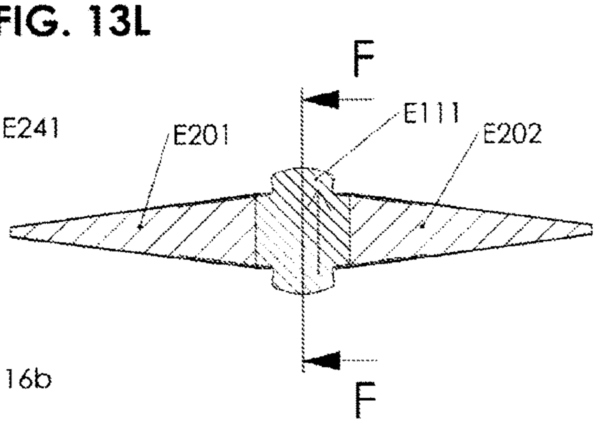
FIG. 13N is a cross-sectional view (section E-E) across the diaphragm structure.
Figure 13O:
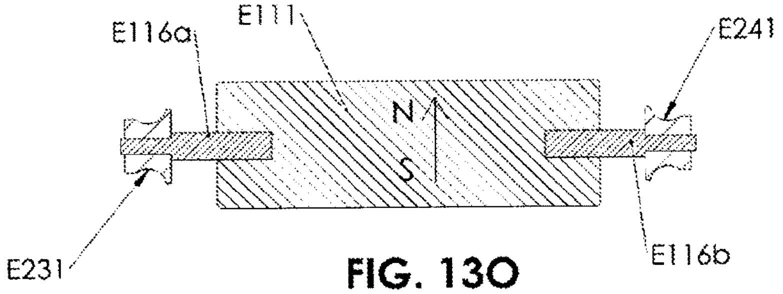
FIG. 13O is a cross-sectional view (section F-F) across the centre of the diaphragm structure.
Figure 13P:
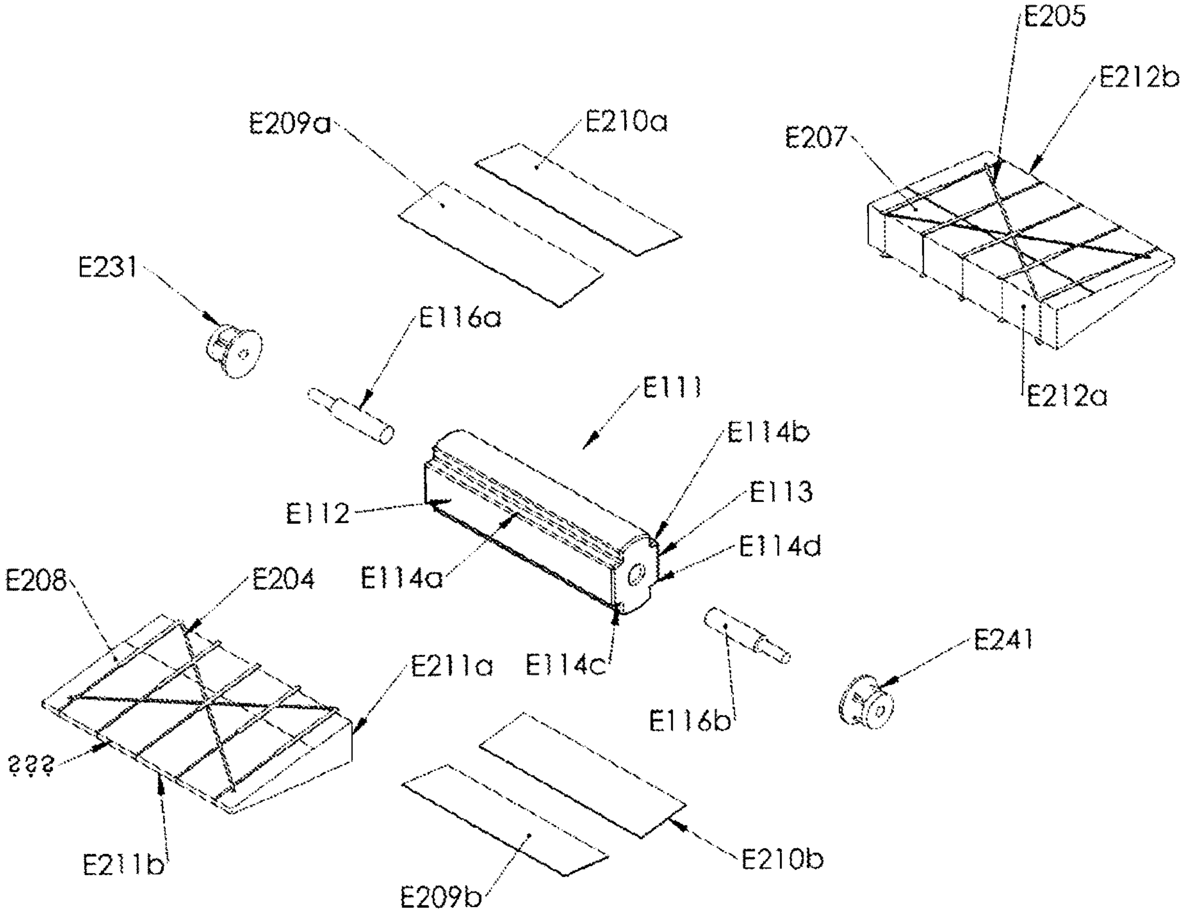

Referring to FIGS. 13A-13P, a fourth audio transducer embodiment E100 is shown comprising of a substantially rigid diaphragm structure E200 mounted to a substantially rigid base structure E102 via a diaphragm suspension. The diaphragm suspension rotatably mounts the diaphragm structure E200 relative to the base structure E102, such that the diaphragm structure E200 is configured to rotatably oscillate about an axis of rotation E103, during operation.

In this embodiment, the diaphragm suspension is configured such that the axis of rotation E103 is substantially coaxial with the node axis E104 of the diaphragm structure E200. The node axis may be predetermined, or may be determined during assembly of the transducer E100 as per the methods described in relation to the first embodiment, for example. In this example, the node axis and axis of rotation E103 are substantially coaxial with a centre of mass axis of the diaphragm structure E200. In some embodiments, the diaphragm suspension may be configured such that the axis of rotation E103 may be in a plane that is: substantially orthogonal to the coronal plane of at least one diaphragm of the structure E200 and that contains the node axis of the diaphragm structure E200 as described in relation to the first embodiment, for example.

In this embodiment, the transducer E100 comprises an electromagnetic transducing mechanism comprising a coil structure comprising a pair of coils E109 and E110 and a magnet E111. The coil structure is coupled to and forms a part of the transducer base structure E102 and the magnet is coupled to and forms a part of the diaphragm structure E200. In some embodiments, the magnet may be coupled to transducer base structure E102 and the coil structure may be coupled to the diaphragm structure E200. In some embodiments, the transducing mechanism may comprise a piezoelectric, electrostatic or other suitable mechanism known in the art.

Diaphragm Structure

Referring to FIGS. 13L-13P, the audio transducer E100 of this embodiment comprises a multiple diaphragm construction. The diaphragm structure E200 comprises a first diaphragm E201 and a second diaphragm E202 extending from a common diaphragm base structure E203. The first and second diaphragms E201 and D202 extend radially about the common axis of rotation E103, and are angled relative to one another. In this embodiment, the first and second diaphragms E201 and E202 extend in opposing directions such that they are approximately 180 degrees apart. The diaphragms E201 and E202 are approximately uniformly spaced about the axis of rotation E103. In some embodiments, the diaphragm structure E200 may comprise a single diaphragm, or two or more diaphragms extending radially at varying angles that may or may not be uniformly spaced about the axis of rotation E103.

Each diaphragm may comprise a construction as per any of the diaphragm embodiments or variations described herein in relation to the first or second embodiment, for example. In the illustrated example, each diaphragm E201, E202 comprises a substantially rigid construction having a diaphragm body E207, E208 formed from a substantially rigid material, such as a Polystyrene foam material. The diaphragm body E207, E208 is substantially thick as previously described in relation to the first embodiment, for example, and comprises a varying thickness. In this example, each body E207, E208 comprises a tapered thickness that reduces from a base end adjacent the diaphragm base structure E203 toward a terminal end E211, E212 distal from the diaphragm base E203. The taper angle is substantially uniform along the length of each diaphragm body E207, E208. In some embodiments the thickness profile may be substantially uniform along the length for the diaphragm E201, E202 or alternatively, each diaphragm E201, E202 may comprise a varying thickness profile similar to any of those described in relation to the first or second embodiments, for example.

Each diaphragm E201, E202 further comprises normal stress reinforcement E204, E205 coupled on each major, radiating face E201*a/b*, E202*a/b* of the diaphragm E201, E202 for resisting tension-compression forces experienced by the diaphragm body E207, E208 during operation. The normal stress reinforcement E204, E205 for each diaphragm E201, E202 may be formed from substantially rigid materials and comprise a varying mass profile similar to those described in relation to the first and second embodiments. In this example, normal stress reinforcement E204, E205 comprise a plurality of struts extending along the length and width of each major face. The struts reduce in mass in regions distal from the diaphragm base E203 and proximal to the terminal end E211, E212. For example, a thickness and/or width of each strut may reduce in thickness in regions distal from the diaphragm base E203. Reinforcement plates E209*a/b* and E210*a/b* are also provided over the major, radiating faces E201*a/b*, E202*a/b* of each diaphragm E201, E202 at the base end E203 for providing additional support at the base. The reinforcement plates E209*a/b* and E210*a/b* also rigidly couple the respective diaphragm E201, E202 to the magnet E111.

In some embodiments, the diaphragm structure E200 may further comprise inner stress reinforcement embedded within each diaphragm body E207, E208. The inner stress reinforcement may be similar to that described in relation to the first embodiment, for example.

The diaphragm structure E200 comprises a diaphragm base structure E203 located between the diaphragms E201 and E202 and extending about and along the axis of rotation E103. In this embodiment, the diaphragm base structure E203 predominantly comprises a diaphragm-side transducing component E111. In this embodiment, the diaphragm-side transducing component is the magnet E111. In some embodiments, it may be the coils E109, E110. The diaphragms E201 and E202 are rigidly coupled to either side of the magnet E111 along the length of the magnet E111. A first, longitudinal face E112 of the magnet directly couples a complementary end face E211*a* of diaphragm E201. A second, longitudinal face E113 couples a complementary end face E212*a* of diaphragm E202. The first and second longitudinal faces E112 and E113 may be substantially planar to complement the planar faces of diaphragm faces E211*a* and E212*a*. The magnet E111 may comprise a plurality of recessed edges or ledges E114*a-d* extending longitudinally along different sides of the magnet for coupling outer reinforcement plates E209*a/b* on diaphragm E201 and outer reinforcement plate E210*a/b* on diaphragm E202.

A pair of pins E116*a*, E116*b* extend from either end of the magnet E111 for mounting the diaphragm suspension thereon. In this embodiment, the diaphragm suspension comprises a pair of bearings. Each bearing having an inner and outer bearing component, moveable relative to one another. The inner bearing component E231, 241 of each bearing 230, 240 is rigidly coupled to a respective pin E116*a*, E116*b* at either end of the magnet E111.

As described in relation to the first embodiment, and as shown in FIG. 13D, a terminal end E211*b*, E212*b* of each diaphragm E201, E202 may be partially or entirely free from physical connection with an interior E105*a* of a surrounding structure E105 directly adjacent the end E211, E212 of the diaphragm E201, E202. A fluid gap, such as an air gap, may separate the terminal end E211, E212 of each diaphragm E201, E202 with the interior of the surrounding structure E105.

The variations described in relation to the diaphragm construction of the first or second embodiment also apply to each diaphragm of this embodiment.

Transducer Base Structure

Referring to FIGS. 13A-13E and 13K, in this embodiment the transducer base structure E102 is configured to remain relatively stationary during operation and forms a surrounding structure E105 for accommodating the diaphragm structure E200 therein. The transducer base structure E102 comprises a plurality of inner cavities E108 and E109 that are shaped to accommodate the diaphragms E201 and E202, and enable rotational movement of the diaphragms E201 and E202 within the surround E105 during operation. Each cavity E108, E109 is shaped and sized to complement the envelope of the diaphragm periphery during operation and therefore comprises a substantially arcuate profile along a section opposing the terminal end E211*b*, E212*b* of the respective diaphragm E201, E202. As shown in FIG. 13I, each cavity E108, E109 may be sized to maintain a close, but physically separated fit with the peripheral edges (including terminal ends E211*b*, E212*b*) of each diaphragm E201, E202 extending between the major faces E201*a/b*, E202*a/*, to minimise air leakage during operation.

The transducer base structure E102 comprises a pair of surround parts E118 and E119 which may be rigidly coupled together to assemble the transducer. In combination, the parts E118 and E119 form the pair of cavities E108 and E109 for accommodating the diaphragms E201 and E202. Each part E118, E119 comprises a main body E118*a*, E119*a* and an annular flange E118*b*, E119*b* extending about the main body E118*a*, E119*a*. The parts E118, E119 may be coupled at the annular flanges E118*b* and E119*b*. As shown in FIG. 13A, each main body E118*a*, E119*a* comprises a pair of openings or sound ports E118*c/d*, E119*c/d* on opposite sides of axis of rotation E103 for enabling the propagation of sound pressure to or from the radiating, major faces E201*a/b*, E202*a/b* of the respective diaphragm E201, E202 during operation. Each part E118, E119 may be formed from a substantially rigid material, such as a hard plastics material or a metal material.

As shown in FIG. 13B, at least one coil is coupled to an interior of the transducer base structure E102 for cooperating with the magnet E111 during operation. In this embodiment, a pair of coils E109 and E110 are coupled to an interior of the transducer base structure E102. In some embodiments a single, or three or more coils may be used. Each coil E109, E110 extends about the magnet E111. The coils E109 and E110 are directly adjacent one another in this embodiment, but may be separated in alternative embodiments. Each coil E109 and E110 is preferably substantially rigid and is rigidly coupled to the interior of the base structure E102.

The relatively long side of each coil extends along an axis substantially parallel to the axis of rotation E103 and/or the longitudinal axis of the magnet E111. In some embodiments, the transducer base structure E102 or other surrounding structure E105 or housing may comprise a strengthened wall region opposing the terminal ends E211*b*, E212*b* of each diaphragm. The strengthened region may comprise a substantially thicker wall, one or more reinforcement ribs, and/or a stronger material relative to other regions of the base or surrounding structure. In this embodiment, for example, a region E106, E107 of the surrounding structure E105 opposing the terminal ends E211*b*, E212*b* of each diaphragm E201, E202 comprises a reinforcement rib E106*a*, E107*a* extending laterally from the region E106, E107 for strengthening the region opposing the respective diaphragm E201, E202. A plurality of ribs may be used in some embodiments. The ribs E106*a* and E107*a* preferably extend externally of the surrounding structure E105, away from the corresponding diaphragms E201 and E202. This feature may be incorporated in the structure surrounding the diaphragm of any one of the embodiments herein described.

Diaphragm Suspension

Referring to FIGS. 13F-J and 13P, the diaphragm structure E200 is coupled to the transducer base structure E102 via a diaphragm suspension. The diaphragm suspension has a construction wherein each hinge 230, 240 comprises a pair of contact surfaces that are physically coupled and moveable relative to one another to rotate the diaphragm during operation. In this embodiment, the suspension comprises a pair of bearings E230 and E240 located on either side of the diaphragm structure E200. Each bearing E230, E240 comprises an inner, annular bearing member E231, E241, an outer, annular bearing member E233, E243 and a plurality of balls E232, E242 rotatably retained between the inner and outer bearing members. In some embodiments, the suspension may comprise a single bearing or more than three bearings.

One of the inner or outer bearing members may comprise one or more stoppers for limiting a relative position of each ball along the corresponding bearing. In this example, each inner bearing member E231, E241 comprises a plurality of stoppers E234, E244 located on either side of each ball E232, E242 to limit the position of each ball relative to the inner bearing and promote each ball to maintain a correct relative position during operation. The stoppers E234, E244 may be integrally formed as raised peak along the length of each corresponding inner bearing E231, E241. The stoppers E234, E244 may alternatively be formed on the inner surface of each outer bearing to limit the relative position balls in some embodiments. In this embodiment, each inner bearing member E231, E241 may comprise a convex outer surface E245 between adjacent pairs of stoppers E234, E244 to further promote each ball E232, E242 maintaining a correct relative position during operation. In some embodiments, the inner surface of each outer bearing E233, E243 may comprise formations that promote the balls maintaining correct relative positions during operation.

The balls E232, E242 are formed from a substantially soft material, such as an elastomeric material. The balls may be formed from a cast polyurethane elastomer with a shore D hardness of approximately 70, and a Young's modulus of approximately 250 MPa, for example. The inner and outer bearing members may also formed from a cast polyurethane elastomer or similar material. In this embodiment, four balls E232, E242 are used for each bearing E230, E240. In some embodiments, the diaphragm suspension may comprise at least one hinge joint, each hinge joint having a ball bearing, and wherein the ball bearing comprises less than seven balls. Each hinge joint may comprise a ball bearing, and wherein the ball bearing comprises less than six balls. Each hinge joint may comprise a ball bearing, and wherein the ball bearing comprises less than five balls.

The inner bearing member E231, E241 of each bearing E230, E240 is configured to rigidly couple the diaphragm structure E200 via corresponding pins E116*a* and E116*b* extending laterally from the diaphragm base structure E203. The pins D116*a* and D116*b* extend from either side of the diaphragm structure E203 and are substantially coaxial with the axis of rotation E103. The outer bearing member E233, E243 of each bearing E230, E240 is rigidly coupled to an internal side of the transducer base structure E102.

In some embodiments a diaphragm centring mechanism may be incorporated in the transducer that biases each diaphragm E201, E202 towards a neutral, rotational position relative to the transducer base structure. The centring mechanism may include a resilient member such as a spring or elastomer, for example. This may contribute to defining the fundamental frequency of the diaphragm and help control the bass response. This may also help prevent the balls hitting the stoppers during normal operation.

The diaphragm suspension of this embodiment may be replaced with any other diaphragm suspension herein described or modified as per any other diaphragm suspension modification or variation herein described.

Transducing Mechanism

Referring to FIGS. 13C-E, the transducing mechanism is an electromagnetic mechanism comprising a magnet E111 and a pair of coils E109 and E110. The magnet E111 may be permanent magnet or a direct current electromagnet. In this example, a permanent magnet is utilised. The permanent magnet E111 rigidly couples a base end of each diaphragm E201, E202 and overlaps with diaphragm structure E200 in the direction of the axis of rotation E103. The magnet E111 comprises opposing poles E111*a* and E111*b* that extend along the length of the magnet E111. The poles E111*a* and E111*b* are oriented such that a direction E111*c* of primary magnetic field through the magnet body is along an axis that is substantially orthogonal to the axis of rotation E103. The direction of primary magnetic field E111*c* of the magnet E110 may also be substantially orthogonal to: a coronal plane of at least one or each diaphragm E201, E202 or a coronal plane of the diaphragm structure E200. Alternatively, or in addition the direction E110*c* may be substantially parallel to a sagittal of at least one or each diaphragm E201, E202 or diaphragm structure E200. The magnet E111 is preferably located such that a central, longitudinal axis is substantially coaxial with the axis of rotation E103 defined by the bearings, such that a substantially pure torque is imparted on diaphragm during operation.

A pair of coils E109 and E110 couple the interior of the transducer base structure and extend about the magnet E111. Each coil E109, E110 is longitudinal and includes a pair of opposing long sides and a pair of opposing short sides. The long sides extend longitudinally along the length of the magnet such that they are substantially parallel with the axis of rotation E103. A longitudinal axis of the coil E109 is also substantially perpendicular to the primary magnetic field of the corresponding magnet E111 of the transducing mechanism. The coil axis may intersect at a central region of the magnet. The coil axis may intersect at a central region of a longitudinal axis of the magnet E111.

Each magnet pole E111*a*, E111*b* may comprise a substantially convex outer surface, and the corresponding opposing outer surface of each coil E109, E110 may comprise a complementary concave surface.

The magnet E111 comprises one or more surfaces configured to couple to corresponding surfaces of each diaphragm E201, E202. The one or more surfaces include a sufficient surface area for achieving a sufficiently rigid connection. In this embodiment, the surfaces are on sides of the magnet E111 that are configured to extend adjacent and/or in a same or similar plane to the major faces of each diaphragm E201, E202. The surfaces may be directly coupled to normal stress reinforcement of the diaphragm. The magnet may also be coupled to each diaphragm directly at regions of the magnet most-proximal to the diaphragm. Regions most proximal may be closer to the diaphragm than adjacent coils and/or pole pieces of the transducing mechanism. For example, the magnet E111 may be directly coupled to a surface of the diaphragm body that is configured to exhibit primarily shear deformation forces during operation (end face of diaphragm opposing axis of rotation). A high temperature adhesive may be used to bond the magnet to the diaphragm. The magnet bonding surface may be nickel plated and treated with an acid, such as nitric acid.

In some embodiments, the magnet E111 and each diaphragm may be coupled via one or more components configured to extend into corresponding apertures or slots in one or both of the magnet and diaphragm.

The transducing mechanism of this embodiment may be replaced with any other transducing mechanism herein described or modified as per any other transducing mechanism modification or variation herein described.

Device Incorporating Transducer

Referring to FIGS. 14A-14D, the transducer base structure E102 may be coupled to a housing E300 or a baffle via the flanges E118*b*, E119*b*. The base structure E102 may be rigidly coupled to the baffle or housing or may be coupled via a suspension, such as a decoupling mounting system E400. The suspension E400 preferably extends about and flexibly couples the outer periphery of the transducer bases structure E102 with the inner periphery of housing E300. The suspension E400 is preferably formed from a substantially flexible and soft material, such as soft thermoplastic polyurethane foam of 0.1 MPa Young's modulus. The suspension E400 may be continuous along the entire length of the transducer base structure periphery, or it may extend about a portion of the periphery, or there may be multiple discrete, but separated suspension parts about the periphery. One side or edge of each suspension member is preferably rigidly coupled to the transducer base structure E102 and an opposing side or edge is preferably rigidly coupled to the interior of a housing or other surrounding structure. Preferably an air seal is formed. In some embodiments, the transducer base structure E102, may be rigidly coupled to the housing E300.

The housing E300 may be configured to direct sound pressure through an air channel E301 from the diaphragms E201, E202 to a sound port E302. For example, the arrows in FIG. 14C indicate the direction of air flow through the housing and out of the sound port E302 as the diaphragm structure rotates in the clockwise direction. The sound port E302 may comprise a grille.

In some embodiments, audio transducer D100 may be similarly coupled to a housing E300.

5. Embodiment 5 Audio Transducer

Figure 16B:
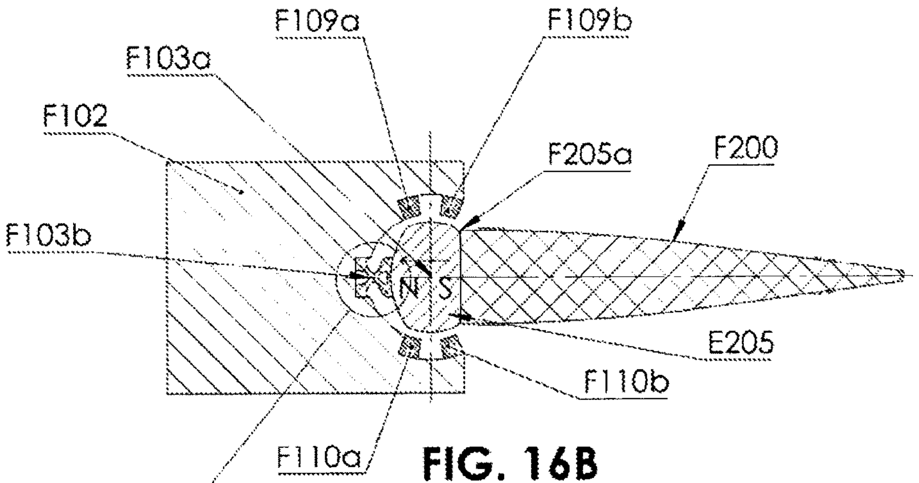
Figure 16C:
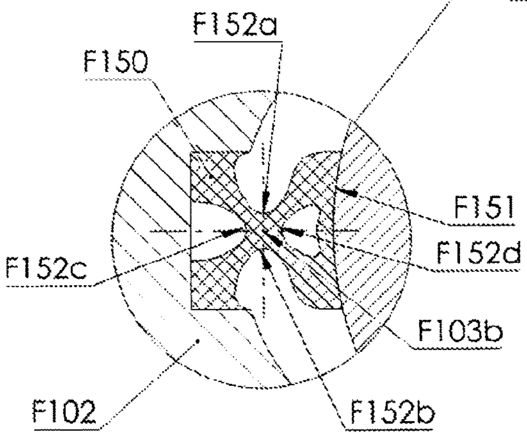
Figure 16A:
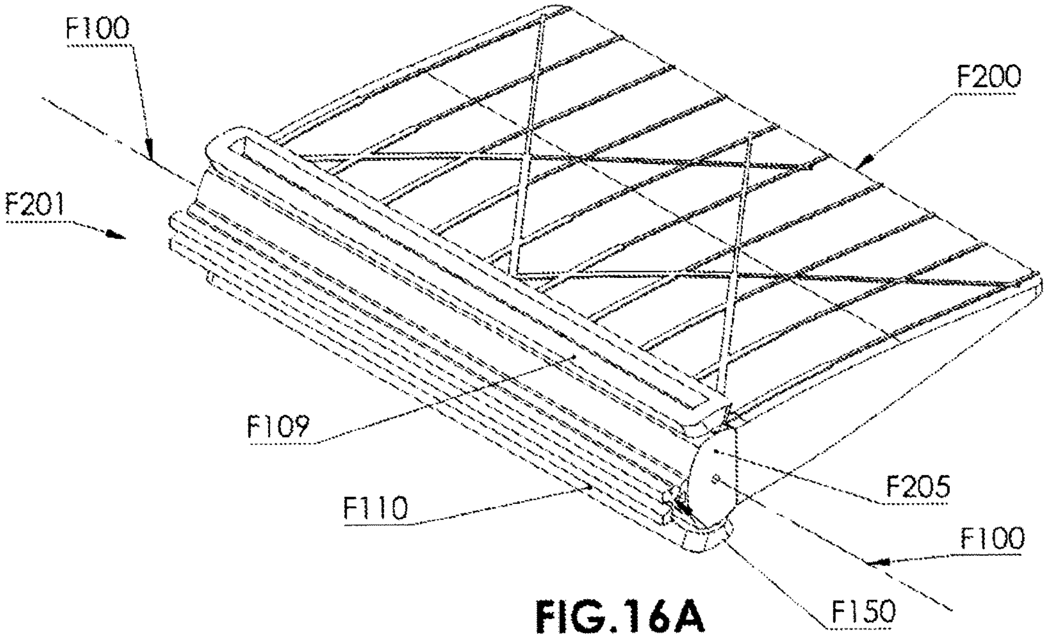

Referring to FIGS. 16A-16C, a fifth audio transducer embodiment F100 is shown comprising a substantially rigid diaphragm F200 mounted to a substantially rigid base structure F102 via a diaphragm suspension. The diaphragm suspension rotatably mounts the diaphragm structure F200 relative to the base structure F102, such that the diaphragm F200 is configured to rotatably oscillate about an axis of rotation F103, during operation.

The diaphragm F200 is similar to diaphragm A101 of the first embodiment and therefore will not be described in detail for conciseness. In some embodiments, other diaphragm constructions herein described may be incorporated in transducer F100.

The transducing mechanism comprises a magnet F205 that is rigidly coupled to the diaphragm F200, similar to magnet A205 of the first embodiment, but with the orientation of the magnetic field altered in this embodiment. In particular, in this embodiment, the direction of a primary magnetic field F205*a* through the magnet F205 between opposing poles is in a direction that is substantially angled, and preferably substantially orthogonal, to the axis of rotation F103. The direction of the field F205*a* is preferably also substantially parallel to a coronal plane and/or a longitudinal axis of the diaphragm F200.

The transducing mechanism further comprises a pair of coils F109 and F110 that are rigidly coupled to the transducer base structure F102 and extend longitudinally over opposing sides of the magnet F205. In this embodiment, each coil F109, F110 does not loop or wrap about the entire magnet F205 but rather extends over and directly adjacent the corresponding pole of the magnet F205. Each coil F109, F110 extends longitudinally along an axis that is substantially parallel to the axis of rotation. The coils F109 and F110 may not be electronically connected, but are preferably connected to an audio source such that the same audio signal is received by each coil. In some cases, the coils may be electronically connected, such as in parallel or in series. The phase of the coils F109 and F110 may be adjusted to create a net rotational torque on the magnet F205 about the axis of rotation F103.

In this embodiment, the diaphragm suspension comprises a flexible hinge mount F150 that is coupled along the base end of the diaphragm F200. A single flexible mount extends along a transverse axis of the magnet, along the base end F201. In some embodiments, two or more flexible mounts may be coupled and separated along the base end F201. The flexible mount F150 is rigidly coupled to a face of the magnet that is distal from the diaphragm body.

The flexible mount F150 comprises a longitudinal body F151, having one or more grooves or concave surfaces F152*a-c* extending along the length of the body F151. The hinge mount may comprise at least one substantially concave outer surface extending along the mount body in a direction parallel to the axis of rotation F103. Each surface F152*a-c* is concave across cross-sectional profile the mount across a transverse plane (that is substantially orthogonal to the longitudinal axis of the mount or the axis of rotation). There may be a single concave surface or as in this embodiment, multiple concave surfaces that are angled relative to one another. Each concave surface F152*a-c* may be substantially rounded or smooth as in this embodiment, or in some embodiments, one or more concave surfaces may comprise substantially planar faces that are angled relative to one another (i.e. a relatively sharp curve). One side F153 of the flexible mount is rigidly coupled along the face F252 of the magnet and an opposing side is rigidly coupled to a surface or groove F106 of the transducer base structure F102.

In this embodiment, a pair of opposing concave surfaces F152*a* and F152*b* extend on opposing sides of the diaphragm and are curved to face an external side of the mount F150, such that they are oriented to face in directions that are approximately 180 degrees apart. One surface may face toward the diaphragm and another may face toward the transducer base structure as shown. A third concave surface F152*c*. Each concave surface extends along the length of the mount F150 such that the surface is curved about an axis that is substantially parallel to the axis of rotation F103. The axis of rotation F103 may extend centrally between all concave surfaces F152*a-d*. The In some embodiments, any one or more of such concave surfaces may be formed in the mount body, which may be formed internally of the mount or which may be formed such that the surface is open to an exterior of the mount. Each surface may face in an arbitrary direction in some embodiments.

The mount F150 may be formed from a substantially soft material, such as a soft plastics material as in the hinge mounts of embodiments one, two and three.

In this embodiment, as described in relation to the first embodiment, in a first operational mode where the transducer is operating at frequencies significantly below the resonance frequencies of the Primary Mode and the other five modes for this transducer F100, the location of the axis of rotation F103B of the diaphragm F200 relative to the base structure F102 may be significantly influenced by the diaphragm suspension F150, as well as by the forces applied to the diaphragm F200 by the transducing mechanism. The first mode of operation is akin to the stiffness-controlled region of the transducer, with respect to all six diaphragm resonance modes facilitated primarily by diaphragm suspension compliance. The axis of rotation F103B in this mode extends centrally along the longitudinal axis of the diaphragm suspension F150. In a second operational mode, where the transducer F100 is operating at frequencies significantly above the resonance frequencies of the Primary Mode and the other five suspension compliance modes, the location of the axis of rotation F103A of the diaphragm F200 relative to the transducer base structure F102 may be primarily defined by the location of the diaphragm node axis F104 and less significantly by the diaphragm suspension. The diaphragm node axis F104 is primarily defined by the forces applied to the diaphragm F200 by the transducing mechanism and by the mass distribution/profile of the diaphragm F200 (including magnet F205). In the second operation mode, the diaphragm node axis F104 may be relatively unaffected by the diaphragm suspension. In the case of a substantially pure torque transducing mechanism, as in this embodiment, the node axis F104 is substantially coaxial with the diaphragm structure's (includes diaphragm F200 and magnet F205) centre of mass F105. The second operational mode is akin to the mass-controlled region of operation of the transducer, with respect to all six diaphragm resonance modes facilitated primarily by diaphragm suspension compliance.

This embodiment may be well-suited as a mid-range or high frequency loudspeaker, such as a tweeter, where it is configured to operate in the mid-high frequency range only. In this manner, the axis of rotation F103B during operation remains substantially coaxial with the node axis F104 and/or the centre of mass F105.

6. Audio Transducer Applications

Each of the audio transducer embodiments described herein can be scaled to a size that performs the desired function. For example, the audio transducer embodiments of the invention may be incorporated in any one of the following audio devices, without departing from the scope of the invention:

- Personal audio devices including headphones, earphones, hearing aids, mobile phones, personal digital assistants and the like;
- Computing devices including personal desktop computers, laptop computers, tablets and the like;
- Computer interface devices including computer monitors, speakers and the like;
- Home audio devices, including floor-standing speakers, television speakers and the like;
- Car audio systems;
- Microphones;
- Passive radiators; and
- Other specialty audio devices.

Furthermore, the frequency range of the audio transducer can be manipulated in accordance with a given design to achieve the desired results. For example, an audio transducer of any one of the above embodiments may be used as a bass driver, a mid-range-treble driver, a tweeter or a full-range driver depending on the desired application.

In some embodiments, the audio device may comprise a housing for surrounding the diaphragm or diaphragm structure, transducer base structure and transducing mechanism. The housing may be made from plastics material.

In some embodiments, the audio transducer may be a mid-range and treble transducer configured to transduce sound in the frequency band 200 Hz to 20 kHz.

In some embodiments, the audio transducer may be a bass transducer configured to transduce sound in the frequency band of approximately 20 Hz to approximately 200 Hz.

In some embodiments, the audio transducer may comprise a fundamental resonance frequency of less than 100 Hz, or less than approximately 70 Hz, or most preferably less than 50 Hz.

Personal Audio Device Incorporating Transducers

A personal audio device, including for example headphones, earphones, telephones, hearing aids and mobile phones incorporate audio transducers that are sized and configured to be normally located within close proximity of a user's head or in direct association with a user's head to transduce sound directly into the user's ear. Such devices may be configured to locate within approximately ten centimetres or less of a user's head or ears in use, such as in the case of a mobile phone. Personal audio devices are typically compact and portable, and thus the audio transducers incorporated therein are also substantially more compact than in other applications such as home audio systems, televisions, and desktop and laptop computers for example. Such size requirements typically limits flexibility for achieving a desired sound quality, as factors such as the number of audio transducers that can be incorporated have to be considered. More often than not, a single audio transducer may be required for providing the full audio range of the device, for example, which could potentially limit the quality of the device.

In some embodiments, the audio transducer embodiments described herein may be incorporated a personal audio transducer. The audio transducer may be configured to transduce sound in the frequency band of approximately 20 Hz to approximately 20 k Hz.

The personal audio device may comprise at least one interface device that is sized and configured to locate against the user's ear, in use.

Figure 20A:
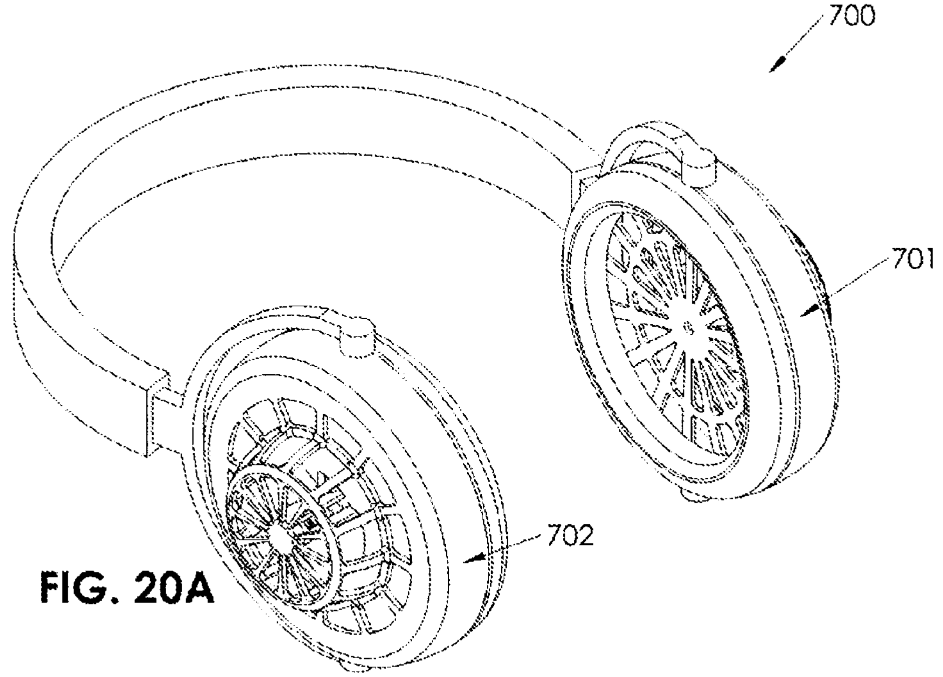
Figure 20B:
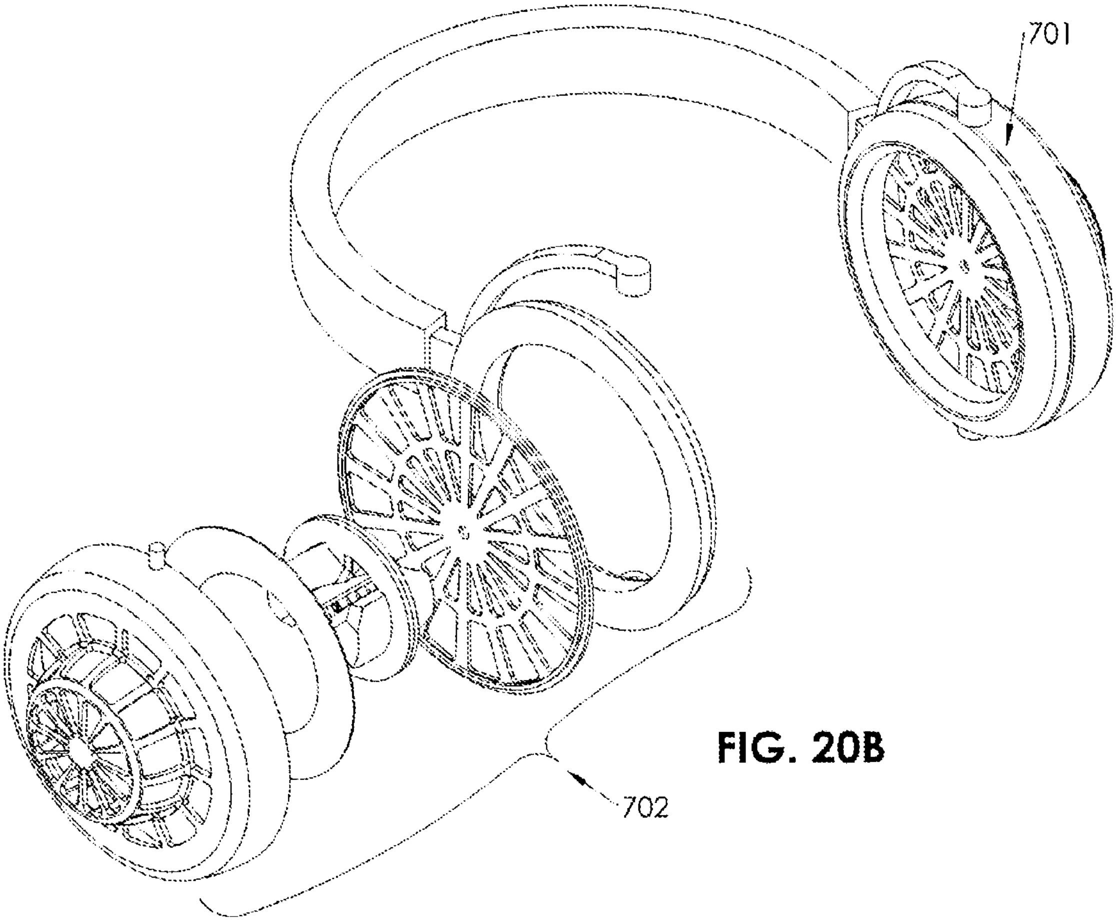

Referring to FIGS. 20A and 20B, an exemplary personal audio device embodiment is shown comprising a headphone device 700, including a pair of interface devices 701 and 702, each configured to mount at or about a user's ear in use. The interface devices 701 and 702 each comprise an audio transducer as per any one of the embodiments herein described, such as transducer D100 for example. The transducer in each interface device is configured to reproduce an independent audio signal.

Each interface device comprises a headphone cup in this embodiment which is worn about a user's ear in use.

In some embodiments, each interface device may be an interface plug of an earphone configured to locate at, adjacent or within the user's ear canal in use. Each earphone interface may be non-sealing about the associated ear canal when worn. Each interface device may comprise an air channel extending from an ear canal opening to a vent in the device.

In some embodiments, the interface device may be a mobile phone sound interface.

In some embodiments, the interface device may be a hearing aid interface.

Slim Electronic Devices Incorporating Transducers

Figure 15A:
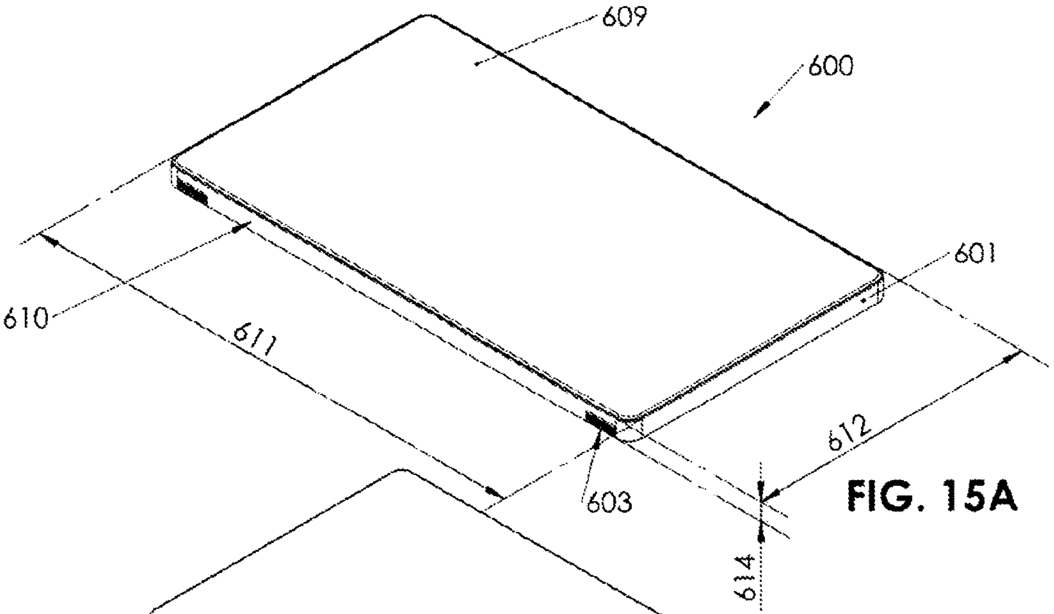
Figure 15B:
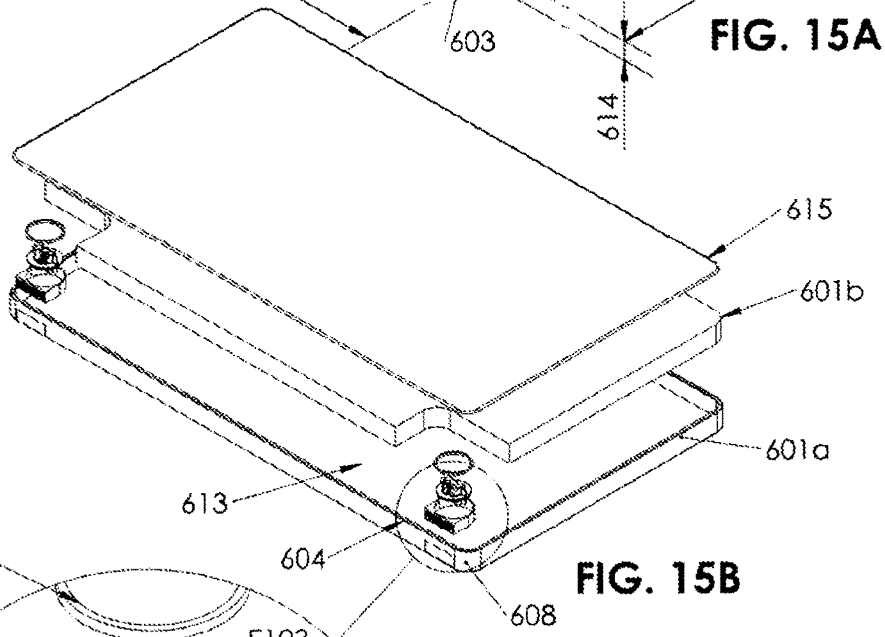
Figure 15C:
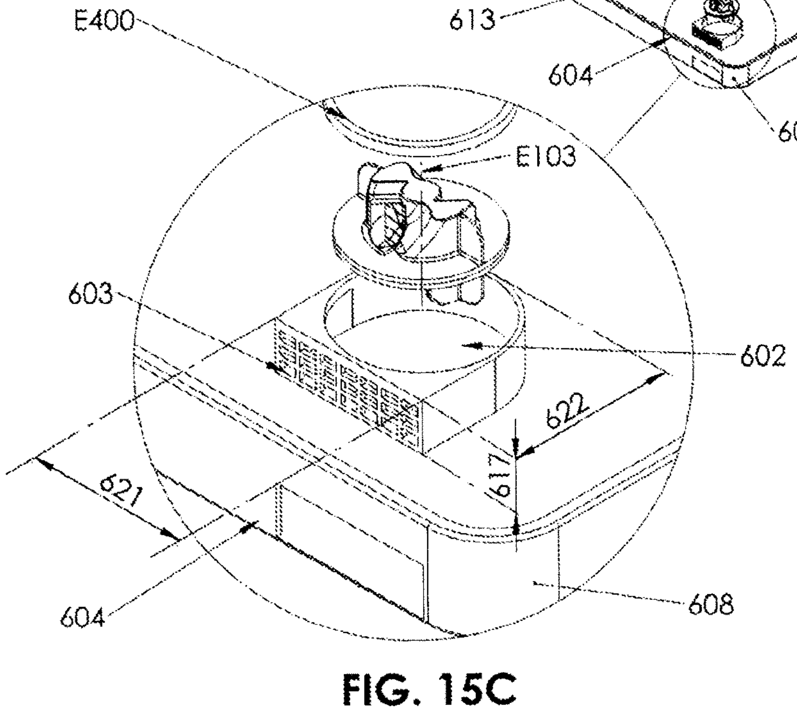

Referring to FIG. 15, in some embodiments, the audio transducers herein described may be incorporated in a slim electronic device 600. The transducer E100 is provided as an illustrative example in this embodiment. However, other transducers of the invention may be similarly incorporated in the slim device 600 in some embodiments.

The device 600 of the invention is shown comprising a housing 601 and an electroacoustic transducer E100 located within the housing 601. The housing 601 comprises a main, substantially hollow base 601*a* configured to accommodate a plurality of electronic components and circuitry therein. The base 601*a* may consist of multiple cavities to compartmentalise the electronic circuitry. The housing 601 further comprises a cover 601*b* that is configured to rigidly couple over the base to substantially enclose the hollow interior of the base 601*a*. An electronic display screen 615, or other external user interface components, such as keyboards or other user input devices may be mounted onto the cover 601*b* of the housing in some embodiments. The housing 601 comprises at least one electroacoustic transducer cavity 602 having an electroacoustic transducer E100 accommodated therein. The cavity 602 may contain one or more electroacoustic transducers in some embodiments. In this embodiment the housing 601 comprises a single electroacoustic transducer cavity 602 on one side of the housing 601. There may be any number of cavities in alternative embodiments depending on the application. It is preferred that each electroacoustic transducer cavity 602 is located adjacent a periphery 604 of the housing 601 to enable direct transmission of sound to the surrounding environment. Each cavity may be located at or adjacent a corner section 608 of the housing. Each electroacoustic transducer E100 is preferably mounted within the respective cavity by any suitable transducer suspension system, such as suspension E400 as previously described. In some embodiments, the transducer E100 may be directly and rigidly coupled to the cavity 602.

The region 613 inside the audio device housing and outside of cavities 602 may comprise electronic components/circuitry, including for example computer processor (s), power supply, amplifier(s), circuit board(s), sockets, cooling system(s), hard drive(s), memory component(s) and the like, as is well known in the art. Each cavity 602 is preferably a separate cavity but may otherwise be formed by a space or volume between such components in some embodiments. The cavity may be separate to and sealed from internal region 613 or it may have an air passage to said region.

In this embodiment, the audio device 600 is an electronic device having a sufficiently thin or slim construction in which a depth dimension 614 of the housing 601, at least in the region of the electroacoustic transducer cavity 602, is significantly smaller than width 612 and/or length dimensions of the housing. The audio device may be, for example, a mobile phone a flat screen television, a laptop computer, a computer monitor, a tablet computer, or other well-known electronic device having an aesthetic and design requirement to reduce the depth of the device to as little as practicable. The depth dimension 614 of the housing may be less than approximately 0.2 times the width 612 and/or length 611 dimensions of the housing, or less than approximately 0.15 times the width and/or length dimensions, or less than 0.1 times the width and/or length dimensions, for example. It will be appreciated that these ratios are dependent on the type of electronic device and in practice dictated by other components to be incorporated in the device. As such, the ratios provided are not intended to be limiting. In general, this embodiment relates to any electronic device where there is a significant requirement to reduce the depth to as little as practicable, as mentioned above.

Although the housing 601 is shown rectangular in cross-section, it will be appreciated that in alternative embodiments the device 600 may consist of a housing 601 that is of any desired shape for the particular application. For example, the housing 601 may be circular or oval in shape. Reference to length 611 and/or width 612 dimensions in this context may therefore relate to the diameter(s) of the housing in one plane. The housing may have constant or varying width and/or length dimension. The depth dimension 614 is preferably substantially constant, however it may be variable across one or more dimensions of the housing. For example, the depth may reduce adjacent the edges of the housing and increase in a central region. The housing 601 may comprise a pair of opposing major faces 609 that are connected by one or more side faces 610. The major faces 609 preferably have a substantially larger surface area than the side faces. The major faces are preferably substantially orthogonal to the depth dimension 614 of the housing and to a depth dimension 617 of each cavity.

The depth 617 of each cavity 602 may be substantially the same or similar to the depth dimension 614 of the housing. In some embodiments, the depth of one or more cavities may differ from the depth of the housing. In some embodiments, the depth dimension 617 of one or more cavities, is greater than approximately 0.5 times the depth 614 of the housing, or greater than approximately 0.6 times the depth of the housing or greater than approximately 0.7 times the depth of the housing. In some embodiments the cavity depth dimension 617 of one or more cavities, at the location of the mounted transducer, is greater than approximately 0.5 times the depth of the housing, or greater than approximately 0.6 times the depth of the housing or greater than approximately 0.7 times the depth of the housing.

In some embodiments the depth 617 of one or more cavities 602 is significantly smaller than a width dimension 612 and/or length dimension 611 of the housing. Preferably the depth of one or more cavities 602 is significantly smaller than the width and the length dimensions of the housing. For example the depth dimension 617 of one or more cavities may be less than approximately 0.2 times the width 612 and/or length 611 dimensions of the housing, or less than approximately 0.15 times the width 612 and/or length 611 dimensions of the housing, or less than approximately 0.1 times the width 612 and/or length dimensions 611 of the housing.

In some embodiments the depth dimension 617 of one or more cavities 602 is smaller than a substantially orthogonal width dimension 622 and/or a substantially orthogonal length dimension 621 of the cavity. For example, the depth dimension may be less than approximately 0.8 times the width 622 and/or length 621 dimensions, or less than approximately 0.6 times the width 622 and/or length 621 dimensions. Preferably the depth dimension 617 of one or more cavities 602 is substantially smaller than a substantially orthogonal width dimension 622 of the cavity 602 and a substantially orthogonal length dimension 612 of the cavity.

The housing 601 further comprises one or more apertures adjacent each electroacoustic transducer cavity for sound to propagate therethrough from the associated electroacoustic transducer E100 to the surrounding environment external to the device 600. In the preferred embodiment, the housing 601 comprises a grille 603 or other mesh-type surface adjacent each electroacoustic transducer cavity 602. The grille 603 is located in a side of the housing that extends along the depth dimension 614. The grille 603 of each cavity 602, preferably extends along a substantial portion of the depth dimension 617 at or adjacent the cavity 602. In this manner the cavity is substantially open through a minor face 605 of the housing. This enables sound to propagate from/into the minor face of the housing.

Figure 14A:
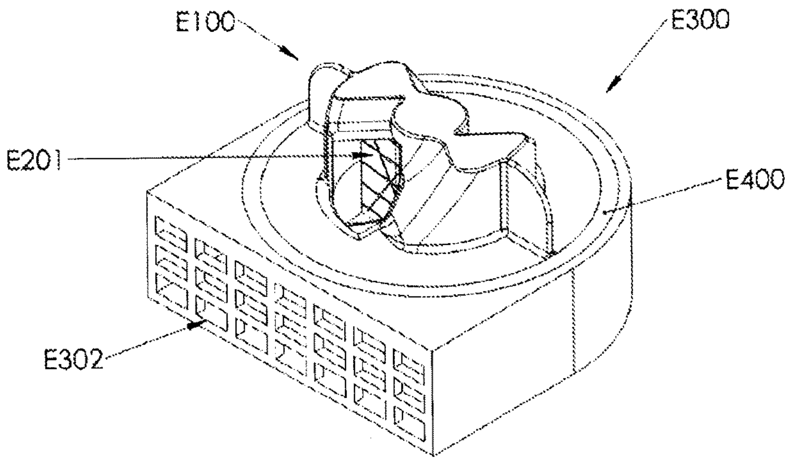
Figure 14C:
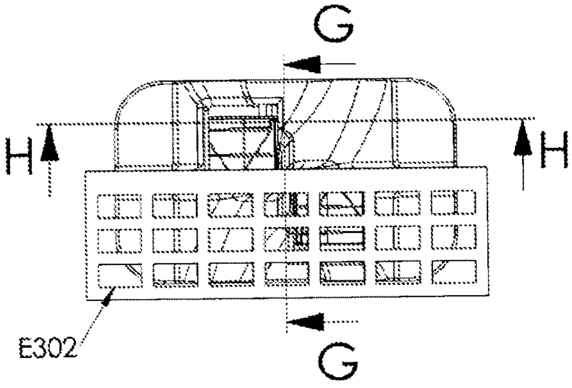
Figure 14D:
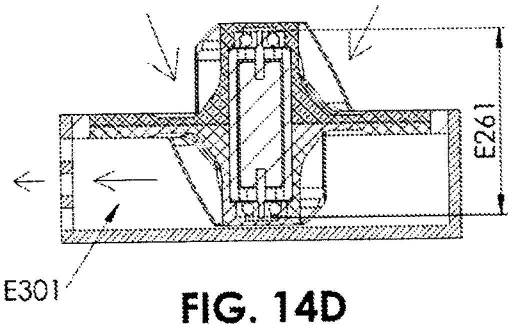
Figure 14B:
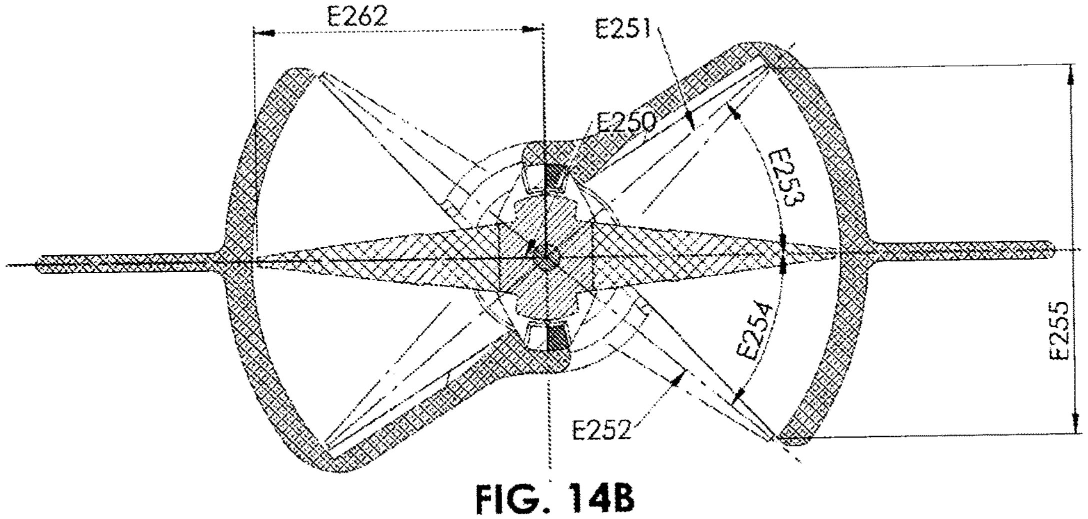

Referring also to FIGS. 14B and 14D, the electroacoustic transducer E100 is mounted within the respective cavity 602 in an orientation such that the axis of rotation E103 of the diaphragm structure E200 is substantially parallel to the depth dimension 617 of the cavity 602. In other words, the direction of motion of the diaphragm 702 during operation is along a plane that is substantially orthogonal to the depth dimension 617 of the cavity. This orientation maximises diaphragm excursion/displacement for a given depth. In situ and during operation, each diaphragm E201, E202 of each transducer E100 rotatably oscillates between two terminal positions E251, E252, on either side of a central or neutral diaphragm position E250. The angular displacement E253 between the neutral position and a first terminal position E251 is preferably substantially the same or similar to the angular displacement E254 between the neutral position and a second, opposing terminal position E252. These may be different in some embodiments. For example both angular displacements may be approximately 30 degrees. This means that the total angular displacement may be approximately 60 degrees for example. The invention is not intended to be limited to these exemplary values.

As mentioned, the orientation of the transducer E100 within the respective cavity 602 maximises diaphragm excursion/displacement for a given cavity depth. In some embodiments, for each transducer E100, a total overall linear displacement E255 of the terminal end of each diaphragm along a plane that is substantially orthogonal to the depth dimension 617 (and substantially orthogonal to the axis of rotation E103), as it moves from the first terminal position E251 to the second terminal position E252 (or vice versa) is preferably substantially the same or larger than the depth dimension 617 of the associated cavity 602. The abovementioned plane may be substantially parallel to the width and length dimensions 622 and 621 respectively, for example. More preferably, the total linear displacement E255 along the abovementioned plane is larger than the depth dimension 617 of the cavity or the depth dimension 614 of the housing, at least at the location of each diaphragm. For example, the transducer E100 may have a total overall linear displacement E255 of each diaphragm terminal end of about 30 mm, the cavity may have a depth dimension 617 of about 20 mm and the housing may have a depth dimension 614 of about 24 mm. However, the invention is not intended to be limited to these exemplary values. The terminal end may be an edge, face or apex of a diaphragm for example.

In some embodiments at least a component of the linear displacement that is substantially orthogonal to the depth dimension 617 (for example a component that is substantially parallel to the width 622) in the abovementioned plane is the same or larger than the depth dimension of the associated cavity.

In an embodiment where the diaphragm structure E200 consists of multiple diaphragms, the terminal end means the end of the diaphragm E201, E202 that is most distal from the axis of rotation E103. If multiple diaphragms have ends that are most distal from the axis of rotation E103, then the terminal end of the diaphragm E201, E202 may be any one of these diaphragm ends.

In some embodiments, each diaphragm E201, E202 of each transducer E100 may be operative to achieve a total angular displacement between the first and second positions E251, E252 of more than approximately 40 degrees, or more than approximately 60 degrees. In some embodiments, the total linear displacement E255 of the terminal end along the plane of motion and along an axis substantially orthogonal to the depth dimension 614 may be more than approximately 1.2 times, or more than approximately 1.5 times, the depth dimension 614 of the housing. It will be appreciated that these values are exemplary and not intended to be limiting.

In some embodiments a maximum diaphragm structure dimension E261 along an axis substantially parallel to the axis of rotation E103 in situ, is greater than approximately 0.5 times the depth dimension 614 of the housing, or greater than approximately 0.6 times the depth dimension of the housing, or greater than approximately 0.7 times the depth dimension 614 of the housing. In some embodiments a maximum diaphragm dimension E261 along an axis substantially parallel to the axis of rotation in situ, is greater than approximately 0.5 times the depth dimension of the housing at the location of the transducer, or greater than approximately 0.6 times the depth dimension of the housing at the location of the transducer, or greater than approximately 0.7 times the depth dimension of the housing at the location of the transducer.

Due to the reduced depth 614 of the device, the width of the diaphragm structure of each transducer E100 is also reduced in this embodiment. Each transducer E100 instead makes use of the increased relative length of the device to increase the length of each diaphragm E201, E202 relative to the width and optimise volume excursion capability. For example, in this embodiment a diaphragm structure E200 of each transducer E100 may consist of a maximum length or radius E262 from the axis of rotation E103 to a most distal peripheral edge E211*b*, E212*b*, that is more than approximately a width of the diaphragm structure E200, or more than approximately 1.5 times the width of the diaphragm structure E200, or more than approximately 1.75 times the width of the diaphragm structure E200.

As mentioned the orientation of each electroacoustic transducer E100 permits greater diaphragm excursion for a given housing depth 614 as the respective diaphragm. In addition, rotational action transducers also permit increased diaphragm excursion relative to linear action transducers for a given space. Rotational action transducers also increase excursion, whilst reducing fundamental resonance frequency without damaging the treble response as could be the case with linear action drivers. This means a higher level of excursion and improved electroacoustic transducer performance, whilst minimising overall transducer cavity volume requirements within the housing.

7. Audio Tuning

Figure 21A:
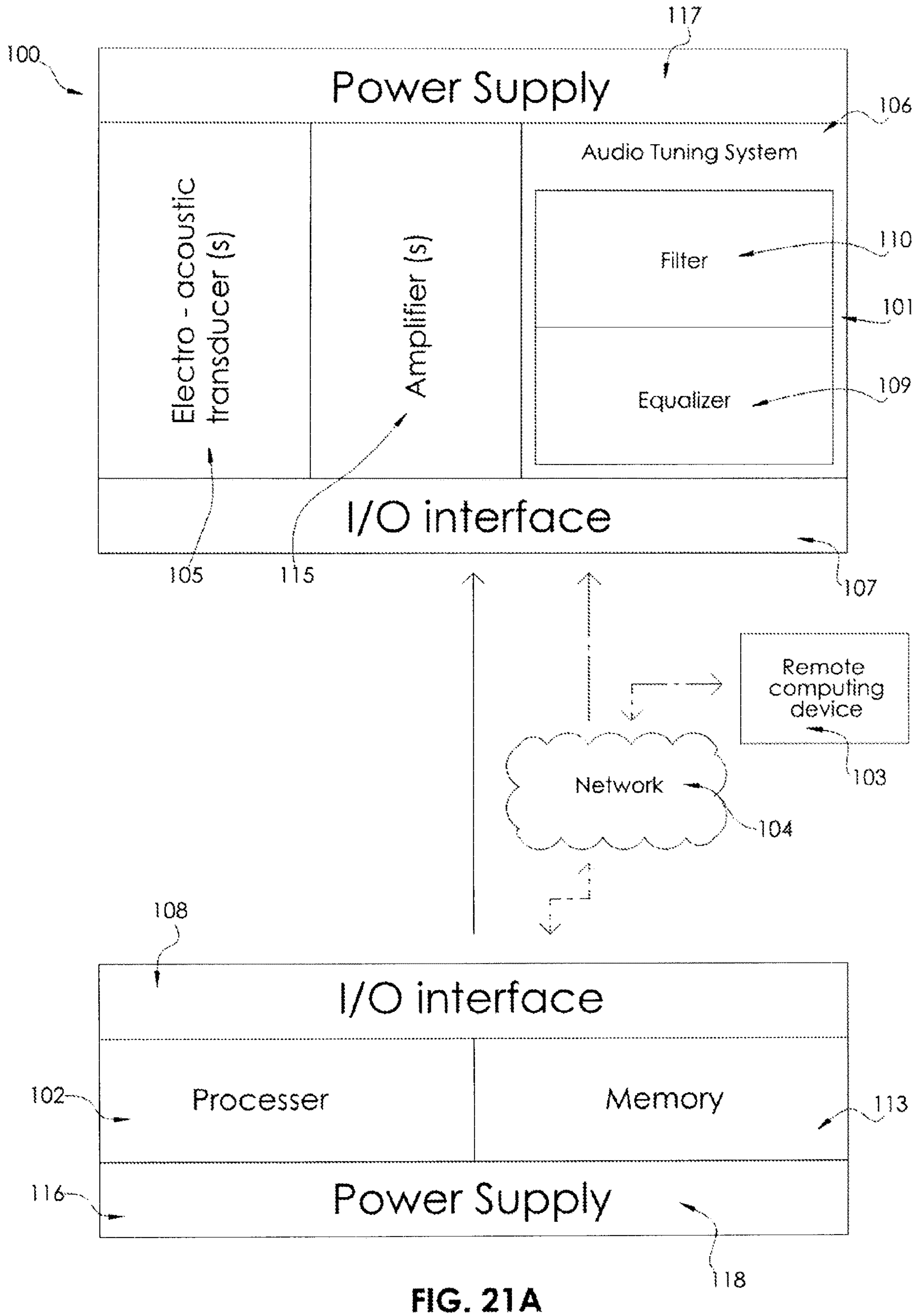
Figure 21B:
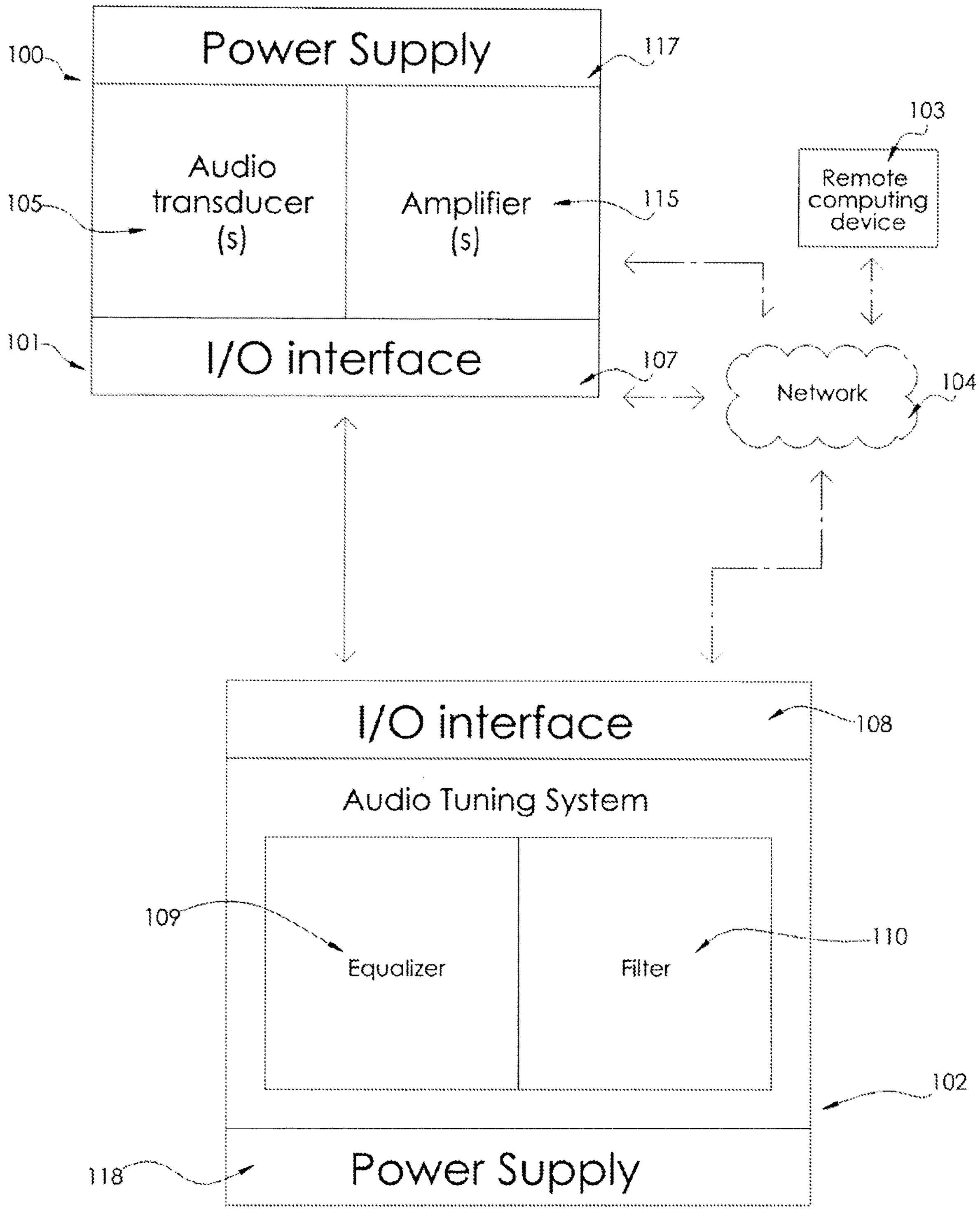

Referring to FIGS. 21A and 21B, the audio transducer embodiments described herein (A100, B100, D100, E100, F100) may be implemented as an electro-acoustic device and incorporated in an audio device 101 or system 100 that is configured to operate with an audio tuning system to optimise the audio signal for the electro-acoustic transducer. The electro-acoustic transducer may be located within a housing of the device 101. During operation, the audio device 101 is configured to receive audio signals from the audio source 102 and direct the audio signals to the electro-acoustic transducer(s) 105 for sound generation. The audio system 100 further comprises an audio tuning system 106. The audio tuning system 106 is configured to optimise the sound output from the electro-acoustic transducer(s) 105, preferably based on the characteristics of the system 100 and/or device 101. In this embodiment, the audio tuning system 106 is implemented within the audio device 101. As will be explained in further detail, the audio tuning system 106 may otherwise be implemented in the audio source device 102 or even in a remote device, such as the remote computing device 103 in alternative embodiments. In yet another alternative, the various functions or circuits of the audio tuning system 106 may be separately implemented in multiple discrete devices, such as in any combination of two or more of the personal audio device 101, the audio source device 102 and the remote computing device 103. The audio tuning system 106 may be implemented in hardware or in software that may be stored in electronic memory and executed by a processor, or any combination thereof.

The audio source 102 may be a computing device with a media player, such as a mobile phone, a personal computer or tablet, however, the audio source 102 may include any other form of device that is capable of outputting audio signals such as a radio, a compact disc player, a video system, a communication device, a navigation system and any other device that may form part of a multimedia system for example.

The audio device 101 may comprise a communications interface 107 for transmission and/or reception of signals/data to/from external devices including the audio source device 102, and optionally one or more remote computing devices 103. The communication interface 107 may include for example any combination of a data port and/or a wireless transceiver, software/hardware for implementing analogue to digital converters (ADCs) and/or digital to analogue converters (DACs) and software/hardware for receiving/transmitting data in accordance with a desired communications protocol. Audio source device 102 comprises a corresponding communications interface 108 for transmission and/or reception of signals/data to/from external devices including the personal audio device 101, and optionally one or more remote computing devices 103. Communication between the personal audio device 101 and the audio source device 102 may be achieved via cable, or alternatively wirelessly via wireless transceivers and appropriate wireless communication interfaces for example. The wireless communication interfaces may operate in accordance with any suitable wireless protocol/standard known in the art, such as Bluetooth, Wi-Fi and/or Near Field Communication (NFC) for example. The personal audio device 101 and/or audio source device may communicate to one another via a network 104, such as the internet, and optionally either one or both may communicate to one or more remote devices 103 via such network 104.

The audio tuning system 106 comprises one or more tuning modules configured to optimise audio signals received from the audio source prior to playback via the electro-acoustic transducer(s) 105. A module may be a software or hardware engine or circuit or any combination thereof configured to perform one or more functions or tasks. In a preferred embodiment the audio tuning system 106 comprises an equalisation module 109 (hereinafter referred to as: equaliser 109) and a filter 110. These modules may be separate or otherwise two or more may be integral with one another as will be described in further detail below. Furthermore, in alternative embodiments the audio tuning system 106 may comprise either one or both of the equaliser 109 or filter 110. The audio tuning system 106 is configured to optimise at least one but preferably all output channels of the audio device. The audio source 102 may generate audio signals for one or more audio channels. As such the audio device 101 may comprise a single audio output channel or multiple audio output channels (most likely two audio output channels). In the case of the latter, the audio tuning system 106 is configured to optimise the audio signals for at least one but preferably all transducer(s) 105 of each audio output channel. There may be one or more of each of the tuning modules 109, 110 per electro-acoustic transducer or per output audio channel, or the channels may share a common module 109, 110.

The audio tuning modules 109, 110 of the tuning system 106 may be implemented in one or more signal processors capable of performing logic to process audio signals from the audio source 102. The signal processor(s) may be microprocessors, digital signal processor(s), application specific integrated circuits (ASICs), field programmable gate arrays (FPGAs), other programmable logic components, discrete hardware components, or any combination thereof designed to perform the functions of the modules 109, 110 described herein. The signal processor(s) may include signal processing components such as filters, digital-to-analogue converters (DACs), analogue-to-digital converters (DACs), signal amplifiers, decoders or other audio processing components known in the art. The functions of the modules 109, 110 may be implemented directly in hardware or in software executable by the signal processor(s), or in a combination of both. Software may reside in RAM memory, flash memory, ROM memory, EPROM memory, EEPROM memory, registers, hard disk, a removable disk, a CD-ROM, or any other form of electronic memory known in the art. The electronic memory is accessible by the signal processor(s) such that the processor(s) can read information from, and write information to, the memory. The electronic memory may be local to the signal processor(s), remote on a separate device, or any combination thereof. In the alternative, the electronic memory may be integral to the processor(s). Furthermore, information or data that is received, processed and/or generated by the audio tuning modules 109, 110 may be stored in the electronic memory. Such data may include parameter values, user input data, predetermined frequency response data, and/or any other information related to processing of audio signals as would be apparent to those skilled in the art. Some data may be stored in files that are downloadable by the audio tuning system 106 from the audio source device 102, or from a remote computing device 103 via network 104 for example.

Similarly, the audio source device 102 may comprise one or more signal processor(s) and associated electronic memory component(s) for generating audio signals for driving the electro-acoustic transducers 105 of one or more output audio channels of the audio device 101. Information or data associated with the audio signals may be stored in the electronic memory. Such data may include media files, user input data and/or any other information related to processing of audio signals as would be apparent to those skilled in the art. Some data may be stored in files that are downloadable from a remote computing device 103 via network 104 for example.

The audio device 101 may further comprise one or more audio amplifiers 115 operatively coupled to the output of the audio tuning system 106 and to the input of the electro-acoustic transducer(s) 105. There may be one or more amplifier(s) 115 per channel. The amplifier may be configured to receive output current from an audio transducer as feedback at an input of the amplifier. The amplifier may be digital and/or analogue.

The audio device 101 may comprise an on-board power supply 117 such as a battery or batteries which may be rechargeable, for powering the various electronic circuits of the device as is well known in the art. Similarly, the audio source device 102 may comprise an on-board power supply 118 such as a battery or batteries which are rechargeable, for powering the various electronic circuits of the device as is well known in the art.

Equalisation

In some embodiments the audio tuning system 106 of the invention includes an equaliser 109 configured to equalise received audio signals for each output channel of the associated audio device 101. The equaliser 109 is configured to compensate for characteristics of the related audio transducer(s). Such characteristics may include any combination of one or more of: a frequency response of the audio transducer; the phase response of the audio transducer; the impulse response of the audio transducer; and/or the mass-spring-damper lumped parameter characteristics, where the fundamental mode is modelled, and optionally also one or more translational modes.

The characteristics of the audio transducer 105 may be pre-stored in memory associated with the equaliser 109. For example, a frequency response associated with each transducer 105 of the audio device 101 may be determined and stored in memory associated with the equaliser 109. The characteristics may be determined and stored during manufacture, or they may be determined during a calibration phase initiated by the audio device 101 or system 100 post manufacturing, for example. In some cases, they may be determined during normal operation of the device or system.

In some embodiments, the equaliser may be configured to remove steps in a frequency response of an audio signal, and deliver an equalised audio signal to the transducing mechanism of an audio transducer 105.

The equaliser may be configured to remove phase spikes or blips or steps in a phase response of an audio signal.

In some embodiments, the equaliser may be configured to remove spikes or blips in a frequency response of an audio signal, and deliver an equalised audio signal to the transducing mechanism of a related audio transducer 105. The spike or blip may cause an at least 1 dB spike in the frequency response, for example.

In some embodiments, the audio tuning system may be configured to equalise a frequency and/or a phase response and/or a transient response of an input signal to the transducing mechanism based on the fundamental diaphragm resonance frequency.

In some embodiments, the audio tuning system may be configured to equalise a frequency response and/or a phase response and/or a transient response of an input signal to the transducing mechanism to compensate for amplitude and/or phase and/or transient characteristics associated with lumped parameter, e.g. mass-spring-damper, characteristics of the diaphragm. The lumped parameter characteristics may include both the fundamental diaphragm resonance mode and also one or more resonance modes involving a significant component of diaphragm assembly translation associated with translational hinge compliance.

In some embodiments, the audio tuning system may be configured to increase a frequency response of an audio signal with increasing frequency at an input of the transducing mechanism, to compensate for high-frequency roll-off. The high-frequency roll-off may be related to coil inductance.

In some embodiments, the equaliser may be configured to impose a frequency response curve comprising a step change in loudness occurring at or near a frequency corresponding to compensation for effect of a resonance mode having motion comprising translation of the diaphragm structure via translational compliance of the diaphragm suspension. Preferably the imposed frequency response curve also comprises a correction for a response peak and/or trough associated with a resonance mode having motion comprising translation of the diaphragm structure via translational compliance of the diaphragm suspension.

Filter

In some embodiments, the audio tuning system 106 comprises a high-pass filter 110 for filtering relatively low frequency components of an input audio signal. The filter is also configured to provide a filtered audio signal to the transducing mechanism of an associated transducer 105 during operation.

The filter 110 may be configured to filter frequency components of an associated audio transducer 105 based on the lower roll-off frequency of the transducer's frequency response.

In some embodiments, the diaphragm suspension of the audio transducer 105 may be sufficiently compliant such that a resonance frequency of the diaphragm associated with translational compliance is below the cut-off frequency of the filter. The cut-off frequency may be the −3 DB frequency of the filter for example.

The diaphragm resonance frequency associated with translational hinge compliance may involve significant displacement of the diaphragm in a direction perpendicular to a coronal plane. The diaphragm resonance frequency associated with translational hinge compliance may cause an associated frequency response deviation of 1 dB or more when measured 1 m away on-axis. The diaphragm assembly resonance frequency associated with translational hinge compliance may cause an associated frequency response step of 0.5 dB or more when measured 1 m away on-axis.

8. Advantages

Benefits to some of the feature combinations of the embodiments herein described are provided below.

The combination of a single diaphragm with a diaphragm suspension that comprises an axis of rotation located based on the diaphragm's node axis as described for the first embodiment (referred to in this section as a "balanced diaphragm design") can present certain practical and performance advantages.

As described, there are five unwanted non-primary resonance modes of the diaphragm associated with compliance of the diaphragm suspension. These are only minimally excited for balanced diaphragm designs and results in a relatively flat frequency response, even when soft hinge materials are used. Using a single diaphragm body, instead of multiple bodies, in this embodiment may also have benefit in some applications. For example, a single diaphragm body may allow for greater volume excursion for a given real estate and for a given bass extension. A single diaphragm body may also result in reduced air leakage when the periphery is substantially unsupported as described for diaphragm. Finally, a single diaphragm body may reduce device design complications.

The combination of a balanced diaphragm design with substantially soft hinge mounts as in this transducer A100 also provides certain advantages which may be useful in some applications. This combination is useful because a balanced diaphragm design mitigates distortion resulting from with non-primary resonance modes associated with hinge compliance, while the soft hinge material may facilitate lowered fundamental diaphragm resonance frequency for low frequency extension, increased diaphragm excursion for greater loudness at low frequencies, and reduced hinge fatigue issues. A soft hinge can also enable simpler and inexpensive hinge designs.

The use of damped material in or around one or more hinge mounts can significantly increase damping of one or more resonance modes of the diaphragm associated with hinge compliance. For example, the hinge mounts may dampen translational modes of the diaphragm in a direction perpendicular to the coronal plane of the diaphragm. Dampening this translational mode can be beneficial to account for potential manufacturing inaccuracies in hinge location, for example, which may otherwise lead to excitation of this mode. This can be particularly useful in combination with a balanced hinge design as it provides the benefit of substantially mitigating distortion resulting from non-primary resonance modes associated with hinge compliance, and providing further mitigation in situations where these modes are not entirely removed due to practicalities associated with transducer manufacturing, for example.

Locating the diaphragm-side transducing component at or proximal to the diaphragm can improve structural integrity of the diaphragm structure and reduce flex in components that may extend between the diaphragm and the diaphragm-side transducing component. This is in contrast to certain cases where the diaphragm-side transducing components may be located distal to the diaphragm. In combination with a balanced diaphragm design, this may lead to reduced excitation of resonance in the diaphragm assembly, improved waterfall plot characteristics and subjectively clearer sound.

As described in relation to transducer A100 a diaphragm-side transducing component located at or proximal to the diaphragm may be implemented via any combination of one or more of:

- locating the diaphragm-side transducing component such that it overlaps with the diaphragm along the axis of rotation;
- locating the diaphragm-side transducing component such that all parts of the component are located within at least 20%, more preferably 15%, and most preferably 10%, of the width of the diaphragm;

integrating the diaphragm-side transducing component with the diaphragm;

rigidly connecting the diaphragm-side transducing component along one side of the diaphragm;

coupling the diaphragm-side transducing component along an axis that is substantially parallel to the primary axis of rotation, between two opposing sides of the diaphragm.

The combination of a balanced diaphragm design with a diaphragm, including a diaphragm-side transducing component, that is substantially symmetrical about a sagittal plane of the diaphragm results in a low resonance loudspeaker by virtue of balancing of resonance modes associated with hinge compliance, combined with balancing of a number of modes involving asymmetrical movement about said sagittal plane. For example, by symmetry, one or more resonance modes involving twisting of the diaphragm about an axis intersecting the sagittal plane and the coronal plane may not be excited. Preferably the transducer-base-structure-side transducing component is also symmetrical about the diaphragm's sagittal plane A201, such that the excitation force is also symmetrical. Likewise, preferably the hinge components are symmetrical about the same plane A201, to minimise excitation of the same resonance mode(s) via asymmetrical hinge forces.

In some embodiments (not shown) the diaphragm, including diaphragm-side transducing component and/or transducer-base-structure transducing component and/or hinge mounts may be asymmetrical about sagittal plane A201, but the asymmetry is designed to be balanced relative to one-another in a way that such resonance modes are not excited. Preferably they are balanced in a manner such that a resonance mode involving twisting of the diaphragm about an axis intersecting the sagittal plane and the coronal plane is balanced and only minimally excited. Preferably the diaphragm is furthermore balanced by locating the hinge mounts at the diaphragm node axis.

In some variations of this embodiment a balanced diaphragm design is combined with a diaphragm suspension including at least two hinge joints, rotatably coupling the diaphragm to the transducer base structure, and wherein the at least two hinge joints are located on either side of a central sagittal plane of the diaphragm that is substantially perpendicular to the primary axis of rotation, and wherein each hinge joint is located a distance from the central sagittal plane that is less than 0.47, 0.45, 0.42 times a maximum width of the diaphragm. This combination results in a low resonance loudspeaker by virtue of 1) balancing of resonance modes associated with diaphragm translation via hinge compliance, so that such mode(s) are only minimally excited, and 2) providing hinge support of the diaphragm structure close, in the axis direction, to natural node points of one or more bending modes of the diaphragm base structure. Such natural node points tend to be located within a distance from the central sagittal plane that is at least 0.47, 0.45, 0.42 times a maximum width of the diaphragm. As may be seen in FIG. 18E the hinge support locations, which have in this example been designed to be located near the node locations, are even closer to the sagittal plane.

The combination of a diaphragm suspension having flexible hinge mounts with a balanced diaphragm design may also provide certain advantages in some applications. Flexible hinges may be inexpensive, but may not be well suited to simultaneously achieving 1) free rotation about the primary axis, 2) high rigidity against resonance modes involving hinge compliance in translation and 3) a high angle of diaphragm excursion. An advantage of this combination is that at least some of the resonance modes involving hinge compliance in translation are addressed via balancing of the diaphragm.

The combination of 1) a balanced diaphragm assembly and 2) at least one flexible mount coupled between the diaphragm and the transducer base structure and having the properties or features of one or more of the hinge mount designs herein described, may also useful in some applications. The hinge mount designs herein described may be used to tailor the hinge to reduce the fundamental diaphragm resonance frequency and/or enhance diaphragm excursion and/or reduce compliance in a direction perpendicular to the coronal plane of the diaphragm to prevent it from bumping the driver base structure. The above combination 1) and 2) may also be useful in combination with b) a loudspeaker type transducer since these tend to be more constrained in terms of requirement for high volume excursion (related to diaphragm excursion) and possibly also reduced fundamental diaphragm resonance frequency compared to, for example, a microphone transducer. The 1) and 2) combination may also be useful in conjunction with c) transducers where there is an enclosure (see A301 in FIG. 3C) exposed to large diaphragm face(s) facing one rotational direction about axis, and outside air is exposed to opposing large rotational faces, so that: i) a low frequency increase in external sound pressure results in net torque on diaphragm and/or ii) a rotation of diaphragm assembly at low frequency results in a net displacement of air. The benefit is that using an enclosure to separate diaphragm faces in this way can make the transducer more useful at low frequencies, which works well with the improved bandwidth and reduced resonance versus cost of manufacture provided by the combination of 1) and 2).

The combination of 1) a balanced diaphragm design and 2) at least one flexible mount coupled between the diaphragm and the transducer base structure may also be useful in conjunction with d) transducers where the diaphragm-side transducing component comprises a coil (such as embodiment 2 described below), or e) the diaphragm-side transducing component comprises a magnet. The resonance benefits from combining 1) and 2) plus a linear transducing mechanism combine to make for a relatively high performing transducer that may be cost-effective to produce. Alternatively 1) and 2) may also be useful in combination with f) a piezoelectric crystal based force transducing component since these are also cost-effective.

The combination of 1) a balanced diaphragm assembly and 2) at least one flexible mount coupled between the diaphragm and the transducer base structure is furthermore useful in conjunction with g) a thick diaphragm (see FIG. 2C, A101) in order to facilitates reduced resonance via increased resistance to diaphragm bending, especially in larger transducers capable of moving a larger air volume. This can combine well with the combination of 1) and 2) which also facilitate reduced resonance, as described above, as well as potentially increased diaphragm excursion (volume excursion), all else being equal. Likewise the 1) and 2) combination may be useful in combination with h) diaphragms having thickness reducing towards the tip (see FIG. 2C, A101), especially over the half of the diaphragm furthest from the axis of rotation. This is because reducing thickness at the extremity reduces the support required of the preceding region, which may be made thinner and/or lighter. The net effect of this is to increase the frequency of certain important diaphragm tip deflection resonance modes thereby improving bandwidth. This can be advantageous in combination with 1) and 2), since this combination may also permit increased bandwidth via balancing of resonances associated with hinge compliance, while furthermore facilitating use of an inexpensive hinge mechanism. Likewise, the combination of 1) and 2) can be advantageous in combination with i) diaphragm designs where the mass per unit area reduces towards the tip (see FIG. 2C, A101) region. Similar benefits can be had by this combination as previously described for h). The combination of 1) and 2), cost-effectively addressing resonance, combine well with j) composite diaphragm designs with normal stress reinforcement (see FIG. 2C, A101) and having a lightweight body since such construction may also address resonance and/or increase diaphragm size and volume excursion, all else being equal.

Some embodiments herein described combine diaphragm balancing with a decoupling mounting system flexibly mounting the transducer base structure to an adjacent component of the audio transducer (other than the diaphragm). As seen in FIG. 3G, compliant decoupling mounts A305*a*, A305*b* and A306*a*, A306*b* reduce transfer of vibration energy between the driver base structure and it's housing, the reduce excitation of resonance modes of the housing.

Such driver decoupling, used in combination with diaphragm balancing to reduce excitation of diaphragm resonances associated with hinge compliance, may provide a cost effective low resonance speaker system.

Figure 2F:
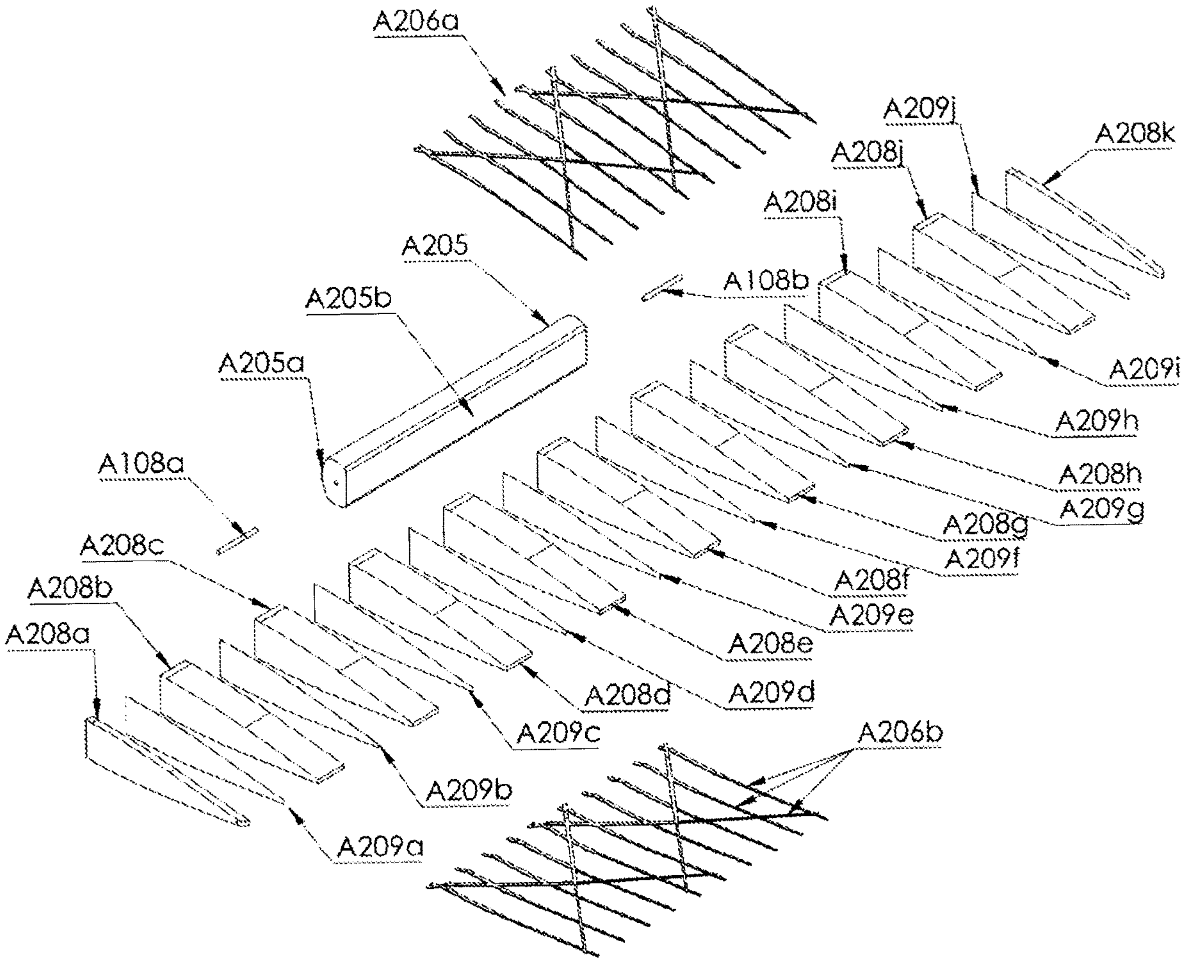

Some embodiments combine diaphragm balancing with a diaphragm construction comprising a lightweight diaphragm body and normal stress reinforcement that is reduced or mitigated in regions of the diaphragm distal to the axis of rotation. Similarly some embodiments combine diaphragm balancing with a diaphragm construction comprising a lightweight diaphragm body and normal stress reinforcement that reduces in mass in regions of the diaphragm distal from the primary axis of rotation relative to a region of the diaphragm proximal to the axis. As seen in FIGS. 2B and 2F, normal reinforcing, in this case carbon fibre struts A206*a* and A206*b*, covers only a small proportion of the diaphragm face. This means that adhesive is not required over the entire tip region, reducing mass. Concentrating the carbon fibre into struts covering a small area also permits a low overall mass of normal reinforcement at this region without complicating manufacturing methods. Concentrating the fibres into struts may be more practical to construct. Used in conjunction with diaphragm balancing to reduce excitation of diaphragm resonances associated with hinge compliance, this may result in a transducer having extended low resonance and correspondingly clean waterfall plot measurements, as well as subjective sound.

Some embodiments combine diaphragm balancing with a magnet assembly that is rigidly coupled to the diaphragm and has, overall, a single main pair of opposing magnetic poles located at opposite sides of the axis. FIG. 2D shows north and south poles located either side of axis A103, and these poles extend along substantially the entire length of a side of the diaphragm, as shown in FIG. 2A. In this embodiment the coil runs around the entire magnet, with the two main active winding sections located one adjacent to each pole. This magnet configuration provides high linear diaphragm excursion via a) rotational action/hinge to facilitate high excursion and b) two main magnet poles in this configuration makes much of that excursion linear, up to +−20 degrees or more, without the complexity and distortion associated with having multiple commutated drive coils. High linear excursion means the transducer may be made smaller, all else being equal, which may reduce unwanted resonance. With other designs the high mass of the magnet may result in unwanted resonance modes associated with hinge compliance. But in this embodiment resonances are managed via diaphragm balancing.

Some embodiments combine an audio transducer featuring diaphragm balancing, a housing having cavity for the transducer, the cavity having a substantially shallow depth dimension, the diaphragm is configured to rotatably oscillate about the primary axis of rotation between a first terminal position and second terminal position during operation, the audio transducer is oriented within the cavity such that the primary axis of rotation is substantially parallel to the depth dimension of the cavity, and wherein a total linear displacement of a terminal end of the diaphragm most distal from the primary axis of rotation along a plane that is substantially orthogonal to the depth dimension is substantially the same or greater than the depth dimension of the cavity. This geometrical configuration may be useful for providing high volume excursion in a slim device from a single transducer, such as may be required in mobile phones, tablets, laptop computers and the like. The configuration may also provide high volume excursion relative to the space taken by the transducer. Furthermore a high level of sound quality may be achieved by virtue that the diaphragm is able to move a high distance relative to diaphragm area, meaning that diaphragms may be employed which, by virtue of their small size, may be relatively resonance-free. These benefits may work particularly well in conjunction with diaphragm balancing, which may result in reduced excitation of diaphragm resonance modes that are associated with hinge compliance. Also, in this configuration the reaction force and/or torque on the transducer base structure may transmit into the rest of the (slim) device in the plane of the device, potentially resulting in less adverse resonance due to the relatively high stiffness and reduced area suitable for effective acoustical radiation, compared to other directions of excitation.

Some embodiments comprise a transducer having a rotational action diaphragm wherein the diaphragm comprises a varying thickness along a length of the diaphragm such that it: tapers thickness from a central region towards the terminal end, and the degree of taper reduces, or even reverses, towards the base end. This may result in overall convex curves over much or all of the diaphragm major faces. Preferably the diaphragm-side transducing component is located along the axis at the base end. Preferably the diaphragm-side force transducing component extends along substantially all of the base end. Force transducing components, particularly magnets and coils, may have high rotational inertia and it may be useful to restrict their diameter, about the axis, in order to manage rotational inertia and thereby optimise driver efficiency. However, a smaller diameter may mean that at higher excursion angles adjacent parts of the diaphragm may collide with either the base-side force transducing component or other closely located parts of the device, resulting in restricted diaphragm excursion. In some cases, even if diaphragm excursion is not a key limitation, even the maximum diameter of an optimised diaphragm-side transducing component may be less than an optimal base thickness for a diaphragm that has a uniform wedge-type taper. One or both if these issues may be mitigated, while preserving much of the resonance-reduction benefit of diaphragm tapering, by tapering the tip end, or at least much of the tip end, of the diaphragm, but reducing or even reversing that taper at the axis end. As previously described above, reducing thickness at the tip extremity can have the net effect of increasing the frequency of certain important diaphragm tip deflection resonance modes, thereby improving bandwidth and/or decreasing resonance issues. Providing a convex curve over much of one or both major faces may provide increased diaphragm excursion, without undue sacrifice in terms of resonance susceptibility and/or diaphragm area and/or sensitivity. As may be seen in FIG. 2*c*, diaphragm major faces 212*a* and 212*b* are both convexly curved, resulting in a reasonably sharp taper in the tip region and a zero taper proximal to magnet A205.

The benefits of a convex diaphragm are useful in combination with diaphragm balancing, which may address resonances associated with hinge compliance, since the overall result is improved volume excursion capability and reduced or eliminated resonances.

The benefits provided by convexly shaped major diaphragm face(s) may also be useful in combination with audio transducers having a rotational-action diaphragm mounted via a hinge where one or more components within or proximal to hinges have low Young's modulus. This may be a cost-effective and practical solution that may help to manage diaphragm translation resonance modes associated with hinge compliance while also potentially facilitating improved low-frequency extension from a rotational action transducer without undue compromise in terms of unwanted resonances at higher frequencies. Soft hinge components may potentially reduce resistance to rotation in flexible hinge designs, and may reduce required manufacturing tolerances in rolling type hinges. When combined with a convex diaphragm major face, which may also provide benefits such as increased diaphragm excursion, the result may be a cost-effective and relatively high-performing transducer.

The benefits provided by convexly shaped major diaphragm face(s) may be furthermore useful in combination with a diaphragm assembly comprising (and rigidly connected to) a moving magnet assembly, such as magnet A205, since magnets are an especially heavy component and so efficiency may be optimised when the magnet radius is fairly small and potentially too small for a constant taper from axis to tip to provide effective resonance control at the diaphragm tip region, whilst also leaving space for high diaphragm excursion. Note that in some embodiments there may be a thickened section of diaphragm around the periphery that serves to increase the length through the air gap in order to improve the degree of air sealing between the diaphragm periphery and its housing.

In some embodiments a transducer comprises a diaphragm structure comprising a plurality of diaphragms, a transducer base structure, a diaphragm suspension configured to rotatably mount the diaphragm structure relative to the transducer base structure to rotate the diaphragm structure relative to the transducer base structure about an axis of rotation, and a transducing mechanism operatively coupled to the diaphragm structure to transduce between audio signals and sound pressure. Preferably the plurality of diaphragms each extend from the axis of rotation and are radially spaced, and preferably they are substantially rigidly connected to one-another. An advantage of such transducers is that, for given overall volume excursion capability, diaphragm bodies may extend a shorter distance out from the axis, and may also be narrower in the axis direction, thereby potentially reducing susceptibility to diaphragm flexing resonance for given volume excursion capability. Such transducers may be useful in combination with convex diaphragms, since both features together may provide further increased diaphragm excursion and reduced susceptibility to resonance.

Some embodiments comprise 1) a balanced diaphragm design and 2) a diaphragm-side transducing component that couples along an axis that is substantially parallel to the primary axis of rotation, between two opposing sides of the diaphragm. Benefits include low resonance by virtue of 1) balancing of resonance modes associated with hinge compliance, 2) dual diaphragm blades may extend a shorter distance from the axis thereby reducing susceptibility to diaphragm flexing resonance for given volume excursion, and 3) the heavy diaphragm-side transducing component being located in close proximity between two diaphragms reduces susceptibility to resonance modes involving movement of the diaphragms relative to the transducing component.

In some embodiments a diaphragm structure comprising a plurality of diaphragms, in combination with at least one primary hinge support that works via a flexing action as opposed to, for example, a hinge based on elements that roll against one-another, such as occurs in a ball bearing race can be beneficial. Flexible hinges may be inexpensive, but may not be well suited to simultaneously achieving 1) free rotation about the primary axis, 2) high rigidity against resonance modes involving hinge compliance in translation and 3) a high angle of diaphragm excursion. An advantage of this embodiment is a rotational diaphragm assembly comprising multiple diaphragms tends to be better balanced, or at least less unbalanced, compared to a single diaphragm design, so excitation of one or more resonance modes facilitated by hinge compliance in translation may be reduced. In a preferred embodiment the flexing element of the hinge furthermore has Young's modulus less than 8 GPa to make even greater use of the relaxation of constraint 2). Such less-rigid materials may facilitate freer rotation (requirement 1 above) and increased diaphragm excursion (requirement 3), as well as being potentially inexpensive to manufacture, for example via processes such as injection moulding. Additionally, multiple diaphragms means that more air can be moved with less angle of excursion, meaning that requirement 3) may be relaxed, all else being equal. These features have potential to result in an inexpensive and effective transducer having low susceptibility to resonance.

In some embodiments a diaphragm structure comprising a plurality of diaphragms in combination with at least one primary hinge support that works via a flexing action, and with the diaphragm-side force transducing component comprising a magnet assembly can be beneficial. Moving magnet-assembly transducer designs typically have a disadvantage that the magnet mass is high, leading to hinge requirement 2) above, for high rigidity against resonance modes involving hinge compliance in translation, becoming particularly hard to achieve since the hinge must be even more rigid against translational resonance modes. Because multiple diaphragm assemblies tend to be better balanced, or at least less unbalanced, compared to a single diaphragm designs, hinge requirement 2) may be relaxed, permitting use of a relatively simple flexing type hinge, and furthermore permitting use of a moving-magnet-assembly diaphragm-side force transducing component. Both the flexible hinge and the moving magnet motor structure may be simple and inexpensive to manufacture yet relatively high performing in a multiple diaphragm construction.

Some embodiments comprise a multiple diaphragm transducer, a moving magnet assembly diaphragm-side force transducing component and a decoupling mounting system flexibly mounting the transducer base structure to an adjacent component of the audio transducer other than the diaphragm structure. The advantages of combining a moving magnet assembly motor type with a multiple-diaphragm diaphragm assembly work well in combination with a decoupling system to reduce transfer of vibration to surrounding components such as a housing, which may reduce excitation of such surrounding components resulting in a cost-effective device with reasonable performance.

Some embodiments comprise a multiple diaphragm transducer, a moving magnet assembly diaphragm-side force transducing component and at least one diaphragm hinge joint having a rolling element race, for example a ball bearing race, and wherein the rolling element race comprises less than seven rolling elements. Reducing the number of rolling elements provides advantages that there may be less chance of closely adjacent elements having different tolerances so that one may either jam or rattle potentially leading to distortion in transducer output. Also less rolling elements may lead to reduced rolling resistance and reduced nonlinear stop/start friction effects, again leading to reduced transducer output distortion. Translational rigidity may potentially be reduced, however this disadvantage may be mitigated by improved balancing associated with the use of multiple diaphragms reduces translational stiffness requirement 2) on the hinge. As described above the reduced translational stiffness requirement 2) on the hinge may also mean that a heavy moving magnet assembly may be feasible. The combination may thereby provide a simple and cost-effective transducer having low susceptibility to resonance type and rolling element type distortions.

Some embodiments comprise a multiple diaphragm transducer, and a moving magnet assembly diaphragm-side force transducing component that has, overall, a single main pair of opposing magnetic poles located at opposite sides of the axis. In this embodiment the coil runs around the entire magnet, with the two main active winding sections located one adjacent to each pole. This magnet configuration provides high linear diaphragm excursion via a) rotational action/hinge to facilitate high excursion and b) two main magnet poles in this configuration makes much of that excursion linear, up to +−20 degrees or more, without the complexity and distortion associated with the complexity and possible distortion associated with multiple commutated drive coils. High linear excursion means transducers may potentially be smaller, all else being equal, which in turn means reduced resonance. Ordinarily the high mass of the magnet may result in unwanted resonance modes associated with hinge compliance, but this disadvantage may be mitigated by improved balancing associated with the use of multiple diaphragms. Despite potentially compact diaphragm blade dimensions, and resulting reduced susceptibility to resonance, linear volume excursion capability may be high due to the combination of multiple diaphragm bodies, the high linear excursion angle provided by the transducing mechanism, and potentially high excursion capability of the hinge since improved balancing may relax the requirement for it to be highly rigid against translations. The overall result is an inexpensive yet potentially high performing loudspeaker.

Some embodiments comprise a multiple diaphragm transducer, a transducing mechanism comprising a magnet assembly diaphragm-side transducing component coupled to the diaphragm structure for transferring a force to or from the diaphragm structure during operation, and where the magnet assembly overlaps with one or more diaphragms along the primary axis of rotation. Preferably the magnet assembly extends along one side of at least one, or more preferably all, diaphragm bodies. Having the heavy magnet assembly physically close to diaphragm(s), proximal to one side rather than, for example, connected via a shaft, may keep the diaphragm assembly more compact and may keep heavy components in closer proximity, which helps to reduce diaphragm assembly flexing resonance issues. In conjunction with a diaphragm assembly comprising at least two diaphragm blades, which may be made smaller and therefore less prone to resonance all else being equal, the result may be a cost-effective transducer providing low resonance distortion. Preferably the magnet assembly is directly, rigidly connected to the diaphragm structure, and most preferably to normal reinforcement on the surface of a composite diaphragm, so that inherent rigidity in the magnet assembly may more effectively support the diaphragm against unwanted resonance modes. Preferably connection is exclusively via components having at least reasonably high Young's Modulus (preferably >0.5 GPa, more preferably >2 GPa and most preferably >4 GPa) in order to ensure a rigid coupling and reduce resonance. Preferably connecting components are not sharply curved and are oriented such that they may transmit forces via tension and/or compression. Such construction may for example help to reduce resonance involving diaphragm movement in opposition to the diaphragm-side transducing component. Preferably air adjacent to diaphragm faces producing positive air pressure, given a particular angle of rotation, is separated from air adjacent to opposing diaphragm faces, by a close-fitting surround and baffle or enclosure, in order that lower frequencies may be reproduced with reduced turbulence noise distortion, since this may enhance low resonance benefits of structural features described above and linearity benefits of the electromagnetic transducing mechanism. In an alternative embodiment a multiple diaphragm transducer is combined with a piezoelectric element overlapping with one or more diaphragms along the primary axis of rotation, and preferably also extending along one side. Again, the close proximity of the diaphragm-side transducing component to the diaphragms may help to address unwanted resonance modes in the system.

In some embodiments a multiple diaphragm design is combined with damped material in or around one or more hinge mechanisms. This combination provides the benefit that improved diaphragm balancing reduces distortion resulting from non-primary resonance modes associated with hinge compliance, and the damped hinge material may dissipate energy from what excitation does happen of these modes. Resonance associated with certain diaphragm flexing modes is also reduced due to the relatively smaller diaphragm size made possible by using multiple diaphragm bodies so an overall cost-effective and low-resonance transducer may result.

In some embodiments a multiple diaphragm design is used in combination with a surround configured to surround at least one diaphragm of the diaphragm structure, and preferably also surround the diaphragm structure, wherein the surround comprises at least one reinforced region opposing a terminal end of at least one of the diaphragms that is distal to the primary axis of rotation, each reinforced region comprising a greater stiffness relative to adjacent region(s) of the surround. Preferably reinforcing comprises a rib of increased thickness. Preferably the rib protrudes on the side facing away from the diaphragm. Preferably some reinforcing is along a full range of motion of the terminal end during operation. Preferably some reinforcing is across the full width of the terminal end, more preferably in a direction substantially parallel to the axis. The reinforcing provides advantages that the terminal face may be made cost-effectively, for example via injection moulding, from a material that may be relatively inexpensive, such as plastic or fibre-reinforced plastic, without being unduly prone to resonance. This is useful in combination with a multiple diaphragm transducer which may also be less prone to resonance due to the possibility of diaphragms being smaller, all else being equal, making for a cost-effective yet high-performing transducer/housing combination. Another benefit is that reinforcing may permit cost-effective manufacturing with reduced risk of warping that may occur with a uniformly thick wall. Since the diaphragm sweeps a three-dimensional curve, potentially over a wide angle, manufacturing methods such as trimming the diaphragm perimeter to fit the surround/housing, may not be useful in terms of that the required trim profile may vary with angular excursion. So a more accurately manufactured surround/housing may be useful in terms of permitting the diaphragm to be fitted more closely and seal better resulting in reduced distortion associated with air leakage.

In some embodiments the hinge is located at the diaphragm structure node axis, and the diaphragm suspension comprises one or more hinge joints, each hinge joint having a pair of cooperating, substantially rigid contact surfaces configured to move relative to one another during operation to rotate the supported diaphragm, and a biasing mechanism configured to compliantly bias the pair of cooperating contact surfaces towards one another to maintain substantially consistent physical contact between the contact surfaces during normal operation.

Such a hinge mechanism may provide high diaphragm excursion and reduced fundamental resonance frequency and potentially low susceptibility to fatigue failure, while simultaneously offering potential for constraining the diaphragm against translation. The hinge joint could be, for example, a highly rigid rolling joint that attempts to restrain the diaphragm by brute force, in which case highly rigid rolling surfaces may be desired, or else some translational compliance might be acceptable in which case rolling surfaces and/or other hinge components could comprise a material having some degree of compliance such as, for example, a hard urethane, for example the hinge could comprise a ball bearing race where the balls are made from hard urethane that introduces compliant bias at the rolling surfaces. Such performance characteristics may be augmented by location of the hinge at the diaphragm node axis, resulting in balancing of resonance modes associated with hinge compliance for further improved transducer performance.

Further advantage may be obtained in terms of resonance management wherein, in the aforementioned embodiment, one of the contact surfaces forms part of the diaphragm and the other contact surface forms part of the transducer base structure, since this may achieve a simple, high performing and cost-effective system.

Loudspeakers having a rotational action diaphragm hinging on a soft hinge may be inexpensive to produce. However, hinge compliance in translation may result in resonance modes of the diaphragm and associated frequency response peaks, dips and/or steps around the frequency of such unwanted resonance modes. The combination of a transducer having a diaphragm rotatably mounted to a base structure via a hinge that permits a degree of translational as well as rotational compliance, with a high-pass filter applied to source audio, may help to solve such issues. When the translational compliance of the hinge is sufficient that a diaphragm resonance frequency associated with translational hinge compliance lies below the frequency from which the high-pass filter provides 3 dB of attenuation the distortions associated with the resonance may be shifted to below the operating bandwidth that is defined by the filter. Resonance modes resulting in displacement of the diaphragm in a direction perpendicular to a coronal plane may move the most air, and preferably these are shifted to below the operating bandwidth. This technique may be especially effective in the case of mid-range or treble bandwidth drivers that are intended to be used with a high-pass filter.

This issue may also be addressed through the combination of a transducer having a rotatably mounted diaphragm with an equalisation device which corrects one or more frequency response and/or other distortions associated with translational hinge compliance. The equalisation device may compensate for distortions in frequency response, phase response, and impulse response. The equalisation device may comprise a filter, for example a digital filter such as a Finite Impulse Response filter. The equalisation device may comprise an analogue filter. The equalisation device may alternatively comprise a digital processor programmed with mathematical model of diaphragm behaviour, or at least correlated with diaphragm behaviour, which is used in a feed-forward process that corrects distortions associated with hinge compliance. The equalisation device may comprise a digital processor programmed based on a measured response of a speaker, for example it may apply an impulse response to in incoming audio signal based on an inverse of a measured response of a speaker as measured in an anechoic environment. Equivalents to any of the above methods may be applied to an output audio signal of a microphone transducer having a substantially rotational action diaphragm.

The combination of an audio transducer having a rotational-action diaphragm mounted via a soft hinge with a surround comprising a protective material on an inner wall may also be useful in some applications. The soft hinge may be cost effective and high-performing, but may be susceptible to translation if the product is bumped or dropped, potentially damaging the fragile diaphragm perimeter. The protective material helps to avoid such damage without necessitating an unduly large air gap, or a traditional rubber type diaphragm surround to maintain an air seal.

The combination of an audio transducer having a rotational-action diaphragm mounted via a soft hinge with one or more features for locating the device proximal to a user's ear and with a coil or magnet diaphragm-side transducing component may be beneficial. Rotational action transducers having soft hinges may work well in close proximity to a user's ear because, since there is reduced requirement for high volume excursion, performance is relatively more limited by bandwidth considerations. A soft hinge is a cost-effective solution that may provide low-frequency extension without undue compromise in terms of unwanted resonances at higher frequencies, even when the operating bandwidth is very wide as in the case of personal audio devices. Moving coil or moving magnet transducing mechanisms may provide high linearity over a wide angle of diaphragm excursion, resulting in a cost-effective, easily miniaturised yet potentially high performing device. One or more hinge components, or components proximal to a hinge, may be well-damped as well as, or instead of being, soft.

In some applications it may be useful to combine audio transducer having a rotational-action diaphragm mounted via a soft hinge with one or more features for locating the device proximal to a user's ear and with a diaphragm-side transducing component located within at least 50% (more preferably within 40% and most preferably within 30%) of a radius of the diaphragm structure. As described above, rotational action drivers having soft hinges may satisfy the demanding bandwidth requirement, and locating a diaphragm-side transducing component at a reduced radius may provide improved linearity over a wide angle of diaphragm excursion. One or more hinge components, or components proximal to a hinge, may be well-damped as well as, or instead of being, soft.

In some applications it may be useful to combine audio transducer having a rotational-action diaphragm mounted via a soft hinge with one or more features for locating the device proximal to a user's ear and with a diaphragm having a substantially thick diaphragm body. Again, rotational action transducers having soft hinges may satisfy the demanding bandwidth requirement. Combined with a substantially thick diaphragm to improve high frequency bandwidth via reduced resonance, while potentially also increasing diaphragm size for improved low frequency response, the result may be a cost-effective yet potentially high performing device. One or more hinge components, or components proximal to a hinge, may be well-damped as well as, or instead of being, soft.

In some applications it may be useful to combine audio transducer having a rotational-action diaphragm mounted via a soft hinge with one or more features for locating the device proximal to both of a user's ear. The above-described advantages of locating a soft-hinge rotational action transducer proximal to a user's ear may be fully realised when such a device is accurately located proximal to each ear to enable accurate, consistent and repeatable calibration for stereophonic, at least, reproduction in both ears. Again one or more hinge components, or components proximal to a hinge, may be well-damped as well as, or instead of being, soft.

It may also be useful to combine an audio transducer having a rotational-action diaphragm mounted via a soft hinge with a coil or else magnet diaphragm-side transducing component, the centre of mass of which is located at or adjacent the axis of rotation. Reducing Young's modulus in a hinge may improve low-frequency extension without undue compromise in high frequency performance. Location of the substantial mass of a coil or magnet-based force transferring component at or close to the axis may better balance the diaphragm and reduce excitation of translational resonance modes to which soft hinges may be susceptible. Moving coil or moving magnet excitation may provide high linearity over a wide range of diaphragm excursion. Preferably the diaphragm-side force transducing component comprises a magnet.

This can work well with a soft-hinge approach in the sense that translational modes are managed so the high mass of a magnet does not pose an unacceptable limitation. One or more hinge components, or components proximal to a hinge, may be well-damped as well as, or instead of being, soft.

In some applications it may be useful to combine audio transducer having a rotational-action diaphragm mounted via a soft hinge with a diaphragm having a substantially thick body and a diaphragm-side transducing component having centre of mass located at or adjacent the axis of rotation. Reducing Young's modulus in a hinge may improve low-frequency extension without undue compromise in high frequency performance. A substantially thick diaphragm improves high frequency bandwidth via reduced resonance, while potentially also increasing diaphragm size for improved low frequency response. Location of the substantial mass of a force transferring component at or close to the axis may better balance the diaphragm and reduce excitation of translational resonance modes to which soft hinges may be susceptible. One or more hinge components, or components proximal to a hinge, may be well-damped as well as, or instead of being, soft.

The combination of an audio transducer having a rotational-action diaphragm mounted via a soft hinge with a decoupling system reducing vibration transfer between a transducer base structure and its housing may be useful in certain applications. Using low Young's modulus materials in and/or proximal to a hinge may provide improved low-frequency extension without undue compromise in terms of unwanted resonances at higher frequencies, while a decoupling system may cost effectively reduce excitation of resonances of the housing or enclosure. As above, one or more hinge components, or components proximal to a hinge, may be well-damped as well as, or instead of being, soft.

In some applications it may be useful to provide a soft, flexing-type diaphragm hinge having special geometry that may improve some combination of: increase rotational compliance about the axis; increase maximum excursion capability; reduce susceptibility to fatigue failure; and/or reduce translational compliance in a direction perpendicular to the axis of rotation.

A soft diaphragm hinge that may be useful comprises a pin rigidly connected to either of the diaphragm assembly or the driver base and extending substantially along the axis, which is surrounded by and fixed to a soft, flexible material. The flexible material may connect to a part of the other of the diaphragm assembly or transducer base structure that extends around the pin. This design may provide mechanical robustness and reduce translational compliance, due to the fact that the flexible material may be constrained around the pin.

Another potentially useful soft hinge comprises a torsion element located at the axis. The diaphragm assembly may be connected at one end of the element and the transducer base structure at the other. One or both connections of these connections may be located substantially at the axis. The middle portion of the torsion element may be thinner in order to reduce the chance of failure at the connections.

One potentially useful a soft hinge comprises an elongated flexing element, one end of which connects to the diaphragm assembly and another end connects to the base. The shortest length through the flexing material from the diaphragm assembly to the transducer base structure may be greater than 1.5, more preferably greater than 2, and most preferably greater than 2.5 times the minimum thickness across the elongated element in a direction perpendicular to the length. Preferably the length through the flexing material is substantially straight. The hinge may comprise another elongated element oriented in a significantly different direction, which may provide increase support against translation in multiple because each element may provide disproportionately reduced compliance in a direction along its own length. The connection points may comprise a thicker profile in order to avoid creating points of elevated stress at the joint. In some cases each flexible element is substantially planar and is oriented substantially parallel to the axis but, again, are also rotated about the axis relative to one-another so that they provide disproportionately increased support against translation in their own plane.

In some embodiments, soft hinges having one or more concave surfaces may be used as these tend to increase rotational compliance over translational compliance, which is useful for diaphragm hinges, as is outlined above.

In some embodiments, compliance and/or damping may be imparted to hinge types that ordinarily are rigid and non-damped, via substitution of rigid components with soft and/or damped versions. For example a ball bearing race could have balls and/or a race substituted for hard but damped urethane balls and/or race. Also, similar results may be achieved by attaching rigid hinges via compliant components. For example a ball bearing race may be located within a thin tube of rubber to impart some softness and/or damping. Advantages of such designs may include increased excursion angle capability, reduced fundamental resonance frequency, reduced susceptibility to fatigue failure, reduced manufacturing tolerances and flexibility to tailor softness and damping to manage various resonance modes.

Preferably the flexible material of previously described soft hinge designs is formed by injection moulding or extrusion in order to improve the accuracy and consistency of dimensions and surface finish and the uniformity of the material, thereby improving the angle of excursion and fatigue life. Preferably the flexible material is over-moulded onto one or more support structures in order to eliminate a gluing process that may be prone to leaving excess glue which may create stress raisers thereby reducing diaphragm excursion and/or fatigue life. Such manufacturing methods are particularly useful in the context of miniaturised drivers such as for headphones and earphones, and most especially in such drivers that operate at low frequencies since more compliant and high excursion and generally high-performance hinges may be required.

Preferably the hinge furthermore incorporates means of damping translational displacements in order to further mitigate resonance issues that may arise associated with translational compliance in the hinge.

In some embodiments a diaphragm-side transducing component comprises a magnet, and preferably this is rigidly fixed to the diaphragm in-use. Preferably the magnet is a permanent magnet of a strong type such as Neodymium Iron Boron Magnets, or other suitable magnet type that provides high strength and sufficient temperature resistance for the required power handling capability if the transducer is a loudspeaker.

Preferably the base-side transducing component comprises a coil rigidly fixed thereto. Transducer efficiency may be improved through use of ferromagnetic pole pieces directing field lines around the coil, however this may also cause problems including potentially subjecting the magnet/diaphragm assembly to high static forces. Such forces may cause creep in susceptible components including certain hinge, transducer parts and housing materials, and excessive creep may lead to unwanted rubbing of parts, wear, and breakage. Management of creep may necessitate robust components which may increase cost and limit performance of the hinge, for example hinges may need to comprise rigid ball bearing races, for example, rather than more cost-effective and reliable flexing hinges, and housings may need to be cast from metal rather than moulded from plastic.

In some embodiments ferromagnetic materials, at least those which are not rigidly fixed to the diaphragm, may be located sufficiently far away from the magnet that static forces may be manageable without undue requirement to manage creep. Large ferromagnetic surfaces may be especially problematic in terms of applying load to a magnet. Strongly ferromagnetic materials having higher permeability, for example pure iron, ferritic stainless steel, martensitic stainless steel or ferrite may also result in greater loads.

In some embodiments, the audio transducer may comprise one or more other strongly ferromagnetic component(s) that are rigidly connected to the magnet(s) and that may carry a significant magnetic flux form a magnet structure or assembly. These, being rigidly fixed to the magnet, will not exert loads on hinge systems and housings of the magnet other than due gravity acting on their inherent mass.

In some embodiments, the audio transducer may not comprise other components comprising a strongly ferromagnetic material other than those of the magnet structure or assembly. This may mean that there are no other ferromagnetic objects in close proximity attracting the magnet and thereby may avoid loads on hinge systems and housings of the magnet.

A component having a strongly ferromagnetic material may mean a component having a maximum relative magnetic permeability in-situ (with diaphragm-at-rest) of more than approximately 300 $m\mu_r$, or more than approximately 500 $m\mu_r$, or more than approximately 1000 $m\mu_r$.

In some embodiments, the audio transducer may comprise one or more other strongly ferromagnetic component(s), other than components of the magnetic structure or assembly, and the magnetic assembly is substantially distal from the other ferromagnetic component(s). Again, This may mean that there are no other ferromagnetic objects in close proximity attracting the magnet and thereby may avoid loads on hinge systems, housings of the magnet, and potentially on the diaphragm structure itself.

In some embodiments, the other ferromagnetic component(s) may comprise one or more relatively large or major surface(s) facing towards the magnet or magnetic structure or assembly. The relatively large or major surface(s) of the other ferromagnetic component(s), may be substantially distal from a nearest surface or a relatively large or major surface of the magnet or of the magnetic structure or assembly, to mitigate or significantly minimise a reaction of the other ferromagnetic component(s) with the magnet or magnetic structure or assembly. The nearest or relatively large or major surface(s) of the magnet or magnetic structure or assembly may be separated from the relatively large or major surface(s) of the other ferromagnetic component(s) by a distance of at least approximately 0.4 times a maximum distance between opposing poles of the magnet or magnetic structure or assembly. Again, This may mean that there are no other ferromagnetic objects in close proximity attracting the magnet and thereby may avoid loads on hinge systems and housings of the magnet. Note that the maximum distance between opposing poles of the magnet or magnetic structure or assembly may affect the distance from the magnet over which significant attraction may occur, because 1) it is a possible indication of the size of the magnet, and 2) opposite poles that have greater separation tend to 'throw' more magnetic field out a greater distance.

The nearest or relatively large or major surface(s) of the magnet or magnetic structure or assembly may be separated from the relatively large or major surface(s) of the other ferromagnetic component(s) by a distance of at least approximately 0.6 times a maximum distance between opposing poles of the magnet or magnetic structure or assembly. The nearest or relatively large or major surface(s) of the magnet or magnetic structure or assembly may be separated from the relatively large or major surface(s) of the other ferromagnetic component(s) by a distance that is approximately the same as a distance between opposing poles of the magnet or magnetic structure or assembly.

Hinges may be particularly susceptible to static loading in directions perpendicular to the axis, since 1) there may be a larger area of magnet facing and that may be attracted in such directions, 2) hinge may have flexing surfaces that may be thin when viewed from the axis direction, since this may reduce the restoring force about the axis extending low frequency response, and this thinness may make hinges susceptible to deformation or even buckling in directions perpendicular to the axis, and 3) there may be base-side transducing components such as coils, or air sealing surfaces, in close proximity in directions perpendicular to the axis, which may rub if the hinges deflect too far under static loads applied in such directions. To keep loads in such directions within manageable limits, the nearest relatively large or major surface(s) of the magnet or magnetic structure or assembly may be separated from the relatively large or major surface(s) of the other ferromagnetic component(s) by a distance of at least approximately 0.4 times a maximum distance between opposing poles of the magnet or magnetic structure or assembly. The nearest or relatively large or major surface(s) of the magnet or magnetic structure or assembly may be separated from the relatively large or major surface(s) of the other ferromagnetic component(s) by a distance, along an axis substantially perpendicular to the axis of rotation, of at least approximately 0.6 times a maximum distance between opposing poles of the magnet or magnetic structure or assembly. The nearest or relatively large or major surface(s) of the magnet or magnetic structure or assembly may be separated from the relatively large or major surface(s) of the other ferromagnetic component(s) by a distance, along an axis substantially perpendicular to the axis of rotation, that is approximately the same as a distance between opposing poles of the magnet or magnetic structure or assembly.

Since, as stated above, hinges may be particularly susceptible to static loading in directions perpendicular to the axis, it may be important that magnets are not able to 'throw' more magnetic field out a greater distance in such directions (perpendicular to the axis). There may be correlation between the maximum dimension of the magnet along an axis that is substantially perpendicular to the axis of rotation and the distance it is able to 'throw' magnetic field out in directions perpendicular to the axis, so the greater the dimension of the magnet in such directions the further away other ferromagnetic surfaces might need to be in order to avoid undue attraction forces. In some embodiments the nearest or relatively large or major surface(s) of the magnet or magnetic structure or assembly may be separated from the relatively large or major surface(s) of the other ferromagnetic component(s) by a distance of at least approximately 0.4 times a maximum dimension of the magnet along an axis that is substantially perpendicular to the axis of rotation. The nearest or relatively large or major surface(s) of the magnet or magnetic structure or assembly may be separated from the relatively large or major surface(s) of the other ferromagnetic component(s) by a distance of at least approximately 0.6 times a maximum dimension of the magnet along an axis that is substantially perpendicular to the axis of rotation. The nearest or relatively large or major surface(s) of the magnet or magnetic structure or assembly may be separated from the relatively large or major surface(s) of the other ferromagnetic component(s) by a distance that is approximately the same as a maximum dimension of the magnet along an axis that is substantially perpendicular to the axis of rotation.

There may also be correlation between the distance a magnet is able to 'throw' magnetic field out and the maximum dimension of the magnet in one or more directions substantially parallel to a ferromagnetic surface that is in the proximity, so the greater the dimension(s) of the magnet in such directions the further away the other ferromagnetic surfaces might need to be in order to avoid undue attraction forces. In some embodiments nearest or relatively large or major surface(s) of the magnet or magnetic structure or assembly may be separated from the relatively large or major surface(s) of the other ferromagnetic component(s) by a distance of at least approximately 0.4 times a maximum dimension of the magnet in a direction parallel to said surface and perpendicular to the axis. The nearest or relatively large or major surface(s) of the magnet or magnetic structure or assembly may be separated from the relatively large or major surface(s) of the other ferromagnetic component(s) by a distance of at least approximately 0.6 times a maximum dimension of the magnet in a direction parallel to said surface and perpendicular to the axis. The nearest or relatively large or major surface(s) of the magnet or magnetic structure or assembly may be separated from the relatively large or major surface(s) of the other ferromagnetic component(s) by a distance that is approximately the same as a maximum dimension of the magnet in a direction parallel to said surface and perpendicular to the axis.

In the previous three embodiments nearest, the relatively large or major surface(s) of the magnet or magnetic structure or assembly may be separated from the relatively large or major surface(s) of the other ferromagnetic component(s) by the above-described distances in some direction that is substantially perpendicular to the axis of rotation, since such directions are important for loadings on hinges, housings etc.

The nearest or relatively large or major surface(s) of the magnet or magnetic structure or assembly may be separated from the relatively large or major surface(s) of the other ferromagnetic component(s) by a distance of at least approximately 0.4 times a maximum length of the magnet. The nearest or relatively large or major surface(s) of the magnet or magnetic structure or assembly may be separated from the relatively large or major surface(s) of the other ferromagnetic component(s) by a distance of at least approximately 0.6 times a maximum length of the magnet. The nearest or relatively large or major surface(s) of the magnet or magnetic structure or assembly may be separated from the relatively large or major surface(s) of the other ferromagnetic component(s) by a distance that is approximately the same as a maximum length of the magnet.

The nearest or relatively large surface of the magnet assembly is separated, in some direction perpendicular to the axis, from the relatively large surface of the other ferromagnetic component(s) by a distance of at least approximately 0.4 times a maximum dimension of the magnet in a direction parallel to said surface in locality of said surface. The nearest or relatively large surface of the magnet assembly is separated, in some direction perpendicular to the axis, from the relatively large surface of the other ferromagnetic component(s) by a distance of approximately 0.6 times a maximum dimension of the magnet in a direction parallel to said surface in locality of said surface. The nearest or relatively large surface of the magnet assembly is separated, in some direction perpendicular to the axis, from the relatively large surface of the other ferromagnetic component(s) by a distance substantially similar to a maximum dimension of the magnet in a direction parallel to said surface in locality of said surface.

In some embodiments, the transducer does not comprise other ferromagnetic component(s) exerting a force on the magnet or magnetic structure or assembly that is greater than seventy times, more preferably greater than fifty times and most greater preferably forty times the force due to gravity acting on the magnet assembly. Again, this may help to keep such attraction forces manageable, reducing static loads on hinge elements, housings and the diaphragm.

In some embodiments, the transducer comprises other ferromagnetic component(s) facing towards the magnet or magnetic structure or assembly that attract the magnet or magnetic structure or assembly in opposing directions. In some embodiments, the net force on the magnet or magnetic structure or assembly due to the other ferromagnetic component(s) is negligible or approximately zero.

In some embodiments, the net force exerted on the diaphragm by the other ferromagnetic components is less than 20 times greater, more preferably less than 10 times great, and most preferably less than 5 times greater than the force on the diaphragm due to the effect of gravity.

In some embodiments, the net force exerted on the diaphragm by other ferromagnetic components may approximately cancel the force on the diaphragm due to the effect of gravity, in situ.

The above embodiments comprising devices where the other ferromagnetic components are either kept away from the magnet, or else are eliminated entirely, may be useful in combination with a magnet assembly structure wherein the magnet overlaps with the diaphragm along the axis of rotation. The overlapping of the magnet keeps higher mass components in closer proximity within the diaphragm assembly, reducing resonance issues, and potentially also lets the magnet double as a rigid diaphragm base structure preventing further resonance modes. Keeping other ferromagnetic components some distance away from the magnet, or eliminating them entirely, which may reduce static loads on hinges and housings, permitting use of more common and inexpensive manufacturing methods such as injection moulding of housings, and more high performance yet delicate hinge systems, such as incorporating lower-Young's modulus materials into hinges to further address resonance issues. The overall result is an inexpensive yet high-performing transducing device.

The above embodiments comprising devices where the other ferromagnetic components are either kept away from the magnet, or else are eliminated entirely, may be useful in combination with a diaphragm assembly comprising a maximum width, in the axis direction, that is less than approximately 6 times greater than a length from an axis of rotation to a furthest opposing terminal end of the diaphragm assembly, or less than 4 times greater, or less than three times greater since such more compact proportions keeps higher mass components in closer proximity within the diaphragm assembly, reducing resonance issues. Again, this is useful in combination with keeping of other ferromagnetic components some distance away, or eliminating them entirely, since this may facilitate more practical and inexpensive and/or high-performance manufacturing methods and materials for housings and hinge systems, potentially reducing resonance and resulting in an inexpensive yet high-performing transducing device.

Preferably if the magnet is housed in a metal part, this has density of less than approximately 2.2 grams per centimetre cubed. Preferably the metal part, in the vicinity of the magnet, may have a solid volume that is lower than a solid volume of the magnet, or a solid volume that is less than approximately 0.8 times the solid volume of the magnet. The metal part may be located at an average radius that is less than the average radius of the magnet. This may avoid undue mass which may otherwise exacerbate resonance modes, and if there is mass the radius is not too large in order that it does not contribute unduly to rotational inertia of the diaphragm assembly.

In some embodiments, a face or side of the coil on a side distal from a magnet of an electromagnetic mechanism, may not have any strongly ferromagnetic material in intimate contact therewith. In some embodiments, a face or side of the coil on a side distal from a magnet of an electromagnetic mechanism, may not have any strongly ferromagnetic material rigidly connected therewith. Preferably also, there is no pole piece proximal to a magnet of an electromagnetic mechanism. In this manner ferromagnetic surfaces, other than any rigidly attached to the magnet/diaphragm, may be removed from close proximity to the magnet. This may result in reduced transducer efficiency because one or more magnetic fields may not be effectively directed, however there may be a reduction in static loads on hinges, housings etc. which may facilitate more high performing and/or inexpensive materials and manufacturing methods and may improve device reliability. Preferably also, a flexible hinge is used, which provides advantages such as simple manufacturing and low diaphragm fundamental resonance frequency, yet may not be so susceptible to creep or failure resulting from static loads because ferromagnetic elements are less proximal or absent.

In some embodiments, a face or side of the coil on a side distal from a magnet of an electromagnetic mechanism, may have a gap of at least 1 mm, more preferably at least 2 mm, and most preferably at least 4 mm to any strongly ferromagnetic material beyond.

In some embodiments, the audio transducer may not comprise any pole pieces around the coil. In alternative embodiments, the audio transducer may comprise pole pieces around the coil.

Some embodiments combine: a transducer having a rotatable diaphragm; a diaphragm-side transducing component being a magnet; the direction of a primary internal magnetic field between the magnetic poles may be substantially angled relative to a coronal plane of the diaphragm; the magnet may overlap with the axis of rotation; a base-side transducing component comprising a coil may be located adjacent and wrapped around a magnet of the transducing mechanism; one side of coil windings at one side of the axis are not continuously connected to another side of the coil windings at the other side of the magnet via a continuous ferromagnetic pole piece circuit. Preferably the direction of the primary magnetic field may be substantially orthogonal relative to a coronal plane of the diaphragm, or of a diaphragm of the diaphragm structure. Preferably the coil may be wrapped around an axis intersecting a coronal and a sagittal plane of the diaphragm. This diaphragm and coil orientation provides advantages of simplicity, high linear excursion capability of the motor, and reasonable efficiency since the magnet is located overlapping the axis thereby minimising rotational inertia. The fact that the coil windings on one side are not connected by a continuous ferromagnetic circuit may reduce attraction forces acting on the magnet, which may potentially be or become unbalanced, reducing the chance of static loads on hinges, housings etc. which may facilitate more high performing and/or inexpensive materials and manufacturing methods and may improve device reliability. The result may be an inexpensive yet high-performing transducer. Preferably also, a flexible hinge is used, which provides advantages such as simple manufacturing and low diaphragm fundamental resonance frequency, yet may not be so susceptible to creep or failure resulting from static loads because there is no continuous ferromagnetic circuit.

Some embodiments combine: a transducer having a rotatable diaphragm; a diaphragm-side transducing component being a magnet; the direction of a primary internal magnetic field between the magnetic poles may be substantially angled relative to a coronal plane of the diaphragm; the magnet may overlap with the axis of rotation; a base-side transducing component comprising a coil may be located adjacent and wrapped around a magnet of the transducing mechanism; a diaphragm suspension comprising a flexible hinge. Preferably the direction of the primary magnetic field may be substantially orthogonal relative to a coronal plane of the diaphragm, or of a diaphragm of the diaphragm structure. Preferably the coil may be wrapped around an axis intersecting a coronal and a sagittal plane of the diaphragm. This diaphragm and coil orientation provides advantages of simplicity, high linear excursion capability of the motor, and reasonable efficiency since the magnet is located overlapping the axis thereby minimising rotational inertia. The flexing type hinge may provide advantages such as simpler manufacturing and low diaphragm fundamental resonance frequency. There may be a reduction in excitation of one or more resonance modes involving a component of diaphragm assembly translation associated with hinge compliance, since the heavy magnet is located overlapping the axis thereby potentially improving balancing.

Some embodiments combine: a transducer having a rotatable diaphragm; a diaphragm-side transducing component being a magnet; the direction of a primary internal magnetic field between the magnetic poles may be substantially angled relative to a coronal plane of the diaphragm; the magnet may overlap with the axis of rotation; a base-side transducing component comprising a coil may be located adjacent and wrapped around a magnet of the transducing mechanism; a diaphragm suspension comprising a soft hinge. Preferably the direction of the primary magnetic field may be substantially orthogonal relative to a coronal plane of the diaphragm, or of a diaphragm of the diaphragm structure. Preferably the coil may be wrapped around an axis intersecting a coronal and a sagittal plane of the diaphragm. This diaphragm and coil orientation provides advantages of simplicity, high linear excursion capability of the motor, and reasonable efficiency since the magnet is located overlapping the axis thereby minimising rotational inertia. The soft type hinge may provide advantages such as simpler manufacturing and low diaphragm fundamental resonance frequency. There may be a reduction in excitation of one or more resonance modes involving a component of diaphragm assembly translation associated with hinge compliance, since the heavy magnet is located overlapping the axis thereby potentially improving balancing, which is useful in conjunction with the soft hinge type since such modes are likely to occur within the operating bandwidth.

Some embodiments combine: a transducer having a rotatable diaphragm; a diaphragm-side transducing component being a magnet; the direction of a primary internal magnetic field between the magnetic poles may be substantially angled relative to a coronal plane of the diaphragm; the magnet may overlap with the axis of rotation; a base-side transducing component comprising a coil may be located adjacent and wrapped around a magnet of the transducing mechanism; wherein the magnet overlaps with the diaphragm along the axis of rotation. Preferably the direction of the primary magnetic field may be substantially orthogonal relative to a coronal plane of the diaphragm, or of a diaphragm of the diaphragm structure. Preferably the coil may be wrapped around an axis intersecting a coronal and a sagittal plane of the diaphragm. This diaphragm and coil orientation provides advantages of simplicity, high linear excursion capability of the motor, and reasonable efficiency since the magnet is located overlapping the axis thereby minimising rotational inertia. The soft type hinge may provide advantages such as simpler manufacturing and low diaphragm fundamental resonance frequency. There may be a reduction in excitation of one or more resonance modes involving a component of diaphragm assembly translation associated with hinge compliance, since the heavy magnet is located overlapping the axis thereby potentially improving balancing. The overlapping of the magnet with the diaphragm addresses unwanted resonance by keeping higher mass components in closer proximity within the diaphragm assembly, and potentially also by letting the magnet double as a rigid diaphragm base structure preventing further resonance modes.

Some embodiments combine: a transducer having a rotatable diaphragm; a diaphragm-side transducing component being a magnet; the primary internal magnetic field of the magnet between opposing poles may be substantially parallel to a coronal plane of a diaphragm and substantially angled, such as orthogonally, relative to the axis of rotation of the diaphragm; a base-side transducing component may comprise a coil located adjacent a magnet of the transducing mechanism and wrap around a region adjacent a pole of the magnet. Preferably a plurality of coils may be located adjacent a magnet of the transducing mechanism, each wrapping around a region adjacent one of the poles of the magnet. The regions may be directly adjacent the poles. Preferably the coils are be connected in series or in parallel. This diaphragm and coil orientation provides advantages of simplicity and high linear excursion capability of the motor. The location of the coil(s) proximal to the magnet poles may reduce or eliminate the requirement for ferromagnetic pole pieces proximal to the magnet, potentially reducing attraction forces to reduce the chance of static loads on hinges, housings etc. which may facilitate more high performing and/or inexpensive materials and manufacturing methods and may improve product reliability. Preferably the magnet overlaps the axis to reduce excitation of one or more resonance modes involving a component of diaphragm assembly translation associated with hinge compliance by potentially improving balancing. Preferably the magnet overlaps with the diaphragm in the axis direction, addressing various resonance modes. Preferably there is no ferromagnetic material closer to the magnet than are the coil windings, to help minimise attraction forces to the magnet. Preferably there is no ferromagnetic path continuously connecting two different coils.

In some embodiments, instead of the magnet overlapping the axis, there is at least some part of magnet located on opposite side of axis from a diaphragm tip. Preferably a significant part of the magnet mass is located on opposite side of axis from a diaphragm tip. Preferably the diaphragm assembly comprises a single magnet.

In some embodiments a diaphragm-side transducing component is a magnet. The diaphragm is rotatably mounted on a flexible type hinge; and the flexile hinge comprises one or more of the following features as previously described:

Elongated flexing section
Two angled elements
Air cavities/foam
Anisotropic

Moving magnet transducers may be simple and inexpensive to produce while high-performing. Disadvantages may include difficulty managing resonance modes involving diaphragm translation, due to the high mass, and difficulty managing static loads and possible creep of supporting components including the hinge. The above-described hinge features may provide increased rotational compliance relative to translational compliance, which may reduce the fundamental diaphragm resonance frequency for improved low-frequency bandwidth, improve diaphragm excursion, improve fatigue life, improve resistance to creep due to attraction forces and higher mass of the magnet.

In some embodiments a diaphragm-side transducing component is a magnet, the diaphragm is rotatably mounted on a flexible type hinge, a base side force transducing component comprises a coil, there is ferromagnetic shielding a distance away from the magnet, which is not immediately proximal to either magnet or coil. Both moving magnet designs and flexible hinge designs may be simple and effective, however in combination with one-another there is risk of creep or failure, for example via buckling, in the relatively delicate hinge component if a second external magnet, say, is brought close to the diaphragm magnet. To address this potential issue ferromagnetic shielding, which may comprise, for example, a perforated ferromagnetic grill, may shield the magnet. However preferably the shielding is not too close in order to avoid causing undue static loading. Preferably there are one or more further ferromagnetic components are located, collectively/on average, at the opposite side of the magnet in order to provide a balancing attraction force, the goal being that the net static force on the magnet is reduced and hopefully small.

Alternatively, or in addition, the hinge comprises a soft material or has a soft material in close proximity. The soft material may be well-damped. For example, the hinge might be a ball bearing race, and the soft material may be a thin ring of urethane surrounding the race. The soft material may assist in management of translational diaphragm resonance modes associated with hinge compliance, for example the frequency of such modes may be shifted to below the intended operating bandwidth, or managed via inherent damping of the soft material. The ferromagnetic shielding may protect the soft material from undue magnetic force loading that may result in, for example, creep or failure in the soft material.

In some embodiments a loudspeaker transducer comprises: diaphragm-side transducing component is a magnet; the diaphragm is rotatably mounted to a driver base; a base side force transducing component comprising a coil; the coil having DC resistance less than 2.5 Ohms, more preferably is less than 2 Ohms, and most preferably is less than 1 Ohm. A moving magnet transducer may potentially provide a number of advantages including high performance via low resonance, good power handling since the coil is stationary and may be cooled via conduction, simplified manufacturing due to the fact that no wires need connect to the moving diaphragm and small magnet mass to reduce cost, and improved flexibility to increase coil mass due to the fact that the coil remains substantially stationary in-use. The ability to increase coil mass may however reach a limit whereby additional wire turns results in increasing coil inductance to a point where the high-frequency response of the transducer dips. This embodiment instead reduces the DC resistance to below the standard values of 3.1-7 Ohms, potentially necessitating specially designed amplifiers. The advantage is that coil wire mass may be further increased by increasing the wire diameter. Advantages may potentially include improvement in driver efficiency and power handling, the latter being due to increased wire mass that may be capable of acting as a heat sink and having potentially increased surface area for conduction and/or convection cooling.

In some embodiments an audio system comprises: a loudspeaker transducer; a diaphragm-side transducing component comprising a magnet; a diaphragm rotatably mounted on a flexible type hinge; a base side force transducing component comprises a coil; an equalisation system adjusting an incoming audio signal. Preferably the equalisation system increases the level of higher frequencies. Preferably coil inductance is higher than standard for the type of driver. Preferably the driver's frequency response reduces towards the upper limit of the operating bandwidth. In this embodiment driver efficiency maybe improved, at least overall, by again making use of the possibility of increasing wire mass without affecting rotational inertia, however in this example wire turns are increased, potentially to a point where associated coil inductance creates a response roll-off at higher frequencies. This roll-off may be corrected by the equalisation system resulting in an overall response that preferably exhibits no undue roll-off over the operating bandwidth. Driver efficiency may be reduced at higher frequencies due to the inductance roll-off, however overall efficiency may be improved due to the increased wire turns and associated increase in torque applied to the diaphragm. Another advantage may be the ability to utilise more standard amplifier designs that may comfortably operate outputting to 3-8 Ohm loads.

In some embodiments a loudspeaker transducer comprises: a diaphragm; a diaphragm-side transducing component is a magnet; the diaphragm is rotatably mounted to a driver base; the driver base is mounted to another component, other than the diaphragm, via a decoupling system. The moving magnet diaphragm design may form a basis for a low-resonance and cost-effective transducer, for reasons outlined above. The decoupling mounting system may also reduce resonance issues, in a potentially cost-effective way, for example by reducing excitation of resonance modes of a housing or baffle or enclosure to which the transducer may be mounted. The result may be a cost-effective yet high-performing device.

Some embodiments combine: an audio transducer having a rotational-action diaphragm; one or more features for locating the device proximal to a user's ear and; a diaphragm-side transducing component comprising a magnet. An audio transducer based on a rotatably mounted diaphragm with a moving magnet diaphragm-side transducing component may work unexpectedly well in close proximity to a user's ear due to a match between the characteristics of such drivers and the special requirements specific to personal audio drivers. Specifically personal audio driver have reduced requirement for high volume excursion because of the proximity to the ear, so performance is relatively more by limited by bandwidth considerations. A moving magnet rotational action driver as described may provide good operating bandwidth because: a magnet may provide a relatively rigid foundation supporting the base of a diaphragm without the susceptibility to flexing, twisting, bending and buckling that may occur in a more flimsy, shell-like coil structure, meaning that high-frequency bandwidth may be improved, and rotational action drivers tend to be well suited to providing good low-frequency extension because hinges may more easily be made compliant in rotation without a corresponding 'floppiness' that, in conventional headphone driver, may create high-frequency resonance. Such drivers may provide further advantages including: simplified manufacturing due to easy miniaturisation because no wires need connect to the moving diaphragm; simple hinges may be injection moulded, for example, which may provide good low frequency extension without susceptibility to high frequency resonance; diaphragm assemblies are small enough that resonance may be addressed via rigidity rather than balancing/tuning reducing required tolerances. Preferably the magnet overlaps with the diaphragm along the axis of rotation, which may keep higher mass components in closer proximity within the diaphragm assembly, again reducing resonance issues. Preferably at least two such devices are mounted one per ear and configured to reproduce stereophonic sound or other multi-channel sound format.

Some embodiments combine: an audio transducer having a rotational-action diaphragm; a diaphragm-side transducing component comprising a magnet; a diaphragm construction comprising a lightweight core and normal reinforcing coupled to one or more of the major faces, and wherein the normal stress reinforcement comprises a lower mass per unit area in a region of the diaphragm distal from the primary axis of rotation relative to a region of the diaphragm proximal to the axis. Reducing mass at the extremity reduces the support required by the preceding region, which may then be made lighter also, cumulatively reducing the support required still closer to the axis, and so on, with the net effect being to increase the frequency of certain important diaphragm tip deflection resonance modes. This construction, when coupled with a moving magnet rotational diaphragm design, may be comparatively robust against diaphragm resonances, and may furthermore be relatively simple to manufacture potentially making for an effective yet inexpensive device. Preferably the magnet overlaps with the diaphragm along the axis of rotation, which may keep higher mass components in closer proximity within the diaphragm assembly, again reducing resonance issues.

Some embodiments combine: an audio transducer having a rotational-action diaphragm; a diaphragm-side transducing component comprising a magnet; the magnet is shaped with one or more external features to improve attachment of the diaphragm. A typical magnet form used in a moving magnet rotational-action transducer may comprise a form such as a rectangular block or a cylinder. These shapes may be suitable for providing even magnetic field, however they may be problematic in terms of attaching the diaphragm, with potential issues including: if a diaphragm attaches to the widest points this may restrict the maximum angle of diaphragm excursion, or; If attachment is to an interior region attachment may be via a butt joint, for example, which may be weaker and prone to localised increases in stress. This embodiment may help to solve such issues via forming magnets with surfaces for attachment in locations that are less restrictive of diaphragm excursion and/or oriented so that loads are more in shear rather than tension/compression. Preferably the feature provides sufficient surface area for robust attachment. Preferably said feature is oriented such that adhesive loadings are more in shear as opposed to tension/compression or a butt-joint. Preferably the attachment feature avoids stress raiser/concentration geometry. Preferably the feature facilitates connection without unduly restricting diaphragm excursion. Preferably the diaphragm construction comprises a lightweight core and normal reinforcing coupled to one or more of the major faces, and the normal stress reinforcement attaches to said feature. Preferably the features incorporate a surface oriented substantially parallel to a coronal plane of the diaphragm.

Some embodiments combine: an audio transducer having a rotational-action diaphragm; a diaphragm-side transducing component comprising a magnet; one or more relatively thick intermediate attachment components which may: attach to the magnet with increased surface area; comprise sufficient thickness to resist localised stress increases; transfer loads to one or more thinner diaphragm components diaphragm via one or more surfaces designed more like the attachment features in the previous embodiment. These components are basically adhered to the magnet and replicate the function of the attachment features of the previous example.

In some embodiments a loudspeaker transducer comprises: a diaphragm; a diaphragm-side transducing component is a magnet; the diaphragm is rotatably mounted to a driver base; the driver base has cooling fins incorporated to help remove heat generated within the coil. Preferably the driver base is intimately connected to the coil, in order to maximise conduction of heat away from said coil. Preferably some of the cooling fins are exposed to outside air, to improve cooling. Preferably other fins are exposed to air inside the device. The advantage is that the fins increase the area of the base that is exposed to the environment, thereby increasing the rate of cooling and improving the power handling capability of the device.

The foregoing description of the invention includes preferred embodiments audio transducer, audio device, hinge system and electronic device embodiments. The description also includes various embodiments, examples and principles of design and construction of other systems, assemblies, structures, devices, methods and mechanisms relating to the abovementioned preferred embodiments. Modifications to the embodiments and to the other related systems, assemblies, structures, devices, methods and mechanisms disclosed herein may be made, as would be apparent to those skilled in the relevant art, without departing from the spirit and scope of the invention as defined by the accompanying claims.

The invention claimed is:

1. An audio transducer comprising:

a diaphragm;

a transducer base structure;

a diaphragm suspension configured to rotatably mount the diaphragm relative to the transducer base structure to enable the diaphragm to rotate relative to the transducer base structure about an axis of rotation, wherein the diaphragm suspension comprises at least one hinge and the diaphragm extends radially, in a single radial direction, from the axis of rotation; and a transducing mechanism operatively coupled to the diaphragm to transduce between audio signals and sound pressure;

wherein the diaphragm comprises at least one major face having a profile that is substantially convex along the single radial direction of the diaphragm, wherein a diaphragm thickness tapers along the single radial direction, reducing in thickness from a central region towards a terminal end that is distal to the axis of rotation, and wherein the diaphragm thickness comprises one of:

tapers from the central region reducing toward a base end proximal the axis of rotation, or is substantially uniform from the base end to the central region.

2. An audio transducer as claimed in claim 1 wherein a pair of opposing major faces of the diaphragm each comprise a profile that is substantially convex along the single radial direction of the diaphragm.

3. An audio transducer as claimed in claim 1 wherein the diaphragm thickness tapers from the central region toward the terminal end is substantially stepped.

4. An audio transducer as claimed in claim 1 wherein the diaphragm thickness tapers from the central region toward the terminal end is substantially curved.

5. An audio transducer as claimed in claim 1 wherein at least one major face of the diaphragm comprises, a first angle, relative to a first imaginary plane bisecting the diaphragm and comprising the axis of rotation, between the central region and base end, and a second angle relative to the first imaginary plane between the central region and the terminal end, and wherein an absolute value of the first angle is less than an absolute value of the second angle.

6. An audio transducer as claimed in claim 1 wherein the diaphragm remains substantially rigid in-use.

7. An audio transducer as claimed in claim 1 wherein the diaphragm comprises a diaphragm body that is substantially thick.

8. An audio transducer as claimed in claim 7 wherein the diaphragm body comprises a maximum thickness that is greater than 12% of a length of the diaphragm body along the single radial direction.

9. An audio transducer as claimed in claim 7 wherein the diaphragm body comprises a maximum thickness that is greater than 15% of a length of the diaphragm body along the single radial direction.

10. An audio transducer as claimed in claim 1 wherein the diaphragm comprises a varying mass along a length of the diaphragm, and wherein the diaphragm comprises a relatively lower mass, per unit area, in regions of the diaphragm that are distal from the axis of rotation relative to regions that are proximal to the axis of rotation.

11. An audio transducer as claimed in claim 1 wherein the diaphragm comprises a diaphragm body and normal stress reinforcement coupled to the diaphragm body at or adjacent the at least one major face for resisting compression-tension stresses experienced by the diaphragm body, at or adjacent the at least one major face, during operation.

12. An audio transducer as claimed in claim 11 wherein the diaphragm comprises a pair of opposing major faces, and the normal stress reinforcement is coupled to the diaphragm body at or adjacent the pair of opposing major faces.

13. An audio transducer as claimed in claim 11 wherein the normal stress reinforcement comprises a relatively lower mass, per unit area, in regions of the diaphragm that are distal from the axis of rotation relative to regions that are proximal to the axis of rotation.

14. An audio transducer as claimed in claim 11 wherein the diaphragm comprises a diaphragm base structure rigidly coupled to the diaphragm body and located at or proximal to the axis of rotation, and the diaphragm base structure is rigidly connected to the normal stress reinforcement.

15. An audio transducer as claimed in claim 1 wherein the diaphragm comprises a diaphragm body and at least one inner reinforcement member embedded within the diaphragm body and oriented at an angle relative to the at least one major face for resisting and/or substantially mitigating shear deformation experienced by the diaphragm body during operation.

16. An audio transducer as claimed in claim 15 wherein each inner reinforcement member extends along a length of the diaphragm from adjacent the axis of rotation toward a terminal end of the diaphragm.

17. An audio transducer as claimed in claim 16 comprising a plurality of inner reinforcement members along a dimension of the diaphragm that is substantially parallel to the axis of rotation.

18. An audio transducer as claimed in claim 1 wherein the diaphragm comprises a diaphragm body, and a diaphragm base structure rigidly coupled to the diaphragm body and located at or proximal to the axis of rotation.

19. An audio transducer as claimed in claim 18 wherein the diaphragm base structure rigidly connects the diaphragm body to the diaphragm suspension.

20. An audio transducer as claimed in claim 18 wherein the diaphragm base structure rigidly connects the diaphragm body to the transducing mechanism.

21. An audio transducer as claimed in claim 18 wherein the diaphragm base structure is rigidly coupled to the diaphragm body via a rigid component or components that is or are sufficiently straight and/or sufficiently thick to substantially resist bending deformation during operation.

22. An audio transducer as claimed in claim 18 wherein the diaphragm base structure comprises relatively rigid materials having a Young's Modulus of at least approximately 8 GPa.

23. An audio transducer as claimed in claim 1 further comprising a structure immediately surrounding the diaphragm, and an outer periphery of the diaphragm is at least partially free from physical connection with an interior of the structure immediately surrounding the diaphragm.

24. An audio transducer as claimed in claim 1 wherein the diaphragm suspension flexibly mounts the diaphragm relative to the transducer base structure.

25. An audio transducer as claimed in claim 24 wherein the diaphragm suspension comprise at least one hinge mount formed from a substantially soft material having an average Young's Modulus of less than approximately eight Gigapascals (GPa).

26. An audio transducer as claimed in claim 24 wherein the diaphragm suspension comprises at least one hinge mount that has sufficiently low Young's Modulus such a fundamental diaphragm resonance frequency is less than approximately 100 Hertz.

27. An audio transducer as claimed in claim 24 wherein at least one hinge mount of the diaphragm suspension is substantially compliant in translation such that the at least one hinge mount deforms substantially linearly along at least one axis during operation.

28. An audio transducer as claimed in claim 27 wherein the at least one hinge mount is substantially compliant in translation such that the at least one hinge mount deforms substantially linearly along at least two orthogonal axes during operation.

29. An audio transducer as claimed in claim 28 wherein the at least one hinge mount is substantially compliant in translation such that the at least one hinge mount deforms substantially linearly along three orthogonal axes during operation.

30. An audio transducer as claimed in claim 24, wherein each hinge mount is formed from a material having Young's modulus, in compression, that is less than 1 GPa.

31. An audio transducer as claimed in claim 30 wherein each hinge mount is formed from a material having a Young's modulus that is greater than 0.003 GPa.

32. An audio transducer as claimed in claim 24 wherein each hinge mount is substantially damped.

33. An audio transducer as claimed in claim 32 wherein each hinge mount is formed from a material having a material loss coefficient, at 30 degrees Celsius and 100 Hertz operating frequency, that is greater than 0.005.

34. An audio transducer as claimed in claim 32 wherein each hinge mount is supported by a material having a material loss coefficient, at 30 degrees Celsius and 100 Hertz operating frequency, that is greater than 0.005.

35. An audio transducer as claimed in claim 1 wherein the diaphragm suspension comprises at least one mount formed from an elastomer or soft plastics material.

36. An audio transducer as claimed in claim 1 wherein the transducing mechanism comprises a magnet coupled to the diaphragm and configured to move with the diaphragm, during operation.

37. An audio transducer as claimed in claim 36 wherein the magnet is configured to rotate with the diaphragm about the axis of rotation, during operation.

38. An audio transducer as claimed in claim 1 wherein the diaphragm thickness tapers from the central region toward the base end is substantially stepped.

39. An audio transducer as claimed in claim 1 wherein the diaphragm thickness tapers from the central region toward the base end is substantially curved.

40. An audio transducer as claimed in claim 1 wherein the central region is located at approximately 15-50% of a longitudinal length between the base end and the terminal end of the diaphragm.

41. An audio transducer as claimed in claim 1 wherein the at least one major face that is substantially convex along the single radial direction of the diaphragm is substantially curved.

42. An audio transducer as claimed in claim 1 wherein the at least one major face that is substantially convex along the single radial direction comprises a pair of substantially planar segments meeting at a substantially sharp, stepped or curved transition.

43. An audio transducer comprising:

a diaphragm;

a transducer base structure;

a diaphragm suspension configured to rotatably mount the diaphragm relative to the transducer base structure to enable the diaphragm to rotate relative to the transducer base structure about an axis of rotation, wherein the diaphragm suspension comprises at least one hinge and the diaphragm extends radially, in a single radial direction, from the axis of rotation; and a transducing mechanism operatively coupled to the diaphragm to transduce between audio signals and sound pressure;

wherein the diaphragm comprises at least one major face having a profile that is substantially convex along the single radial direction of the diaphragm, and wherein:

the diaphragm comprises a varying mass along a length of the diaphragm, and the diaphragm comprises a relatively lower mass, per unit area, in regions of the diaphragm that are distal from the axis of rotation relative to regions that are proximal to the axis of rotation.

44. An audio transducer comprising:

a diaphragm;

a transducer base structure;

a diaphragm suspension configured to rotatably mount the diaphragm relative to the transducer base structure to enable the diaphragm to rotate relative to the transducer base structure about an axis of rotation, wherein the diaphragm suspension comprises at least one hinge and the diaphragm extends radially, in a single radial direction, from the axis of rotation; and a transducing mechanism operatively coupled to the diaphragm to transduce between audio signals and sound pressure;

wherein the diaphragm comprises at least one major face having a profile that is substantially convex along the single radial direction of the diaphragm, and wherein:

the diaphragm comprises a diaphragm body and normal stress reinforcement coupled to the diaphragm body at or adjacent the at least one major face for resisting compression-tension stresses experienced by the diaphragm body, at or adjacent the at least one major face, during operation, and the normal stress reinforcement comprises a relatively lower mass, per unit area, in regions of the diaphragm that are distal from the axis of rotation relative to regions that are proximal to the axis of rotation.

45. An audio transducer comprising:

a diaphragm;

a transducer base structure;

a diaphragm suspension configured to rotatably mount the diaphragm relative to the transducer base structure to enable the diaphragm to rotate relative to the transducer base structure about an axis of rotation, wherein the diaphragm suspension comprises at least one hinge and the diaphragm extends radially, in a single radial direction, from the axis of rotation; and a transducing mechanism operatively coupled to the diaphragm to transduce between audio signals and sound pressure;

wherein the diaphragm comprises at least one major face having a profile that is substantially convex along the single radial direction of the diaphragm, and wherein:

the diaphragm suspension flexibly mounts the diaphragm relative to the transducer base structure, and the diaphragm suspension comprises at least one hinge mount formed from a substantially soft material having an average Young's Modulus of less than approximately eight Gigapascals (GPa).

46. An audio transducer comprising:

a diaphragm;

a transducer base structure;

a diaphragm suspension configured to rotatably mount the diaphragm relative to the transducer base structure to enable the diaphragm to rotate relative to the transducer base structure about an axis of rotation, wherein the diaphragm suspension comprises at least one hinge and the diaphragm extends radially, in a single radial direction, from the axis of rotation; and a transducing mechanism operatively coupled to the diaphragm to transduce between audio signals and sound pressure, the transducing mechanism having a magnet coupled to the diaphragm and configured to rotate with the diaphragm about the axis of rotation, during operation, and wherein the diaphragm comprises at least one major face having a profile that is substantially convex along the single radial direction of the diaphragm.

* * * * *